United States Patent
Okamoto et al.

[11] Patent Number: 5,960,028
[45] Date of Patent: Sep. 28, 1999

[54] SPREAD SPECTRUM COMMUNICATION SYSTEM

[75] Inventors: Naoki Okamoto, Nara; Minoru Kubota, Ichihara; Yasuhiro Hamaguchi, Chiba, all of Japan

[73] Assignee: Sharp Kabushiki Kaisha, Osaka, Japan

[21] Appl. No.: 08/689,412

[22] Filed: Aug. 7, 1996

[30] Foreign Application Priority Data

| Aug. 11, 1995 | [JP] | Japan | 7-206159 |
| Jan. 30, 1996 | [JP] | Japan | 8-13963 |
| Mar. 5, 1996 | [JP] | Japan | 8-47118 |
| Mar. 11, 1996 | [JP] | Japan | 8-53363 |
| Mar. 25, 1996 | [JP] | Japan | 8-68222 |
| Apr. 22, 1996 | [JP] | Japan | 8-100107 |

[51] Int. Cl.$^6$ ................................................. H04B 15/00
[52] U.S. Cl. ................. 375/200; 375/206; 375/209; 375/296
[58] Field of Search .............................. 342/58, 86–87, 342/92; 370/206, 208–209, 335, 479; 375/200, 206, 208–209, 340, 343; 455/65, 67.3, 67.6, 276.1, 279.1, 422, 562

[56] References Cited

U.S. PATENT DOCUMENTS

| 5,237,586 | 8/1993 | Bottomley | 375/200 |
| 5,493,588 | 2/1996 | Lennen | 375/343 |
| 5,559,828 | 9/1996 | Armstrong et al. | 375/200 |
| 5,602,833 | 2/1997 | Zehavi | 370/209 |
| 5,629,956 | 5/1997 | Durrant et al. | 375/208 |
| 5,680,414 | 10/1997 | Durrant et al. | 375/206 |
| 5,715,236 | 2/1998 | Gilhousen et al. | 370/209 |
| 5,745,839 | 4/1998 | Lieberman | 455/10 |

FOREIGN PATENT DOCUMENTS

| 3-150938 | 6/1991 | Japan . |
| 4-360434 | 12/1992 | Japan . |
| 5-183534 | 7/1993 | Japan . |
| 5-252141 | 9/1993 | Japan . |

OTHER PUBLICATIONS

"Spread Spectrum Communication System", by Mitsuo Yokoyama, Kagaku–Gijutsu Shuppansha, pp. 528–538.

*Primary Examiner*—Stephen Chin
*Assistant Examiner*—Joseph Roundtree

[57] ABSTRACT

A transmitter of a spread spectrum communication system includes a data generating portion, a differential coding portion, an S/P converting portion, multipliers, PN generator, a local signal generator, modulators, delay elements, combiner, a frequency converting portion, a power amplifying portion and a transmission antenna. Parallel signals are multiplied by a spread code from the PN generator, and the results are delayed by delay elements and multiplexed. Time difference between the delay times are set to an arbitrarily time period of at least 1 chip from each other. Therefore, error rate characteristics can be improved, and degradation of correlated output is suppressed, whereby difficulty in demodulation can be avoided.

42 Claims, 109 Drawing Sheets

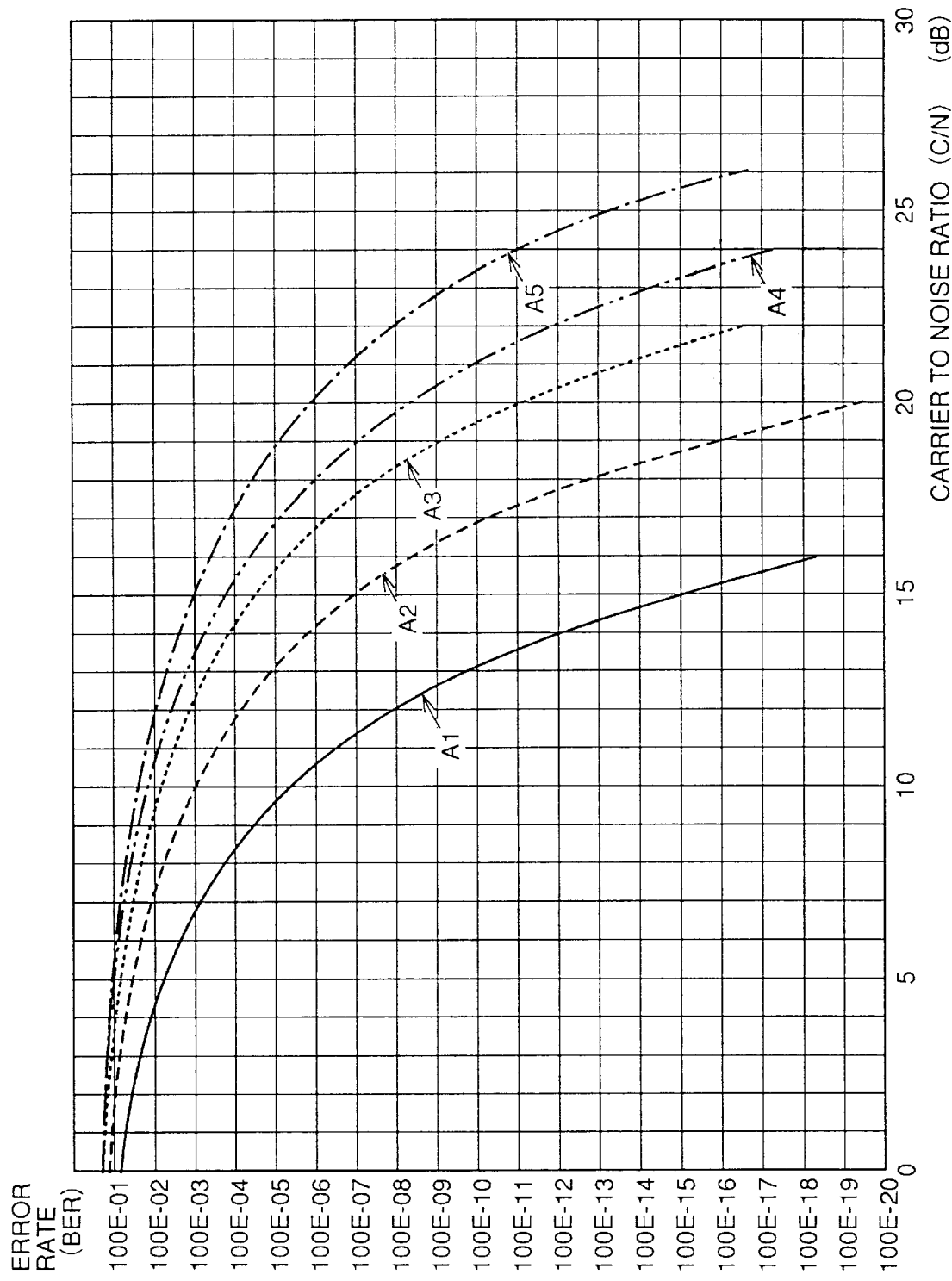

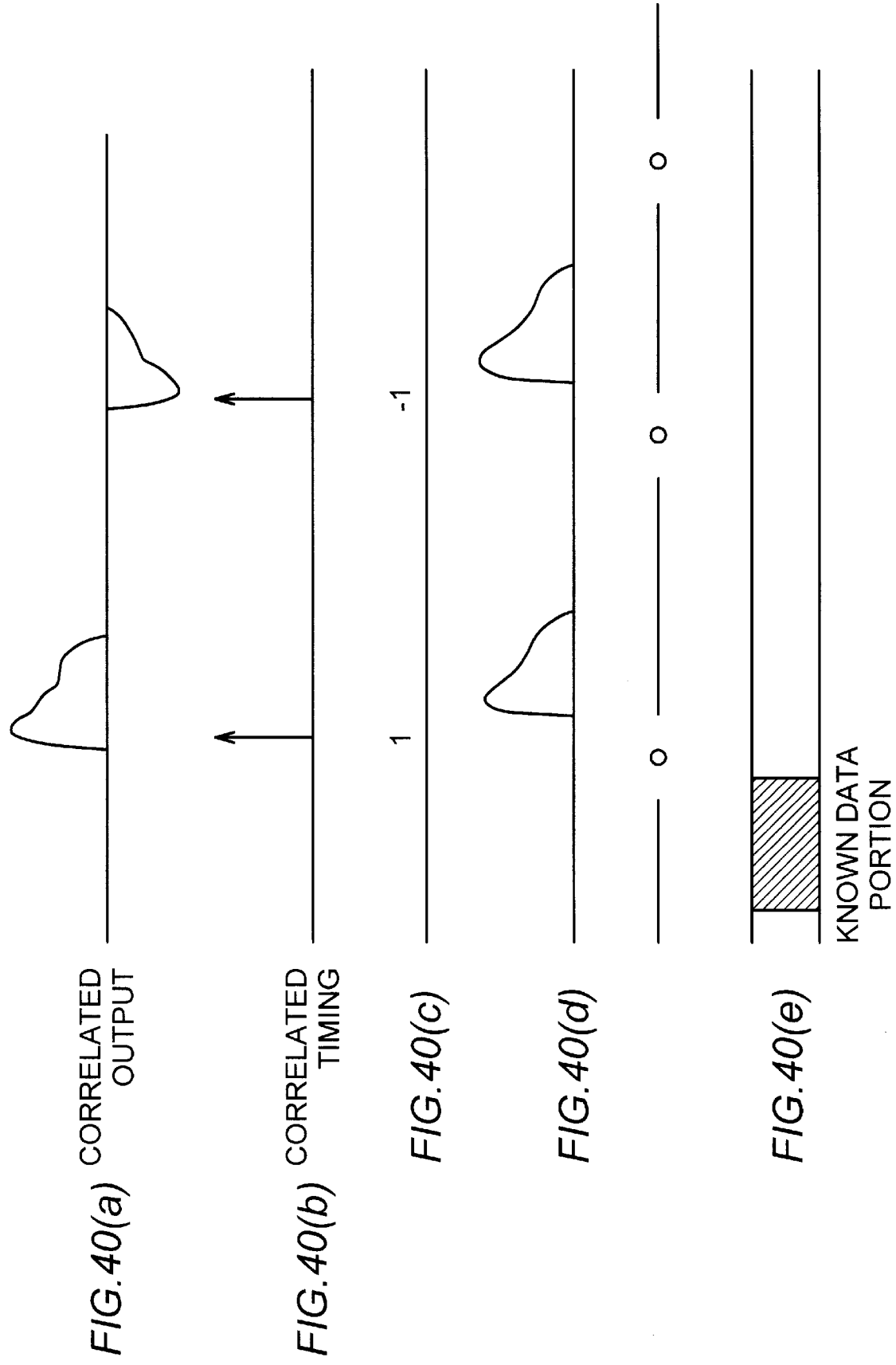

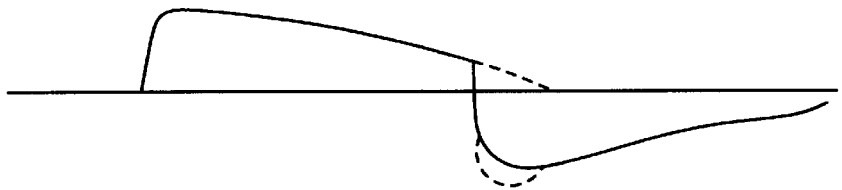
FIG.44(a)
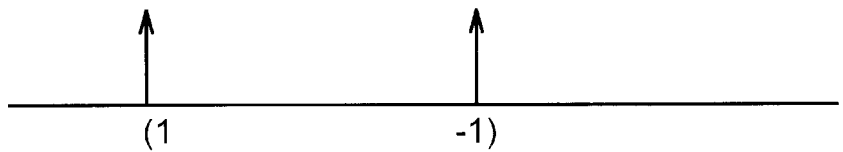
FIG.44(b)
FIG.44(c)
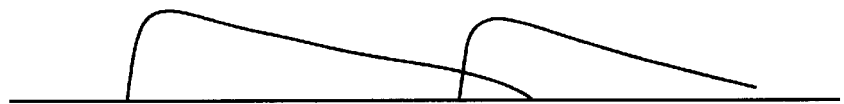
FIG.44(d)
FIG.44(e)
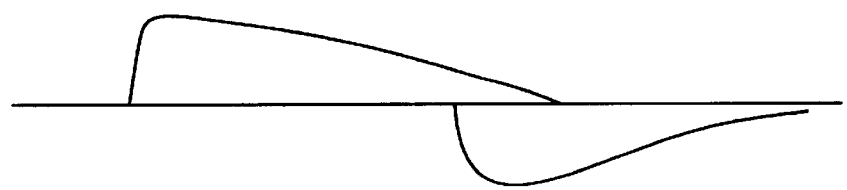

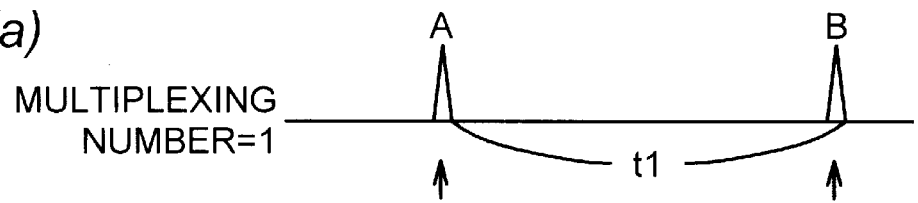
FIG.47(a) MULTIPLEXING NUMBER=1
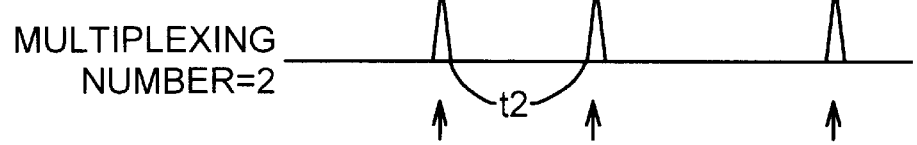
FIG.47(b) MULTIPLEXING NUMBER=2
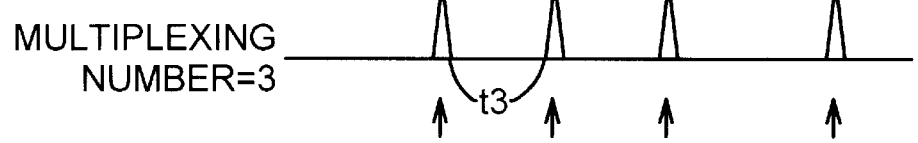
FIG.47(c) MULTIPLEXING NUMBER=3
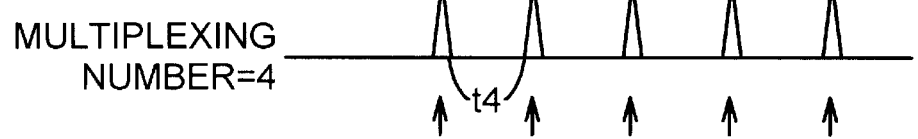
FIG.47(d) MULTIPLEXING NUMBER=4
FIG.47(e) MULTIPLEXING NUMBER=5

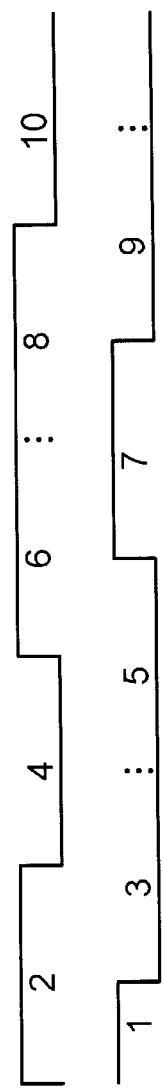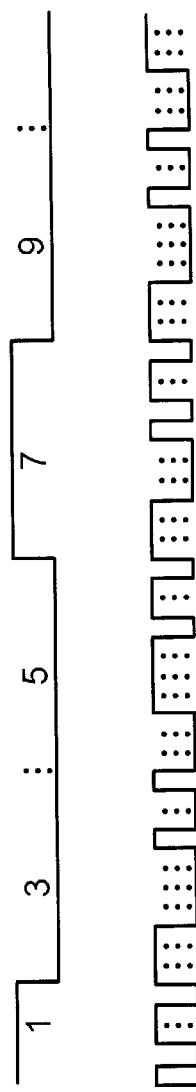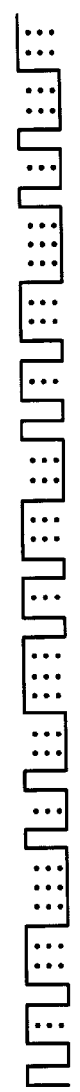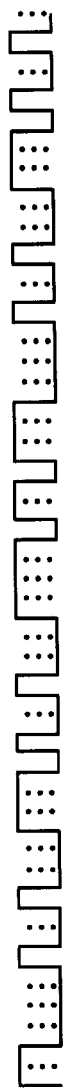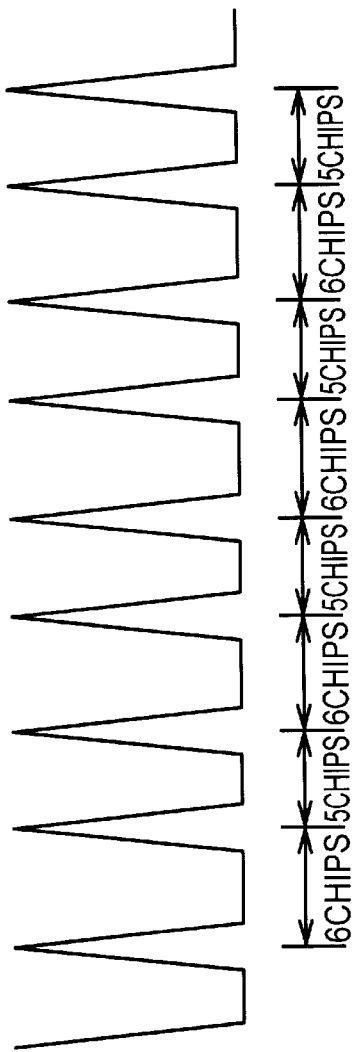
FIG.59(a) INFORMATION BIT SEQUENCE 1
FIG.59(b) INFORMATION BIT SEQUENCE 2
FIG.59(c) SPREAD BY 11 CHIPS CODE 1
FIG.59(d) SPREAD BY 11 CHIPS CODE 2
FIG.59(e) CORRELATION PEAK DETECTION PERIOD AT RECEIVER

FIG. 66

FIG.70(a)
RXI 
FIG.70(b)
RXQ 
↓ CORRELATOR
FIG.70(c) Isum 
FIG.70(d) Qsum 
(MOVED FOR CONVENIENCE OF ILLUSTRATION)
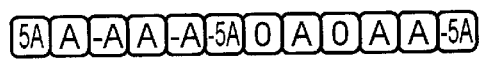
FIG.70(e)
OUTPUT CLK FROM CORRELATION SYNC CKT
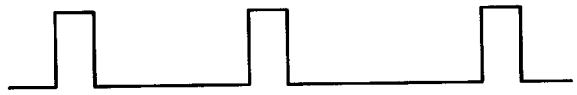
FIG.70(f)
INPUT TO DIFFERENTIAL DEMODULATING POTION (I SIDE)
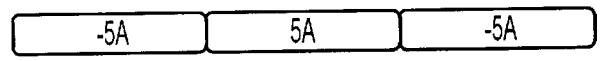
FIG.70(g)
INPUT TO DIFFERENTIAL DEMODULATING PORTION (Q SIDE)
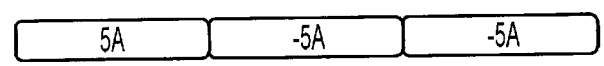
FIG.70(h)
OUTPUT FROM DIFFERENTIAL DEMODULATING PORTION (I SIDE)
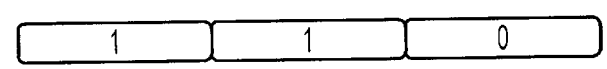
FIG.70(i)
OUTPUT FROM DIFFERENTIAL DEMODULATING PORTION (Q SIDE)
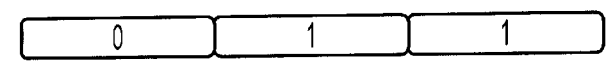
FIG.70(j)
OUTPUT AFTER P/S CONVERSION

FIG.73
WHEN TRANSMISSION DATA IS 1
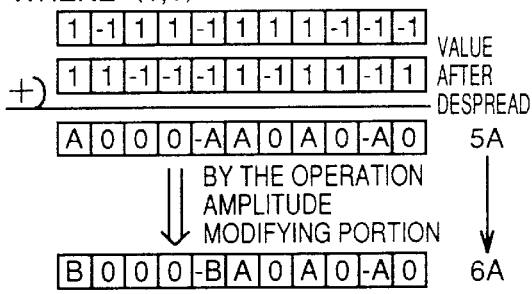
WHERE (1,1)
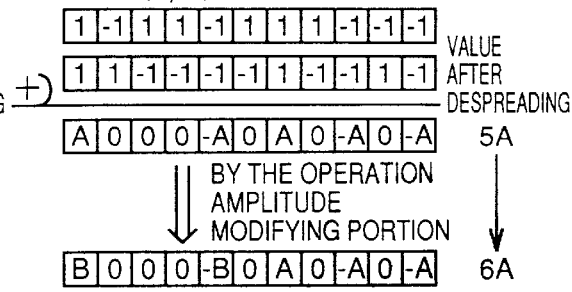
WHERE (1,-1)
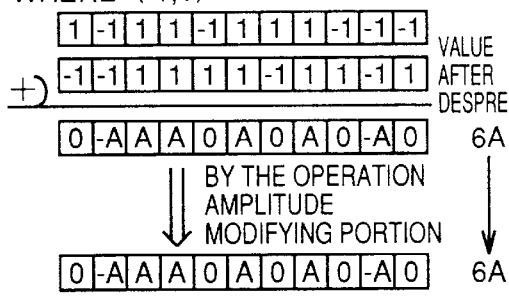
WHERE (-1,1)
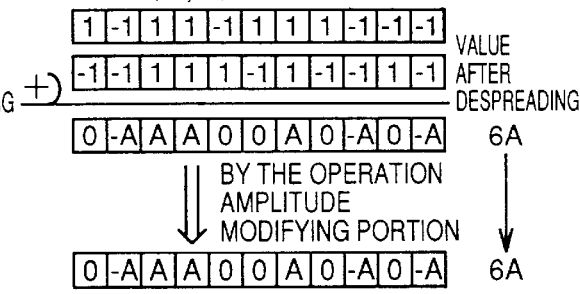
WHERE (-1,-1)
WHERE B=1.5A
WHEN TRANSMISSION DATA IS -1
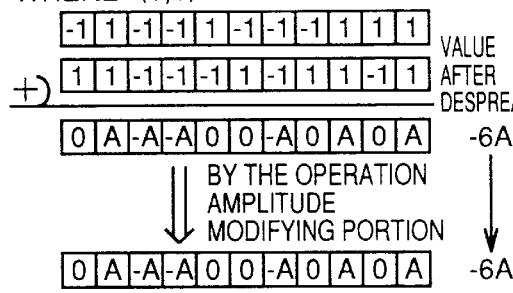
WHERE (1,1)
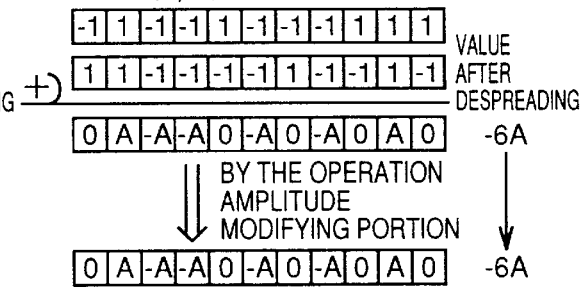
WHERE (1,-1)
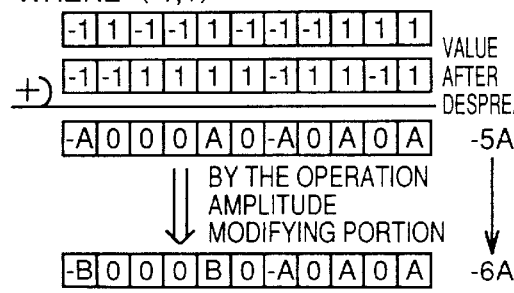
WHERE (-1,1)
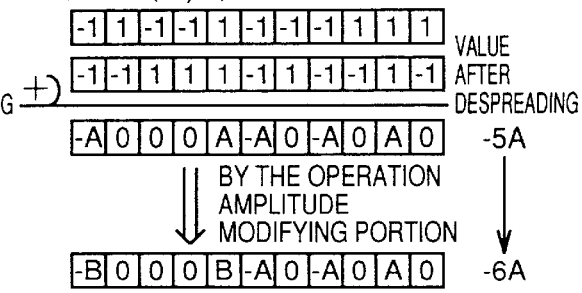
WHERE (-1,-1)
WHERE B=1.5A FIG.76(a)
RXI 
FIG.76(b)
RXQ 
↓ CORRELATOR
FIG.76(c) Isum 
FIG.76(d) Qsum 
(MOVED FOR CONVENIENCE OF ILLUSTRATION)
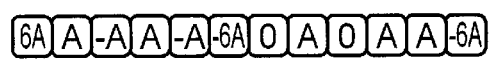
FIG.76(e)
OUTPUT CLK FROM CORRELATION SYNC CKT
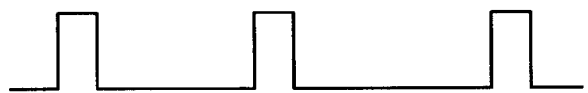
FIG.76(f)
INPUT TO DIFFERENTIAL DEMODULATING PORTION (I SIDE)
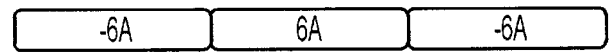
FIG.76(g)
INPUT TO DIFFERENTIAL DEMODULATING PORTION (Q SIDE)
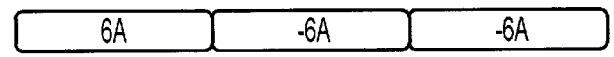
FIG.76(h)
OUTPUT FROM DIFFERENTIAL DEMODULATING PORTION (I SIDE)
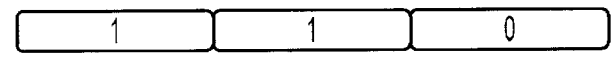
FIG.76(i)
OUTPUT FROM DIFFERENTIAL DEMODULATING PORTION (Q SIDE)
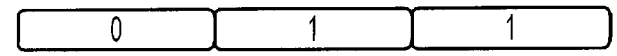
FIG.76(j)
OUTPUT AFTER P/S CONVERSION

EVEN  1  1   1 1 -1 -1 -1 -1 -1 -1 -1 -1 -1 1 1

-1 -1  -1 1 1 1 1 1 1 1 1 1 1 -1 1

(11 CHIPS BARKER)

ODD   1  -1  1 1 1 -1 1 -1 1 -1 1 -1 1 -1 -1 1

```
EVEN   1   1     15  -1  -1  -1  -1  -1  -1  -1  -1  -1  -1  -1  -1  -1  -1  -1  -1   15
      -1  -1    -15   1   1   1   1   1   1   1   1   1   1   1   1   1   1   1   1  -15

ODD    1  -1     15   1   3   5   3   1   3  -3  -3  -3  -1  -3  -5  -1  -15
      -1   1    -15   1  -3  -5  -3  -1  -3   3   3   3   1   3   5   1   15
```

(15 CHIPS M SEQUENCE)

(13 CHIPS BARKER)

| | | | | | | | | | | | | | | | | |
|---|---|---|---|---|---|---|---|---|---|---|---|---|---|---|---|---|
| EVEN | 1 | 1 | 13 | 1 | 1 | 1 | 1 | 1 | 1 | 1 | 1 | 1 | 1 | 1 | 1 | 13 |
| | -1 | -1 | -13 | -1 | -1 | -1 | -1 | -1 | -1 | -1 | -1 | -1 | -1 | -1 | -1 | -13 |
| ODD | 1 | -1 | 13 | -1 | 1 | -1 | 1 | -1 | 1 | -1 | 1 | -1 | 1 | -1 | 1 | -13 |
| | -1 | 1 | -13 | 1 | -1 | 1 | -1 | 1 | -1 | 1 | -1 | 1 | -1 | 1 | -1 | 13 |

TIMING SIGNAL

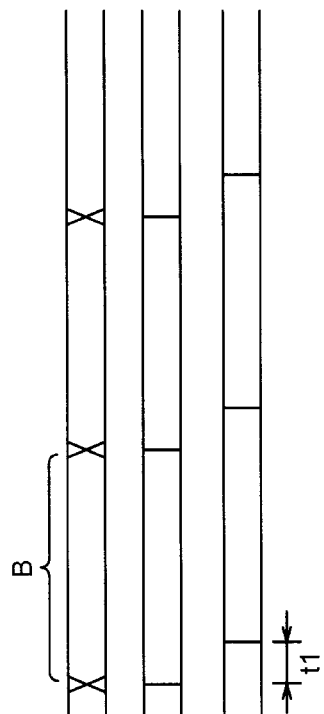
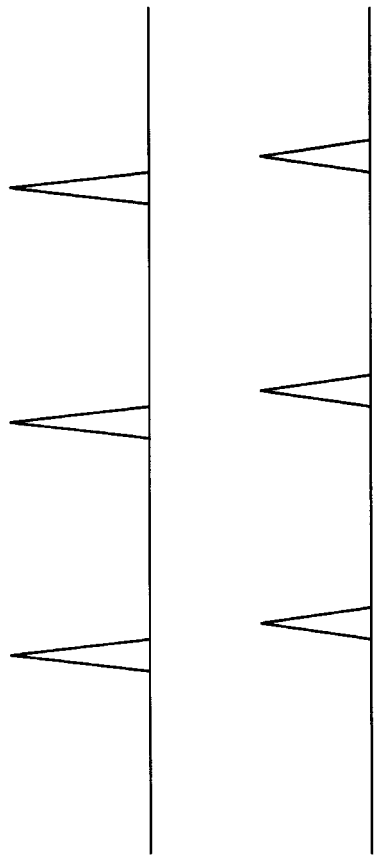
FIG.126(a) PRIOR ART
FIG.126(b) PRIOR ART
FIG.126(c) PRIOR ART
FIG.126(d) PRIOR ART
FIG.126(e) PRIOR ART

FIG.127 PRIOR ART

| a | 1 | 1 | 0 |
|---|---|---|---|
| b | 1 0 1 0 1 0 1 | 1 0 1 0 1 0 1 | 1 0 1 0 1 0 1 |
| c | 1 0 1 0 1 0 1 | 1 0 1 0 1 0 1 | 0 1 0 1 0 1 0 |
| d | 1 0 1 0 1 0 1 | 1 0 1 0 1 0 1 | 1 0 1 0 1 0 1 |
| e | 7 | 7 | -7 |

FIG.128 PRIOR ART

| a | 1 | 1 | 0 f | 1 |
|---|---|---|---|---|
| b | 1 0 1 0 1 0 1 | 1 0 1 0 1 0 1 | 1 0 1 0 1 0 1 | |
| c | 1 0 1 0 1 0 1 | 1 0 1 0 1 0 0 | 0 1 0 1 0 1 1 | |
| d | 1 0 1 0 1 0 1 | 1 0 1 0 1 0 1 | 1 0 1 0 1 0 1 | |
| e | 7 | 5 | -5 | |

(arrows label: f, g pointing to third column)

SPREAD SPECTRUM COMMUNICATION SYSTEM

BACKGROUND OF THE INVENTION

1. Field of the Invention

The present invention relates to a spread spectrum communication system capable of preventing degradation of communication performance while realizing multiplexed high-speed communication.

2. Description of the Background Art

Communication using narrow band modulation system has been conventionally used in a the field of data communication. Such a system is advantageous in that demodulation at the receiver can be carried out by a relatively small circuitry However, it has a disadvantage that it is weak against multiple path fading and narrow band color noise in a room (office, factory or the like).

By contrast, in spread spectrum communication system, spectrum of data is spread by a spread code and the data is transmitted in a wide band. Therefore, the aforementioned disadvantage can be eliminated.

In Japan, use of ISM band of 2.45 GHz has been approved and comes to be practically used. The permitted band within the ISM band of 2.45 GHz is the band width of 26 MHz, with the spreading rate of at least 10. Accordingly, when BPSK modulation is used, for example, the data rate which can be transmitted is about 1.3 MHz.

On the other hand, higher speed of communication has been desired, and for this purpose, multiplexed transmission becomes necessary. One method has been proposed for this multiplex transmission, in which data are spread by the same spreading code and the spread code are multiplex with a delay. This will be described in detail.

FIG. 123 is a schematic block diagram showing a transmitter of a conventional spread spectrum communication system. Referring to FIG. 123, the transmitter of the conventional spread spectrum communication system includes a serial/parallel converting portion 461, multipliers 463, 465, 467, delay circuits 469, 471, 473, a spread code generator (PN generator) 475, a synchronizing circuit 477, an adder 479, an amplifier 481, a local oscillator 483, a spread code generator for synchronization (PN generator for synchronization) 485, a multiplier 487 and a mixing circuit 489.

In the transmitter of the conventional spread spectrum communication system, serial baseband data S is converted to N channel parallel data by serial/parallel converting portion 461. Meanwhile, a first spread code generated by PN generator 475 is input to N type of delay circuits 469 to 473. The delay time is selected to be shorter than one cycle time of the spread code pattern, and respective delay circuits have mutually different delay times.

The PN generator 485 for synchronization generates a second spread code in synchronization with the first spread code. The second spread code is used for acquisition and tracking in synchronization with the receiving side.

The N channel parallel data output from serial/parallel converting portion 461 are subjected to spreading and modulated by the N type of first spreading code having different phases, by multipliers 463 to 467. The spread and modulated data are subjected to analog addition at adder 479 and converted to data of 1 channel.

Mixing circuit 489 mixes the output from PN generator 485 for synchronization and an output from local oscillator 483, and multiplier 487 multiplies the output from adder 479 by the output from mixing circuit 489. The multiplied data is amplified by amplifier 481 and externally transmitted through an antenna, not shown, from a duplexer, not shown, as a radio signal.

The transmitter of the conventional spread spectrum communication system described above is disclosed in Japanese Patent Laying-Open No. 4-360434. In this laid open patent, it is mentioned that delay circuits 469 to 473 have mutually different delay time. However, it is not disclosed that the delay is at least 1 chip. When the delay is 1 chip or shorter, it is possible that correlated outputs are overlapped in the receiver, degrading error rate characteristic. This will be described in a greater detail.

FIG. 124 shows correlated outputs on the receiver side, when the delay provided on the transmitting side is within 1 chip. The abscissa represents time t. Referring to FIG. 124, it can be understood that two correlated waveforms are overlapped. In this case, at a sample point SP, because of the influence of signal component (the portion represented by the arrow a) at the overlapping portion, correlated outputs are degraded, and hence error rate characteristic at the time of reception is also degraded. This is because autocorrelation characteristic of two correlated waveforms are independent when the waveforms are apart from each other by at least 1 chip, but not independent when the waveforms are not apart from each other by at least 1 chip.

In the transmitter of the conventional spread spectrum communication system, the first spread code is delayed, and the delayed first spread code is multiplied by parallel converted data to realize spreading. In this method, the point at which data changes and the start of the spreading code are not matched. This results in a disadvantage that demodulation using a correlator becomes difficult. This will be described in greater detail. FIG. 125 shows parallel converted data (N channel parallel data) and the first spread code shown in FIG. 123.

In FIG. 125, (a) represents parallel converted data at nodes a1, a2, . . . , aN of the transmitter shown in FIG. 123. The data at respective nodes a1 to aN all have the same timing.

In FIG. 125, (b) shows the first spreading code at node b of the transmitter shown in FIG. 123. It is assumed that one cycle of the spread code is T.

In FIG. 125, (c) show spread codes at nodes c1, c2, . . . cN of the transmitter shown in FIG. 123. The first spread code at nodes c1 to cN are delayed by the delay time $\tau_1$ to $\tau_N$, by corresponding delay circuits 469 to 473, respectively. Therefore, as shown in (a) and (c) of FIG. 125, the timings of the first delay codes are shifted from the timing of the parallel converted data. The influence when the timing of the first spreading codes are offset from the timings of the parallel converted data will be described in greater detail.

FIG. 126 is an illustration showing undesirable influence caused when the timing of the first spreading codes is offset from the timing of the parallel converted data in the transmitter.

In FIG. 126, (a) shows the parallel converted data at node a1 of FIG. 123. Here, B represents 1 bit of data.

In FIG. 126, (b) shows a spread code at node b of FIG. 123. In FIG. 126, (c) shows a spread code at node c1 of FIG. 123. As can be seen from these portions, the first spread code is delayed by $\tau_1$ from the parallel converted data, and the timing is offset.

FIG. 126 (d) represents correlated output at a receiver not shown, when the parallel converted data and the first spread code are well timed. FIG. 126(e) shows the correlated output at the receiver, when the timing of the first spread code is offset by the delay time $\tau_1$ from the parallel converted data.

As shown in (d) and (e) of FIG. 126, if the parallel converted data and the first spread code are off timing, the correlated output becomes smaller at the receiver. The reason for this is that the first spread code is replaced by a code of a correlator included in a receiver, not shown, as the input signal (data) is inverted midway the first spread code. This will be described in greater detail.

FIG. 127 shows specific examples of correlated outputs when the timings of the data and the first spread code are matched.

The row a represents data. The row b represents the first spread code. The first spread code includes 7 chips. More specifically, the first spread code is (1010101).

The row c represents the result of multiplication of the data by the first spread code. The row d represents correlator code possessed by the correlator of the receiver. The row e represents correlated outputs.

FIG. 128 shows specific examples of the correlated outputs at the receiver, when the timing of data is offset from the timing of the first spread code.

Referring to FIG. 128, the row a represents data. The row b represents the first spread code. The first spread code includes, similar to the first spread code shown in FIG. 127, 7 chips.

The row c represents results of multiplication of data by the first spread code. The row d represents correlator code possessed by the correlator of the receiver. The row e represents correlated output.

As can be seen from the rows a and b, the timing of the data is off from the timing of the first spread code. In FIG. 127, the correlated outputs based on the second from the left data 1 is 7. Meanwhile, in FIG. 128, the correlated output based on the second from left data 1 is 5. From the comparison between FIGS. 127 and 128, it is understood that correlated output is degraded when the data and the first spread code are off the timing. The correlated output for the third from the left data 0 is also degraded.

The reason why the correlated output based on the second from the left data is not 7 but 5 in FIG. 128 will be described. The first spread code is delayed with respect to the data. Therefore, the last information 1 (denoted by arrow f) of the second from the left spread code corresponding to the second from the left data 1 is multiplied not by the second from the left data 1 but by the next, the third from the left data 0 (denoted by the arrow g). Accordingly, as shown second from the left portion of the row c, the result of the multiplication of the spread code and the data is 1010100. By contract, in FIG. 127, as can be seen at the second from the left portion of the row c, the result of multiplication of the data by the first spread code is 1010101.

The correlator codes are the same both in FIGS. 127 and 128.

From the foregoing, the correlated output based on the second from the left data 1 of FIG. 127 is 7, while correlated output based on data 1 of FIG. 128 is 5, that is, degraded. The same applies to the correlated output based on the third from the left data 0.

From the foregoing, it becomes clear why demodulation becomes difficult when the timing of data is offset from the timing of the first spread code.

Further, in the spread spectrum communication system disclosed in Japanese Patent Laying-Open No. 5-252141, multiplexing is performed with the spread signals delayed by 1 chip or 2 chip. It is disclosed that a spread code of which side lobe of auto-correlation function attains 0 in a prescribed period is used. However, it is not described in this reference that the time is an arbitrary time period not shorter than 1 chip. Further, only a special spread code of which side lobe periodically attains 0 is used.

In this case, from the speciality of the code, the possible delay time is restricted to the point where autocorrelation of the code attains to 0, that is, either 2 chips or 1 chip. Therefore, there has been a disadvantage that freedom in designing the spread spectrum communication system is limited.

Further, when there is a delayed wave caused by multipath, for example, it may be possible that the delayed wave spread over a time period of several chips. In such a case, if the delay interval corresponds to 2 chips, delayed waves may be overlapped, resulting in degraded characteristics.

Further, as the demodulating method, the receiver of the spread spectrum communication system disclosed in Japanese Patent Laying-Open No. 4-360434 mentioned above performs active despreading by multiplying the spread code. The receiver of the spread spectrum communication system disclosed in Japanese Patent Laying-Open No. 5-252141 mentioned above uses output from a matched filter (correlator) sampled directly, as demodulation data.

In such a case, if several waves are input multiplexed with each other because of multipath, for example, what can be demodulated is only an interfered one wave of the several waves, and hence characteristics are degraded

SUMMARY OF THE INVENTION

The present invention was made to solve the above described problem and its object is to provide a spread spectrum communication system allowing multiplex communication without degrading error rate characteristics. Another object of the present invention is to provide a spread spectrum communication apparatus allowing multiplex communication while preventing degradation of correlated outputs and preventing difficulty in demodulation.

A still further object of the present invention is to provide a spread spectrum communication apparatus ensuring higher degree of freedom in designing.

A still further object of the present invention is to provide a spread spectrum communication apparatus capable of improving communication performance under multipath environment.

Briefly stated, in the present invention, data sequence is converted to a plurality of parallel signals, the plurality of parallel signals are multiplied by a spread code resulting in a plurality of spread signals, the plurality of spread signals are modulated, resulting in a plurality of intermediate frequency signals, the plurality of intermediate frequency signals are delayed by a plurality of different delay times, and the delayed signals are multiplexed to be output as a transmission signal, where the different delay times are set to have an arbitrary time difference of at least 1 chip from each other.

Therefore, according to the present invention, the timing of the parallel signal and the timing of the spread code are not offset from each other because of the delay for multiplexing, and it is possible to constantly match these two times. Accordingly, multiplex communication is possible while preventing degradation in correlated outputs on the receiving side and avoiding difficulty in demodulation.

In accordance with another aspect of the present invention, data sequence is converted to a plurality of parallel signals, the plurality of parallel signals are multiplied by a spread code, resulting in a plurality of spread signals which are of the baseband, the plurality of spread signals are delayed by a plurality of different delay times, and a plurality of delay signals are generated. At this time, the plurality of different delay times are set to have an arbitrary time difference of at least 1 chip from each other. According to this aspect, multiplexing is realized by delaying a plurality of spread signals obtained by multiplication of a plurality of parallel signals by a spread code. Therefore, the timing of the spread code and the timing of the parallel signals are not offset because of the delay for multiplexing, and these two timings match with each other. As a result, multiplex communication becomes possible while degradation in correlated outputs on the receiving side is prevented and difficulty in demodulation is avoided.

According to a still further aspect of the present invention, data sequence is converted to a plurality of parallel signals, the plurality of parallel signals, which are the baseband signals, are delayed by a plurality of different delay times, and a plurality of delayed parallel signals are generated.

Therefore, in the present invention, the parallel signals corresponding to a delay spread code are delayed by the same delay time as that of the delay spread code, so that the timing of the delayed parallel signals and the timing of the delay spread codes are not offset from each other because of the delay for multiplexing, and these two timings are matched. Therefore, multiplex communication becomes possible while preventing degradation in correlated outputs on the receiving side and avoiding difficulty in demodulation.

In a still another aspect of the present invention, data sequence is converted to a plurality of parallel signals and latched, a spread code is delayed by a plurality of different delay times, resulting in a plurality of delayed spread codes, the latched signals are multiplied by the plurality of delayed spread codes, resulting in a plurality of delayed spread signals, and these signals are multiplexed to be output as a transmission signal. A plurality of latch control signals which are of the same timing as the start chip of respective corresponding delay spread codes, and the plurality of parallel signals are latched by the latch control signals, whereby the timings of the plurality of latch signals to be multiplied match with the timing of the plurality of delay spread codes.

Therefore, in this aspect of the present invention, the timing of the latch signals and the timing of the delay spread signals match each other.

In a preferred embodiment, differential decoding is performed using a signal based on the transmission signal, and time interval between the signals to be differentially decoded is made shorter, whereby the change in paths during that period can be made smaller, improving the effect of PDI (Post Detection Integration)

Further, in accordance with a still further aspect of the present invention, correlation between a delay signal and a predetermined code is found, a known data portion is detected from the correlated signal, a correlated signal at the time of actual measurement is output based on the detection signal, and the signal and a correlated output are compared with each other, thus providing a delay profile which corresponds to the status of the delay signal.

More preferably, delay spread is found from the calculated delay profile, and predetermined various characteristics are calculated based on the value.

In the method of spread spectrum communication in accordance with a still further aspect of the present invention, signals spread by the same spread code are each delayed by an arbitrary several chips and multiplexed for transmission, a spread code which is uniquely defined based on one of preceding or succeeding data is used no matter whether the side lobe of auto-correlation is of odd correlation or even correlation, correlation of data timing of (number of multiplexing −1) is held before and after the central correlation which is to be cancelled, the preceding or succeeding data is selected, the correlated value of the preceding or succeeding data which is determined uniquely is selected and added, the result of addition is multiplied but the spreading rate, and the result of multiplication is added to/subtracted from the correlated value to be cancelled, whereby the side lobe of the auto-correlation is cancelled.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3(a)–(d) are an illustration of differential coding performed at the differential coding portion of FIG. 1.

FIG. 35 shows relation between error rate and C/N (carrier to noise ratio) in a thirty-sixth embodiment of the present invention.

FIGS. 44(a)–(e) are timing charts showing the operation of the embodiment shown in FIG. 43.

FIGS. 47(a)–(e) are timing charts showing the operation of FIG. 46.

FIGS. 59(a)–(e) are graphs showing data and spread code on the modulating side and cycle of detected correlation peak in the receiver, of the spread spectrum communication utilizing delayed multiplexing.

FIGS. 60B, 60C and 60D show examples of phase rotation corresponding to 5.5 chips, 5 chips and 6 chips when a code of 11 chips is used respectively, with frequency offset.

FIG. 66 shows a pattern of transmission data in accordance with the fifty-fourth embodiment of the present invention, where transmission data is 1.

FIGS. 70(a)–(j) show data flow in the receiver shown in FIG. 68.

FIG. 73 shows a pattern of transmission data in accordance with the fifty-sixth embodiment of the present invention.

FIGS. 76(a)–(j) show data flow in the receiver shown in FIG. 74.

FIG. 90 shows auto-correlation of n sequence of 15 chips.

FIG. 91 shows correlated value when m sequence signals are delayed and multiplexed, by numerical values.

FIG. 92 shows auto-correlation of a Barker code of 13 chips.

FIG. 121 shows signal point distribution after differential demodulation.

FIG. 122 is a block diagram showing a seventy-first embodiment of the present invention.

FIG. 123 is a schematic block diagram showing a transmitter of a conventional spread spectrum communication system.

FIG. 124 shows disadvantages of the conventional spread spectrum communication system.

Figure 123:
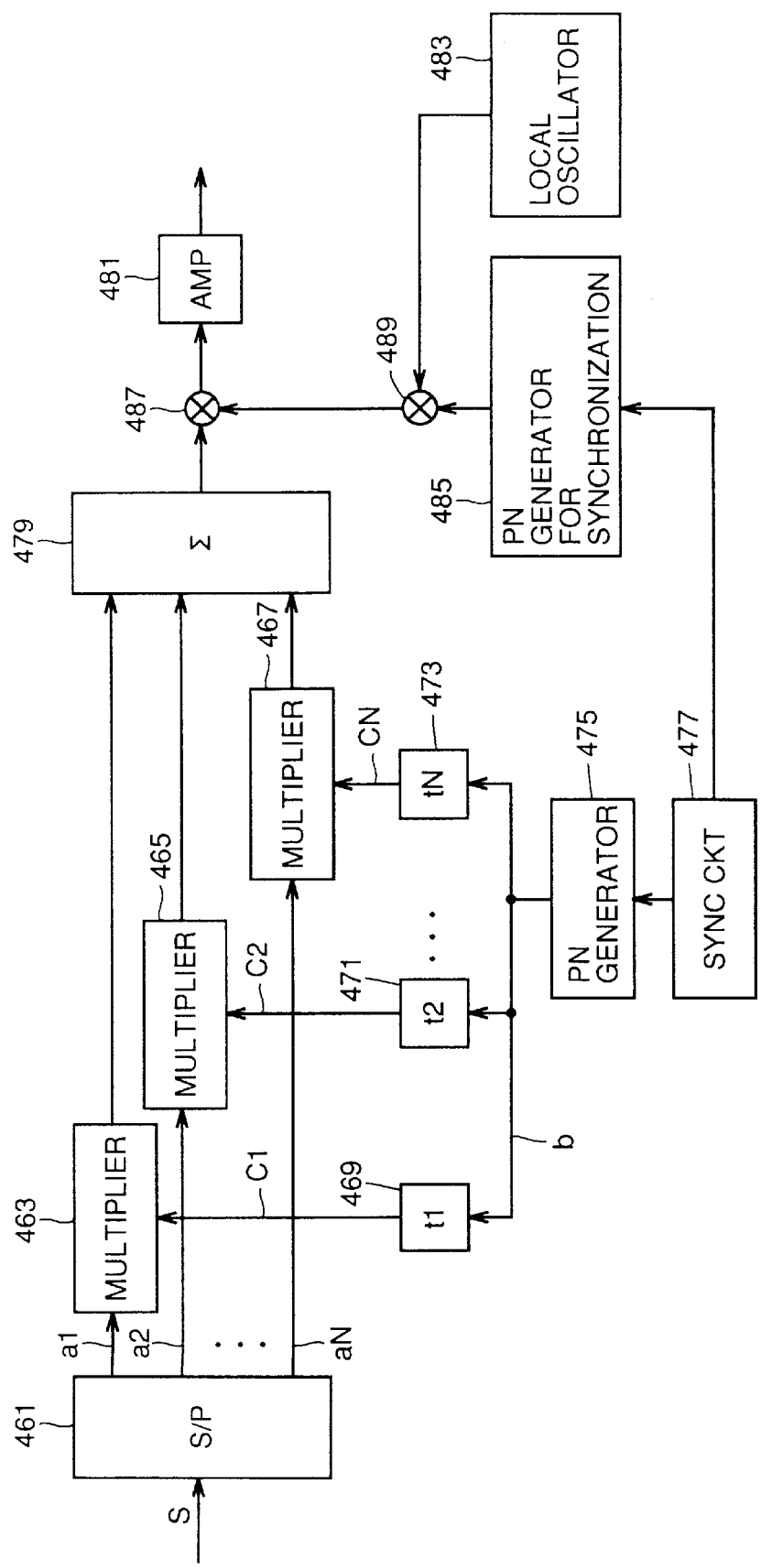
Figure 124:
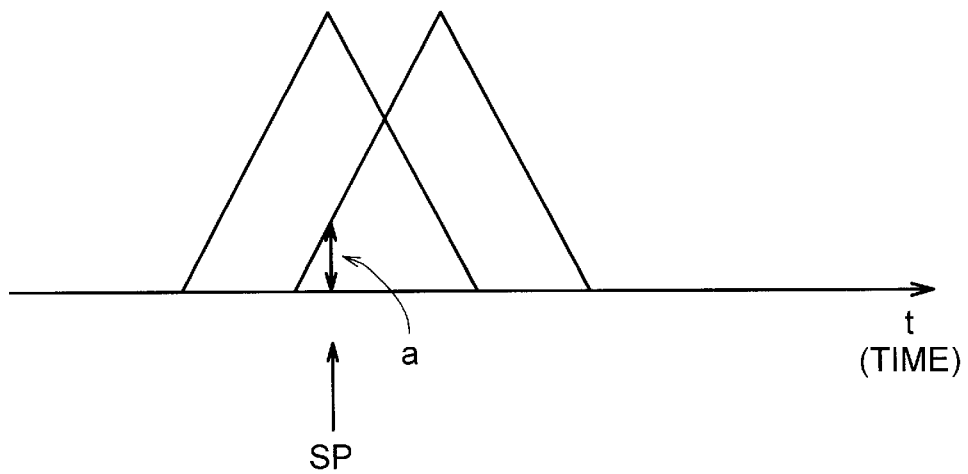
Figure 125A:
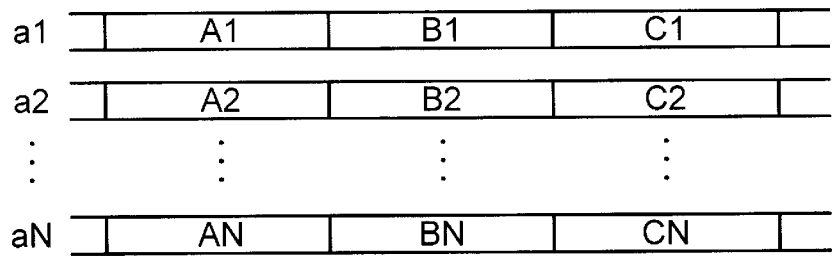
Figure 125B:
Figure 125C:
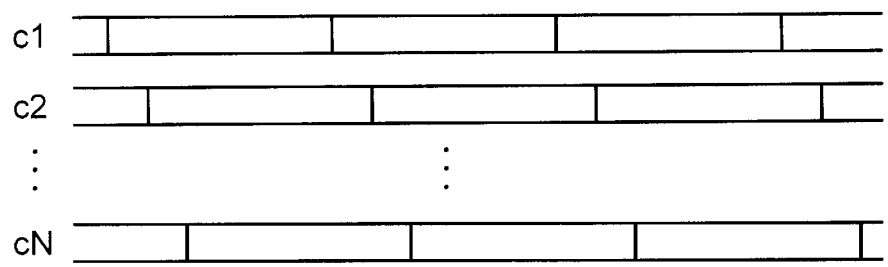

FIGS. 125(a)–(c) show parallel converted data and first spread code of FIG. 123.

FIGS. 126(a)–(c) show an undesirable influence of offset between the timing of the first spread code and the timing of the parallel converted data, in the transmitter shown in FIG. 123.

FIG. 127 shows a specific example of correlated output when the timing of data matches the timing of the first spread code.

FIG. 128 shows a specific example of correlated output when the timing of data is offset from the timing of the first spread code.

DESCRIPTION OF THE PREFERRED EMBODIMENTS

The spread spectrum communication system in accordance with the present invention will be described with reference to the figures.

Figure 1:
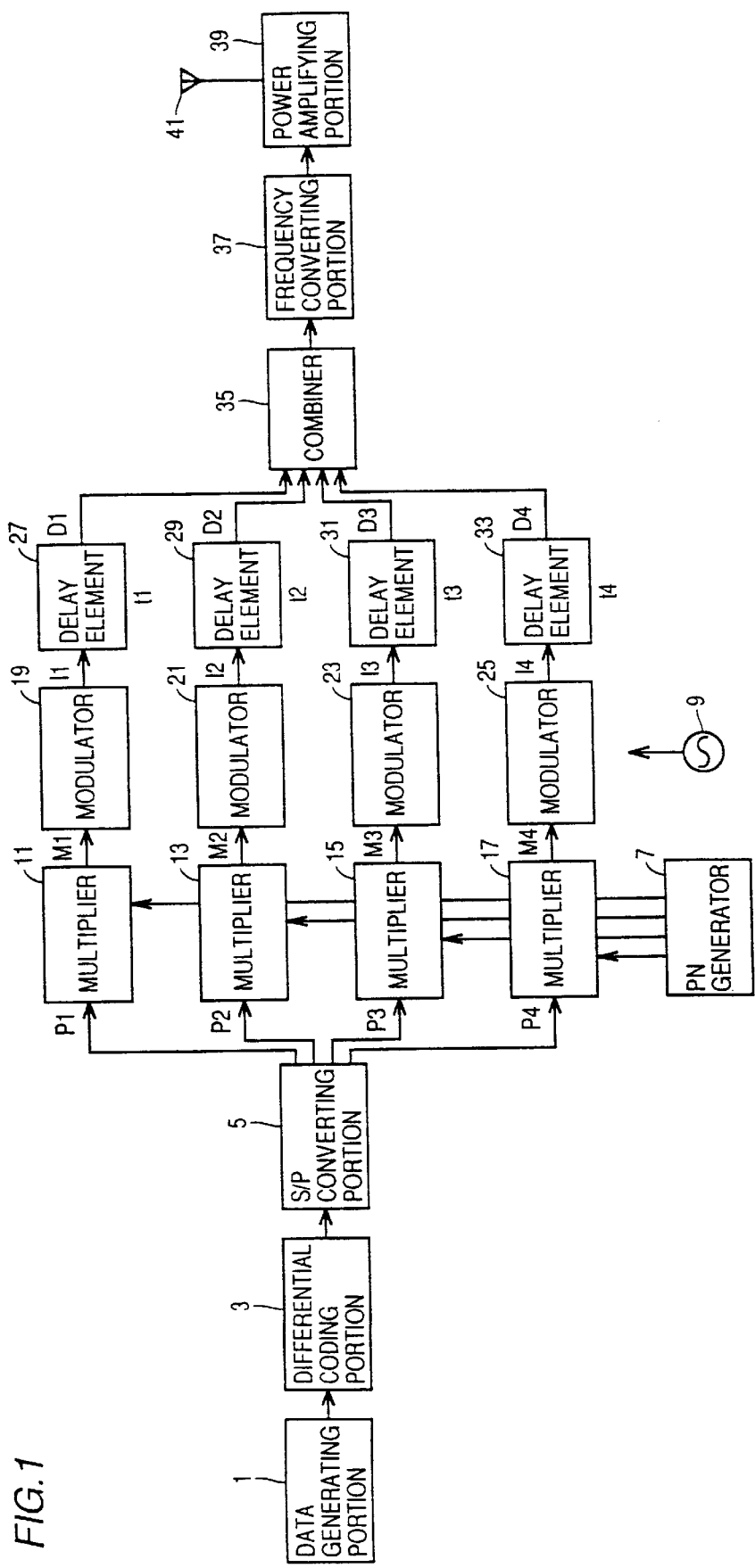
FIG. 1 is a schematic block diagram showing a transmitter of a spread spectrum communication system in accordance with a first embodiment of the present invention.

Referring to FIG. 1, the transmitter of the spread spectrum communication system in accordance with the first embodiment includes a data generating portion 1, a differential coding portion 3, a serial/parallel converting portion (S/P converting portion) 5, a spread code generator (PN generator) 7, a local signal generator 9, multipliers, 11, 13, 15, 17, modulators 19, 21, 23, 25, delay elements 27, 29, 31, 33, a multiplexer 35, a frequency converting part ion 37, a power amplifying portion 39 and a transmission antenna 41.

Data generated from data generating portion 1 is differentially coded by differential coding portion 3. The differentially coded data is converted by S/P converting portion 5, to a plurality of parallel signals (a plurality of parallel data). PN generator 7 generates a spread code. Multipliers 11 to 17 multiplies the plurality of parallel signals P1 to P4 by the spread code from PN generator 7, and generates spread signals M1 to M4.

Modulators 19 to 25 modulate spread signals M1 to M4 by using a local frequency signal from local frequency signal generator 9, providing intermediate frequency signals (IF signals) I1 to I4. Delay elements 27 to 33 delay intermediate frequency signals I1 to I4, providing delay signals D1 to D4.

Delay elements 27 to 33 have mutually different delay times. Further, the delay times of delay elements 27 to 33 each has an arbitrary time difference of at least 1 chip from each other. Such setting of the delay time will be referred to as "first delay time setting method."

The plurality of delay signals D1 to D4 are multiplexed by multiplexer 35. The multiplexed signal has its frequency converted by frequency converting portion 37, whereby it is turned to a high frequency signal. The frequency converted signal is amplified by power amplifying portion 39 and output as a transmission signal from transmission antenna 41.

Figure 2:
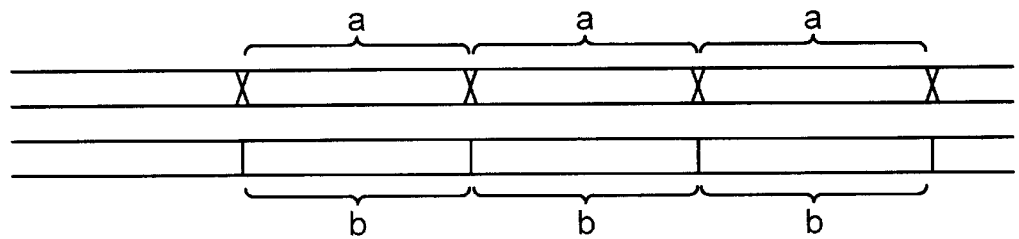
FIG. 2 shows a relation between data and a spread code in the transmitter of the spread spectrum communication system in accordance with the first embodiment of the present invention.

FIG. 2 shows timings of the parallel signals P1 to P4 of FIG. 1 and the timing of the spread code. Referring to FIG. 2, the upper portions show the timing of the parallel signal P1 of FIG. 1, for example, and a reference character represents 1 bit of data.

Referring to FIG. 2, the lower part shows the timing of the spread code. The reference character b represents one period of the spread code.

As shown in FIG. 2, the timing of the parallel signal P1 matches the timing of the spread code. Similarly, the timing of parallel signals P2 to P4 match the timing of the spread code.

As described above, in the first embodiment, spread signals M1 to M4 obtained by multiplying parallel signals P1 to P4 by a spread code are modulated to intermediate frequency signals I1 to I4, which are delayed by delay elements 27 to 33, whereby data are multiplexed. Therefore, the timing of parallel signals P1 to P4 is not offset from the timing of the spread code because of the delay for multiplexing, and these two timings match each other.

As a result, in the first embodiment, multiplexed communication becomes possible while preventing degradation of correlated outputs on the receiving side and avoiding difficulty in demodulation. Since the time difference between the delay times is set to be at least 1 chip, the signal to be demodulated never overlaps the next incoming signal, whereby error rate characteristics can be improved. In other words, signal degradation caused by interference of delayed and multiplexed signals are reduced, whereby error rate characteristics can be improved.

Further, unlike the conventional example (in which time difference between delay times is set to 1 chip or 2chips), the time difference may be an arbitrary time period, and hence degree of freedom in designing the hardware, that is, the spread spectrum communication system, can be made higher.

The shortest delay time of the delay elements 27 to 33 shown in FIG. 1 may be set to 0. In that case also, similar effects as described above can be obtained.

Further, as an equivalence to the above, one of the delay elements 27 to 33 may be omitted.

Differential coding at differential coding portion 3 of FIG. 1 will be described in detail. In DBPSK (differential binary phase shift keying) or DQPSK (differential quadri-phase shift keying) modulation, data is determined based on phase difference from a signal preceding by one bit (one symbol). For this purpose on the transmitting side, the data to be transmitted is converted. This is differential coding.

When DBPSK is considered as an example, differential coding means preparation of transmission phase such that phase difference attains to 0 when data is "1" and the phase difference attains 180° when data is "0". Details are as follows.

FIG. 3 is an illustration of differential coding at the differential coding portion 3 of FIG. 1.

In FIG. 3, (a) represents information data. In FIG. 3, (b) represents transmission phase, and (c) shows phase difference. In FIG. 3, (d) shows demodulated data on the receiving side.

Referring to FIG. 3, consider the left most data, transmission phase, phase difference and demodulated data. Here, 0° on the left most side of (b) is set as an initial value.

Since the transmitting phase is to be prepared such that the phase difference attains to 0 when data is "1" as described above, the transmitting phase for data "1" is 0°, as shown on the second from the left of (b). Transmitting phase of other data is found in the similar manner.

In this manner, differential coding portion 3 of FIG. 1 prepares transmitting phase. However, actually, what is transmitted is not an angle. Therefore, in DBPSK modulation, when transmitting phase is 0°, 1 is transmitted as a transmission signal (transmission data), and 0 is transmitted when transmitting phase is 180°. More specifically, in differential coding portion 3, transmission data corresponding to the transmitting phase is prepared from the information data.

Further, delay times of delay elements 27 to 33 are set such that time difference between adjacent ones of the multiplexed plurality of signals is kept constant. Here, the delay times of delay elements 27 to 33 each has arbitrary time difference of at least one chip from each other, as already described. Such setting of the delay time will be referred to as "second delay time setting method." For example, delay time of delay element 27 is made shorter than the delay times of other delay elements 29 to 33, and this short delay time is used as a reference delay time. The delay times of other delay elements 29 to 33 are each set to be the reference delay time of delay element 27 multiplied by a designated number.

More specifically, difference in delay time between delay elements 27 and 29, the difference in delay time between delay elements 29 and 31, and the difference in delay times between delay elements 21 and 33 are set to be identical with the reference delay time of delay element 27.

By doing so, the circuit scale of the system can be significantly reduced, since there is only one path to be delayed on the receiving side. Further, the delay path is only one on the receiving side regardless of the number of multiplexing, and hence the circuit scale of the system is not enlarged but constant even when the number of multiplexing is increased.

In the spread spectrum communication system in accordance with the first embodiment, intermediate frequency signals I1 to I4 are delayed and multiplexed. In the spread spectrum communication system in accordance with the second embodiment, baseband signals are delayed and multiplexed.

Figure 4:
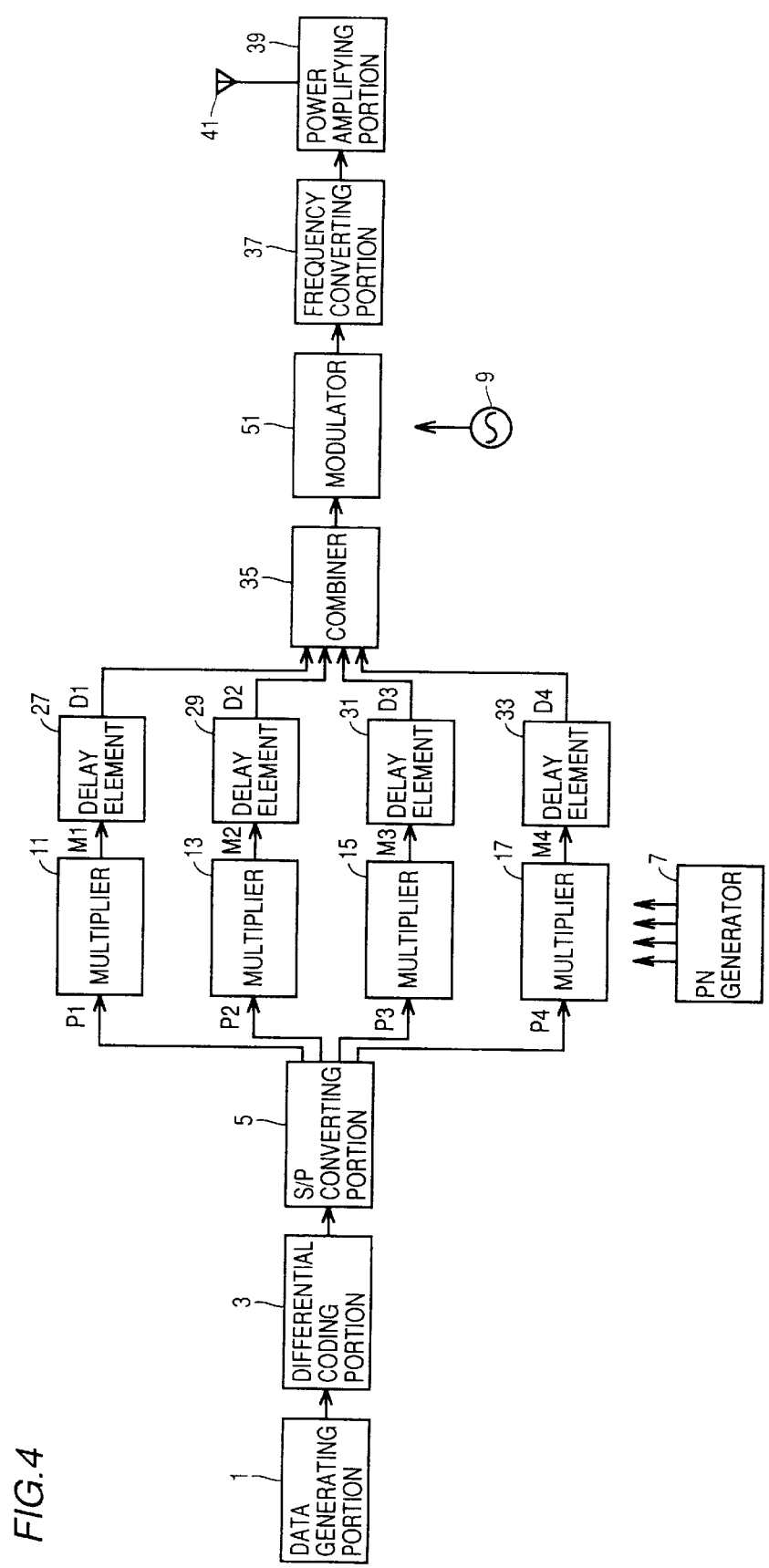
FIG. 4 is a schematic block diagram showing a transmitter of the spread spectrum communication system in accordance with a second embodiment of the present invention.

FIG. 4 is a schematic block diagram showing a transmitter of the spread spectrum communication system in accordance with the second embodiment of the present invention.

Referring to FIG. 4, the transmitter of the spread spectrum communication system in accordance with the second embodiment includes data generating portion 1, differential coding portion 3, S/P converting portion 5, PN generator 7, local frequency signal generator 9, multipliers 11, 13, 15, 17, delay elements 27, 29, 32, 33, multiplexer 35, modulator 51, frequency converting portion 37, power amplifying portion 39 and transmission antenna 41. Portions similar to those of FIG. 1 are denoted by the same characters and description thereof is not repeated.

Delay elements 27 to 33 delay multiplied signals M1 to M4 from multipliers 11 to 17 with mutually different delay times, thereby providing delay signals D1 to D4. The multiplied signals M1 to M4 are baseband signals, and hence delay elements 27 to 33 delay baseband signals.

Further, multiplied signals M1 to M4 obtained by multiplying parallel signals P1 to P4 by a spread code are delayed and multiplexed. Therefore, the timing of the spread code and the timing of parallel signals P1 to P4 are not offset because of the delay for multiplication, and these two timings match each other.

Multiplexer 35 multiplexes delay signals D1 to D4. Modulator 51 modulates the multiplexed signal by using a local signal from local signal generator 9, thus providing intermediate frequency signal. Frequency converting portion 37 converts frequency of the intermediate frequency signal. The signal of which frequency is converted by frequency converting portion 37 is amplified by power amplifying portion 39 and transmitted from transmission antenna 41.

As described above, in the second embodiment, the timing of the spread code matches the timing of the parallel signals P1 to P4. Accordingly, multiplex communication becomes possible while preventing degradation of correlated outputs on the receiving side and avoiding difficulty in demodulation.

Further, time difference between delay time is set to be at least 1 chip. Therefore, the signal to be demodulated never overlaps the next incoming signal, and hence error rate characteristic can be improved. More specifically, signal degradation caused by interference of delayed and multiplexed signals with each other on the receiving side can be prevented, and error rate characteristics can be improved.

Further, unlike the prior art (in which time difference between delay times is set to 1 chip or 2 chips), the time difference is not limited but it may be an arbitrary time period, and hence the degree of freedom in designing the hard ware, that is, the spread spectrum communication system, can be made higher.

Further, the shortest delay time of delay elements 27 to 33 shown in FIG. 4 may be set to 0. In that case also, similar effects as described above can be obtained. As an equivalence thereof, one of the delay elements 27 to 33 may be omitted.

Further, as described with reference to the first embodiment, the second delay time setting method may be used for setting the delay times of delay elements 27 to 33. More specifically, the delay times of delay elements 27 to 33 are such that time difference between adjacent ones of the multiplexed plurality of signals are kept constant in an arbitrary time period of at least one chip. In that case, only one delay path is necessary on the receiving side and hence circuit scale of the system can be significantly reduced. Further, since there is only one delay path regardless of the number of multiplexing, the circuit scale of the system is not enlarged even when the number of multiplexing is increased.

Further, since baseband multiplied signals N1 to N4 are delayed and multiplexed, digital delay elements may be used for the delay elements 27 to 33, which allows higher integration and smaller size of the transmitter.

In the first and second embodiments, signals multiplied by the spread codes are delayed. In the spread spectrum communication system in accordance with the third embodiment, multiplexing is performed with the spread code being delayed.

Figure 5:
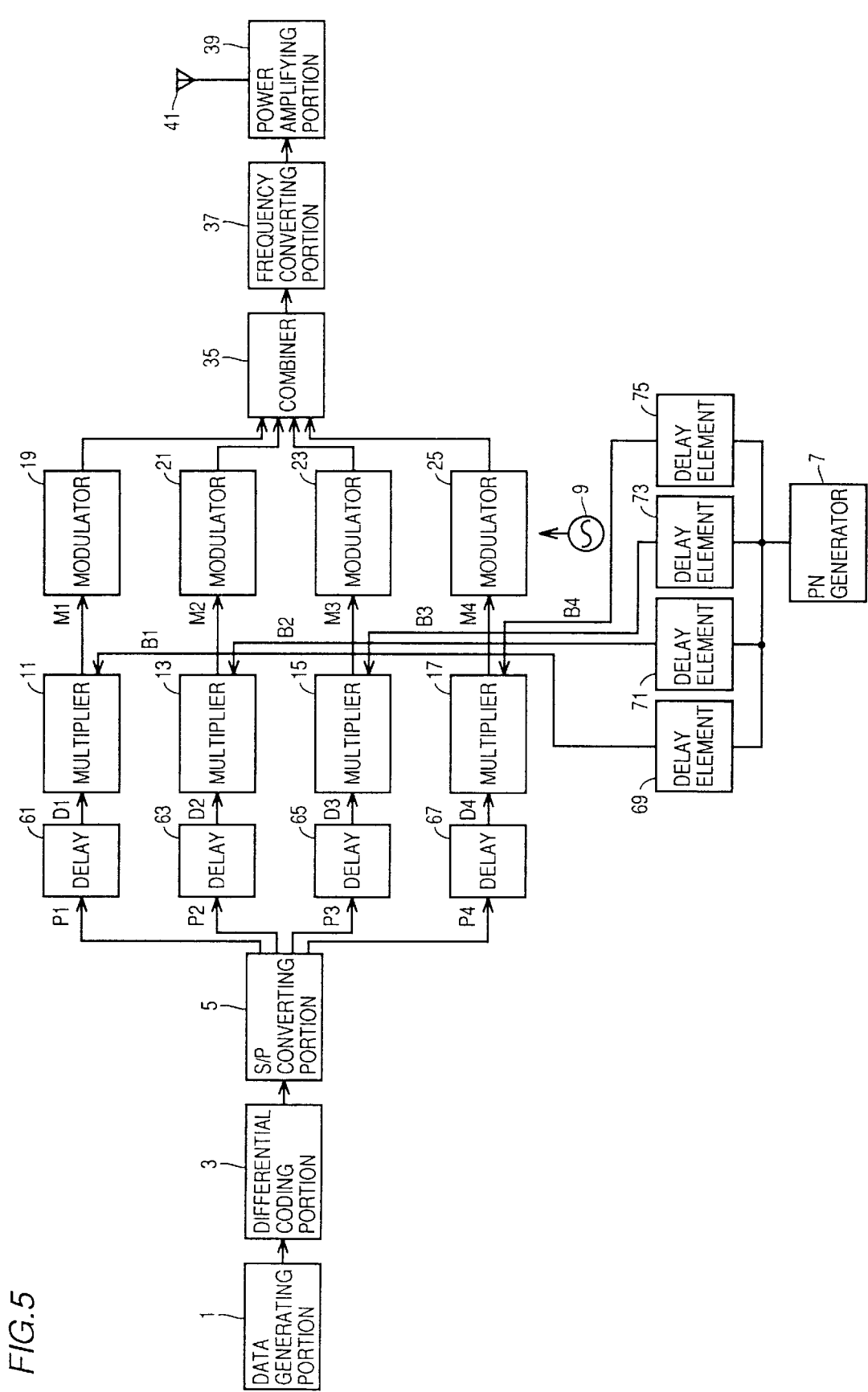
FIG. 5 is a schematic block diagram showing a transmitter of a spread spectrum communication system in accordance with a third embodiment of the present invention.

FIG. 5 i a schematic block diagram showing a transmitter of the spread spectrum communication system in accordance with the third embodiment of the present invention.

Referring to FIG. 5, the transmitter of the spread spectrum communication system in accordance with the third embodiment includes data generating portion 1, differential coding portion 3, S/P converting portion 5, PN generator 7, local signal generator 9, delay elements 61, 63, 65, 67, 69, 71, 73, 75, multipliers 11, 13, 15, 17, modulators 19, 21, 23, 25, multiplexer 35, frequency converting portion 37, power amplifying portion 39 and transmission antenna 41. Portions similar to those of FIG. 1 are denoted by the same reference characters and description thereof is not repeated. Mainly, the characteristic portion will be described.

Delay elements 61 to 67 delay parallel signals P1 to P4 and generate delayed parallel signals D1 to D4. Meanwhile, delay elements 69 to 75 delay a spread code from PN generator 7 and generates delayed spread code B1 to D4. Here, delay elements 61 and 69 have the same delay time, 63 and 71 have the same delay time, 65 and 73, and 67 and 75 have the same delay time, respectively.

Multipliers 11 to 17 multiply the delayed parallel signals B1 to B4 by the delayed spread codes B1 to B4 from delay elements 69 to 75 and generate spread signals M1 to M4. Here, since the delay time of delay elements 61 to 67 and the delay times of delay elements 69 to 75 corresponding to the delay elements 61 to 67 are the same, the timing of delayed parallel signals D1 to D4 matches the timing of the delayed spread codes B1 to B4.

Delay elements 69 to 75 have mutually different delay times. The time difference between the delay times from each other is an arbitrary time period of at least 1 chip.

The delay time of the delay element having the shortest delay time of the delay elements 69 to 75 may be set to 0. In this case, the delay time of the corresponding delay element for delaying parallel signals P1 to P4 is also set to 0. For example, if the delay time of delay element 69 is set to 0, the delay time of delay element 61 is also set to 0. The relation between the delay times is the same as described above. As an equivalence, the delay elements of which delay time is 0 may be omitted.

Modulators 19 to 25 modulate spread signals M1 to M4 by using the local frequency signal from local frequency signal generator 9 and provide intermediate frequency signals (IF signals). Multiplexer 35 multiplexes intermediate frequency signals from modulators 19 to 25. The multiplexed signal is transmitted through frequency converting portion 37 and power amplifying portions 39 as a transmission signal, from transmission antenna 41. Parallel signals P1 to P4 are baseband signals, and hence delay elements 61 to 67 delay baseband signals.

As described above, in the third embodiment, the delay time of the spread code is set to be the same as the delay time of corresponding parallel signals P1 to P4. Therefore, the timing of delayed spread codes B1 to B4 is not offset from the timing of the delayed parallel signals D1 to D4 because of the delay for multiplexing, and these two timings match each other As a result, in the third embodiment, multiplex communication becomes possible while preventing degradation of correlated outputs on the receiving side and avoiding difficulty in demodulation.

The time difference between each of the delay timing of delay elements 61 to 67 and the time difference between each of the delay times of delay elements 69 to 75 is an arbitrary time period of at least 1 chip.

As a result, in the third embodiment, the signals to be demodulated never overlaps the next incoming signal, and hence error rate characteristics can be improved. Further, unlike the conventional example (in which the time difference between delay timings is limited to 1 chip or 2 chips), the time difference may be an arbitrary time period, and hence the degree of freedom in the designing the hardware or the system can be made higher.

Further, since parallel signals P1 to P4 which are baseband signals are delayed and multiplexed, delay elements 61 to 67 can be formed by digital circuits, allowing higher integration and reduction in size of the transmitter.

Further as already described with respect to the first embodiment, the delay times of delay elements 61 to 67 may be set using the second delay time setting method. More specifically, the delay timing of delay elements 61 to 67 are set such that the time difference of each of the plurality of multiplexed signal is an arbitrary constant time period of at least 1 chip. In this case, delay times of delay elements 69 to 75 corresponding to delay elements 61 to 67 are also set in the similar manner.

As a result, in the third embodiment, there is only one path to be delayed on the receiving side. Therefore, circuit scale of the system can be considerably reduced. Further, the delay path is only one regardless of the number of multiplexing, and therefore circuit scale of the system is not enlarged even when the number of multiplexing is increased.

Figure 6:
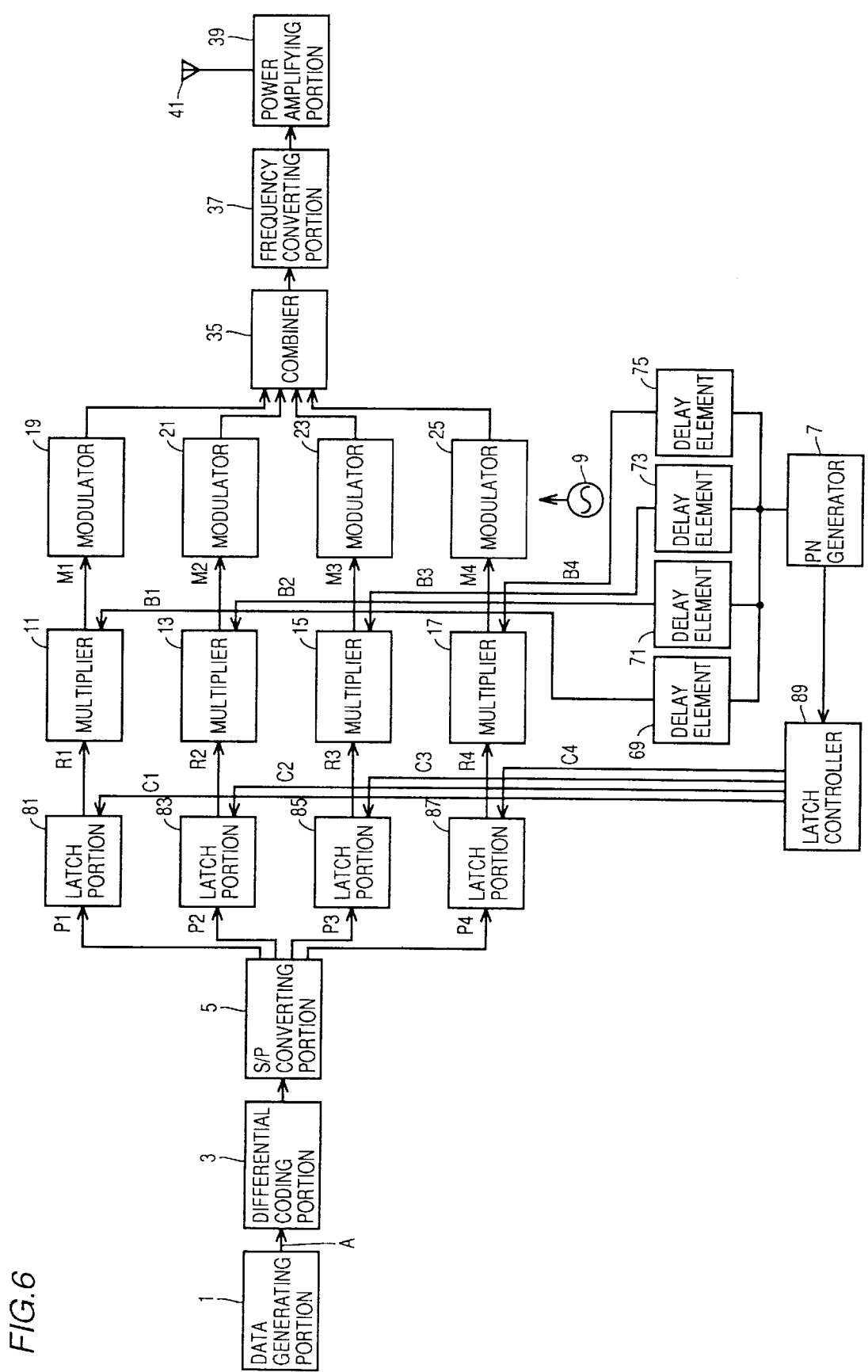
FIG. 6 is a schematic block diagram showing a transmitter of the spread spectrum communication system in accordance with a fourth embodiment of the present invention.

FIG. 6 is a schematic block diagram showing a transmitter of the spread spectrum communication system in accordance with the fourth embodiment of the present invention. Referring to FIG. 6, the transmitter of the spread spectrum communication system in accordance with the fourth embodiment includes data generating portion 1, differential coding portion 3, S/P converting portion 5, PN generator 7, latch portions 81, 83, 85, 87, a latch controller 89, delay elements 69, 71, 73, 75, multipliers 11, 13, 15, 17, modulators 19, 21, 23, 25, local frequency signal generator 9, multiplexer 35, frequency converting portion 37, power amplifying portion 39 and transmission antenna 41. Portions similar to those of FIG. 5 are denoted by the same reference characters and description thereof is not repeated. Mainly the characteristic portions will be described.

In the third embodiment, in order to have the timing of delayed spread codes matched with the timing of parallel signals P1 to P4, delay elements 61 to 67 are provided. In the fourth embodiment, in order to have the timing of the delayed spread codes matched with the timing of the parallel signals P1 to P4, latch portions 81 to 87 and latch controller 89 are provided.

As to the time difference between the delay times of delay element 69 to 75, it is set to be an arbitrary time period of at least 1 chip, and delay times are mutually different from each other.

Figure 7:
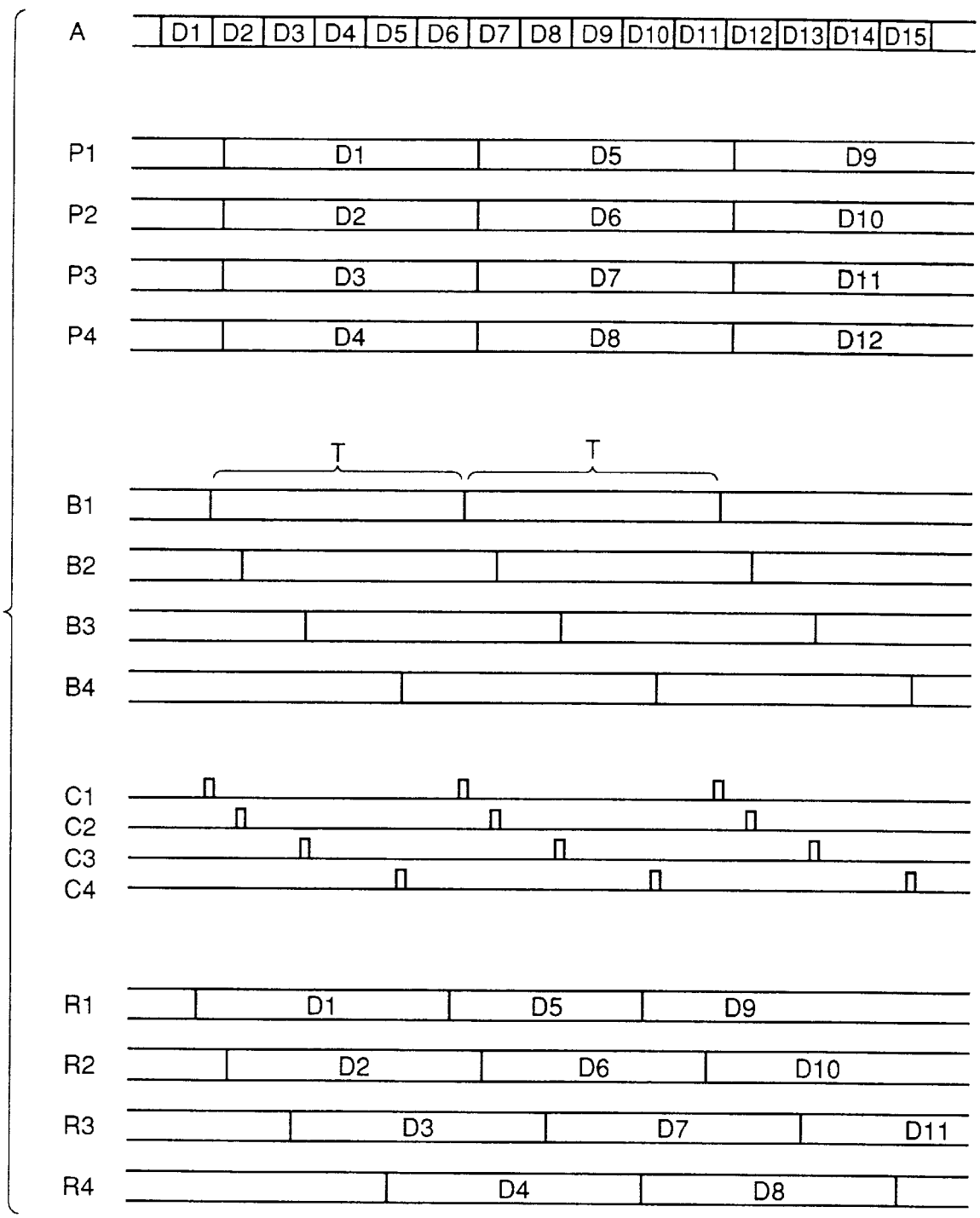
FIG. 7 is an illustration for help in understanding the operation at the latch portion and the latch controller of FIG. 6.

FIG. 7 shows signals (data) at respective nodes of the transmitter shown in FIG. 6. In the figure of signals P1 to R4, the time axis is common. The lateral direction of FIG. 7 represents the time axis.

Referring to FIGS. 6 and 7, data A generated from data generating portion 1 is differentially coded and converted by S/P converting portion 5 to parallel signals (parallel data) P1 to P4. In this case, timing of four parallel signals P1 to P4 are the same. Of data A, D1, D5 and D9 are converted to parallel signal P1. Of data A, D2, D6, D10 are converted to parallel signal P2. Of data A, D3, D7 and D11 are converted to parallel signal P3. Of data A, D4, D8 and D12 are converted to parallel signal P4.

The spread code generated from PN generator 7 is delayed by delay elements 69 to 75 to be delayed spread codes B1 to B4. Here, delay time of delay element 69 is set to be 0. As an equivalence thereof, delay element 69 may be omitted. As shown in FIG. 7, since delayed spread codes B2 to B4 are delayed in accordance with the delay times of delay elements 71 to 75, these are of the timing of parallel signals P1 to P4. Since the spread code B1 is not delayed, it is timed with parallel signals P1 to P4. Here, one cycle of the spread code is T.

Latch controller 89 generates, in response to the timing of generation of the spread code from PN generator 7, latch signals (latch pulses) C1 to C4. Latch signals C1 to C4 have the same timing as the start chips of corresponding delayed spread codes B1 to B4, respectively.

By such latch signals C1 to C4, parallel signals P1 to P4 are latched in latch portion 81 to 87, resulting in latch signals R1 to R4. Therefore, as shown in FIG. 7, delayed spread codes B1 to B4 come to have the same timing as latch signals R1 to R4.

Multipliers 11 to 17 multiply latch signals R1 to R4 with delayed spread codes B1 to B4, and generates delay spread signals M1 to M4. Modulators 19 to 25 modulate delayed spread signals M1 to M4 by using a local frequency signal from local frequency signal generator 9, thereby providing intermediate frequency signals (IF signals). Multiplexer 35 multiplexes these intermediate frequency signals. The multiplexed signal is transmitted as a transmission signal from transmission antenna 41, through frequency converting portion 37 and power amplifying portion 39.

As described above, in the fourth embodiment, since latch portions 81 to 87 and latch controller 89 are provided, delayed spread codes B1 to B4 come to have the same timing as parallel signals P1 to P4 (latch signals R1 to R4).

Therefore, in the fourth embodiment, multiplex communication becomes possible while preventing degradation of the correlated outputs on the receiving side and avoiding difficulty in demodulation.

Further, the time difference between the delay times of delay elements 69 to 75 is set to an arbitrary time period of at least 1 chip (first delay time setting method). Therefore, the signal to be demodulated never overlaps the next incoming signal, and hence error rate characteristic can be improved. Further, unlike the prior art example, there is not a restriction of time difference of the delay times and an arbitrary time period may be selected. Therefore, degree of freedom in designing the hard ware or the system can be made higher.

Further, the delay times of delay elements 69 to 75 may be set using the second delay time setting method, as in the first embodiment. More specifically, the delay times of delay elements 69 to 75 may be set such that the time difference between adjacent ones of the multiplexed plurality of signals is a constant arbitrary time period of at least 1 chip. In that case, only one delay path is necessary on the receiving side, so that circuit scale of the system can be significantly reduced. Further, since there is only one delay path regardless of the number of multiplexing, circuit scale of the system is not enlarged even if the number of multiplexing is increased.

Figure 8:
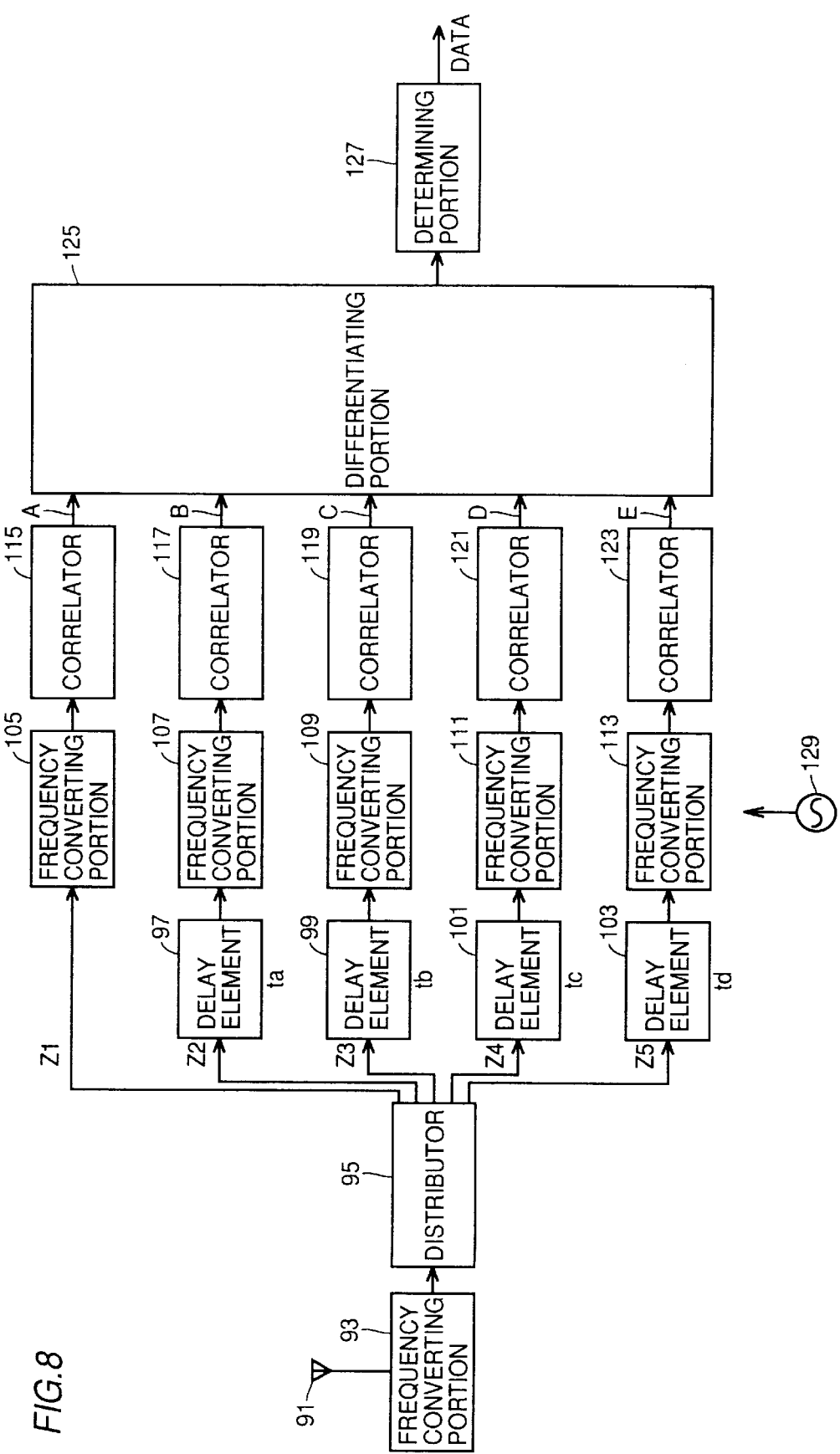
FIG. 8 is a schematic block diagram showing a receiver of the spread spectrum communication system in accordance with a fifth embodiment of the present invention.

FIG. 8 is a schematic block diagram showing a receiver of the spread spectrum communication system in accordance with the fifth embodiment of the present invention Referring to FIG. 8, the receiver of the spread spectrum communication system in accordance with the fifth embodiment includes a reception antenna 91, a frequency converting portion 93, a distributor 95, delay elements 97, 99, 101, 103, frequency converting portions 105, 107, 109, 111, 113, correlators 115, 117, 119, 121, 123, differentiating portion 125, a determining portion 127 and a local frequency signal generator 129. Differentiating portion 125 and determining portion 127 constitute a demodulating portion.

As a transmitter for the receiver of FIG. 8, the transmitter shown in FIG. 1 is used. Reception antenna 91 receives the transmission signal from the transmitter shown in FIG. 1. Frequency converting portion 93 converts the received transmission signal to an intermediate frequency signal (IF signal). The distributor 95 distributes the intermediate frequency signal to a plurality of distribution signals Z1 to Z5. The number of distribution is larger by one than the number of parallel conversion (number of multiplexing) of data on the transmitter side. Since the transmitter of FIG. 1 is used, the number of distribution shown in FIG. 8 is 5. The number of parallel conversion in FIG. 1 is 4.

Distribution signals Z2 to Z5 are delayed by delay elements 97 to 103. The delay times of delay elements 97 to 103 are set in the following manner, for example. The delay times of delay elements 27 to 33 of the transmitter shown in FIG. 1 will be represented as $\tau_1$, $\tau_2$, $\tau_3$ and $\tau_4$, respectively. The relation of magnitude of the delay times is as follows.

$$\tau_1 > \tau_2 > \tau_3 > \tau_4$$

In this case, the delay time of delay element 97 of the receiver shown in FIG. 8 is set to be $\tau_2 - \tau_1$, the delay time of delay element 99 is set to be $\tau_3 - \tau_2$, that of delay element 101 is set to be $\tau_4 - \tau_3$.

Referring to FIG. 1, after a first in-coming data sequence (including four data) is parallel converted, the next in-coming data sequence (including four data) is parallel converted. Here, the first in-coming data sequence will be referred to as a preceding data sequence, and the next in-coming data sequence will be referred to as a succeeding data sequence. Referring to FIG. 1, the time difference between the delay signal D4 deriving from the preceding data sequence and the delay signal D1 derived from the succeeding data sequence corresponds to the delay time of delay element 103 shown in FIG. 8. In the following, description will be given assuming that the delay timings of delay elements 27 to 33 of FIG. 1 and delay elements 97 to 103 of FIG. 8 are set in the above described manner.

Frequency converting portion 105 converts distribution signal Z1 to a baseband signal, by using the local signal from local signal generator 129. Frequency converting portions 107 to 113 convert delayed distribution signals Z2 to Z5 to baseband signals, using the local signal from the local signal generator 129. A carrier synchronization circuit (phase detector), not shown, detects carrier phase offset of the signal, and realizes carrier synchronization by controlling a local frequency signal generator 129 by means of a control signal. Therefore, signals output from frequency converting portions 105 to 113 are completely converted to baseband signals.

The signals generated from frequency converting portions 105 to 113 are input to correlators 115 to 123 which allows correlation with the spread code used at the time of transmission, and output as correlated signals A to E. The correlated signals output from correlators 115 to 123 are also referred to as correlated outputs.

Differentiating portion 125 performs differential decoding by using correlated signals A to E. More specifically, it differentiates correlated signals A and B, B and C, C and D and D and E. The differentially decoded signals are input to determining portion 127. Determining portion 127 determines and externally outputs data in accordance with a data clock, based on the differentially decoded signals.

Figure 9:
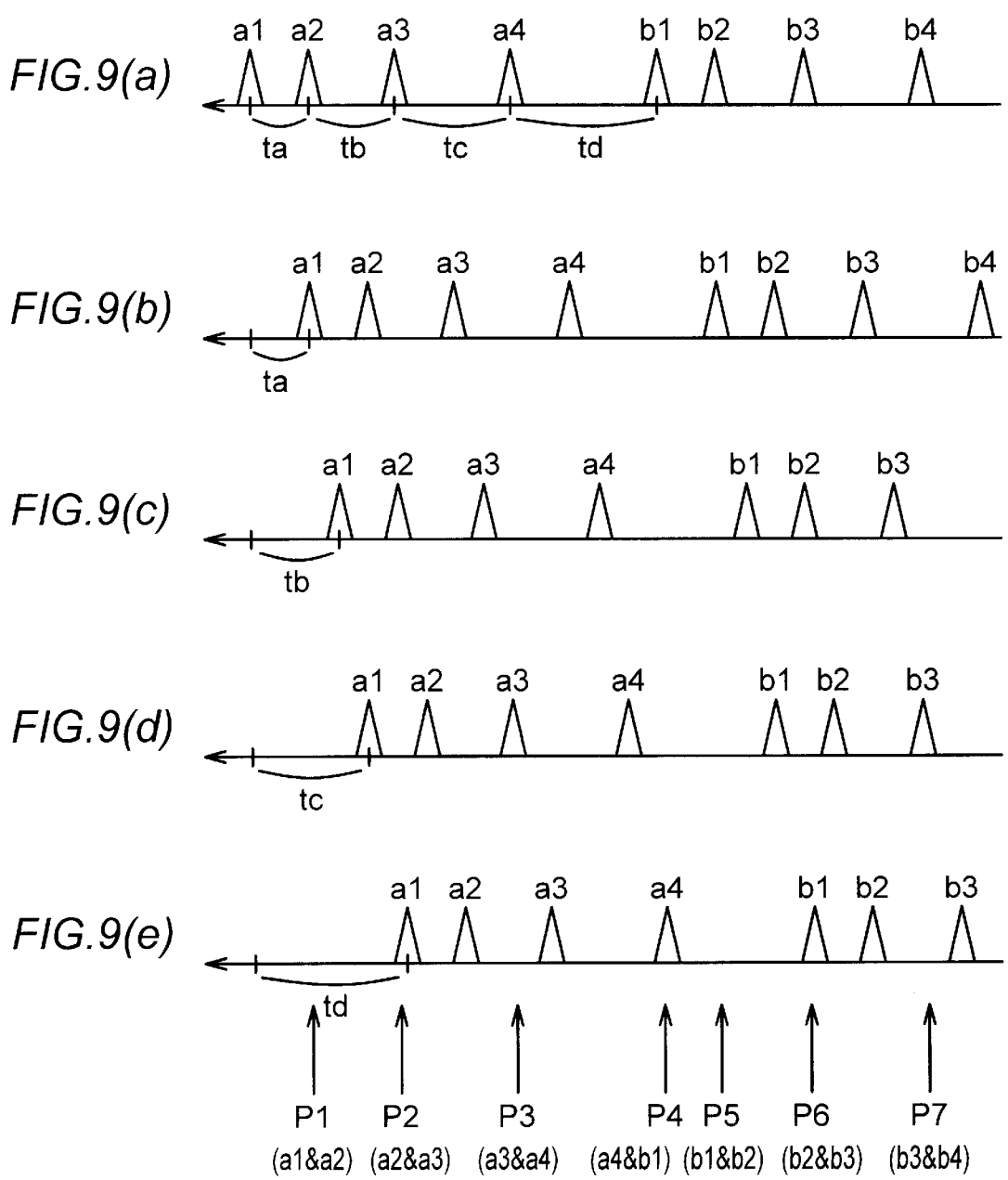
FIGS. 9(a)–(e) are an illustration of differential decoding at the differentiating portion of FIG. 8.

Differential decoding at the differentiating portion 125 will be described in greater detail. FIG. 9 is an illustration for help to understand the differential coding at the differentiating portion 125 of FIG. 8.

Referring to FIG. 9, (A) shows correlated signal A of FIG. 8, (B) shows correlated signal B of FIG. 8, (C) shows correlated signal C of FIG. 8, (D) shows correlated signal D of FIG. 8 and (E) shows correlated signal E of FIG. 8.

Here, as already described, the delay time of delay element 97 is set to be $\tau_2-\tau_1=\tau_a$, delay time of delay element 99 is set to be $\tau_3-\tau_2=\tau_b$, and delay time of delay element 101 is set to be $\tau_4-\tau_3=\tau_c$. In FIG. 1, it is assumed that time difference between delayed signal D4 of the preceding data sequence and the delayed signal D1 of the succeeding data sequence is $\tau_d$. More specifically, the delay time of delay element 103 of FIG. 8 is $\tau_d$. In the example shown in FIG. 9, the delay time of delay element 27 shown in FIG. 1 is set to 0. Namely, it corresponds to a system in which delay element 27 is omitted.

Referring to FIG. 9, signals a1 to a4 are derived from the preceding data sequence of FIG. 1, and signals b1 to b4 are derived from the succeeding data sequence. As shown in (A) to (E) of FIG. 9, correlated signals B to E are delayed by $\tau_a$, $\tau_b$, $\tau_c$ and $\tau_d$ from correlated signal A, respectively.

In differentiating portion 125 of FIG. 8, at point P1 of FIG. 9, the signal a2 of (A) and signal a1 of (B) are on the same time point, and hence signals a2 and a1 are differentiated. At point P2, signal a3 of (A) and signal a2 of (C) are on the same time axis and hence signals a3 and a2 are differentiated. Similarly, other signals are differentiated, using the correlated signal A of (A) as a reference. Data is demodulated by such differentiation.

As described above, in the spread spectrum communication system in accordance with the fifth embodiment, the transmitter shown in FIG. 1 is used. As a result, the spread spectrum communication system in accordance with the fifth embodiment provides similar effects as the first embodiment.

In the spread spectrum communication system in accordance with the fifth embodiment, multiplexing is performed by delaying intermediate frequency signals on the transmitting side. On the receiving side, intermediate frequency signal is delayed, complete carrier synchronization is provided, and baseband signals are obtained for further processing.

As the transmitter of the spread spectrum communication system in accordance with the sixth embodiment, the transmitter shown in FIG. 1 is used. In the fifth embodiment, difference in delay times between delay elements 29 and 27 of FIG. 1 is set to $\tau_a$, difference in delay times between delay element 31 and 29 is set to $\tau_b$, difference in delay times between delay elements 33 and 31 is set to $\tau_c$, and difference in time between the delayed signal D4 of the preceding data sequence and the delayed signal D1 of the succeeding data sequence is set to $\tau_d$, with the magnitudes of $\tau_a$ to $\tau_b$ not specifically designated. In the sixth embodiment, delay times of delay element 27 to 33 of FIG. 1 are set such that $\tau_a$, $\tau_b$, $\tau_c$ and $\tau_d$ are all the same time period. In other words, the second delay time setting method is used.

Figure 10:
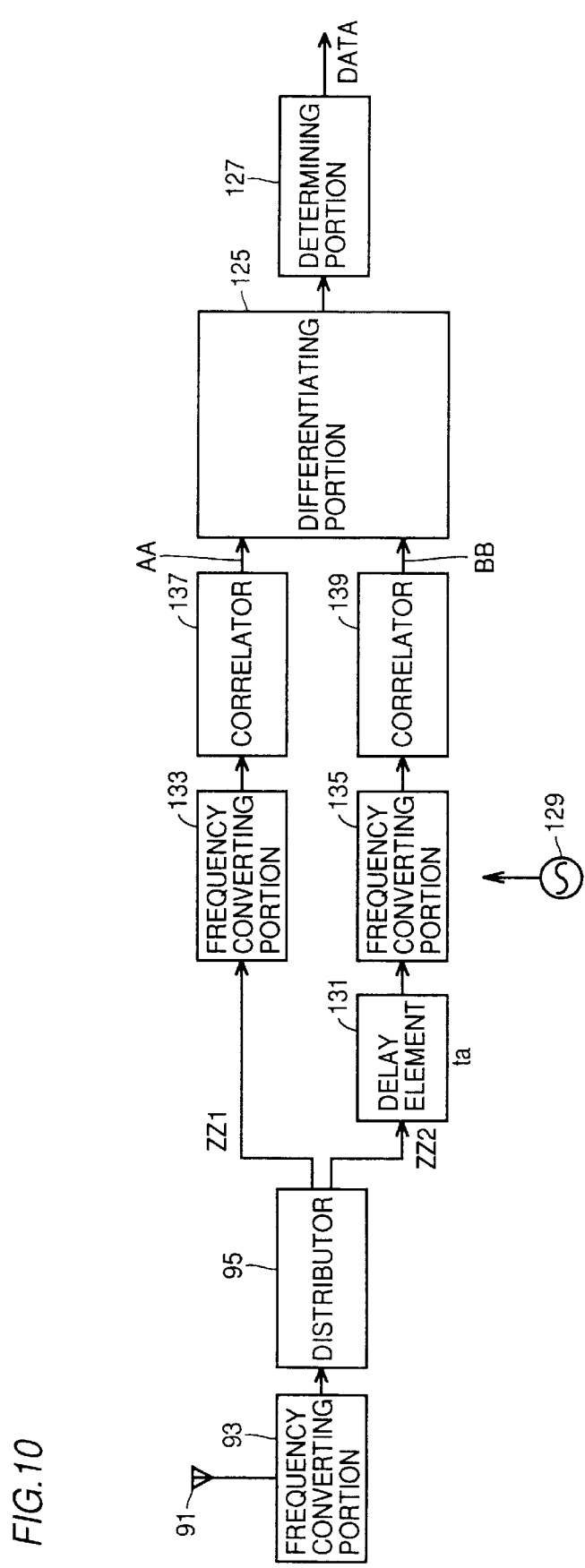
FIG. 10 is a schematic block diagram showing a receiver of the spread spectrum communication system in accordance with a fifth embodiment of the present invention.

FIG. 10 is a schematic block diagram showing a receiver of the spread spectrum communication system in accordance with the sixth embodiment of the present invention.

Referring to FIG. 10, the receiver of the spread spectrum communication system in accordance with the sixth embodiment includes reception antenna 91, frequency converting portion 93, distributor 95, delay element 131, frequency converting portions 133, 135, correlators 137, 139, differentiating portion 125, determining portion 127 and local frequency signal generator 129. Portions corresponding to those of FIG. 8 are denoted by the same reference characters and description thereof is not repeated.

Distributor 95 distributes the intermediate frequency signal from frequency converting portion 93 into two distribution signals ZZ1 and ZZ2. Distribution signal ZZ1 is passed through frequency converting portion 133 and correlator 137 to be input as correlated signal AA, to differentiating portion 125. Distribution signal ZZ2 is passed through delay element 131, frequency converting portion 135 and correlator 139 to be input, as a correlated signal BB, to differentiating portion 125.

Frequency converting portions 133 and 135 are similar to frequency converting portions 105 to 113 of FIG. 8, which provide complete carrier synchronization by using local frequency signal generator 129 and a carrier synchronization circuit (phase detector), not shown, whereby distribution signal ZZ1 and the delayed distribution signal ZZ2 are turned to baseband signals. Correlators 137 and 139 are similar to correlators 115 to 123 of FIG. 8.

Correlated signal AA corresponds to the signal shown in FIG. 9(A), where $\tau_a$, $\tau_b$, $\tau_c$ and $\tau_d$ are all the same. Details are as follows.

Figure 11:
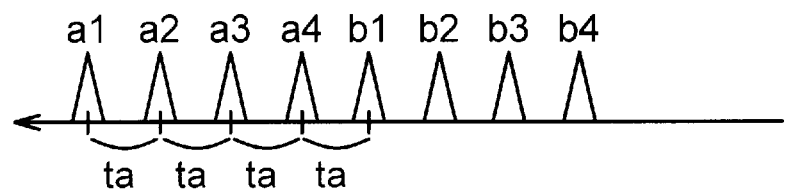
FIGS. 11(a)–(b) are an illustration of differential decoding at the differentiating portion of FIG. 10.
Figure 11:
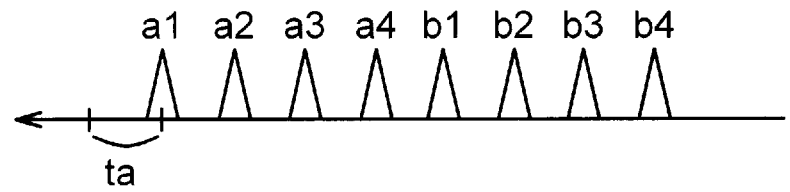

FIG. 11 shows correlated signals AA and BB of FIG. 10.

Referring to FIG. 11, signals a1 to a4 are multiplexed signals derived from the preceding data sequence in the transmitter shown in FIG. 1, while signals $b_1$ to $b_4$ are multiplexed signals derived from the succeeding data sequence. Here, there is the same time interval $\tau_a$ between any adjacent signals. This is because the delay times in the transmitter of FIG. 1 are set by using the second delay time setting method, as already described at the introduction of the sixth embodiment.

In FIG. 11, (AA) represents the correlated signal AA of FIG. 10, and (BB) represents correlated signal BB of FIG. 10. Correlated signal BB is delayed from correlated signal AA by time $\tau_a$. Namely, delay time of delay element 131 shown in FIG. 10 is $\tau_a$. In this manner delay time of delay element 131 shown in FIG. 10 is set to be the same as the time difference between adjacent ones of the multiplexed plurality of signals.

At differentiating portion 125 of FIG. 10, of the correlated signals AA and BB, those on the same time axis are differentiated.

As described above, in the sixth embodiment, a transmitter utilizing the second delay time setting method is used, and the delay time in the transmitter is set such that the plurality of signal sequences included in the correlated signals on the receiver side have the same time interval As a result, only one delay path is necessary in the receiver (in the example of FIG. 8, there are four delay paths), and circuit scale of the receiver can be significantly reduced.

Further, in the sixth embodiment, since the transmitter shown in FIG. 1 is used, similar effects as in the first embodiment can be obtained.

In the sixth embodiment, on the transmitting side, intermediate frequency signals are delayed and multiplexed. On the receiver side, intermediate frequency signal is delayed, thereafter complete carrier synchronization is realized, and the signals are turned to baseband signals for further processing. On the transmitting side, the second delay time setting method is used.

In the spread spectrum communication system in accordance with the seventh embodiment, the transmitter shown in FIG. 1 is used as in the fifth embodiment. As for the receiver, the receiver shown in FIG. 8 having the frequency converting portion for providing baseband signals placed in a preceding stage of the distributor is used.

Figure 12:
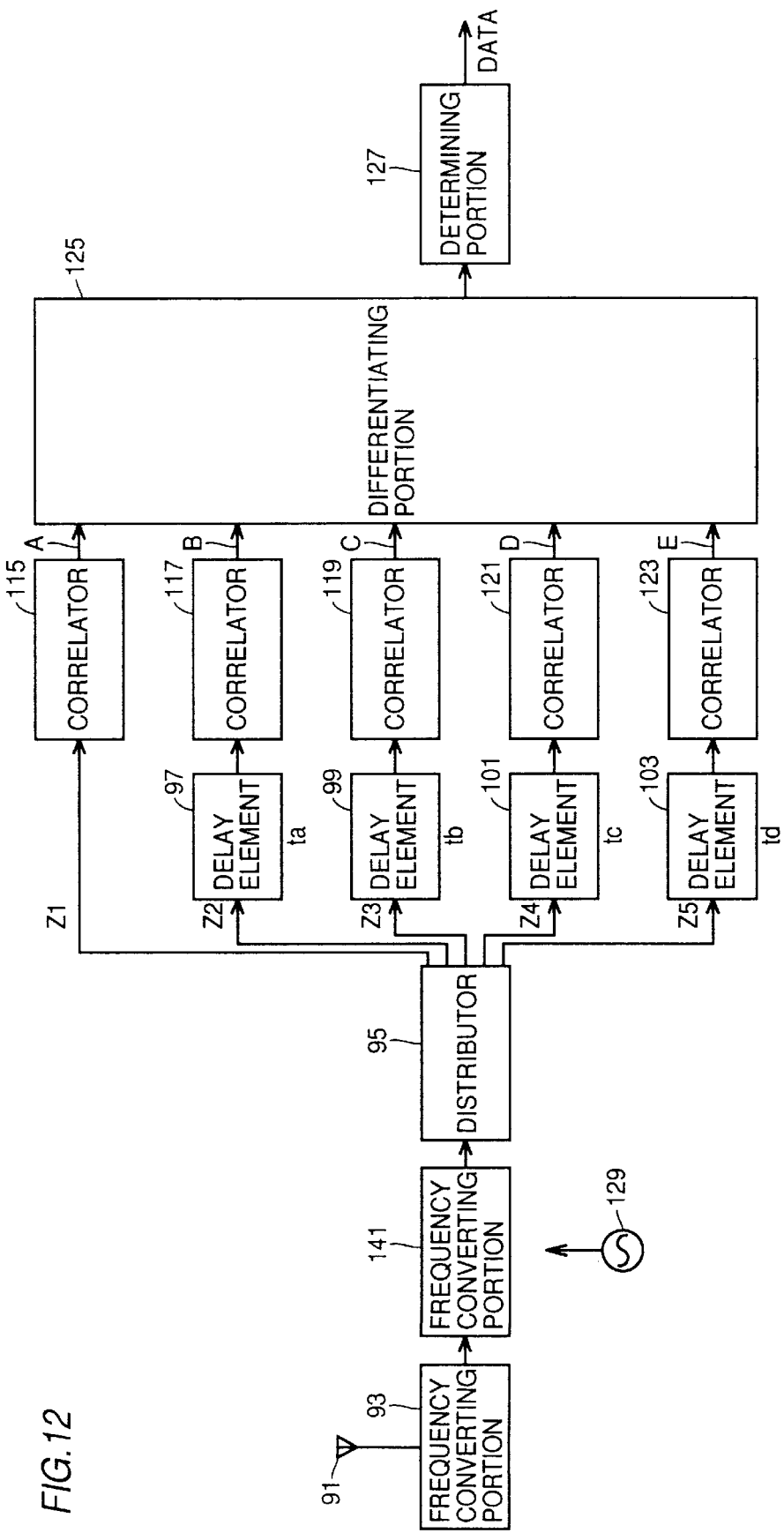
FIG. 12 is a schematic block diagram showing a receiver of the spread spectrum communication system in accordance with a seventh embodiment of the present invention.

FIG. 12 is a schematic block diagram showing the receiver of the spread spectrum communication system in accordance with the seventh embodiment of the present invention.

Referring to FIG. 12, the receiver of the spread spectrum communication system in accordance with the seventh embodiment includes reception antenna 91, frequency converting portions 93, 141, distributor 95, local signal generator 129, delay elements 97, 99, 101, 103, correlators 115, 117, 119, 121, 123, differentiating portion 125 and determining portion 127. Portions corresponding to those of FIG. 8 are denoted by the same reference characters and the description thereof is not repeated. Mainly, characteristic portions will be described.

The intermediate frequency signal (IF signal) generated by frequency converting portion 93 is converted to a baseband signal by frequency converting portion 141. In this case, similar to the example of FIG. 8, complete carrier synchronization is obtained by local signal generator 129 and a carrier synchronization circuit (phase detector), not shown, whereby a completely baseband signal is obtained.

Distributor 95 distributes the baseband signal from frequency converting portions 141 to 5 signals, that is, distribution signals Z1 to Z5. Delay elements 97 to 104 delay distribution signals Z2 to Z5. Distribution signals Z2 to Z5 are of baseband, and hence baseband signals are delayed. The setting of the delay time is similar to that in the fifth embodiment.

Distribution signal Z1 and delayed distribution signals Z2 to Z5 are input to correlators 115 to 123, resulting in correlated signals A to E. Differentiating portion 125 performs differential decoding based on correlated signals A to E. The differentially demodulated signals are output as data through determining portion 127.

As described above, in the seventh embodiment, frequency converting portion 141 is provided in the preceding stage of distributor 95, so that baseband distribution signals are delayed for processing.

As a result, in the seventh embodiment, the number of frequency converting portions can be reduced from 5 to one as compared with the fifth embodiment, and hence circuit scale can be reduced. In the seventh embodiment, the number of necessary frequency converting portions for converting to the baseband signal is only one even if the number of multiplexing is increased.

Further, since baseband distribution signals are delayed, delay elements 97 to 103 may be formed by digital circuits, and hence higher integration and reduction in size of the receiver become possible.

Further, in the seventh embodiment, since the transmitter of FIG. 1 is used, similar effects as in the first embodiment can be obtained.

Delay elements 97 to 103 may be provided in the succeeding stage of correlators 117 to 123. In this case also, similar effects as described above can be obtained.

In the seventh embodiment, on the transmitting side, multiplexing is performed by delaying intermediate frequency signal. On the receiver side, completely carrier synchronized baseband signals are delayed for differential decoding (demodulation).

In the spread spectrum communication system in accordance with the eighth embodiment, the transmitter shown in FIG. 1 employing the second delay time setting method is used. Therefore, setting of the delay times in the transmitter and the receiver is similar to the setting described with reference to the sixth embodiment. In the receiver of the spread spectrum communication system in accordance with the eighth embodiment, the frequency converting portions for converting to the baseband signal in the receiver of FIG. 10 is provided in the preceding stage of the distributer.

Figure 13:
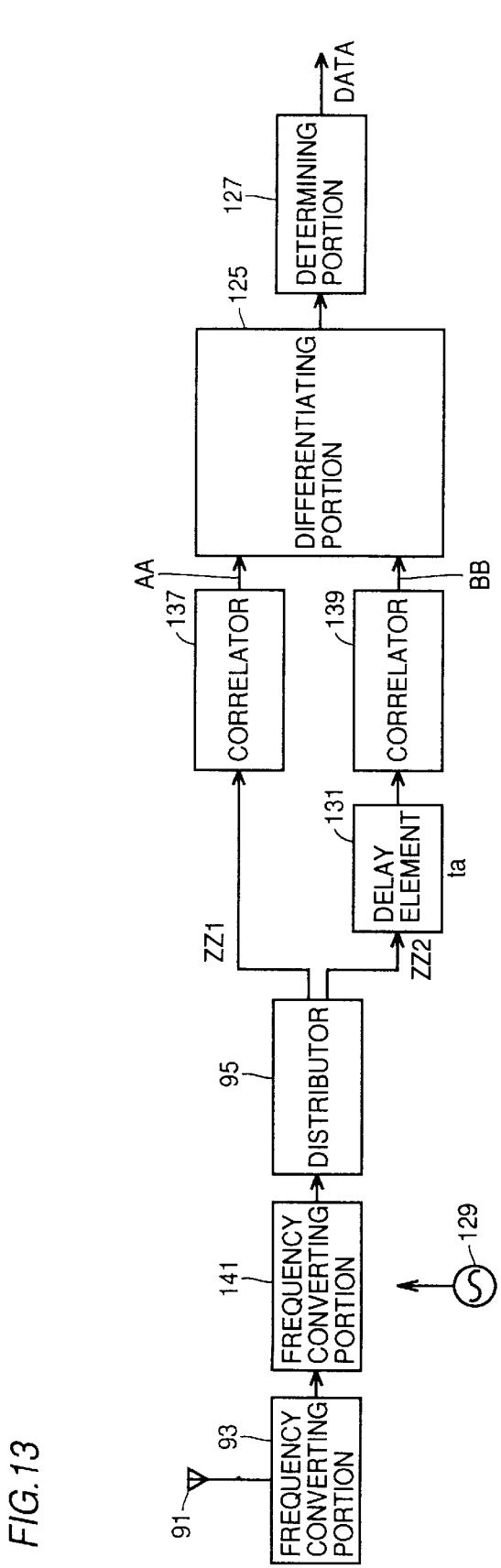
FIG. 13 is a schematic block diagram showing a receiver of the spread spectrum communication system in accordance with an eighth embodiment of the present invention.

FIG. 13 is a schematic block diagram showing the receiver of the spread spectrum communication system in accordance with the eighth embodiment. Portions corresponding to those of FIG. 10 are denoted by the same reference characters and description thereof is not repeated. Mainly, characteristic portions will be described.

Referring to FIG. 13, the receiver of the spread spectrum communication system in accordance with the eighth embodiment includes reception antenna 91, frequency converting portions 93, 141, local signal generator 129, distributor 95, delay element 131, correlators 137, 139, differentiating portion 125 and determining portion 127.

Frequency converting portion 141 converts an intermediate frequency signal from frequency converting portion 93 to a baseband signal, by using a local signal (carrier) from local signal generator 129. In this case, by using a carrier synchronization circuit, not shown, complete carrier synchronization is realized.

Distributor 95 distributes the baseband signal from frequency converting portion 141 into two and generates distribution signals ZZ1 and ZZ2. Correlator 137 generates correlated signal AA using distribution signal ZZ1 correlated with the spread code used at the time of transmission. Distribution signal ZZ2 is input to correlator 139 through delay element 131. Correlator 139 generates correlated signal BB by using the delayed distribution signal ZZ2 correlated with the spread code used at the time of transmission. Differentiating portion 125 performs differential decoding, using correlated signals AA and BB. The differentially decoded signals are output as data through determining portion 127.

The delay time of delay element 131 is set to be the same as the time difference between the adjacent ones of the signals delayed and multiplexed on the transmitting side, similar to the delay time of delay element 131 shown in FIG. 10.

As described, in the eighth embodiment, the frequency converting portion for converting to the baseband signal is provided in the preceding stage of the distributer, and the baseband signal is delayed for processing.

As a result, compared with the receiver shown in FIG. 10, in the eighth embodiment, the number of frequency converting portions can be reduced from two to one, and the delay element 131 can be formed by a digital circuit. Therefore, the size of the receiver can be reduced.

Further, in the eighth embodiment, similar to the sixth embodiment, delay times in the transmitter are set in accordance with the second delay time setting method. More specifically, delay times in the receiver are set such that time difference between adjacent continuous signals is constant.

As a result, in the eighth embodiment, only one delay path is necessary in the receiver as shown in FIG. 13, so that the circuit scale of the receiver can be reduced. Further, regardless of the number of multiplexing, only one delay path is necessary in the receiver, and hence circuit scale is not enlarged even when the number of multiplexing is increased.

Further, since the transmitter shown in FIG. 1 is used in the eighth embodiment, similar effects as in the first embodiment can be obtained.

In the eighth embodiment, on the transmitting side, the multiplexing is performed by delaying intermediate frequency signals. On the receiving side, differential decoding (demodulation) is performed by delaying completely carrier synchronized baseband signal. On the transmitting side, the second delay time setting method is used.

In the spread spectrum communication system in accordance with the ninth embodiment, the transmitter shown in FIG. 1 is used. In the ninth embodiment, the correlator of the receiver shown in FIG. 12 is provided in the preceding stage of the distributer.

Figure 14:
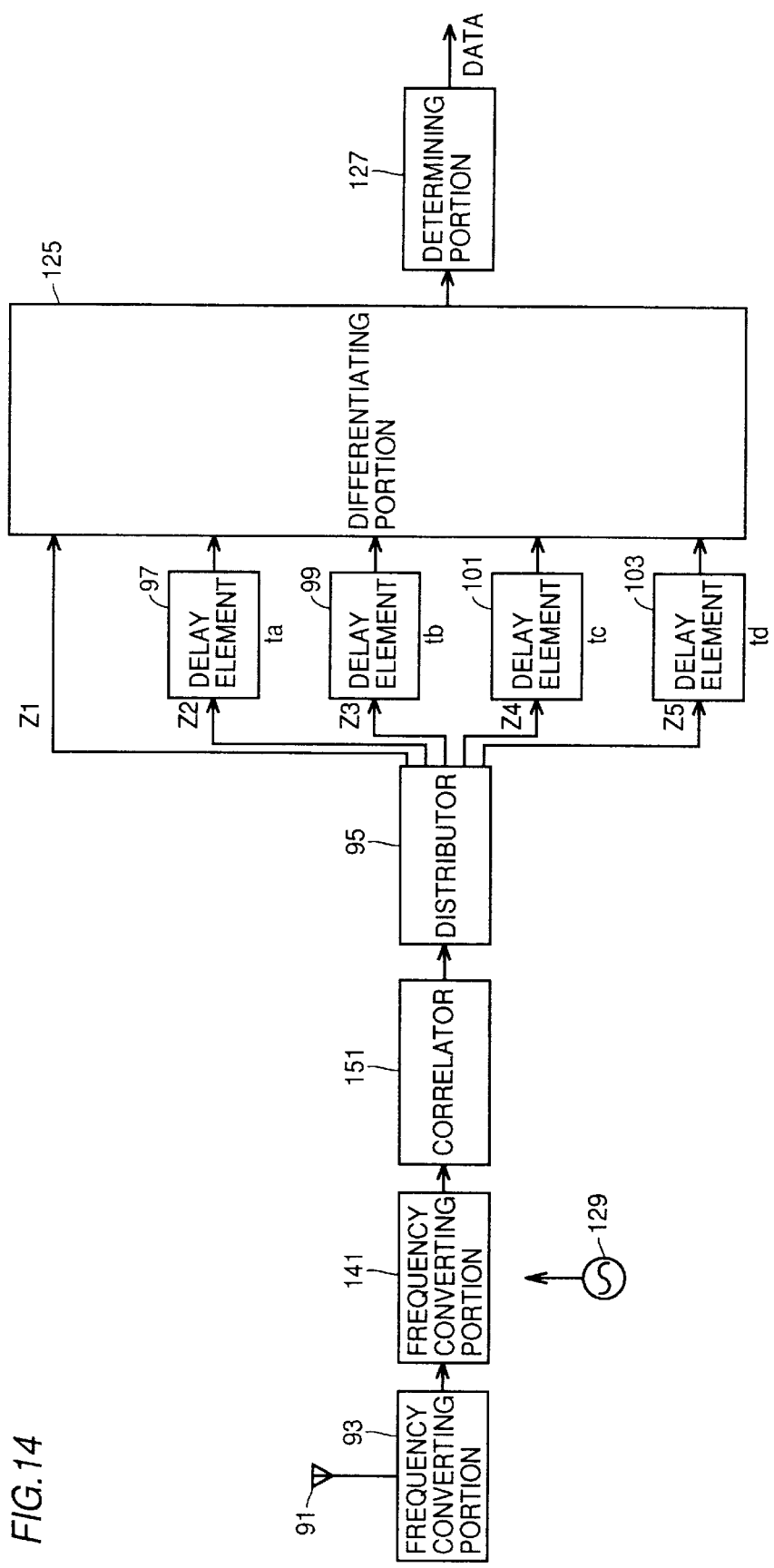
FIG. 14 is a schematic block diagram showing a receiver of the spread spectrum communication system in accordance with a ninth embodiment of the present invention.

FIG. 14 is a schematic block diagram showing the receiver of the spread spectrum communication system in accordance with the ninth embodiment of the present invention. Portions corresponding to those of FIG. 12 are denoted by the same reference characters and description thereof is not repeated. Mainly, characteristic portions will be described.

Referring to FIG. 14, the receiver of the spread spectrum communication system in accordance with the ninth embodiment includes reception antenna 91, frequency converting portions 93, 141, local frequency signal generator 129, correlator 151, distributor 95, delay elements 97, 99, 101, 103, differentiating portion 125 and determining portion 127.

Correlator 151 outputs a correlated signal by using the baseband signal from frequency converting portion 141 correlated with the spread code used at the time of transmission. Distributor 95 distributes the correlated signal from correlator 151 into a number larger by one than the number of parallel signals provided on the transmitting side, and generates distribution signals Z1 to Z5. Differentiating portion 125 receives distribution signal Z1 and distribution signals Z2 to Z5 delayed by delay elements 97 to 103.

Differentiating portion 125 performs differential decoding, using distribution signal Z1 and delayed distribution signals Z2 to Z5. The differentially decoded signals are output as data through determining portion 127.

As described above, in the ninth embodiment, processing is performed with the correlator 151 provided in the preceding stage of distributor 95.

As a result, as compared with the receiver shown in FIG. 12, in the ninth embodiment, the number of correlators can be reduced from five to one, and the circuit scale of the receiver can be reduced.

Further, since the receiver shown in FIG. 1 is used in the ninth embodiment, similar effects as in the first embodiment can be obtained.

Further, since delay is realized on the baseband signal in the receiver, digital delay elements may be used for the delay elements, and hence higher integration and reduction in size of the receiver become possible.

In the ninth embodiment, multiplexing is performed by delaying intermediate frequency signals on the transmitting side. On the receiving side, completely carrier synchronized baseband signals are provided for differential decoding (demodulation).

In the spread spectrum communication system in accordance with the tenth embodiment, the transmitter shown in FIG. 1 employing the second delay time setting method is used. Therefore, delay times in the transmitter and the receiver are set in the similar manner as in the sixth embodiment. In the receiver of the tenth embodiment, the correlator of the receiver shown in FIG. 13 is provided in the preceding stage of the distributer.

Figure 15:
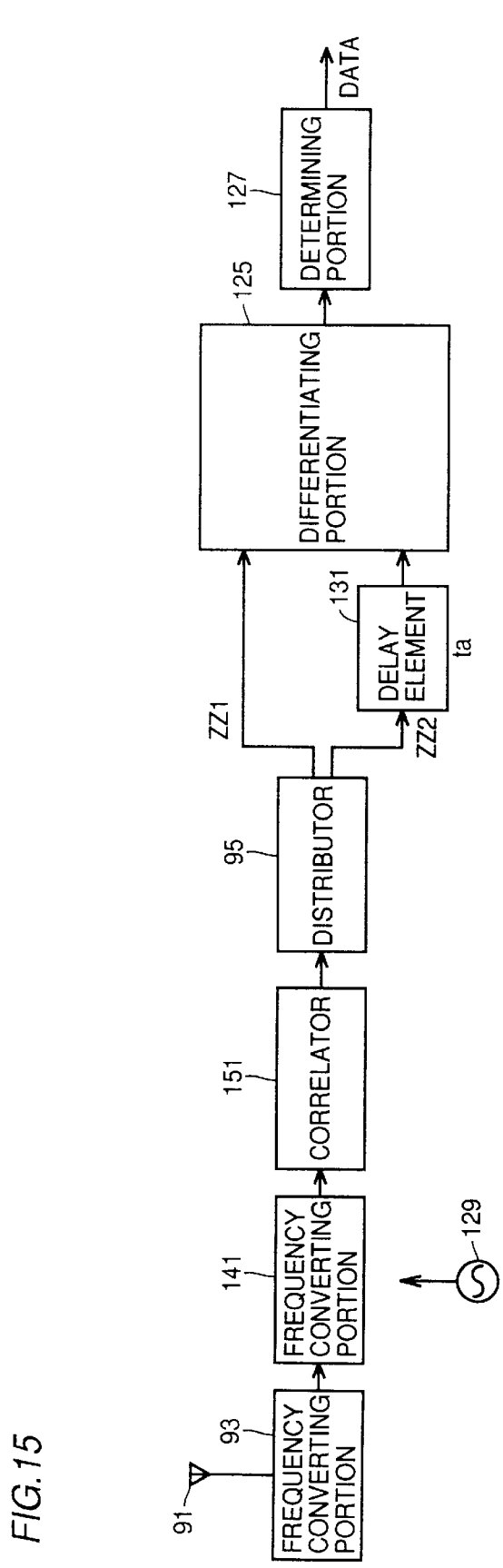
FIG. 15 is a schematic block diagram showing a receiver of the spread spectrum communication system in accordance with a tenth embodiment of the present invention.

FIG. 15 is a schematic block diagram showing the receiver of the spread spectrum communication system in accordance with the tenth embodiment.

Referring to FIG. 15, the receiver of the spread spectrum communication system in accordance with the tenth embodiment includes reception antenna 91, frequency converting portions 93, 141, local frequency signal generator 129, correlator 151, distributor 95, delay element 131, differentiating portion 125 and determining portion 127. Portions corresponding to those of FIG. 13 are denoted by the same reference characters and description thereof is not repeated. Mainly, characteristic portions will be described.

Referring to FIG. 15, correlator 151 provides correlation signals by using the baseband signal from frequency converting portion 141 correlated with the spread code used at the time of transmission. Distributor 95 distributes the baseband correlated signal from correlator 151 into two, and generates distribution signals ZZ1 and ZZ2. Differentiating portion 125 receives distribution signal ZZ1 and distribution signal ZZ2 delayed by delay element 131. The signal differentially decoded by differentiating portion 125 is output as data through determining portion 127.

The distribution signals ZZ1 and ZZ2 correspond to correlated signals AA and BB of FIG. 12, and differential decoding at differentiating portion 125 is performed in the similar manner as differentially decoding at differentiating portion 125 of FIG. 10.

As described above, in the tenth embodiment, correlator 151 is provided in the preceding stage of distributor 95, so that baseband correlated signals are delayed and processed.

As a result, in the tenth embodiment, as compared with the receiver shown in FIG. 13 of the eighth embodiment, the number of correlators can be reduced from two to one, and the delay element 131 may be formed by a digital circuit. Therefore, circuit scale can be reduced.

Further, in the tenth embodiment, the transmitter shown in FIG. 1 utilizing the second delay time setting method is used, and setting of delay times in the transmitter and the receiver are the same as that of the sixth embodiment. Therefore, effects similar to those of the first and sixth embodiments can be obtained.

In the tenth embodiment, multiplexing is performed by delaying intermediate frequency signals on the transmitting side. On the receiving side, completely carrier synchronized baseband signals are delayed for processing. On the transmitting side, the second delay time setting method is used.

Figure 16:
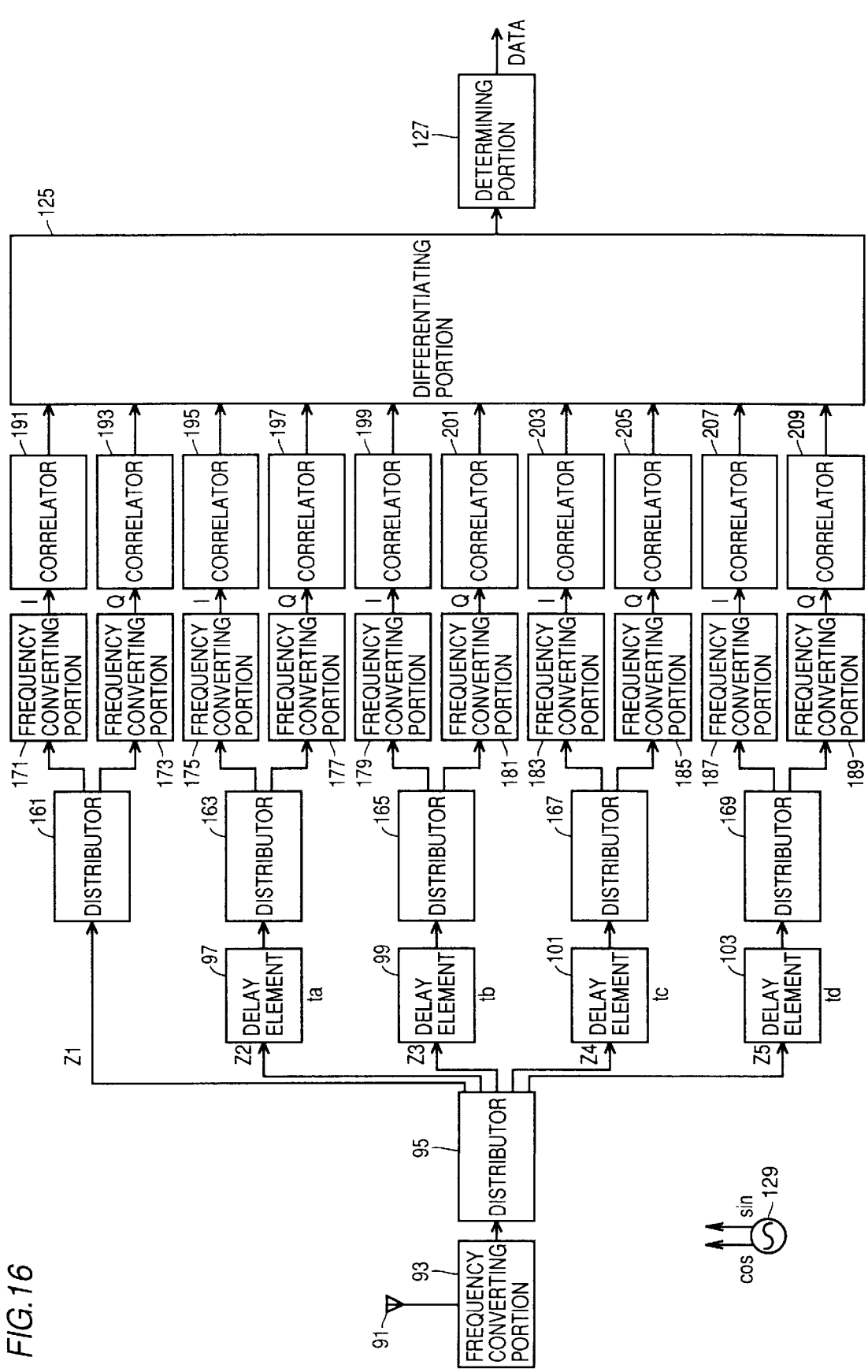
FIG. 16 is a schematic block diagram showing a receiver of the spread spectrum communication system in accordance with an eleventh embodiment of the present invention.

In the spread spectrum communication system in accordance with the eleventh embodiment, the transmitter shown in FIG. 1 is used. FIG. 16 is a schematic block diagram showing the receiver of the spread spectrum communication system in accordance with the eleventh embodiment of the present invention. Portions corresponding to those of FIG. 8 are denoted by the same reference characters and description thereof is not repeated. Mainly, characteristic portion will be described.

Referring to FIG. 16, the receiver of the spread spectrum communication system in accordance with the eleventh embodiment includes reception antenna 91, frequency converting portion 93, distributor 95, delay elements 97, 99, 101, 103, distributors 161, 163, 165, 167, 169, frequency converting portions 171, 173, 175, 177, 179, 181, 183, 185, 187, 189, correlators 191, 193, 195, 197, 199, 201, 203, 205, 207 209, differentiating portion 125 and determining portion 127.

Distributor 95 distributes the intermediate frequency signals from frequency converting portion 93 to a number larger by one than the number of parallel signals provided in the transmitter, and generates distribution signals Z1 to Z5. Distribution signal Z1 and distribution signals Z2 to Z5 delayed by delay elements 97 to 103 are input to distributors 161 to 169 and each further distributed into two.

The signals generated from distributors 161 to 169 are converted to nearly baseband (hereinafter referred to as "pseudo baseband") in-phase signal (hereinafter referred to as "I signal") and quadrature signal (hereinafter referred to as "Q signal") by using the local frequency signal from the local frequency signal generator 129, that is, sin component and cos component of approximately the same frequency as the frequency signal on the transmitting side. The I and Q signals generated from frequency converting portions 171 to 189 are input to correlators 191 to 209.

Correlators 191 to 209 generate correlated signals using I and Q signals correlated with the spread code used at the time of transmission. Differentiating portion 125 performs differential decoding using the correlated signals from correlators 191 to 209. The differentially decoded signals are output as data through determining portion 127.

The operation of the differentiating portion 125 is similar to that of differentiating portion 125 of FIG. 8, except the following points.

Differentiating portion 125 performs differential demodulation based on the change in phase angle, since the signals input thereto are not baseband signals but pseudo baseband signals. Therefore, though not shown, differentiating portion 125 includes means for detecting phase from the correlated signals of I and Q signals. Details are as follows.

FIG. 17 is an illustration of differential decoding at the differentiating portion 125 of FIG. 16.

In FIG. 17, (a) shows differences at differentiating portion 125 in accordance with the fifth to tenth embodiments, and (b) shows differences at differentiating portion 125 of FIG. 16.

Figure 17A:
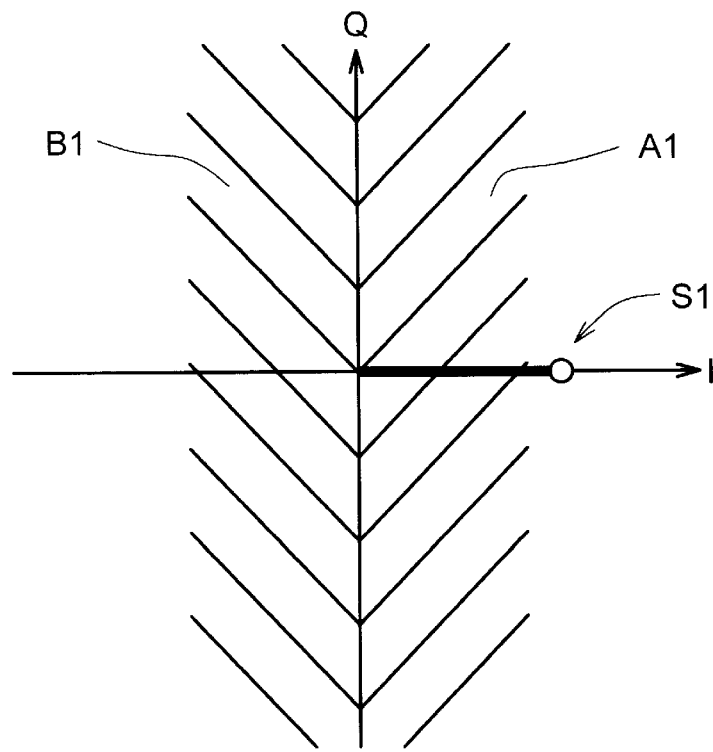
FIGS. 17(a) and (b) are illustrations of differential decoding at the differentiating portion of FIG. 16.

In the fifth to tenth embodiments, completely carrier synchronized baseband signals are used for differential decoding (synchronous demodulation method). In this case, as shown in FIG. 17(a) (for DBPSK), correlated signal appears (arrow S1) in accordance with the content of the data, on the I axis.

Therefore, whether the phase difference is 0° or 180° is determined, using Q axis (I=0) as a reference for determination. More specifically, with the phase angle of $\theta$, whether the phase difference is 0° or 180° is determined dependent on whether the signal is in the region A1 ($90° \leq \theta \leq -90°$) or in the region B1 ($-90° \leq \theta \leq 90°$).

The region A1 is the region used for determining the phase difference of 0°, while the region B1 is used for determining the phase difference of 180°.

Figure 17B:
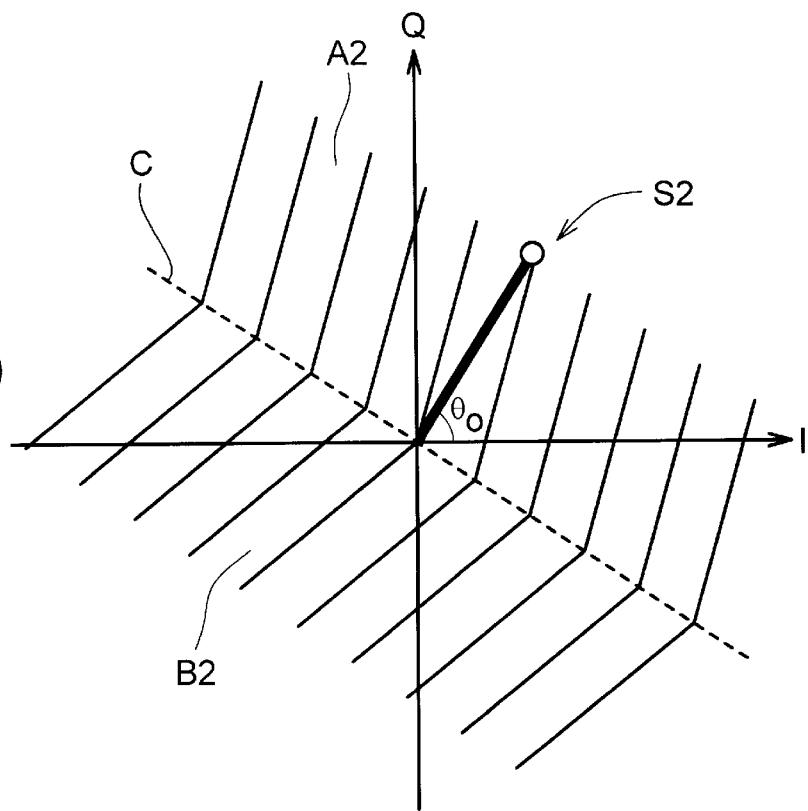

In the present embodiment, differential decoding (demodulation) is performed by using pseudo baseband signals (asynchronous demodulation method). In such asynchronous demodulation method, the signal which appears in accordance with the content of the data has its phase indefinite, and it appears as a vector having an arbitrary phase (arrow S2), as shown in FIG. 17(b). The phase angle when such an arbitrary phase is assumed is represented by $\theta_0$. Therefore, whether the phase difference is 0° or 180° is determined dependent on whether the signal is in the region A2 ($90°+\theta_0 \leq \theta \leq -90°+\theta_0$) or in the region B2 ($-90°+\theta_0 \leq \theta \leq 90°+\theta_0$), as shown in FIG. 17(b). More specifically, it is determined using the axis C plotted in the dotted line, as a reference.

The region A2 is used for determining the phase difference of 0°, and the region B2 is used for determining the phase difference of 180°.

In this manner, differential decoding portion 125 demodulates data (0, 1) based on the change in the phase difference. More specifically, data is demodulated by differentiating the phase obtained by the correlated signals based on I and Q signals and the phase of correlated signals based on I and Q signals at respective delay times. Q axis represents amplitude of sinusoidal carrier wave, and I axis represents amplitude of cosine carrier wave.

As described above, in the eleventh embodiment, differential decoding (demodulation) is performed by using pseudo baseband signals, and not complete baseband signals.

As a result, in the eleventh embodiment, differential decoding (demodulation) becomes possible without carrier synchronization. Therefore, carrier synchronization circuit (phase detector) becomes unnecessary, and as compared with a receiver which performs differential decoding (demodulation) using baseband signals, the circuit scale can be reduced. Further, since the time until carrier synchronization is attained becomes 0, initial operation can be speeded up, and throughput in packet communication or the like having short time of communication can be improved.

Further, in the eleventh embodiment, the transmitter shown in FIG. 1 is used, and hence similar effects as in the first embodiment can be obtained.

In the eleventh embodiment, multiplexing is performed by delaying intermediate frequency signals on the transmitting side. Further, on the receiving side, intermediate frequency signals are delayed for processing, using asynchronous modulation method (in which modulation is performed by not completely carrier synchronized pseudo baseband signals).

In the spread spectrum communication system in accordance with the twelfth embodiment, the transmitter shown in FIG. 1 using the second delay time setting method is used. Therefore, delay times in the transmitter and the receiver are the same as those in the sixth embodiment.

Figure 18:
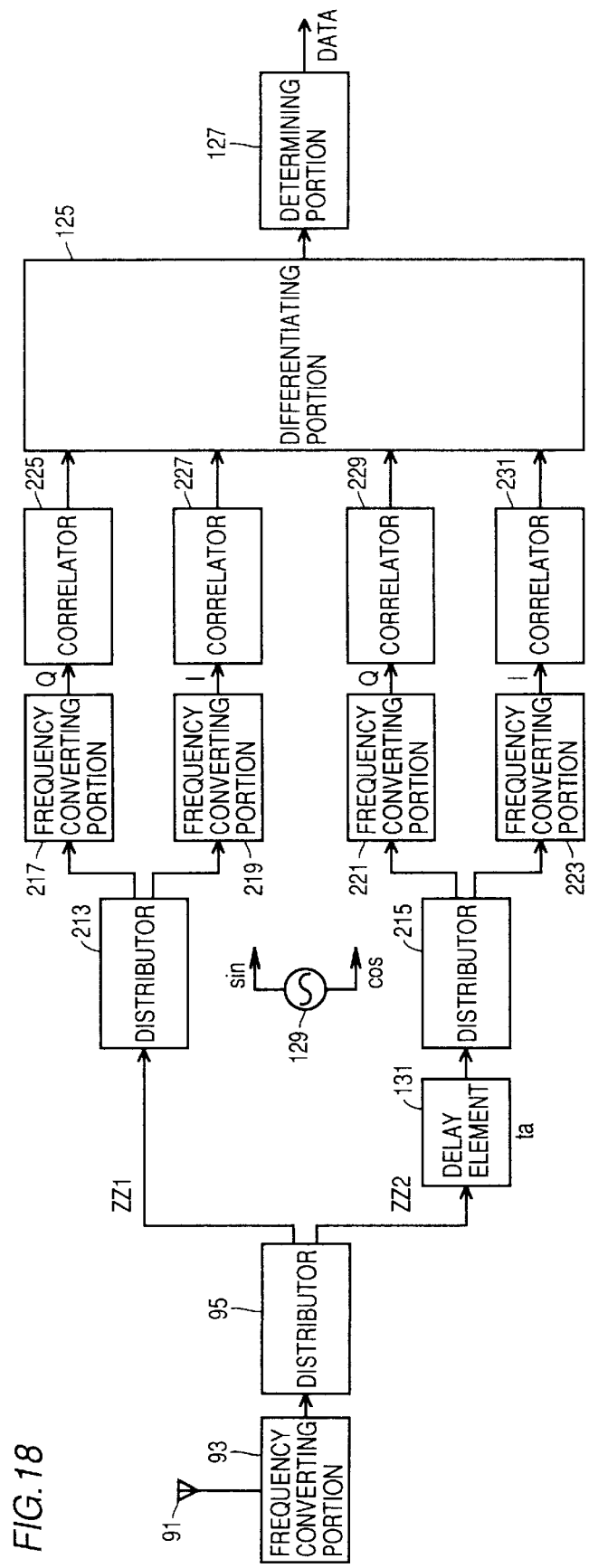
FIG. 18 is a schematic block diagram showing a receiver of the spread spectrum communication system in accordance with a twelfth embodiment of the present invention.

FIG. 18 is a schematic block diagram showing the receiver of the spread spectrum communication system in accordance with the twelfth embodiment. Portions corresponding to those of FIG. 10 are denoted by the same reference characters and description thereof is not repeated. Mainly, characteristic portions will be described.

Referring to FIG. 18, the receiver of the spread spectrum communication system in accordance with the twelfth embodiment includes reception antenna 91, frequency converting portion 93, distributor 95, delay element 131, distributors 213, 215, frequency converting portions 217, 219, 221, 223, correlators 225, 227, 229, 231, differentiating portion 125 and determining portion 127.

Distribution signal ZZ1 and distribution signal ZZ2 delayed by delay element 131 are input to distributors 213 and 215. Frequency converting portions 217 to 223 convert the signals from distributors 213 and 215 to I and Q signals which are pseudo baseband (nearly baseband) signals, using the local signal from local signal generator 129, that is, sin component and cos component of approximately the same frequency as the frequency on the transmitting side. Correlators 225 to 231 generate correlated signals using Q and I signals, correlated with the spread code at the time of transmission. Differentiating portion 125 performs differential decoding using the correlated signals from correlators 225 to 231. Differentially decoded signals are output as data through determining portion 127. The operation of differentiating portion 125 is similar to that of differentiating portion 125 shown in FIG. 16.

As described above, in the twelfth embodiment, differential decoding (demodulation) is performed using pseudo baseband signals (demodulation by quasi synchronous detection, that is, asynchronous demodulation method). As a result, in the twelfth embodiment, differential decoding (demodulation) becomes possible without complete carrier synchronization Therefore, carrier synchronization circuit (phase detector) becomes unnecessary, and as compared with differential decoding using complete baseband signals, the circuit scale can be reduced. Further, the time until carrier synchronization is attained is reduced to 0, and initial operation is speeded up. Accordingly, throughput can be improved in packet communication and so on of which communication time is short.

Further, in the first transmitter of FIG. 1, the second delay time setting method is used. Therefore, the delay times are set such that continuous signals have constant time difference, as in the sixth embodiment. As a result, in the twelfth embodiment, the number of delay paths can be reduced to one on the transmitting side and hence circuit scale of the system can be significantly reduced. Further, since only one delay path is necessary regardless of the number of multiplexing, circuit scale is not enlarged even if the number of multiplexing is increased.

Further, in the twelfth embodiment, the transmitter shown in FIG. 1 is used, and hence similar effects as in the first embodiment can be obtained.

In the twelfth embodiment, on the transmitting side, multiplexing is performed by delaying intermediate frequency signals. Further, on the receiving side, intermediate frequency signals are delayed and differential decoding (demodulation) is performed using not completely carrier synchronized pseudo baseband signals. Further, on the transmitting side, the second delay time setting method is used.

The spread spectrum communication system in accordance with the thirtieth embodiment, the frequency converting portion for converting to the pseudo baseband shown in FIG. 16 is placed preceding the delay element and the distributor, so that pseudo baseband signals are delayed.

The transmitter shown in FIG. 1 is used.

Figure 19:
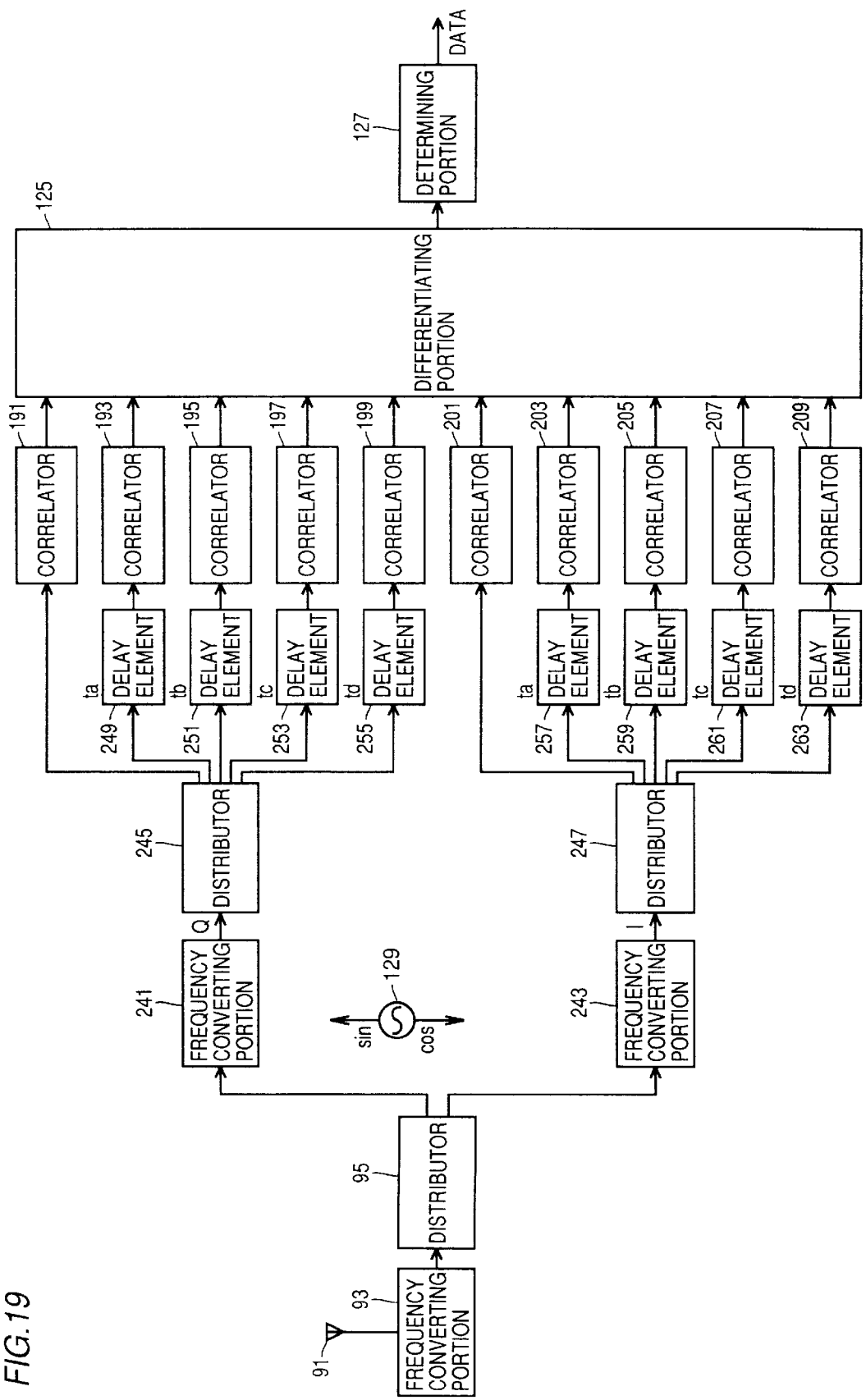
FIG. 19 is a schematic block diagram showing a receiver of the spread spectrum communication system in accordance with a thirteenth embodiment of the present invention.

FIG. 19 is a schematic block diagram showing the receiver of the spread spectrum communication system in accordance with the thirteenth embodiment of the present invention. Portions corresponding to those of FIG. 16 are denoted by the same reference characters and description thereof is not repeated. Mainly, characteristic portions will be described.

Referring to FIG. 19, the receiver of the spread spectrum communication system in accordance with the thirteenth embodiment includes reception antenna 91, frequency converting portion 93, distributor 95, frequency converting portions 241, 243, distributors 245, 247, delay elements 249, 251, 253, 255, 257, 259, 261 263, correlators 191, 193, 195, 197, 199, 201, 203, 205, 207, 209, differentiating portion 125 and determining portion 127.

Distributor 95 distributes intermediate frequency signal into two and generates distribution signals. One of the distribution signals is converted to a Q signal (quadrature signal) of pseudo baseband (nearly baseband) by frequency converting portion 241, using the local frequency signal from local frequency signal generator 129, that is, sin component of approximately the same frequency as the frequency on the transmitting side. Distributor 245 distributes the Q signal from frequency converting portion 241 into five and generates distribution signals. The number of distribution is larger by one than the number of parallel signals provided on the transmitter shown in FIG. 1.

One of the distribution signals from distributor 245 is directly input to correlator 191, while other four distribution signals are input to correlators 193 to 199 through delay elements 249 to 255. Correlated signals from correlators 191 to 199 are input to differentiating portion 125.

Meanwhile, the other one of the distribution signals from distributor 95 is converted to an I signal (in-phase signal) of pseudo baseband, by frequency converting portion 243 using the local signal from local signal generator 129, that is, cos component of approximately the same frequency as the frequency on the transmitting side. Thereafter, it is similarly processed as the Q signal from frequency converting portion 241.

Differentiating portion 125 performs differential decoding using correlated signals from correlators 191 to 209, and differentially decoded signals are output as data through determining portion 127.

The delay times of delay elements 249 to 255 are $\tau_a$ to $\tau_d$, respectively, and delay times of delay elements 257 to 263 are $\tau_a$ to $\tau_d$, which are similar to the delay elements 97 to 103 shown in FIG. 16, and set in the similar manner as in the example of FIG. 16. Differentiating portion 125 is similar to that shown in FIG. 16.

As described above, in the thirteenth embodiment, the frequency converting portion for converting the intermediate frequency signals to pseudo baseband signal is provided in the preceding stage of delay elements, whereby pseudo baseband signals are delayed for processing.

As a result, in the thirteenth embodiment, as compared with the receiver shown in FIG. 16, though the number of delay elements is increased from four to eight, the frequency converting portions for converting to the pseudo baseband signals can be significantly reduced from ten to two, whereby the circuit scale can be significantly reduced.

Further, since pseudo baseband signals are delayed, delay elements can be formed by digital circuits, so that higher integration and reduction in size of the receiver become possible.

Further, since the transmitter shown in FIG. 1 is used, similar effects as in the first embodiment can be obtained.

Further, as in the eleventh embodiment, not completely carrier synchronized pseudo baseband signals are used for processing, so that carrier synchronization circuit (phase detector) becomes unnecessary, and hence circuit scale can be reduced as compared with processing using complete baseband signals. Further, the time until carrier synchronization is attained is reduced to 0, SO that initial operation is speeded up and throughput can be improved in packet communication or the like of which communication time is short.

In the thirteenth embodiment, on the transmitting side, multiplexing is performed by delaying intermediate frequency signals. Further, on the receiving side, not completely carrier synchronized pseudo baseband signals are delayed and thereafter differential decoding (demodulation) is performed.

In the spread spectrum communication system in accordance with the fourteenth embodiment, the transmitter shown in FIG. 1 employing the second delay time setting method is used. Therefore, setting of delay times in the transmitter and the receiver is the same as in the sixth embodiment. In the fourteenth embodiment, the frequency converting portion for converting to pseudo baseband shown in FIG. 18 is provided in the proceeding stage of delay elements, so that pseudo baseband signals are delayed for processing.

Figure 20:
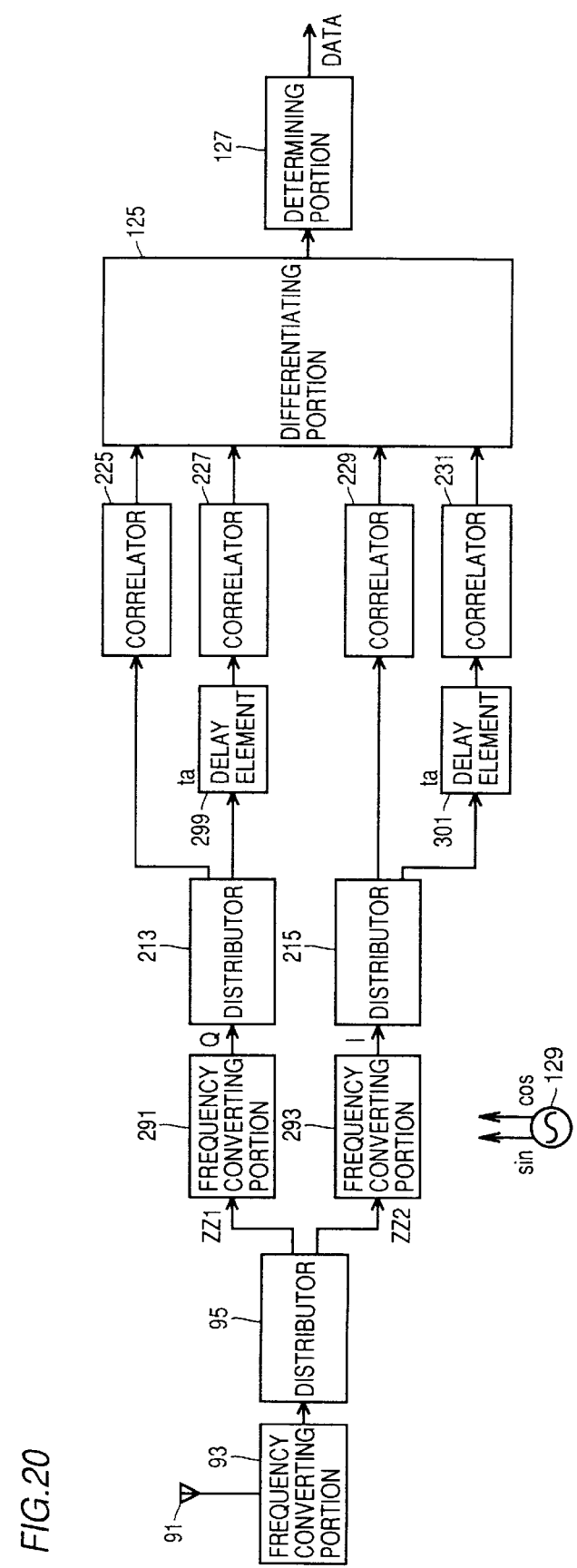
FIG. 20 is a schematic block diagram showing a receiver of the spread spectrum communication system in accordance with a fourteenth embodiment of the present invention.

FIG. 20 is a schematic block diagram showing the receiver of the spread spectrum communication system in accordance with the fourteenth embodiment of the present invention. Portions corresponding to those of FIG. 18 are denoted by the same reference characters and description thereof is not repeated. Mainly, characteristic portions will be described.

Referring to FIG. 20, the receiver of the spread spectrum communication system in accordance with the fourteenth embodiment includes reception antenna 91, frequency converting portion 93, distributor 95, frequency converting portions 291, 293, distributors 213, 215, local signal generator 129, delay elements 229, 301, correlators 225, 227, 229, 231, differentiating portion 125 and determining portion 127.

Referring to FIG. 20, distribution signal ZZ1 is converted to a pseudo baseband Q signal (quadrature signal) by using sin component from local frequency signal generator 129, by means of frequency converting portion 291. Distributor 213 distributes the Q signal into two. One of the distribution signals from distributor 213 is input to correlator 225 and output as a correlated signal. The other distribution signal from distributor 213 is input to correlator 227 through a delay element 229, and output as a correlated signal.

Distribution signal ZZ2 is converted to a pseudo baseband I signal (in-phase signal) using cos component from local signal generator 129. Thereafter, it is processed in the similar manner as the Q signal described above. Frequency converting portion 291 is similar to frequency converting portion 217 shown in FIG. 18, frequency converting portion 293 is similar to frequency converting portion 219 of FIG. 18, and delay elements 299 and 301 are similar to delay element 131 of FIG. 18. Therefore, the delay times of delay elements 299 and 301 correspond to the difference between closest delay times in the transmitter.

As described above, in the fourteenth embodiment, the frequency converting portion for converting to pseudo baseband signals is provided in the preceding stage of the delay element, so that pseudo baseband signals are delayed for processing.

As a result, in the fourteenth embodiment, as compared with receiver shown in FIG. 18, the number of frequency converting portions for converting to the pseudo baseband signals can be reduced from four to two, and the circuit scale of the receiver can be reduced.

Further, in the fourteenth embodiment, the second delay time setting method is employed, and the delay times are set on the transmitter such that the continuous signals have same time intervals. Therefore, only one delay path is necessary in the receiver side, and the circuit scale can be significantly reduced, as in the sixth embodiment. Further, only one delay path is necessary regardless of the member of multiplexing, so that the circuit scale is not enlarged even if the number of multiplexing is increased.

Further, since pseudo baseband signals are delayed, delay elements can be formed by digital circuits, whereby high integration and reduction in size of the receiver become possible.

Further, in the fourteenth embodiment, pseudo baseband signals are delayed and differential decoding (demodulation) is performed. Therefore, carrier synchronization circuit (phase detector) becomes unnecessary, and the circuit scale can be reduced, as compared with processing using complete baseband signals. Further, since the time until carrier synchronization is attained can be reduced to 0, initial operation is speeded up, and throughput can be improved in packet communication or the like of which transmission time is short.

In the fourteenth embodiment, in the transmitter, multiplexing is performed by delaying intermediate frequency signals. Further, on the receiving side, differential decoding (demodulation) is performed by using not completely carrier synchronized pseudo baseband signals. Further, the second delay time setting method is used.

In the spread spectrum communication system in accordance with the fifteenth embodiment, the correlator shown in FIG. 19 is provided preceding the distributor of the succeeding stage. Further, the transmitter shown in FIG. 1 is used.

Figure 21:
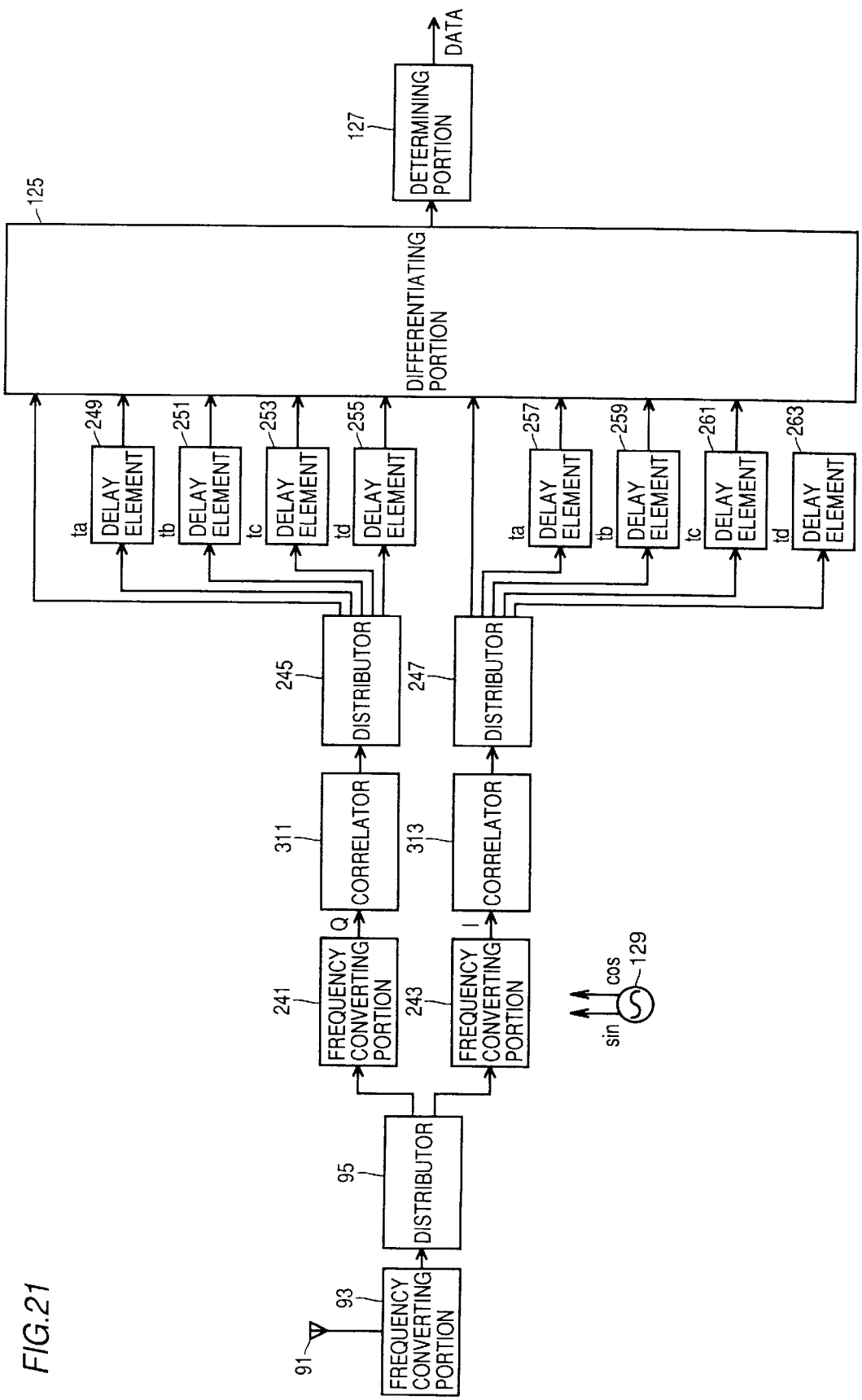
FIG. 21 is a schematic block diagram showing a receiver of the spread spectrum communication system in accordance with a fifteenth embodiment of the present invention.

FIG. 21 is a schematic block diagram showing the receiver of the spread spectrum communication system in accordance with the fifteenth embodiment. Portions corresponding to those of FIG. 19 are denoted by the same reference characters and description thereof is not repeated. Mainly, characteristic portions will be described.

Referring to FIG. 21, the receiver of the spread spectrum communication system in accordance with the fifteenth embodiment includes reception antenna 91, frequency converting portion 93, distributor 95, frequency converting portions 241, 243, correlators 311, 313, distributors 245, 247, local signal generator 129, delay elements 249, 251, 253, 255, 257, 259, 261, 263, differentiating portion 125 and determining portion 127.

Correlator 311 generates a correlated signal by using the pseudo baseband Q signal from frequency converting portion 241, correlated with the spread code used at the time of transmission. Distributor 245 distributes the correlated signal from correlator 311 to five, and generates distribution signals. One of the distribution signals from distributor 245 is directly input to differentiating portion 125, and other four are input to differentiating portion 125 through delay elements 249 to 255.

The pseudo baseband I signal generated from frequency converting portion 243 is processed in the similar manner as the Q signal. Differentiating portion 125 receives two distribution signals from distributors 245 and 247 as well as eight signals from delay elements 249 to 263 and performs differential decoding. The differentially decoded signals are output as data through determining portion 127.

As described above, in the fifteenth embodiment, the correlator is provided preceding the distributor for distributing the pseudo baseband signals for processing.

As a result, as compared with the receiver shown in FIG. 19, in the fifteenth embodiment, the number of correlators can be reduced from ten to two, so that the circuit scale can be reduced.

Further, since the transmitter shown in FIG. 1 is used, similar effects as the first embodiment can be obtained.

Further, since pseudo baseband signals are delayed, delay elements can be formed by digital circuits, whereby higher integration and reduction in size of the receiver become possible.

Further, since not completely carrier synchronized pseudo baseband signals are used for differential decoding (demodulation), carrier synchronization circuit (phase detector) becomes unnecessary, and hence circuit scale can be reduced as compared with processing using completely baseband signals. Further, since time until carrier synchronization is attained can be reduced to zero, initial operation can be speeded up, and throughput can be improved in packet communication or the like of which transmission time is short.

In the fifteenth embodiment, on the transmitting side, multiplexing is performed by delaying intermediate frequency signals. On the receiving side, not completely carrier synchronized pseudo baseband signals are used for processing.

Figure 22:
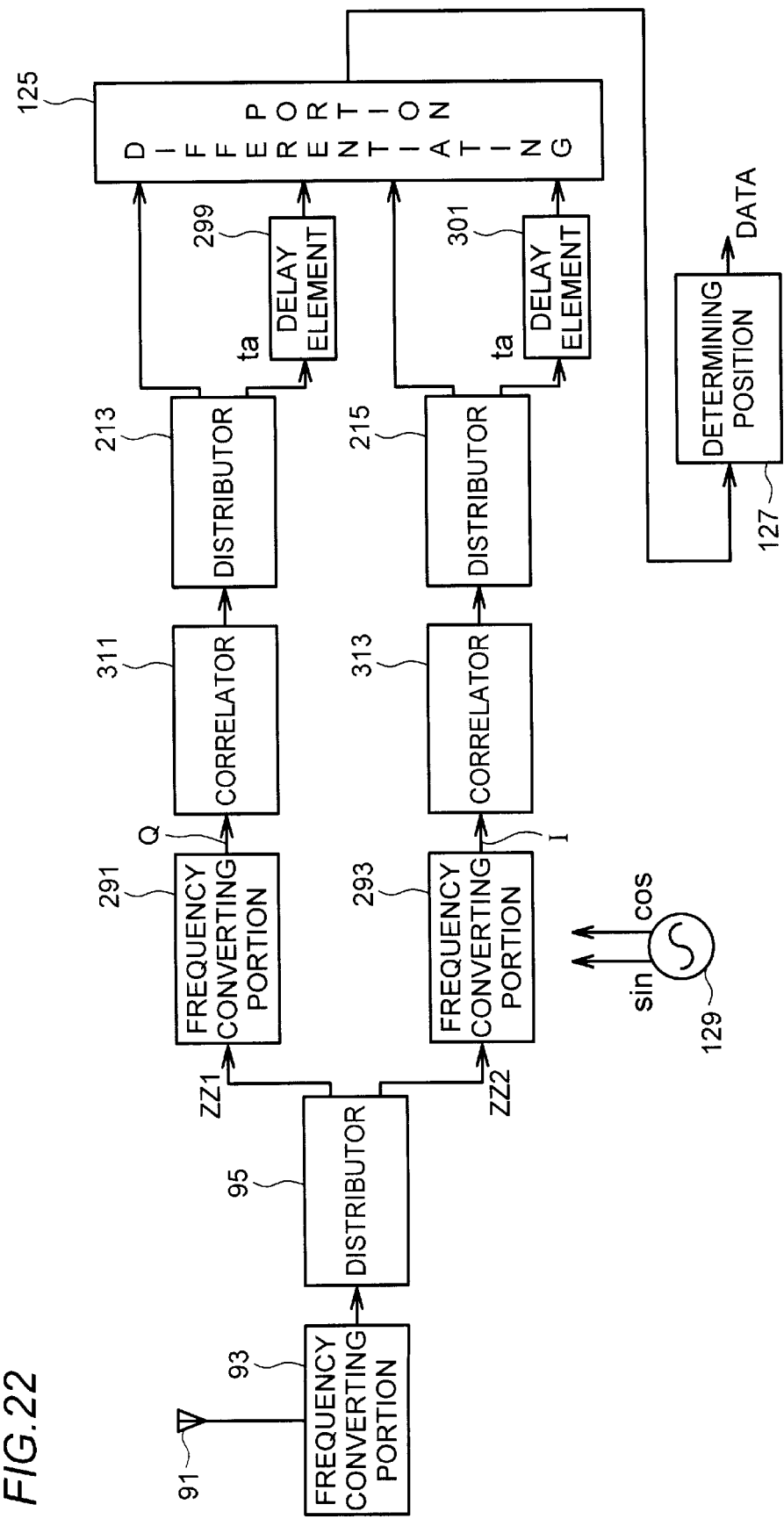
FIG. 22 is a schematic block diagram showing a receiver of the spread spectrum communication system in accordance with a sixteenth embodiment of the present invention.

In the spread spectrum communication system in accordance with the sixteenth embodiment, the correlator shown in FIG. 22 is provided in the preceding stage of the distributor for distributing the pseudo baseband signals. The transmitter shown in FIG. 1 using the second delay time setting method is used.

FIG. 22 is a schematic block diagram showing the receiver of the spread spectrum communication system in accordance with the sixteenth embodiment of the present invention. Portions corresponding to those of FIG. 20 are denoted by the same reference characters and description thereof is not repeated. Mainly, the characteristic portions will be described.

Referring to FIG. 22, the receiver of the spread spectrum communication system in accordance with the sixteenth embodiment includes reception antenna 91, frequency converting portion 93, distributor 95, frequency converting portions 291, 293, correlators 311, 313, distributors 213, 215, local signal generator 129, delay elements 299, 301, differentiating portion 125 and determining portion 127.

Correlator 311 generates a correlated signal using the pseudo baseband Q signal from frequency converting portion 291, correlated with the spread code used on the transmitting side. Distributor 213 distributes the correlated signal from correlator 311 to two, and generates distribution signals. One of the distribution signals from distributor 213 is input to differentiating portion 125. The other one of the distribution signals from distributor 213 is input to differentiating portion 125 through delay element 299.

The pseudo baseband I signal from frequency converting portion 293 is also processed in the similar manner as Q signal. Differentiating portion 125 receives two distribution signals from distributors 213 and 215 as well as two delayed distribution signals from delay element 199 and 301. Differentiating portion 125 performs differential decoding based on these signals. The differentially decoded signals are output as data through determining portion 127.

As described above, in the sixteenth embodiment, the correlator is provided in the preceding stage of the distributor for distributing the pseudo baseband signals for processing.

As a result, in the sixteenth embodiment, as compared with the receiver of FIG. 20, the number of correlators can be reduced from four to two, and the circuit scale can be reduced.

Further, since in the sixteenth embodiment the transmitter shown in FIG. 1 is used, so that similar effects as in the first embodiment can be obtained.

Further, on the receiving side, differential decoding (demodulation) is performed by processing pseudo baseband signals. Therefore, carrier synchronization circuit (phase detector) becomes unnecessary, and hence circuit scale can be reduced as compared with processing using completely baseband signals. Further, time until synchronization is attained is eliminated, and therefore throughput can be improved in packet communication, for example, of which communication time is short.

Further, since pseudo baseband signals are delayed, delay elements can be formed by digital circuits, so that higher integration and reduction in size of the receiver become possible.

Further, the second delay time setting method is used, and the delay times in the transmitter are set such that continuous signals have the same time difference between each other as in the sixth embodiment. Therefore, only one delay path is necessary on the receiving side, and hence circuit scale can be significantly reduced. Further, since the delay path is only one regardless of the number of multiplexing, circuit scale is not enlarged even when the number of multiplexing is increased.

In the sixteenth embodiment, on the transmitting side, multiplexing is performed by delaying intermediate frequency signals. On the receiver side, not completely carrier synchronized pseudo baseband signals are delayed for further processing. On the transmitting side, the second delay time setting method is used.

The spread spectrum communication system in accordance with a seventeenth embodiment of the present invention includes the transmitter shown in FIG. 4 and the receiver shown in FIG. 12. Characteristics will be described. In the transmitter, a plurality of parallel signals P1 to P4 are spread by the spread code and thereafter delayed. Further, time difference between the delay times is set to an arbitrary time period of at least 1 chip (first delay time setting method). Multiplexing is performed by delaying baseband signals.

The receiver performs differential decoding (demodulation) by delaying completely carrier synchronized baseband signals.

As the spread spectrum communication system in accordance with the seventeenth embodiment has the above described structure and characteristics, similar effects as obtained in the second and seventh embodiments can be obtained.

The spread spectrum communication system in accordance with an eighteenth embodiment includes the transmitter shown in FIG. 4 and the receiver of FIG. 13. Characteristics will be described. In the transmitter, a plurality of parallel signals P1 to P4 are spread by a spread code and thereafter delayed. Further, the time difference between the delay times is set to a constant arbitrary time period of at least 1 chip (second delay time setting method). Multiplexing is performed by delaying baseband signals.

The receiver performs differential decoding (demodulation) by delaying completely carrier synchronized baseband signals.

The spread spectrum communication system in accordance with the eighteenth embodiment having the above described structure and characteristic provide similar effects as in the second and eighth embodiments.

The spread spectrum communication system in accordance with the nineteenth embodiments includes the transmitter shown in FIG. 4 and the receiver shown in FIG. 14. Characteristics will be described. In the transmitter, a plurality of parallel signals P1 to P4 are spread by a spread code and thereafter delayed. The time difference between delay times is set to an arbitrary time period of at least 1 chip (first delay time setting method). Multiplexing is performed by delaying baseband signals.

The receiver performs differential decoding (demodulation) by processing completely carrier synchronized baseband signals.

The spread spectrum communication system in accordance with the nineteenth embodiment having the above described structure and characteristics provide similar effects as the second and ninth embodiments.

The spread spectrum communication system in accordance with a twentieth embodiment includes the transmitter shown in FIG. 4 and the receiver of FIG. 15. Characteristics will be described. In the transmitter, a plurality of parallel signals P1 to P4 are spread by a spread code and thereafter delayed. The time difference between delay times is set to a constant arbitrary time period of at least 1 chip (second delay time setting method). Multiplexing is performed by delaying baseband signals.

The receiver processes by delaying completely carrier synchronized baseband signals.

The spread spectrum communication system in accordance with the twentieth embodiment having the above described structure and characteristics provide similar effects as the seventh and tenth embodiments.

The spread spectrum communication system in accordance with a twenty-first embodiment includes the transmitter shown in FIG. 4 and the receiver shown in FIG. 19. Characteristics will be described. In the transmitter, a plurality of parallel signals PI to P4 are spread by a spread code and thereafter delayed. Further, the time difference between delay time is set to an arbitrary time period of at least 1 chip (first delay time setting method). Multiplexing is performed by delaying baseband signals.

The receiver delays not completely carrier synchronized pseudo baseband signals, and thereafter performs differential decoding (demodulation).

The spread spectrum communication system in accordance with the twenty-first embodiment having the above described structure and characteristics provide similar effects as the second and thirteenth embodiments.

The spread spectrum communication system in accordance with the twenty-second embodiment includes the transmitter of FIG. 4 and receiver of FIG. 20. Characteristics will be described. In the transmitter, a plurality of parallel signals P1 to P4 are spread by a spread code and thereafter delayed. Further, the time difference between delay times is set to a constant arbitrary time period of at least 1 chip (second delay time setting method). Multiplexing is performed by delaying baseband signals.

The receiver performs differential decoding (demodulation) using not completely carrier synchronized pseudo baseband signals.

The spread spectrum communication system in accordance with the twenty-second embodiment having the above described structure and characteristics provide similar effects as the second and fourteenth embodiment.

The spread spectrum communication system in accordance with the twenty-third embodiment includes the transmitter of FIG. 4 and a receiver of FIG. 21. Characteristics will be described. In the transmitter, a plurality of parallel signals P1 to P4 are spread by a spread code and thereafter delayed. Further, time difference between delay times is set to an arbitrary time period of at least 1 chip (first delay time setting method). Multiplexing is performed by delaying baseband signals.

The receiver delays not completely carrier synchronized pseudo baseband signals, and thereafter, performs differential decoding (demodulation). The spread spectrum communication system in accordance with the twenty-third embodiment having the above described structure and characteristics provide similar effects as the second and fifteenth embodiment.

The spread spectrum communication system in accordance with the twenty-fourth embodiment includes the transmitter of FIG. 4 and a receiver of FIG. 22. Characteristics will be described. In the transmitter, a plurality of parallel signals P1 to P4 are spread by a spread code and thereafter delayed. The time difference between the delay times is set to a constant arbitrary time period of at least 1 chip (second delay time setting method). Multiplexing is performed by delaying baseband signals.

The receiver delays not completely carrier synchronized pseudo baseband signals for processing. In the transmitter, the second delay time setting method is used. The spread spectrum communication system in accordance with the twenty-fourth embodiment having the above described structure and characteristics provide similar effects as the second and sixteenth embodiments.

The spread spectrum communication system in accordance with the twenty-fifth embodiment uses the transmitter of FIG. 4. The receiver of the twenty-fifth embodiment is the receiver shown in FIG. 14 used in the nineteenth embodiment, with two latch portions and a latch controller provided as equivalence to delay elements 97 to 104.

Figure 23:
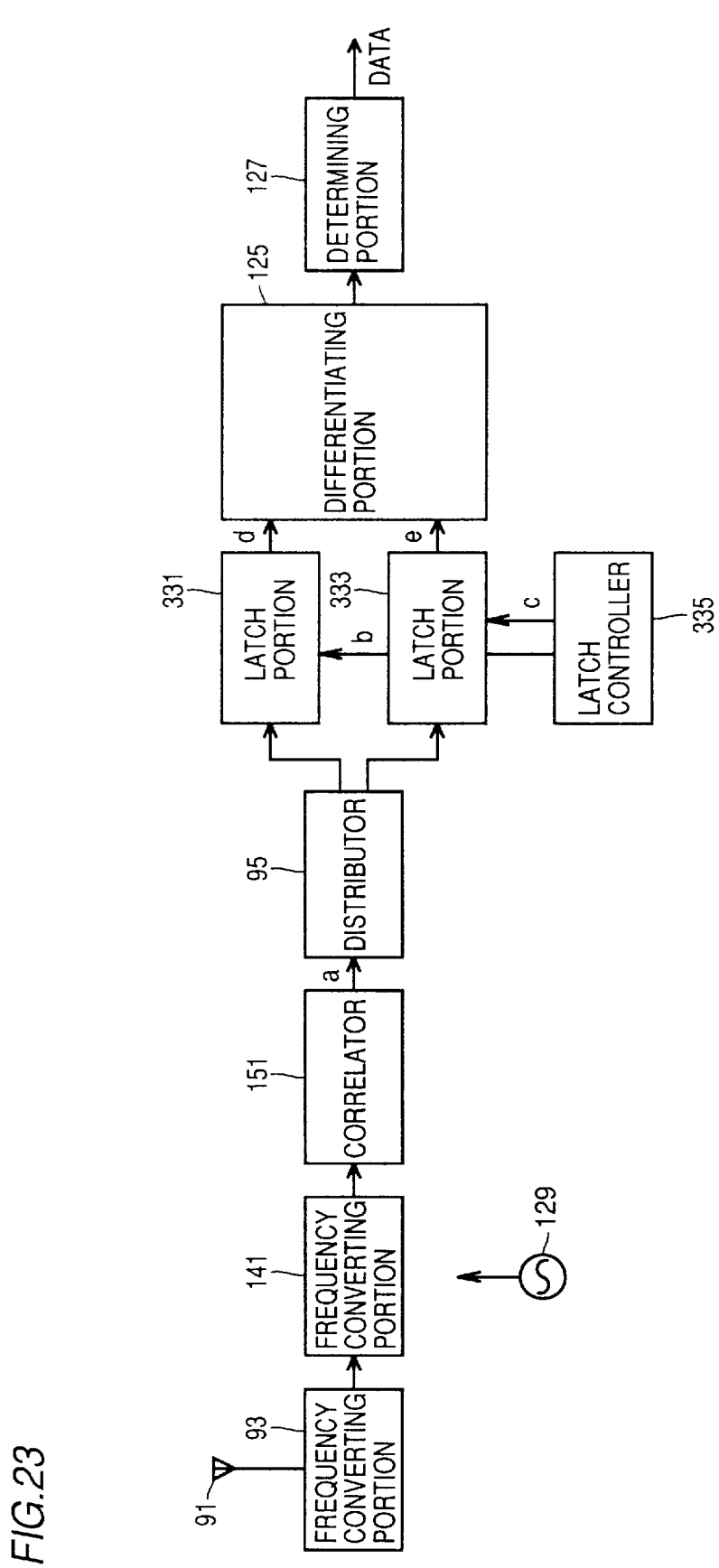
FIG. 23 is a schematic block diagram showing a receiver of the spread spectrum communication system in accordance with a twenty-fifth embodiment of the present invention.

FIG. 23 is a schematic block diagram showing the receiver of the spread spectrum communication system in accordance with the twenty-fifth embodiment of the present invention. Portions corresponding to those of the receiver shown in FIG. 14 used for the nineteenth embodiment are denoted by the same reference characters and description thereof is not repeated. Mainly, characteristic portions will be described.

Referring to FIG. 23, the receiver of the spread spectrum communication system in accordance with the twenty-fifth embodiment includes reception antenna 91, frequency converting portions 93, 141, local signal generator 129, correlator 151, distributor 95, latch portions 331, 333, latch controller 335, differentiating portion 125 and determining portion 127.

Distributor 95 distributes the correlated signal (correlated output) from correlator 151 into two and generates distribution signals. One of the distribution signals from distributor 95 is applied to latch portion 331, and the other is input to latch portion 333.

Latch portion 331 latches one of the distribution signals from distributor 95 based on the latch control signal b from latch controller 335. Latch portion 333 latches the other distribution signal from distributor 95 based on the latch control signal c from latch controller 335.

The correlated signal a from correlator 151 includes four signals of different correlation multiplexed in time. Therefore, by latching the signal at latch portions 331 and 333 based on latch control signal b and c as the timing of delay times of the multiplexed signals, the signal before one delay can be acquired. By using latch signals d and e from latch portions 331 and 333, differentially decoding is performed at differentiating portion 125, and the signals are demodulated. The differential decoded signals are output as data through determining portion 127. Details are as follows.

FIG. 24 is an illustration showing the operation at latch portions 331 and 333 as well as latch controller 335.

In FIG. 24, (a) shows correlated signal a of FIG. 23, (b) shows latch control signal b from latch controller 335, c shows latch control signal (c) from latch controller 335, (b) shows latch signal d from latch portion 331 of FIG. 23, and (e) shows latch signal e from latch portion 333 of FIG. 23.

Referring to FIGS. 23 and 24, correlated signal a includes multiplexed four signals a1 to a4. As the signals are delayed by the transmitter shown in FIG. 4, the sign a1 is apart from signal a2 by the time period $\tau_a$. The signal a2 is apart from signal a3 by the time period $\tau_b$. The signal a3 is apart from the signal a4 by the time period $\tau_c$. More specifically, by the delay provided in the transmitter, the signals are multiplexed with the correlation peaks a1 to a4 shifted by $\tau_a$, $\tau_b$, $\tau_c$, respectively.

Therefore, latch timing at latch portions 331 and 333 are set to $\tau_a$, $\tau_b$ and $\tau_c$ alternately in latch portions 331, and 333, whereby the signal before one delay can be used for differentiating. Details are as follows.

Figure 24A:
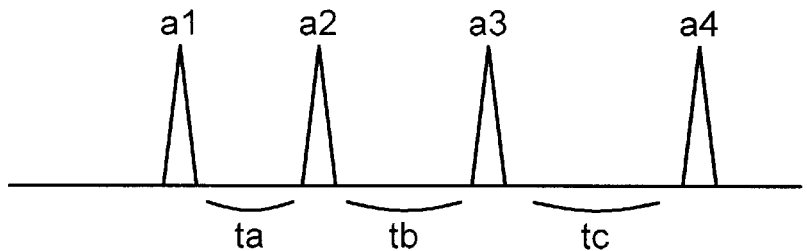
FIGS. 24(a)–(e) are an illustration showing the operation of the latch portion and the latch controller of FIG. 23.
Figure 24B:

Latch controller 335 generates latch control signal b at the timings of signals a1 and a3 (FIG. 24(b)). Latch portion 331 latches the data of signals a1 and a3, based on such latch control signal b (FIG. 24(d)).

Figure 24C:
Figure 24D:
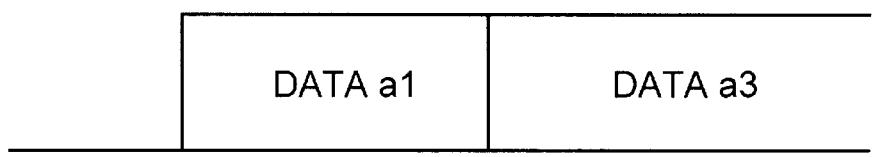
Figure 24E:
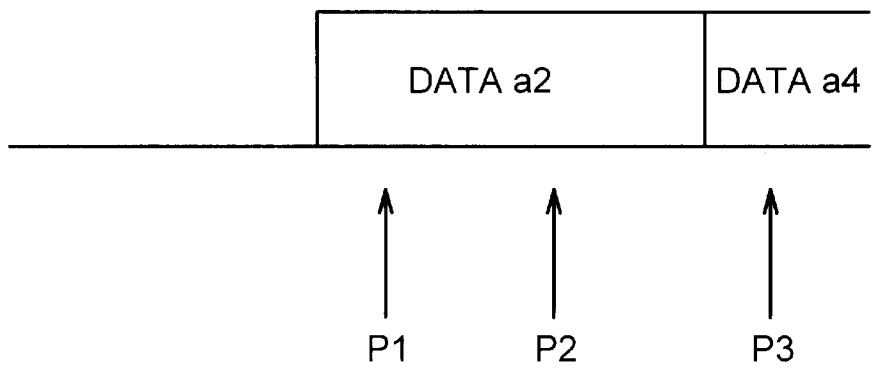

Latch controller 335 generates latch control signal c at the timings of signals a2 and a4 (FIG. 24(c)). Latch portion 33 latches the data of signals a2 and a4 by such latch control signal c (FIG. 24(e)).

Therefore, differentiating portion 125 differentiates data of signals a1 and a2 at point P1, differentiates data of signals a2 and a3 as point p2, and differentiates data of signals a3 and a4 at points P3. In this manner, differentiated portion 125 performs differential decoding and demodulation.

In the example shown in FIG. 24, the shortest of the delay times in the receiver is set to 0. Referring to FIG. 4, the delay time $\tau_2$ of delay element 29 is similar to the time $\tau_a$ of FIG. 24, and delay time $\tau_3$ of delay element 31 shown in FIG. 1 is similar to time $\tau_a+\tau_b$, and delay time $\tau_3$ of delay element 33 of FIG. 1 is similar to time $\tau_a+\tau_b+\tau_c$ of FIG. 24.

The time periods $\tau_a$, $\tau_b$ and $\tau_c$ of FIG. 24 are similar to delay time $\tau_a$ of delay element 97, delay time $\tau_b$ of delay element 99 and delay time $\tau_c$ of delay element 101 of FIG. 14.

As described above, latch portions 331 and 333 as well as latch controller 335 may be provided as equivalence to delay elements 97 to 103 of FIG. 14, since digital circuits can be readily used in the receiver, as delaying and other processes are performed on the baseband signals in the transmitter. Latch portions 331 and 333 need be structured by digital circuits.

As described above, in the twenty-fifth embodiment, instead of a plurality of delay elements, latch portions 331 and 333 as well as a latch controller 335 are provided in the receiver.

Therefore, in the twenty-fifth embodiment, the circuit scale of the receiver can be reduced as compared with differential decoding by the differentiating portion 125 using signals from a plurality of delay elements.

Further, since the transmitter shown in FIG. 4 is used, similar effects as in the second embodiment can be obtained.

Further, the twenty-fifth embodiment provides similar effects as the nineteenth embodiment, since the receiver of the twenty-fifth embodiment differs from the receiver shown in FIG. 14 in its structure only in that latch portions and latch controller are used instead of delay elements.

In the twenty-fifth embodiment, multiplexing is performed by delaying baseband signals on the transmitting side. In the receiver, completely carrier synchronized baseband signals are processed for differential decoding (demodulation).

The spread spectrum communication system in accordance with a twenty-sixth embodiment employs the same transmitter and the receiver of the twenty-fifth embodiment. More specifically, the twenty sixth embodiment includes the transmitter shown in FIG. 4 and the receiver shown in FIG. 23. The only difference is that the second delay time setting method is used in the transmitter and the delay times are set in the similar manner as in the sixth embodiment. More specifically, the delay times are set such that adjacent ones of the signals multiplexed in the transmitter have the same time difference between each other. In FIG. 24, $\tau_a = \tau_b = \tau_c$, that is, this embodiment differs in that the time interval of the latch control signals is also constant.

The twenty-sixth embodiment having the above described structure provides similar effects as the twenty-fifth embodiment.

The spread spectrum communication system in accordance with the twenty-seventh embodiment uses the transmitter shown in FIG. 4. In the twenty-seventh embodiment, the receiver is the receiver shown in FIG. 21 of the twenty-third embodiment. However, in the receiver, latch portions and a latch controller are provided instead of the plurality of delay elements.

Figure 25:
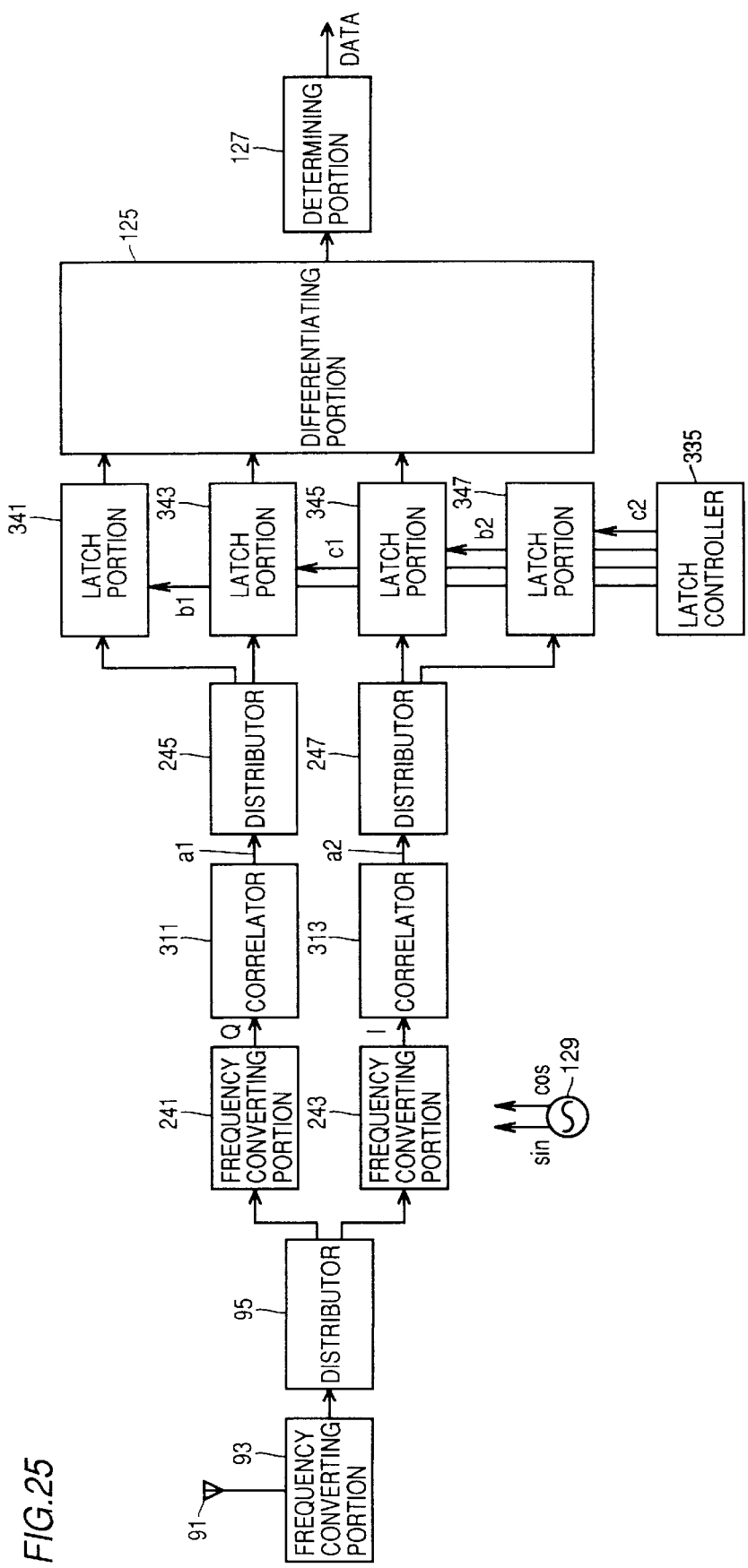
FIG. 25 is a schematic block diagram showing a receiver of the spread spectrum communication system in accordance with a twenty-seventh embodiment of the present invention.

FIG. 25 is a schematic block diagram showing the receiver of the spread spectrum communication system in accordance with the twenty-seventh embodiment of the present invention. Portions corresponding to those of FIGS. 21 and 23 are denoted by the same reference characters and description thereof is not repeated. Characteristic portions will be described.

Referring to FIG. 25, the receiver of the spread spectrum communication system in accordance with the twenty-seventh embodiment includes reception antenna 99, frequency converting portion 93, distributor 95, frequency converting portions 241, 243, correlators 311, 313, distributors 245, 247, local signal generator 129, latch portions 341, 343, 345, 347, latch controller 335, differentiating portion 125 and determining portion 127.

Referring to FIG. 25, the correlated signal a1 which is a pseudo baseband signal from correlator 311 is distributed into two by distributor 245, and input to latch portions 341 and 343. Latch portions 341 and 343 latches the signals input to latch portions 341 and 343 based on the latch control signals b1 and c1 from latch controller 335.

The timing of latching at latch portions 341 and 343, that is, the timings of latch control signals b1 and c1 from latch controller 335 as the same as those described with reference to the twenty-fifth embodiment. The correlated signal a1 and latch control signals b1 and c1 of FIG. 25 corresponds to correlated signal a and latch control signals b and c of FIG. 23, respectively.

Distributor 247 distributes correlated signal a2 which is a pseudo baseband signal from correlator 313 into two and applies to latch portion 345 and 347.

Latch portions 345 and 347 latch signals from distributor 247 based on latch control signals b2 and c2 from latch controller 335. Namely, latching at latch portions 345 and 347 is performed in the similar manner as at latch portions 341 and 343 described above. Correlation signal a2 and latch control signals b2 and c2 of FIG. 25 correspond to correlated signal a and latch control signals b and c of FIG. 23.

As described above, in the twenty-seventh embodiment, latch portions 341 to 347 and latch controller 335 are used instead of the plurality of delay elements shown in FIG. 21.

As a result, in the twenty-seventh embodiment, circuit scale of the receiver can be reduced, as compared with the example in which differential decoding is performed based on said signals from the plurality of delay elements.

Further, the twenty-seventh embodiment provides the similar effects as the second embodiment, since it uses the transmitter shown in FIG. 4.

Further, the receiver of the present embodiment differs from the receiver of FIG. 21 only in that it uses latch portions and latch controller rather than the delay elements, and hence the twenty-seventh embodiment provides similar effects as the twenty-third embodiment.

In the twenty-seventh embodiment, in the transmitter, multiplexing is performed by delaying baseband signals. Further, in the receiver, differential decoding (demodulation) is performed by using not completely carrier synchronized pseudo baseband signals. The reason why latch portions and latch controller may be used instead of the plurality of delay elements is the same as described with respect to the twenty-fifth embodiment.

The spread spectrum communication system in accordance with the twenty-eighth embodiment uses the transmitter and the receiver of the same structure as used in the twenty-seventh embodiment. Namely, it includes the transmitter shown in FIG. 4 and the receiver shown in FIG. 25.

What is different from the twenty-seventh embodiment is that the second delay time setting method is used and the delay times in the transmitter are set in the similar manner as in the sixth embodiment. More specifically, the delay times in the transmitter are set such that adjacent ones of the multiplexed signals have the same time difference between each other. Further, this embodiment differs in that timings for generating the latch control signals from latch controller 333 are the same.

The twenty-eighth embodiment having the above described structure provides the similar effects as the twenty-seventh embodiment.

The first to twenty-eighth embodiments have been described assuming that the system is used for DBPSK. However, the spread spectrum communication system providing similar effects as the above embodiments can be implemented and the system of the present invention is generally applicable in phase modulating method such as DQPSK or in amplitude phase modulation method, provided that I channel and Q channel correlators are prepared.

The spread spectrum communication system in accordance with the twenty-ninth embodiment is applied to DQPSK method.

Figure 26:
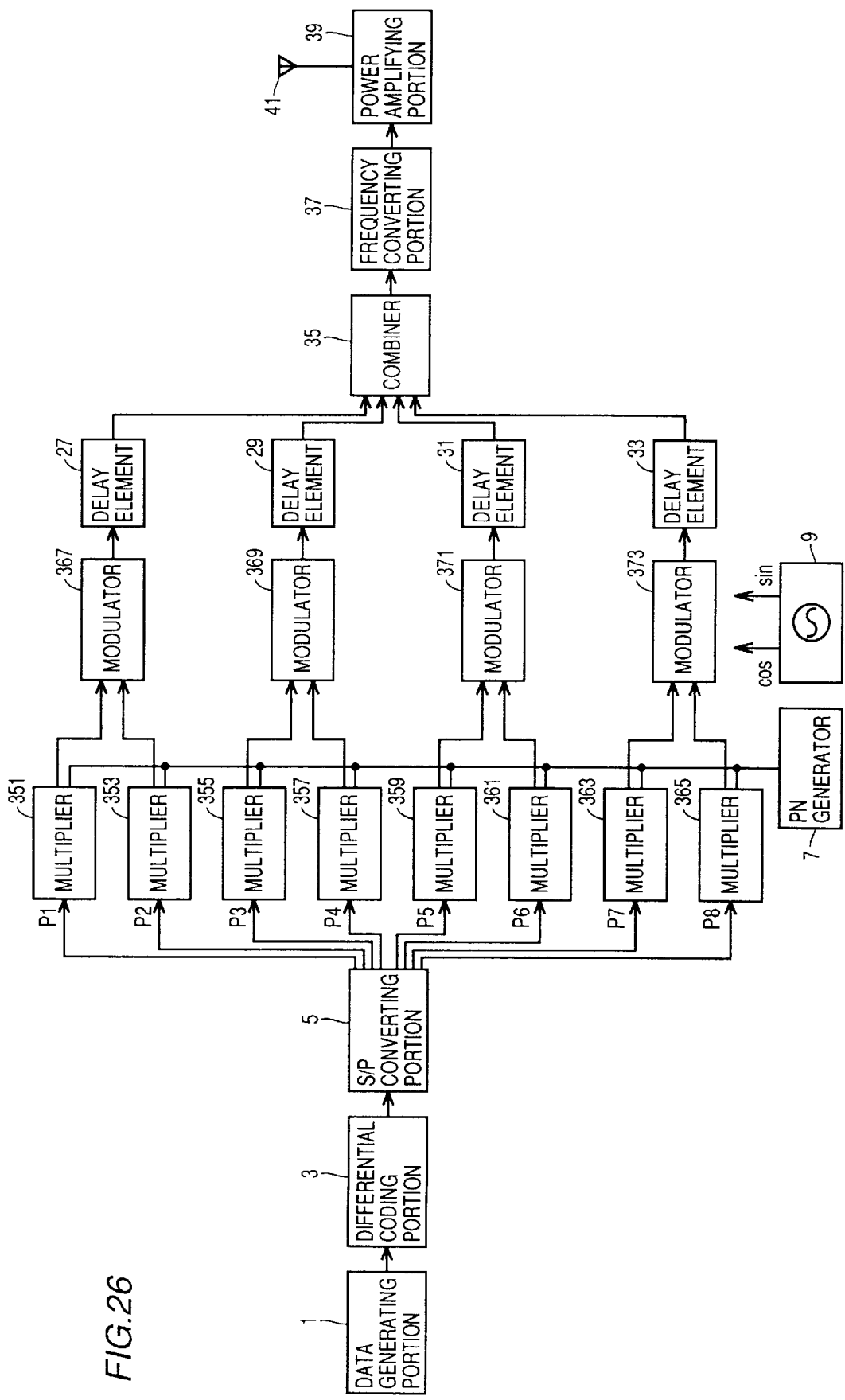
FIG. 26 is a schematic block diagram showing a transmitter of the spread spectrum communication system in accordance with a twenty-ninth embodiment of the present invention.

FIG. 26 is a schematic block diagram showing a transmitter of the spread spectrum communication system in accordance with the twenty-ninth embodiment of the present invention. Portions corresponding to those of FIG. 1 are denoted by the same reference characters and description thereof is not repeated. Mainly, characteristic portions will be described. FIG. 26 corresponds to a transmitter of FIG. 1 of the spread spectrum communication system using the DBPSK method.

Referring to FIG. 26, the transmitter of the spread spectrum communication system in accordance with the twenty-ninth embodiment includes data generating portion 1, differential coding portion 3, S/P converting portion 5, multipliers 351, 353, 355, 357, 359, 361, 363, 365, PN generator 7, modulators 367, 369, 371, 373, local signal generator 9, delay elements 27, 29, 31, 33, multiplier 35, frequency converting portion 37, power amplifying portion 39 and transmission antenna 41.

What is different from the DBPSK method (that is, what is different from FIG. 1) is that the signal from differential coding portion 3 is divided such that the number of parallel signals is doubled in S/P converting portion 5 (in the present invention, the number of parallel signals is 8, while it is 4 in FIG. 1). Multipliers 351 to 365 multiply eight parallel signals P1 to P8 by a spread code from PN generator 7. Modulator 367 performs DQPSK modulation using 2 bits of data from multipliers 351 and 353. The same applies to modulators 369 to 373. These are the points different from FIG. 1 employing DBPSK method. The processes in the succeeding stage of modulators 367 to 373 are the same as that in the transmitter shown in FIG. 1. The first or second delay time setting method is used.

Figure 27:
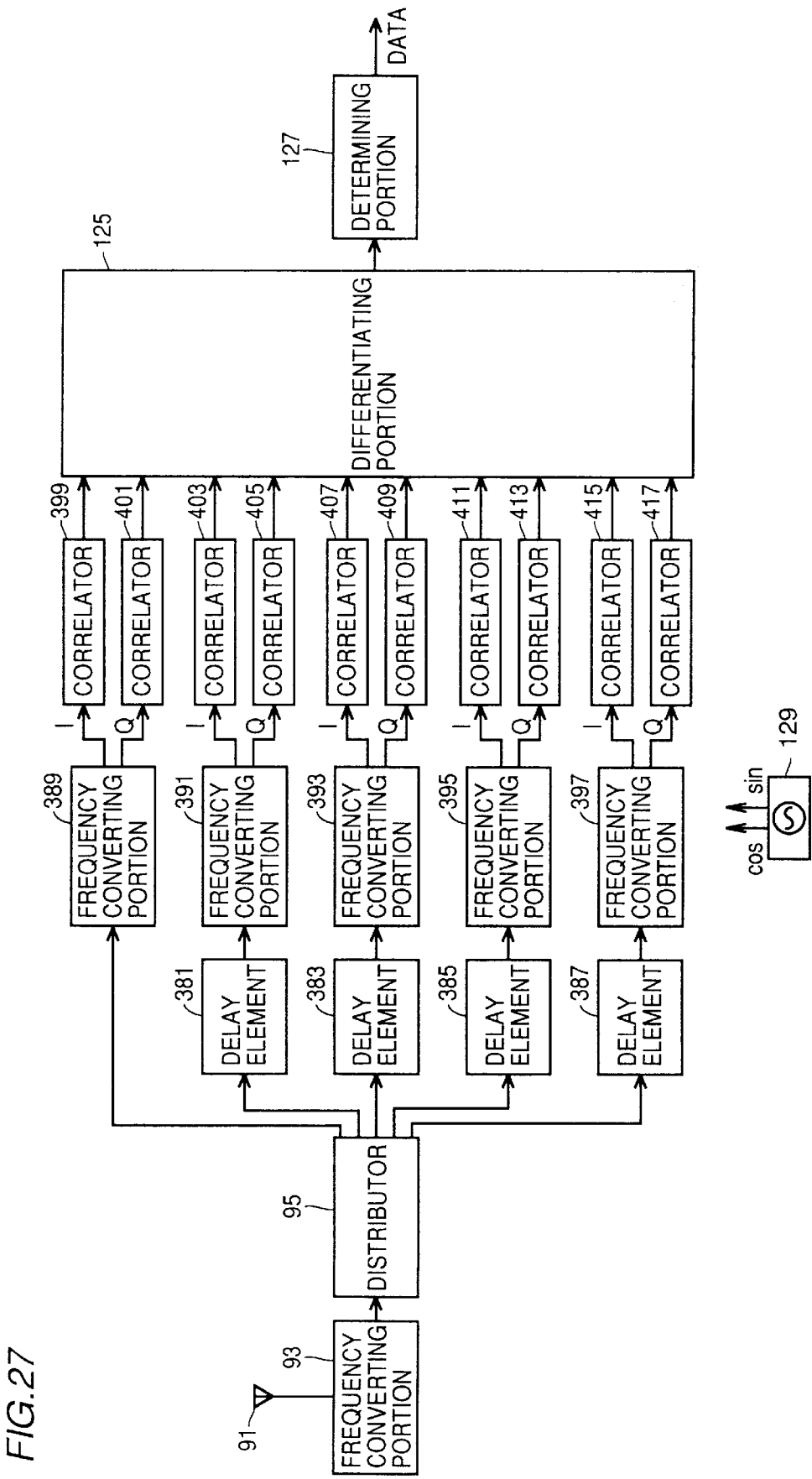
FIG. 27 is a schematic block diagram showing a receiver of the spread spectrum communication system in accordance with the twenty-ninth embodiment of the present invention.

FIG. 27 is a schematic block diagram showing a receiver in accordance with the spread spectrum communication system in accordance with the twenty-ninth embodiment of the present invention. Portions corresponding to those of FIG. 8 are denoted by the same reference characters and description thereof is not repeated. Mainly, characteristic portions will be described.

The receiver shown in FIG. 27 corresponds to the receiver shown in FIG. 8 of the spread spectrum communication system using the DBPSK method.

Referring to FIG. 27, the receiver of the spread spectrum communication system in accordance with the twenty-ninth embodiment of the present invention includes reception antenna 91, frequency converting portion 93, distributor 95, delay elements 381, 383, 385, 387, frequency converting portions 389, 391, 393, 395, 397, local frequency signal generator 129, correlators 399, 401, 403, 405, 407, 409, 411, 413, 415, 417, differentiating portion 125 and determining portion 127. Differentiating portion 125 is the same as differentiating portion 125 of FIG. 19.

What is different from the DBPSK method is that after the signals are frequency converted by using cos and sin components from local signal generator 129 at frequency converting portions 389 to 397, the IF signals are converted to I signals (in-phase signals) and Q signals (quadrature signals) to be input to correlators 399 to 417. Processes following the correlators 399 to 417 are the same as those of FIG. 8.

As described above, the twenty-ninth embodiment employs DQPSK method, in contrast to the fifth embodiment which employs the DBPSK method (in which the transmitter used is shown in FIG. 1 and the receiver used is shown in FIG. 8).

Therefore, the twenty-ninth embodiment provides similar effects as the fifth embodiment.

In the twenty-ninth embodiment, the transmitter and the receiver corresponding to those of FIGS. 1 and 8 have been described. However, by setting the number of parallel signals provided in the transmitter twice that of the DBPSK method so that the signals can be used as I (in-phase) and Q (quadrature) data, all the embodiments described above may be applied to DQPSK method. The reason is that the only difference between the DBPSK method and the DQPSK method is whether the phase is represented by 1 bit or by 2 bits.

In the first to twenty-ninth embodiments, in the receiver, the time difference between delay times is whether an arbitrary time period of at least 1 chip (first delay time setting method) or the same time period of at least one chip (second delay time setting method).

However, when actual circuits are to be assembled, it is difficult to set the time difference between the delay times to an arbitrary time period when the delay elements are to be configured in the intermediate frequency band (IF band), for example. Even if the time difference is to be set identically, it may be impossible dependent on the number of multiplexing.

Digital delay elements may be used as the delay elements for the baseband or pseudo baseband configuration. However, there is a problem that sometimes the spread code is not divisable by the desired parallel number (number of multiplexing). For example, if the spread rate is 16 chips and the number of multiplexing is 4, it can be divided by 4. However, if the spread rate is 15 chips, it cannot be divided but there is a fraction. Further, the spread rate of 16 chips is not divisible if the number of multiplexing is 5.

Therefore, in the spread spectrum communication system in accordance with the thirtieth embodiment, if it is difficult to set the time difference between the delay times all identical to each other in the transmitter, some of the time differences are set to be the same and others are set to arbitrary time period, or vice versa.

As a result, in the thirtieth embodiment, degree of freedom in designing can be made higher when a practical circuitry of the spread spectrum communication system is to be provided.

Further, in the thirtieth embodiment, the number of multiplexing can be determined regardless of the number of chips of the spread code, and the circuitry for the spread spectrum communication system can be assembled freely.

In the thirtieth embodiment, the transmitter and the receiver in accordance with any of the first to twenty-ninth embodiments are used. In accordance with the number of multiplexing in the transmitter (that is, the number of multiplexing when the time difference between delay times is made identical and at least 1 chip, and the number of multiplexing when the time difference is set to an arbitrarily time period of at least 1 chip), an appropriate receiver in accordance with the fifth to twenty-ninth embodiments is used in combination. Therefore, the thirtieth embodiment provides similar effects as those corresponding to the first to twenty-ninth embodiments.

In the spread spectrum communication system in accordance with the thirty-first embodiment, a PDI (Post Detection Integrator) portion which can absorb the influence of multipath or the like is provided between the differentiating portion 125 and determining portion 127 of the fifth to thirtieth embodiments. An example will be described.

Figure 28:
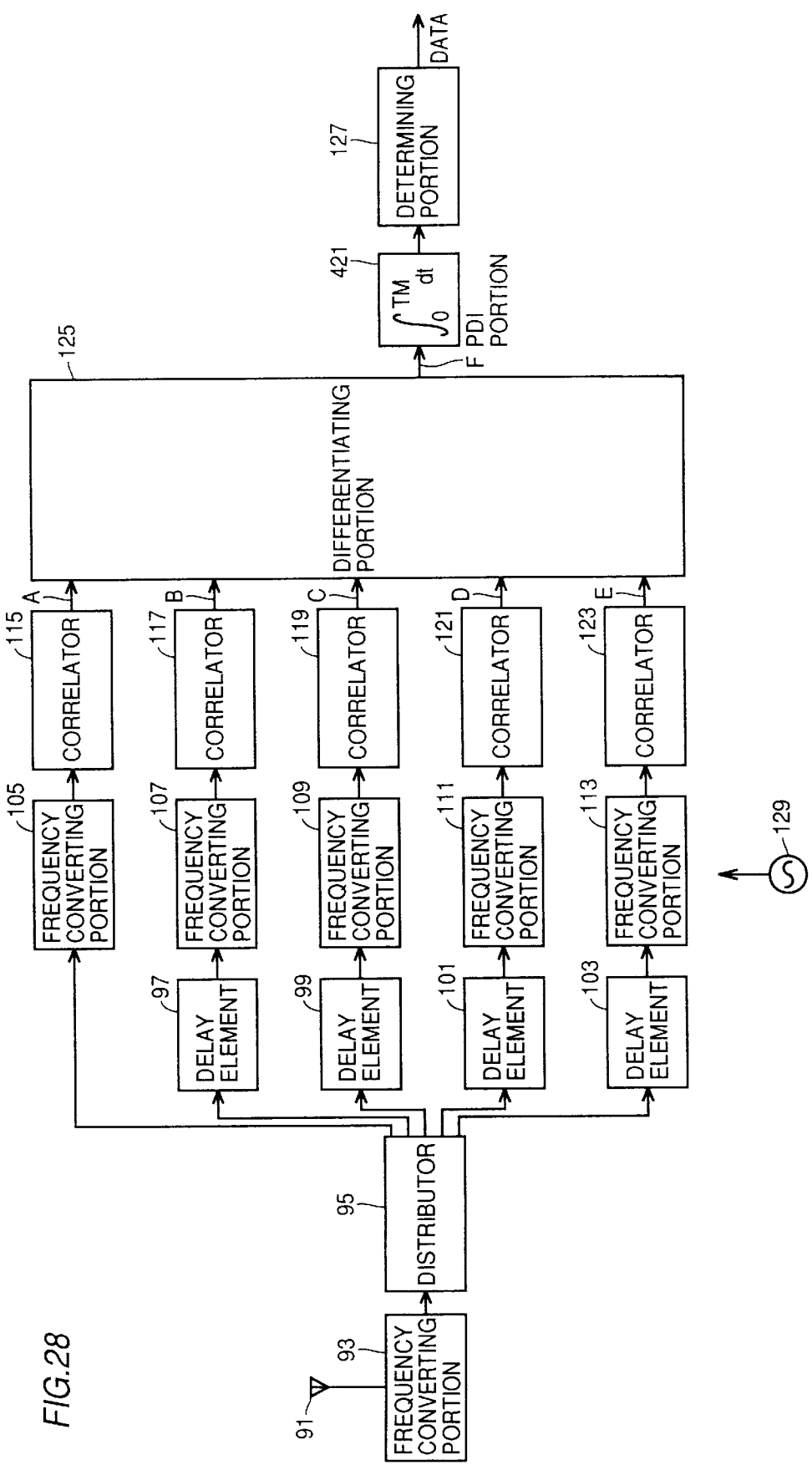
FIG. 28 is a schematic block diagram showing a receiver of the spread spectrum communication system in accordance with a thirty-first embodiment of the present invention.

FIG. 28 is a schematic block diagram showing the receiver of the spread spectrum communication system in accordance with the thirty-first embodiment of the present invention. Portions corresponding to those of FIG. 8 are denoted by the same reference characters and description thereof is not repeated. In the receiver shown in FIG. 28, a PDI portion 421 is provided between determining portion 127 and differentiating portion 125 of the receiver shown in FIG. 8. The transmitter shown in FIG. 1 is used.

Referring to FIG. 28, the receiver of the spread spectrum communication system in accordance with the thirty-first embodiment includes reception antenna 91, frequency converting portion 93, distributor 95, delay elements 97 to 103, frequency converting portions 105 to 113, local signal generator 129, correlators 115 to 123, differentiating portion 125, PDI portion 421 and determining portion 127.

Referring to FIG. 28, PDI (Post Detection Integration) is performed by integrating the differentially decoded signals F spread by the multipath for a prescribed time period (0 to $T_M$). PDI is discussed in detail in Mitsuo Yokoyama, *Spread Spectrum Communication System* (KAGAKU GIJUTSU SHUPPANSHA).

Figure 29A:
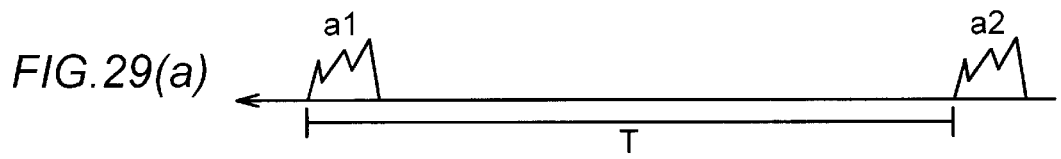
FIGS. 29(a) and (b) are an illustration of PDI at the PDI portion of FIG. 21.
Figure 29B:
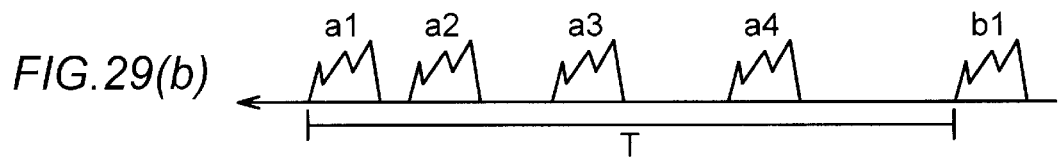

FIG. 29 shows a general PDI and in FIG. 29, (a) illustrates general PDI, and (b) illustrates the PDI in accordance with the present embodiment.

Referring to FIG. 29(a), generally PDI is advantageous in that it can demodulate not only one way but multipath wave signals, by differentiating with respect to one period T of the spread code.

However, in multipath environment in which high speed fading occurs, the environment changes between the signal a2 and the signal a1 before one period T of the spread code. Therefore, sometimes it becomes impossible to improve performance or in some cases, the performance is degraded, when PDI is performed.

In the thirty-first embodiment, four signals are multiplexed in one period T of the spread code as shown in (b), and signals a1 and a2, a2 and a3, a3 and a4 and a4 and b1 are differentiated. Therefore, the time for differentiation is reduced to one significantly as compared with the time when multiplexing is not performed. Therefore, as compared with the example in which multiplexing is not performed (FIG. 29(a)), the change in environment is much reduced, and hence PDI is effective and provides improved performance even in high speed fading environment.

Therefore, in the thirty-first embodiment, performance under fading environment can be significantly improved as compared with the example in which multiplexing is not performed.

Figure 30A:
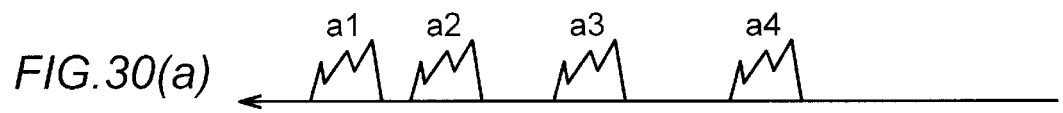
FIGS. 30(a) and (b) show a multiplex signal and a signal subjected to PDI when there are multiple paths, in the thirty-first embodiment.

FIG. 30 is an illustration of the PDI at PDI portion 421 shown in FIG. 28.

In FIG. 30, (a) shows multiplexed four signals a1 to a4. Here, differentiating portion 125 differentiates signals a1 and a2, a2 and a3, a3 and a4.

Figure 30B:
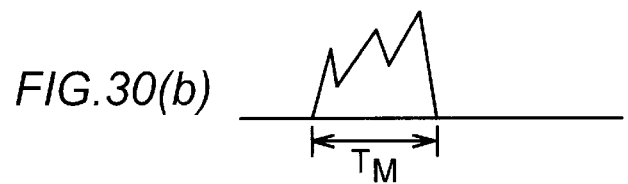

In FIG. 30, (b) shows the signal after differentiation between signals a1 and a2 of (a). PDI portion 412 performs post detection integration using the signal after differentiation, such as shown in FIG. 30(b). More specifically, PDI is performed by integrating the differentially decoded signals in the period TM of FIG. 30(b).

Figure 31A:
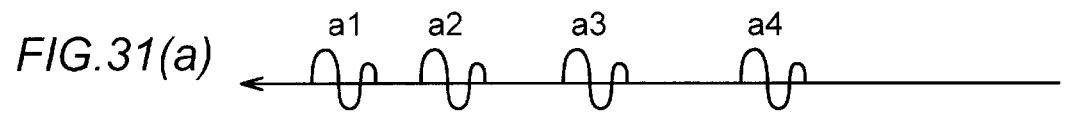
FIGS. 31(a) and (b) show another multiplex signal and a signal subjected to PDI when there are multiple paths, in the thirty-first embodiment.

FIG. 31 shows another example of PDI at PDI portion 421 of FIG. 28.

In FIG. 30, (a) shows multiplexed four signals a1 to a4. What is different from FIG. 30 is that there is an inverted portion in one signal. Differentiating portion 125 of FIG. 28 differentiates signals a1 and a2, a2 and a3, and a3 and a4.

Figure 31B:
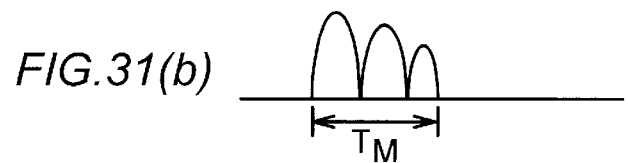

FIG. 31(b) shows a signal after differentiation between signals a1 and a2 of (a). PDI portion 421 of FIG. 28 performs PDI by integrating the differentially decoded signal in the period $T_M$ shown in FIG. 31(b).

PDI is performed after differential decoding, since there occurs a problem when there is an inverted portion in one signal, such as shown in FIG. 31. More specifically, if positive/negative is inverted at just the point where the phase is inverted because of fading, differential decoding after PDI may cause a problem. Therefore, PDI is performed after differential decoding.

As described above, in the thirty-first embodiment, differential decoding is performed by using multiplexed signals with the time interval between each of the signals being short, therefore, as compared with differential decoding using signals not multiplexed, the change in environment is smaller, and hence PDI is effective and provides higher performance even under high speed fading environment. Further, since the transmitter and the receiver similar to those used in the fifth embodiment are used, similar effects as the fifth embodiment can be obtained.

In the thirty-first embodiment, PDI portion 421 is provided between differentiating portion 125 and determining portion 127 of the fifth embodiment. Similar effects can be obtained by providing PDI between differentiating portion 125 and determining portion 127 of the receiver in accordance with any of the sixth to thirtieth embodiments. In that case, similar effects as any of the sixth to thirtieth embodiments can also be provided.

In the thirty-first embodiment, a signal is differentiated with a signal before one delay time (that is, differentiation is performed between adjacent ones of the multiplexed signals), and thereafter PDI is performed, which is advantageous in that it can follow high speed change in environment. In the spread spectrum communication system in accordance with the thirty-second embodiment, control of integration period (window) and weighting of integration is performed using the signal before one delay time (using a signal preceding by one the signal which is the first of the two signals to be differentially decoded).

Referring to FIG. 30, when signals a2 and a3 are to be differentiated, control of the window (period $T_M$ of FIG. 30) and maintaining of integration of PDI are performed by using the signal a1 (preceding the signal a2 by one delay time), which precedes signals a2 and a3, as a pilot signal.

In the thirty-second embodiment, PDI is controlled using a signal close in time (preceding by one delay) as a pilot signal, whereby PDI can be precisely controlled. Therefore, in the thirty-second embodiment, effect of PDI can further be improved as compared with the thirty-first embodiment. In addition, effects similar to the fifth to thirty-first embodiments can be obtained.

The transmitter and the receiver of the thirty-second embodiment are those in accordance with any of the fifth to thirtieth embodiments as in the thirty-first embodiment, and PDI portion is provided between the differentiating portion and the determining portion of the receiver.

In the spread spectrum communication system in accordance with the thirty-third embodiment, as in the thirty-first embodiment, the transmitter and the receiver in accordance with any of the fifth to thirtieth embodiments are used, and PDI portion for PDI is provided between the differentiating portion and the determining portion of the receiver.

In the thirty-second embodiment, referring to FIG. 30, when signals a2 and a3 are to be differentiated, the signal a1 preceding by one the signal a2 is used as a pilot signal. In the thirty-third embodiment, when signals a2 and a3 are to be differentiated, several signals in the period preceding the signal a2 (not all are shown) are used for controlling window $T_M$ (time width for integrating the signal) and weighting of the integration of PDI.

With reference to time, the multipath before one delay of the wave to be demodulated is the closest to the multipath of the waveform to be demodulated, and hence it is ideal to use the signal before one delay as a pilot signal as in the thirty-second embodiment. However, sometimes the signal before one delay is degraded because of noise other than the multipath.

For example, referring to FIG. 30, when the signal obtained by differentiating signals a2 and a3 is as shown in (b) of FIG. 30, the multipath which is closest to the multipath of the signal shown in (b) of FIG. 30 is the multipath of signal a1. However, it is possible that signal a1 is degraded by noise other than multipath, for example. Here "signal before one delay" refers to signal a1. Generally, it means a signal preceding by one the first coming signal (earlier signal) of the two signals to be differentiated.

Therefore, in the thirty-third embodiment, mean value of a plurality of signals preceding the first one (earlier one) of the two signals from which a differential decoding signal (to be subjected to PDI) derives is calculated, and based on the mean value, window and weighting of integration of PDI are controlled.

As a result, in the twenty-third embodiment, even if the signal before one delay is degraded because of noise other than multipath, such influence can be reduced, more precise PDI is realized and error rate in demodulation can be improved.

In the thirty-third embodiment, a plurality of signals are multiplexed by delaying signals in one period of the spread code. Therefore, when the mean value of the plurality of continuous multiplexed signals is calculated, the period of the plurality of continuous signals is shorter in time than one period of the spread code. Therefore, even when mean value of a plurality of continuous signals is used, it is advantageous in that the error is smaller with respect to multipath.

Of the plurality of signals preceding the first one (earlier one) of the two signals used for differential decoding, the multipath of the one closer to said signal for differential decoding has closer multipath to the multipath of the differentially decoded signal.

Therefore, when the mean value of a plurality of continuous multiplexed signals is to be calculated, the influence of multipath and the noises other than the multipath can be made smaller by calculating weighted mean in such a manner that a signal closer to the signal used for differential decoding to be subjected to PDI has heavier weight. Further, effects similar to the fifth to the thirty-first embodiments can be provided.

More specifically, multipath of the signal preceding by one delay is the closest. Therefore, heavier weight is provided to the one having the shorter delay, in order of one, two and three delay times, so as to calculate weighted mean.

In summary, in the present embodiment, two or more signals earlier in time are used as pilot signals, and PDI is performed using the mean value or weighted mean of these signals.

Figure 32:
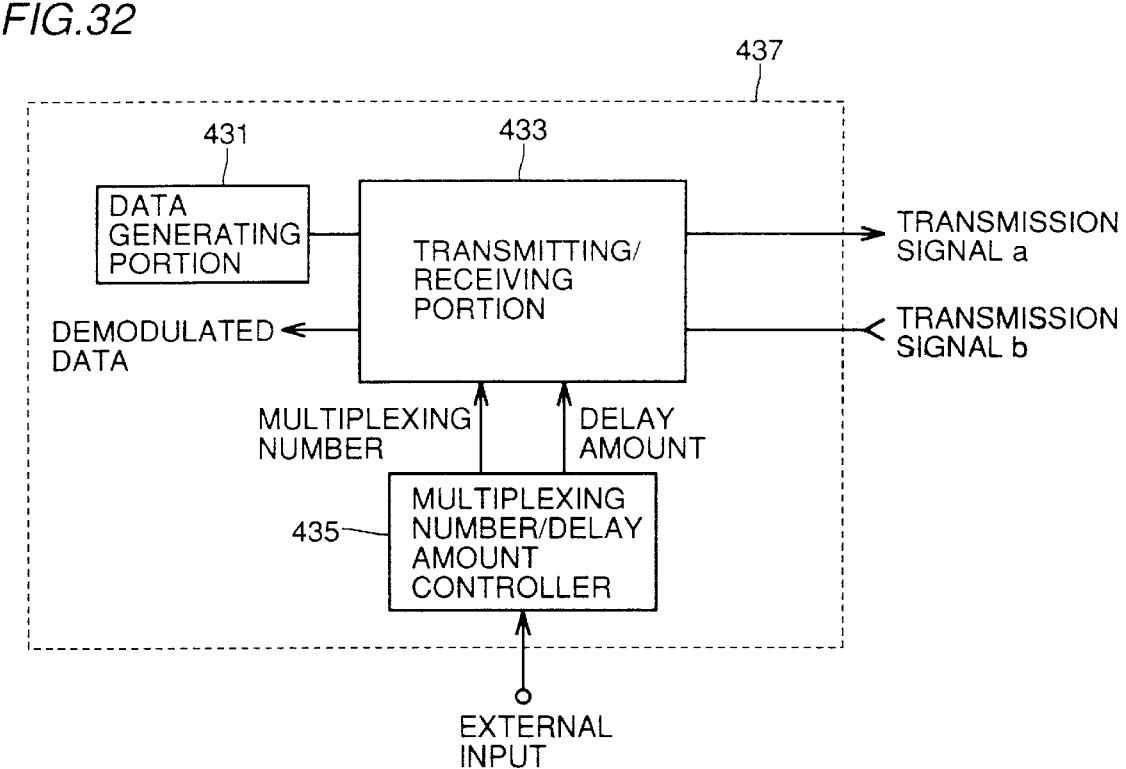
FIG. 32 is a schematic block diagram showing transmitter/receiver of the spread spectrum communication system in accordance with a thirty-fourth embodiment of the present invention.

FIG. 32 is a schematic block diagram showing transmitter/receiver of the spread spectrum communication system in accordance with the thirty-forth embodiment.

Referring to FIG. 32, the transmitter/receiver 437 of the spread spectrum communication system in accordance with the thirty forth embodiment of the present invention includes data generating portion 431, transmitting/receiving portion 433, and multiplexing number/ delay amount delay controller 435. The transmitting/receiving portion 433 includes the transmitter and the receiver in accordance with any of the first to thirty-third embodiments.

In the first to thirty-third embodiments, the number of multiplexing (the number of parallel signals to be provided) and the amount of delay are fixed. However, as the number of multiplexing increases, error rate at a given C/N (signal to noise ratio) becomes higher, making communication difficult.

Therefore, the present invention is adapted to allow change of the number of multiplexing and the amount of delay externally, in accordance with the environment (error rate, C/N, delay profile and the like) in which the transmitter/receiver of the spread spectrum communication system is used. Referring to FIG. 32, data generating portion 431 inputs data to the transmitting portion, not shown, included in the transmitting/receiving portion 433. The data are delayed and multiplexed, and output as a transmission signal a.

The receiver, not shown, included in the transmitting/receiving portion 433 receives a transmission signal b from other transmitter, demodulates the signal and outputs it as demodulated data.

In accordance with the environment in which the transmitter/receiver 437 is used, multiplexing number/delay amount controller 435 is controlled, so that the number of multiplexing and the amount of delay in the transmitting/receiving portion 433 are set.

Generally, when a wireless system is installed or operated, size of an antenna and amplifier power are determined by setting distance, transmission rate and the like allowing communication in advance, taking into consideration the environment in which the system is used. In the same manner, in the present embodiment, the number of multiplexing and the amount of delay are determined when the transmitter/receiver 437 is installed by considering necessary transmission rate and desired error rate, which determined number and amount are externally input to the transmitter/receiver 437. In accordance with the input, the multiplexing number/delay amount controller 435 sets the number of multiplexing and the amount of delay in the transmitting/receiving portion 433.

When the required error rate differs dependent on the content of the data, for example, whether the data is speech or other data (the error rate is $10^{-3}$ for speech and $10^{-8}$ for data), it becomes possible to variably set the number of multiplexing and the amount of delay dependent on the type of the data, with the multiplexing number/delay amount controller 435 receiving setting signals for setting the number of multiplexing and the amount of delay from an application of an external computer, for example.

Further, in accordance with an external input, it is possible to increase the amount of delay when there is much delay spread where the system is used, or to reduce the number of multiplexing when the distance between the transmitter and the receiver is large and the signal level is low.

As described above, in the thirty-fourth embodiment, the number of multiplexing and the amount of delay can be set in accordance with the environment in which the system is used, in accordance with an external input (external signals), whereby efficiency can be improved. Efficiency means data rate of transmission, for example.

Further, since the transmitter and the receiver in accordance with any of the first to thirty-third embodiments are used as the transmitting/receiving portion 433, similar effects as provided by any of the first to thirty-third embodiments can be obtained.

The transmitter/receiver of the spread spectrum communication system in accordance with the thirty-fifth embodiment includes, in the transmitter/receiver 437 of FIG. 32, means for calculating error rate from demodulated data (error rate calculating circuits). Based on the error rate from the error rate calculating circuit, the number of multiplexing and the amount of delay are set.

Figure 33:
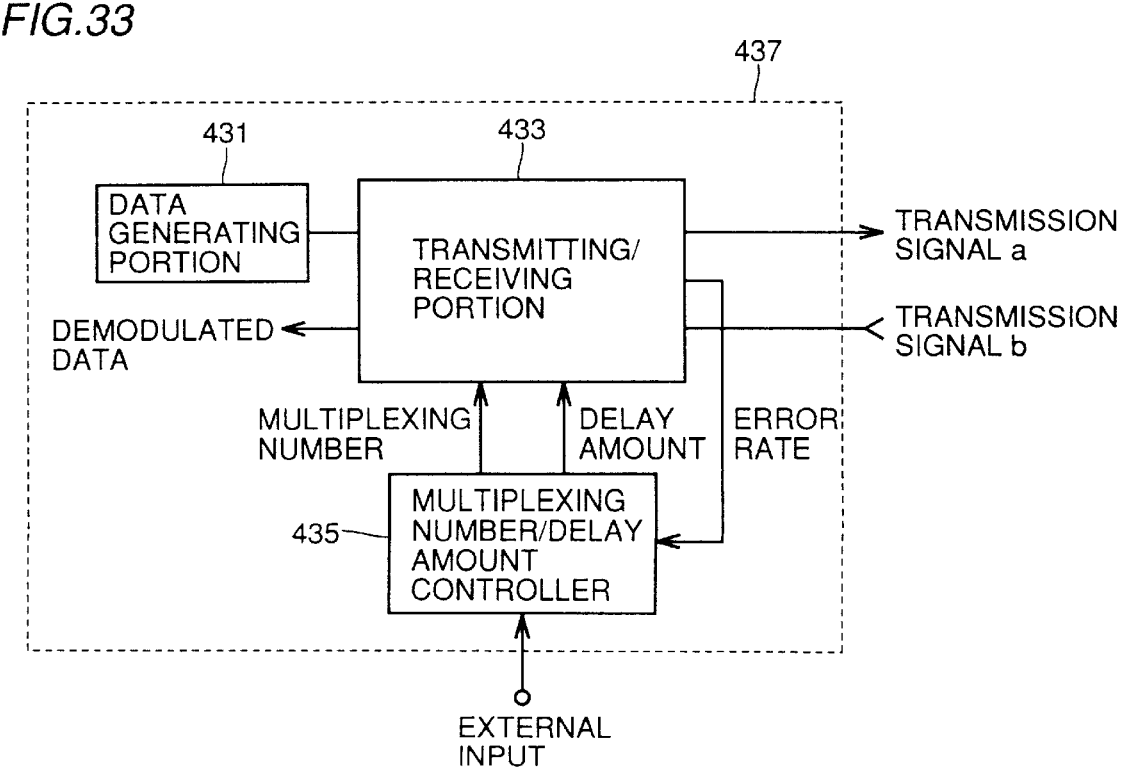
FIG. 33 is a schematic block diagram showing transmitter/receiver of the spread spectrum communication system in accordance with a thirty-fifth embodiment of the present invention.

FIG. 33 is a schematic block diagram showing a transmitter/receiver of the spread spectrum communication system in accordance with the thirty-fifth embodiment of the present invention. Portions corresponding to those of FIG. 32 are denoted by the same reference characters and description thereof is not repeated. Mainly, characteristic portions will be described.

Though not shown, transmitting/receiving portion 433 includes an error rate calculating circuit. Based on the error rate from the error rate calculating circuit, multiplexing number/delay amount controller 435 sets the number of multiplexing and the amount of delay in transmitting/receiving portion 433. Here, the number of multiplexing and the amount of delay are set such that the actual error rate is lower than the desired error rate.

Figure 34:
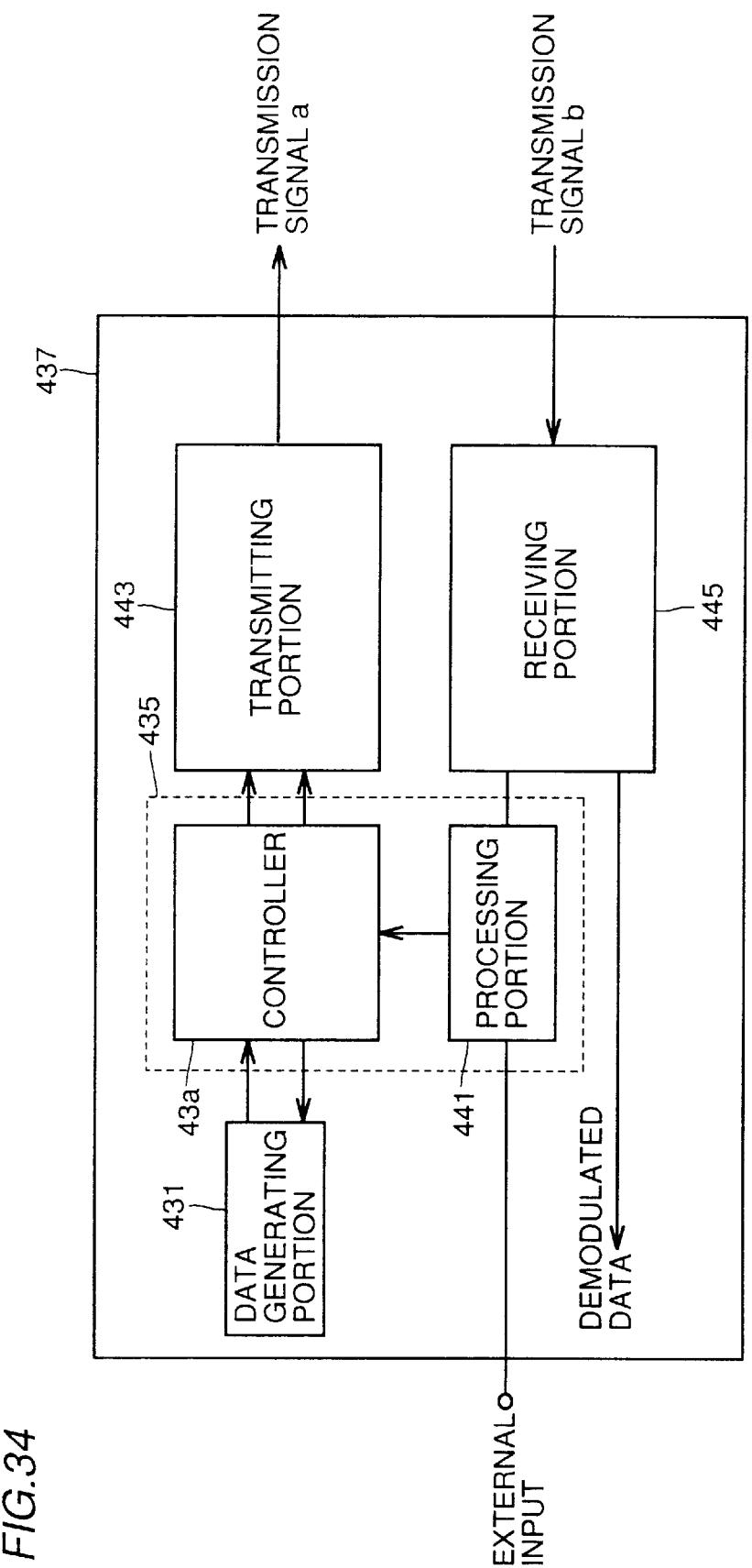
FIG. 34 shows details of the transmitter/receiver of FIG. 33.

FIG. 34 shows details of the transmitter/receiver 437 of FIG. 33. Portions corresponding to those of FIG. 33 are denoted by the same reference characters and description thereof is not repeated.

Referring to FIG. 34, the transmitter/receiver 437 includes data generating portion 431, multiplexing number/delay amount controller 435, transmitting portion 443 and receiving portion 445. Multiplexing number/delay amount controller 435 includes a controller 439 and a processing portion 441.

Processing portion 441 receives information related to error rate from the error rate calculating circuit, not shown, of the receiving portion 445, and determines the number of multiplexing and the amount of delay at the transmitting portion 443. Controller 439 sets the number of multiplexing and the amount of delay at the transmitting portion 443 such that the number of multiplexing and the amount of delay at the transmitting portion 443 attain the number of multiplexing and the amount of delay determined by the processing portion 441.

Data generating portion 431 receives the number of multiplexing set by the controller 439, and generates data in accordance with the transmission capacity determined by the number of multiplexing.

The amount of delay and the number of multiplexing at the transmitting portion 443 are set in this manner. Based on the number of multiplexing and the amount of delay, the data from the data generating portion 431 are processed and output as transmission signal a. Receiving portion 445 receives transmission signal b from other transmitter, demodulates and outputs it as demodulated data.

Now, the relation between the error rate and the number of multiplexing and the amount of delay will be described.

When C/N=12 dB and the number of multiplexing is 5, BER (bit error rate) is about $10^{-2}$. In order to improve the error rate, when the number of multiplexing is reduced from 5→4→3→2→1, then BER is improved from $1\times10^{-2}$→$4\times10^{-3}$→$1.5\times10^{-3}$→$7\times10^{-5}$→$1\times10^{-8}$.

Therefore, when the error rate is not good, it can be improved by reducing the number of multiplexing. Meanwhile, if the actual error rate is about $10^{-5}$ and acceptable, the transmission capacity can be increased by increasing the number of multiplexing.

In this manner, in the present embodiment, the number of multiplexing and the amount of delay are set on real time basis, in accordance with the condition (error rate) of the present communication. As a result, in the thirty-five embodiment, optimal number of multiplexing and optimal amount of delay are always ensured, and efficiency can be improved.

In the thirty-fourth embodiment, the number of multiplexing and the amount of delay are set in advance in accordance with the environment for use. However, the environment for use (environment for communication) changes continuously, and hence it is difficult to find optimal value.

The transmitter/receiver of the thirty-fifth embodiment includes the error rate calculating circuit in addition to the transmitter/receiver in accordance with the thirty fourth embodiment, so that similar effects as in the thirty-fourth embodiment can be obtained.

Further, in the communication system in which the data to be transmitted includes error correction codes, it is possible to determine the number of multiplexing and the amount of delay at the transmitting portion 443 based on the error rate detected at the receiving portion 445. In this case also, similar effects as described above can be obtained.

Details of the transmitter/receiver of FIG. 32 are similar to those of FIG. 34. In this example, there is not an error rate calculating circuit.

In the transmitter/receiver of the spread spectrum communication system in accordance with the thirty-sixth embodiment, in place of the error rate calculating circuit of the transmitter/receiver of FIGS. 33 and 34, means for calculating carrier to noise ratio (C/N) from the received signal (C/N calculating circuit) and a table including the number of multiplexing and the amount of delay suitable for the C/N are provided. The transmitter/receiver of the spread spectrum communication system in accordance with the present embodiment will be described with reference to FIGS. 33 and 34.

Referring to FIG. 33, transmitting/receiving portion 433 includes a C/N calculating circuit, and the C/N calculating circuit calculates C/N based on transmission signal b from other transmitter. Multiplexing number/delay amount controller 435 determines the number of multiplexing and the amount of delay based on the C/N from C/N calculating circuit, and sets the number of multiplexing and the amount of delay at the transmitting/receiving portion 433.

The multiplexing number/delay amount controller 435 includes a table in which the number of multiplexing and the amount of delay suitable for the C/N are set as described above, and it determines the number of multiplexing and the amount of delay, referring to the table and the calculated C/N. In FIG. 34, processing portion 441 has such function.

As described above, while the thirty-fifth embodiment determines the number of multiplexing and the amount of delay based on the error rate, in the present embodiment, the number of multiplexing and the amount of delay are determined based on C/N.

When the C/N is measured, the error rate at that time can be calculated from the C/N if the characteristics thereof are acquired in advance. Therefore, the number of multiplexing and the amount of delay can be controlled in accordance with the actual error rate. Details are as follows.

FIG. 35 shows relation between the error rate (BER) and the carrier to noise ratio (C/N).

The curves denoted by arrows A1, A2, A3, A4 and A5, respectively, correspond to the number of multiplexing of 1, 2, 3, 4 and 5. The ordinate represents the error rate (BER), and the abscissa represents the carrier to noise ratio (C/N).

Referring to FIG. 35, if C/N is constant, the larger the number of multiplexing, the worse the error rate. If the error rate is constant, the larger the number of multiplexing, the larger the value C/N.

If C/N is measured, the error rate at that time can be calculated from the C/N if such characteristic as shown in FIG. 35 is prestored in advance. Therefore, the number of multiplexing and the amount of delay can be controlled in accordance with the actual error rate.

As described above, in the thirty-sixth embodiment, the C/N calculating circuit for calculating the C/N based on the received signal (transmission signal b) and the table in which the number of multiplexing and the amount of delay appropriate for the C/N are set are provided. Therefore, the number of the multiplexing and the amount of delay are controlled on real time basis, in accordance with the conditions of present communication (C/N). As a result, in the thirty-sixth embodiment, optimal number of multiplexing and optimal amount of delay can be provided in accordance with the environment of use, whereby efficiency and throughput can be improved.

In the thirty-sixth embodiment, the transmitter and a receiver in accordance with any of the first to thirty-third embodiment are used as a transmitter/receiver. Therefore, effects similar to any of the first to thirty-third embodiment are also provided.

In the transmitter/receiver of the spread spectrum communication system in accordance with the thirty-seventh embodiment, means for calculating the amount of data of the delay wave based on the received signal (delay amount calculating circuit) is provided in stead of the error rate calculating circuit of the transmitter/receiver of FIGS. 33 and 34. The transmitter/receiver of the present embodiment will be described with reference to the transmitter/receiver of FIGS. 33 and 34.

Referring to FIG. 33, transmitting/receiving portion 433 includes a delay amount calculating circuit for calculating the amount of delay of the delay wave (delay profile) caused by multipath or the like, upon reception of the transmission signal b.

Based on the amount of delay (delay profile) from the delay amount calculating circuit, the multiplexing number/delay amount controller 435 determines the number of multiplexing and the amount of delay, and sets the number of multiplexing and the amount of delay in the transmitting/receiving portion 433. The processing portion 441 of FIG. 34 receives the amount of delay (delay profile) from the delay amount calculating circuit included in receiving portion 445, and determines the number of multiplexing and the amount of delay at transmitting portion 443. The method for determining the number of multiplexing and the amount of delay at transmitting portion 443 based on the delay amount calculated from transmission signal b will be described in greater detail.

Figure 36A:
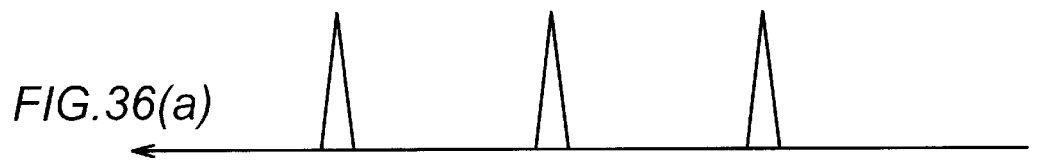
FIGS. 36(a)–(c) are illustration of a procedure to determine the number of multiplexing and the amount of delay, by using a delay profile in the transmitter/receiver of the spread spectrum communication system in accordance with a thirty-seventh embodiment.
Figure 36B:

FIG. 36 is an illustration showing the method of finding the number of multiplexing and the amount of delay based on the amount of delay (delay profile) of the received signal.

In FIG. 36, (a) shows correlated signals (correlation peak) when there is a multipath in the transmission path, and (b) and (c) show correlated signals when there are multipaths in the transmission path. In FIG. 36, (a) to (c) are correlated signals obtained by using the signal based on the transmission signal (b) from other transmitter shown in FIG. 34, correlated with the spread code used on the transmitting side by means of a correlator, not shown, included in the receiving portion 445.

Figure 36C:
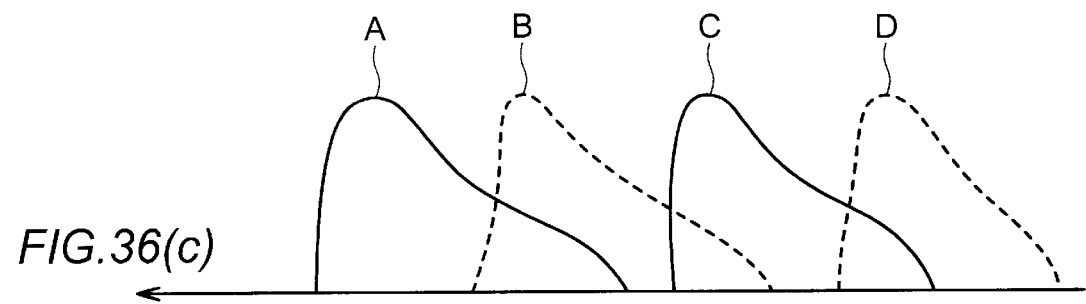

As shown in (b) and (c) of FIG. 36, when there are multipaths, the correlated signals come to have delay profile because of a number of delay waves delayed by the multipath. Referring to FIG. 36(c), consider a multiplexed signal following the signal A. If the multiplexed signal following the signal A is the signal B, the signals A and B are overlapped, which may cause degradation in error rate at the time of demodulation.

Meanwhile, if the signal following the signal A is the signal D, the signals do not overlap, and hence the error rate is not degraded. However, since the signal A is much apart from the signal D, the number of multiplexing is reduced. If the signal following the signal A is the signal C, the signals are not overlapped, and the error rate is not degraded. Different from the signal D, it is not much apart from the signal A, and hence the number of multiplexing can be increased, which means that the transmission capacity is increased.

In this manner, multiplexing number/delay amount controller 435 of FIG. 33 determines the number of multiplexing and the amount of delay based on the information (delay amount) related to the delay profile from transmitting/receiving portion 433, and sets the number of multiplexing and the amount of delay in the transmitting/receiving portion 433.

As described above, in the thirty-seventh embodiment, the number of multiplexing and the amount of delay are determined based on the delay profile (delay amount) of the transmission path. Therefore the transmission capacity can be optimized without any degradation in error rate.

Further, in the thirty-seventh embodiment, the transmitter and a receiver in accordance with any of the first to thirty-third embodiments are used. Therefore, effects similar to any of the first to thirty-third embodiments are also provided.

In the thirty-eighth embodiment, the transmitter/receiver of the spread spectrum communication system in accordance with any of the thirty-fourth to thirty-seventh embodiments are used. In the present embodiment, the number of multiplexing and the amount of delay determined in accordance with the environment for use (error rate, C/N, delay profile and so on) are inserted in a part of the transmission data, so as to transmit the number of multiplexing and the amount of delay used for the next packet frame. The transmitter/receiver of the receiving side automatically sets the number of multiplexing and the amount of delay of itself, using the transmitted information related to the number of multiplexing and the amount of delay.

More specifically, information related to the number of multiplexing and the amount of delay for the next packet is transmitted in the form of a flag on the data format, whereby the system can be adjusted with the number of multiplexing and the amount of delay well matched with respect to the counter part station. Therefore, the number of multiplexing and the amount of delay can be variably adjusted packet by packet, and a number of multiplexing and the amount of delay are optimized.

In this manner, in the thirty-eighth embodiment, the data of the number of multiplexing and the amount of delay set in accordance with the environment for use on the transmitting side are transmitted to data generating portion 431, the data of the multiplexing number and amount of delay are transmitted in addition to the transmission data, and on the receiving side, the number of multiplexing (the number of distribution signals) and the amount of delay for demodulation are set based on the transmitted data of the number of multiplexing and the amount of delay.

From the foregoing, in the thirty-eighth embodiment, the number of multiplexing and the amount of delay can be optimized data packet by data packet, and hence the number of multiplexing and the amount of delay can be optimized following the time change of the environment for use.

Further, in the thirty-eighth embodiment, the transmitter/receiver in accordance with any of the thirty-fourth to thirty seventh embodiment are used as the transmitter/receiver, effects similar to these of any of the thirty-fourth to thirty-seventh embodiments can be obtained.

In the spread spectrum communication system in accordance with the thirty-ninth embodiment, the transmitter/receiver of the thirty-eighth embodiment is used as one transmitter/receiver, and the transmitter and the receiver in accordance with any of the fifth to thirty-first embodiments are used as the other transmitter/receiver.

In the thirty-eighth embodiment, the number of multiplexing and the amount of delay of the demodulating system on the receiving side are set by inserting information of the number of multiplexing and the amount of delay set in accordance with the environment for use into the transmission signal on the transmitting side. In the present embodiment, similar to the thirty-eighth embodiment, information related to the number of multiplexing and the amount of delay determined in accordance with the environment for use on the transmitting side is transmitted as transmission signal (the number of multiplexing and the amount of delay of the transmitter/receiver on the transmitting side are determined in accordance with the environment of use), and on the receiving side, the number of multiplexing and the amount of delay for the demodulating system (receiver) and the modulating system (transmitter) are set based on the transmitted information related to the number of multiplexing and the amount of delay of the transmitting side.

As described above, in the thirty-ninth embodiment, control of the number of multiplexing and the amount of delay has only to be performed in one of the opposing transmitter/receivers. Therefore, by using the information related to the number of multiplexing and the amount of delay determined by one transmitter/receiver, the number of multiplexing and the amount of delay of the other transmitter/receiver can be controlled.

As a result, in the thirty-ninth embodiment, the circuitry for determining the environment for use (such as the error calculating circuit of the thirty-fifth embodiment, the C/N calculating circuit in accordance with the thirty-sixth embodiment, and the delay profile calculating circuit (delay amount calculating circuit) in accordance with the thirty-seventh embodiment) and the multiplexing number/delay amount control circuit have only to be provided in only one of the opposing transmitter/receiver. Therefore, the spread spectrum communication system can be reduced in size and cost.

Further, since the transmitter/receiver used in the thirty-eighth embodiment is used, similar effects as in the thirty-eighth embodiment can be provided.

Further, since the transmitter and the receiver in accordance with any of the first to thirty-third embodiments are used for one of the transmitter/receivers, effects similar to any of the first to thirty-third embodiments can be obtained.

Next, a multirate method will be described. The multirate method is one of the methods for data transmission used for recent multimedia applications, in which transmission rate is changed dependent on the content of communication, for example, determined on whether the content is image data or speech data. In the conventional communication system, symbol rate for communication is changed or the communication time length is changed to cope with the multirate method.

For example, in the communication system employing the conventional BPSK modulation method, when the transmission rate differs between 5 Mbps (bit per second) and 1 Mbps, the symbol rate also differs between 5 Msps (symbol per second) and 1 Msps, which means that the transmission band width changes by five times. This requires change in the frequency channel. Accordingly, the channel width and the number of channels must be controlled in accordance with the situation of use, which control is difficult. The transmitter of the spread spectrum communication system in accordance with any of the present embodiment are to solve such problem.

Figure 37:
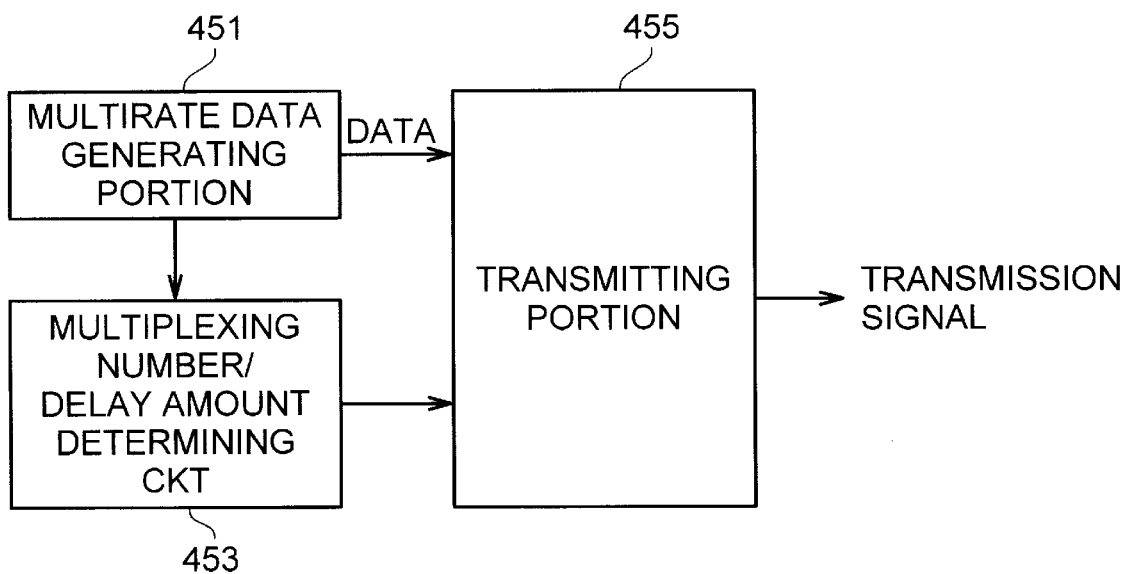
FIG. 37 is a schematic block diagram showing a transmitter of the spread spectrum communication system in accordance with a fortieth embodiment of the present invention.

FIG. 37 is a schematic block diagram showing the transmitter of the spread spectrum communication system in accordance with the fortieth embodiment.

Referring to FIG. 37, the transmitter of the spread spectrum communication system in accordance with the fortieth embodiment includes a multirate data generating portion 451, multiplexing number/delay amount determining circuit 453 and transmitting portion 455.

As the transmitting portion 455, the transmitter of spread spectrum communication system in accordance with any of the first to fourth and twenty-ninth embodiments is used.

Multirate data generating portion 451 changes the data rate dependent on the content of the information to be transmitted (for example, voice, image) and generates data. Multiplexing number/delay amount determining circuit 453 determines the number of multiplexing and the amount of delay such that the symbol rate becomes constant regardless of the data rate, based on the information from multirate data generating portion 451, and sets the number of multiplexing and the amount of delay at the transmitting portion 455.

For example, if the data rate is 3 Mbps, the number of multiplexing is set to 3 and if the data rate is 5 Mbps, the number of multiplexing is set to 5, whereby the symbol rate is constantly set to 1 Msps, which means that communication is possible while maintaining the same band width.

Further, the amount of delay is also adjusted in accordance with the number of multiplexing, that is, if the number of multiplexing is 3, the amount of delay is increased, while if the number of multiplexing is 5, the amount of delay is made smaller.

Here, the symbol rate represents the rate after serial/parallel conversion (S/P conversion). Referring to FIGS. 1, 4, 5, 6 and 26, symbol rate is the rate after serial/parallel conversion by S/P conversion portion 5. When ¼ conversion is performed (for example, when the serial signal from differential coding portion 3 is converted to four parallel signals P1 to P4 by S/P conversion portion 5 of FIG. 1; multiplexing number is four) with the bit rate of 4 Mbps, the symbol rate is 1 Msps.

As described above, in the fortieth embodiment, the number of multiplexing and the amount of delay are determined such that the symbol rate becomes constant. Therefore, communication is possible while maintaining the same band width, control of the frequency channel becomes unnecessary, and multirate method can be readily implemented.

More specifically, same circuitry can be used regardless of the data rate except for the circuitry related to multiplexing, so that multirate method can be implemented with minimum change in design (that is, provision of multiplexing number/delay amount determining circuit 453).

Further, in the fortieth embodiment, the transmitter of the spread spectrum communication system in accordance with the first to fourth embodiments is used, therefore, effects provided by the transmitter in accordance with any of the first to fourth embodiment can be obtained.

Now, when path diversity such as PDI or RAKE is used, the performance is determined dependent on what delay waves are provided by the communication environment used and on how much the delay waves are gathered (integration or addition). Generally, the period for integration is determined based on the experimental data of the past, as already described. However, generally, the environment for use changes with time. Therefore, spread of the delay wave changes time to time. Therefore, it is difficult to constantly keep the optimal period of integration and hence it is degraded in the actual system as compared with the theoretical optimal value.

Figure 38A:
FIGS. 38(a) and (b) show correlated output waveform of the conventional spread spectrum communication system.
Figure 38B:

FIG. 38 shows correlated output waveforms of the conventional system. Conventionally, the amount of delay is considerably large in some environments for use, and sometimes the data component of the preceding signal is overlapped with the next data signal, degrading the performance. In view of the foregoing, when the communication system is designed, it is necessary to set the time period between the symbols sufficiently larger than the amount of delay, by appropriately determining the data symbol speed. In this case also, determination is based on the experimental data of the past. However, the amount of delay is not constant as already described. Hence, sometimes the signal of the preceding symbol is overlapped as shown in FIG. 38(b), degrading performance.

In view of the foregoing, an embodiment in which setting of pulse diversity is appropriately determined in accordance with the condition at that time allowing improvement in performance such as error rate will be described.

Figure 39:
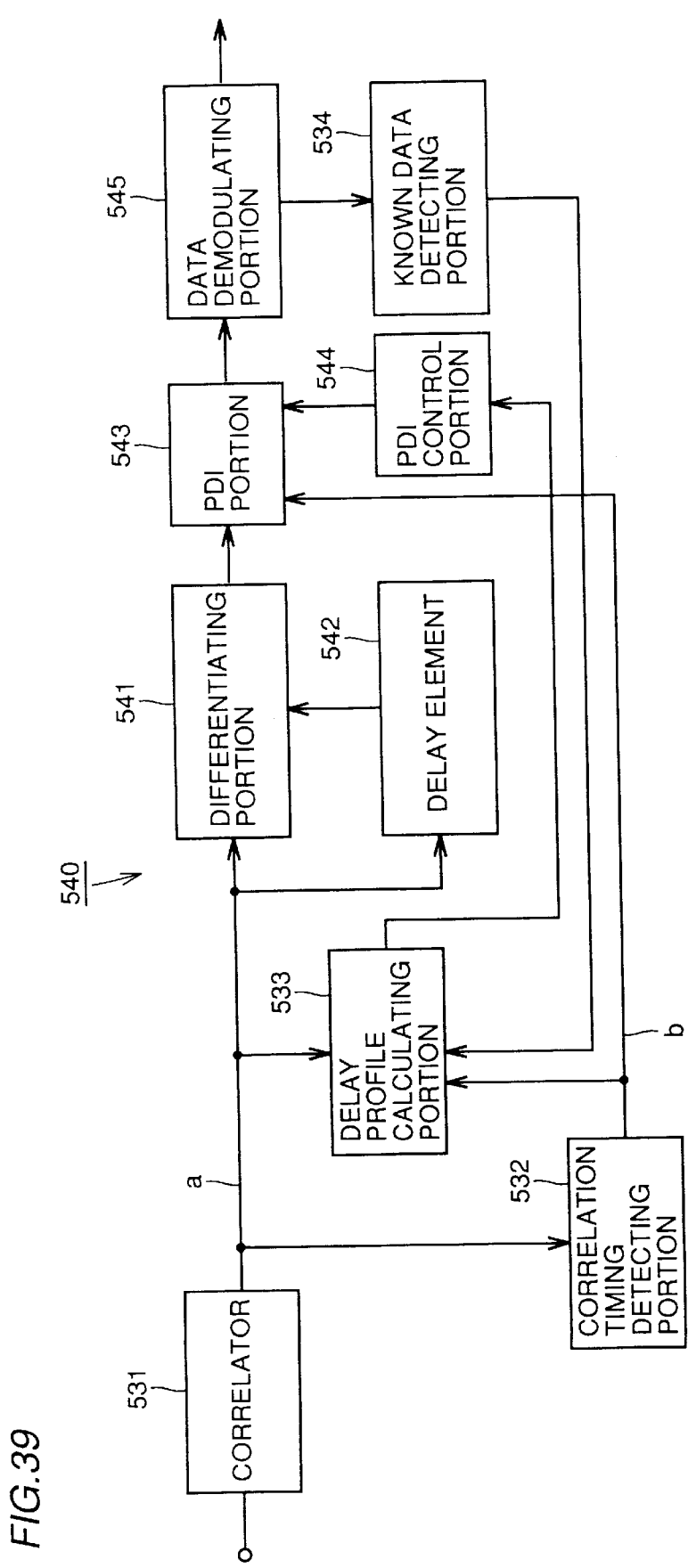
FIG. 39 is a block diagram showing a forty-first embodiment of the present invention.

FIG. 39 is a schematic block diagram showing the forty-first embodiment of the present invention. FIG. 39 shows a portion corresponding to correlator 115, differentiating portion 125 and PDI portion 421 shown in FIG. 28. The signal input from an input portion is correlated with the PN code at correlating portion 531, and output as a correlated signal. The correlated signal is applied to correlation timing detecting portion 532, and correlation timing detecting portion 532 generates a correlation timing signal for demodulation and applies it to delay profile calculating portion 533. Delay profile calculating portion 533 calculates the condition of the delay signal (profile), using the correlation timing signal and a signal from a known data detecting portion 534, which will be described later, as references. The correlated signal from correlating portion 531 is also applied to demodulating portion 540.

Demodulating portion 540 includes differentiating portion 541, delay portion 542, PDI portion 543, PDI control portion 544 and data demodulating portion 545. The correlation timing signal is applied to PDI portion 543, and the delay profile calculating signal from delay profile calculating portion 533 is applied to PDI control portion 544. PDI portion 543 receives the signal from delay profile calculating potion 533 and controls the time of integration of the PDI by the PDI control portion 544 in order to optimize control of the PDI portion 543.

Figure 40:
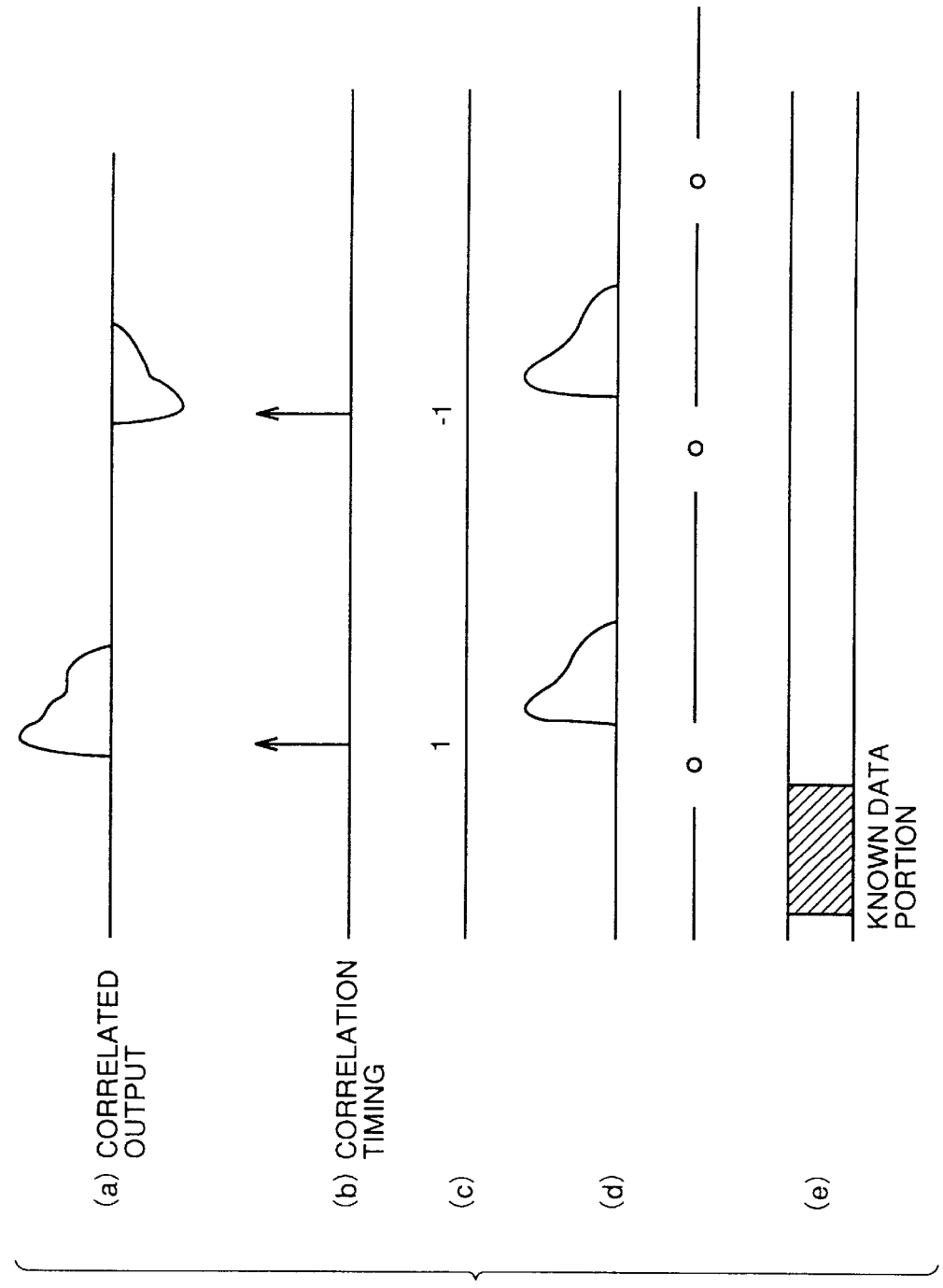
FIGS. 40(a)–(e) timing charts showing the operation of the forty-first embodiment of FIG. 39.

FIG. 40 is a timing chart showing the operation of the forty-first embodiment of the present invention. The operation of FIG. 39 will be described with reference to FIG. 40. The correlated output from correlator 531 is as shown in (a) of FIG. 40, which is the delay profile to be applied to delay profile calculating portion 533. However, in this state, whether the data is positive or negative is not known. Therefore, the resulting delay profile has positive and negative portions. Delay profile calculating portion 533 determines timing of the correlated output based on the correlation timing signal such as shown in FIG. 40(b) applied from correlation timing detecting portion 532, and with this timing and the signal from the known data detecting portion 534, it determines whether the data is 1 or −1 as shown in (c) of FIG. 40. Then, delay profile not having the distinction of positive/negative such as shown (d) of FIG. 40 is calculated. This can be realized only when whether the data is positive or negative is known.

In the above described forty-first embodiment, it becomes possible to calculate the delay profile, as known data detecting portion 534 is provided. Specific example will be described in detail in the following. Of the data, known data portion is as shown in FIG. 40(e). The portion (e) of FIG. 40 has time span on the abscissa different from that of portions (a) to (d) of FIG. 40.

In general communication, data is often in the form of packet or in a frame configuration. Therefore, there is known data portion such as a preamble portion in each frame. In this case, known data detecting portion 534 detects the signal at the known data portion, in accordance with the signal demodulated at data demodulating portion 545. At this time, assume that the length of the known data portion is 100 bits. If the operation of the correlation timing detecting portion 532 and demodulating portion 540 attains to the steady state in the first portion, for example, of ten and several bits of the known data portion, then the next coming signals in the remaining several tens of bits are all known on the receiving side. As a result, it becomes possible to transmit the values of data to be received next, to the delay profile calculating portion 533.

Figure 41:
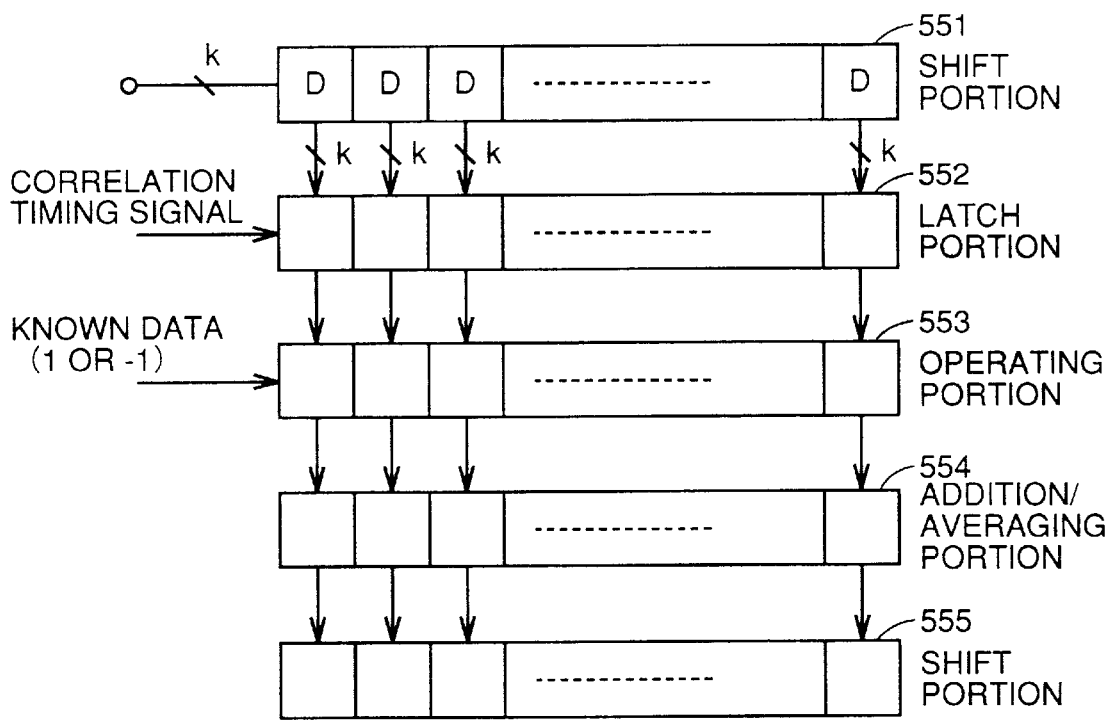
FIG. 41 is a schematic block diagram of the delay profile calculating portion shown in FIG. 39.

FIG. 41 is a block diagram showing an example of delay profile calculating portion 533 shown in FIG. 39. FIG. 41 shows an example in which correlating operation is performed in digital manner. The correlated output signal from correlating portion 531 shown in FIG. 39 is applied to shift portion 551 and shifted sample by sample. The output is latched by latch portion 552 in accordance with the correlation timing signal. Thereafter, the known data for determining whether the correlated output is positive or negative mentioned above is received from known data detecting portion 534, and data without the distinction of positive/negative is calculated at the calculating portion 553. This results in the delay profile without negative/positive distinction described with reference to FIG. 40(d). In general communication path, there are signal components other than delay because of noise or the like. Therefore, to reduce such components, addition and averaging are performed at adding and averaging portion 554. Though noises are not related sample by sample, the delay profile is correlated. Therefore, influence of noise or the like can be reduced by addition and averaging. Delay profile is transmitted thereafter by shift portion 555.

Figure 42:
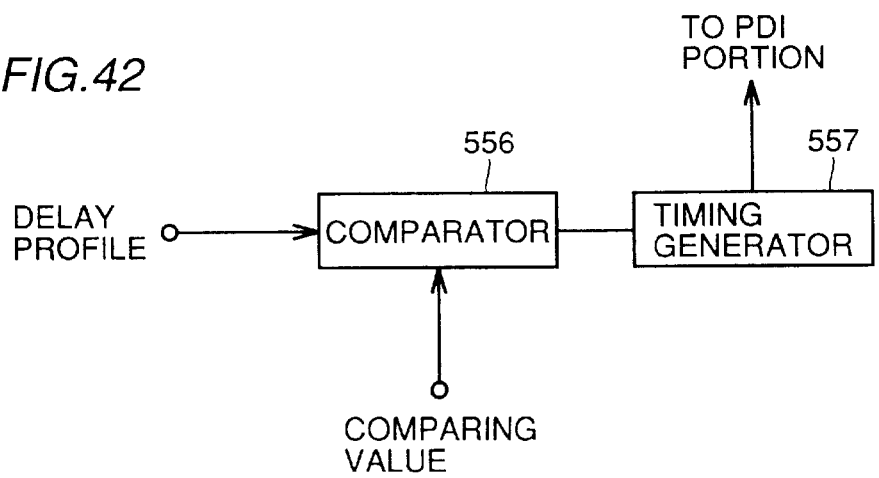
FIG. 42 is a specific block diagram of knowing data detecting portion shown in FIG. 39.

FIG. 42 is a block diagram showing an example of PDI control portion 54 shown in FIG. 39. Referring to FIG. 42, the input delay profile is compared with a comparison reference value at comparator 556. If it is larger than the comparison reference value, it is determined to be a valid region of the delay profile. If the comparison reference value is made larger, only the signals of high level will be added. If the value is made lower, most of the delay signals will be added. The comparison reference value is set in accordance with the condition based on experiments, past data and so on. It may be determined uniquely in accordance with the location of the communication system, or it may be changed by the control of higher layer such as computer application actually utilizing the communication.

In this manner, timing generator 557 transmits the timing signal of the period for integration to PDI portion 543 so that the period for integration determined to be valid is used for PDI. At this time, signal which exceeded the comparison reference value may be used as it is, or it may be transmitted after it is held, or precision may be improved by repeating integration several times.

As described above, in the forty-first embodiment of the present invention, as known data detecting portion 534 is provided, delay profile without positive/negative distinction can be calculated based on the known data portion, which known data portion is detected by the known data detecting portion 534 without the necessity of demodulating data of the demodulation timings, whereby path diversity such as PDI can be performed in the optimal period of integration at that time period. As compared with the convention example in which PDI is performed with the period of integration fixed, in the present embodiment, optimal delay profile at that time point can be used for demodulation, and hence error rate can be improved. Generally, the time of one frame is several miliseconds. Therefore, it is considered that there is hardly a fluctuation in propagation path in the same frame. Therefore, almost optimal control becomes possible by this embodiment.

In the above described embodiment, differential demodulation and PDI has been described. However, the present invention is also applicable to other modulation methods and provides similar effects. Further, it is generally applicable to the method using path diversity in which performance depends on the delay profile. For example, it is applicable to the method such as RAKE. Though delay profile calculating portion 533 and PDI control portion 544 are used in the example of FIG. 39, a calculating delay profiles and a controller other than these may be used.

Figure 43:
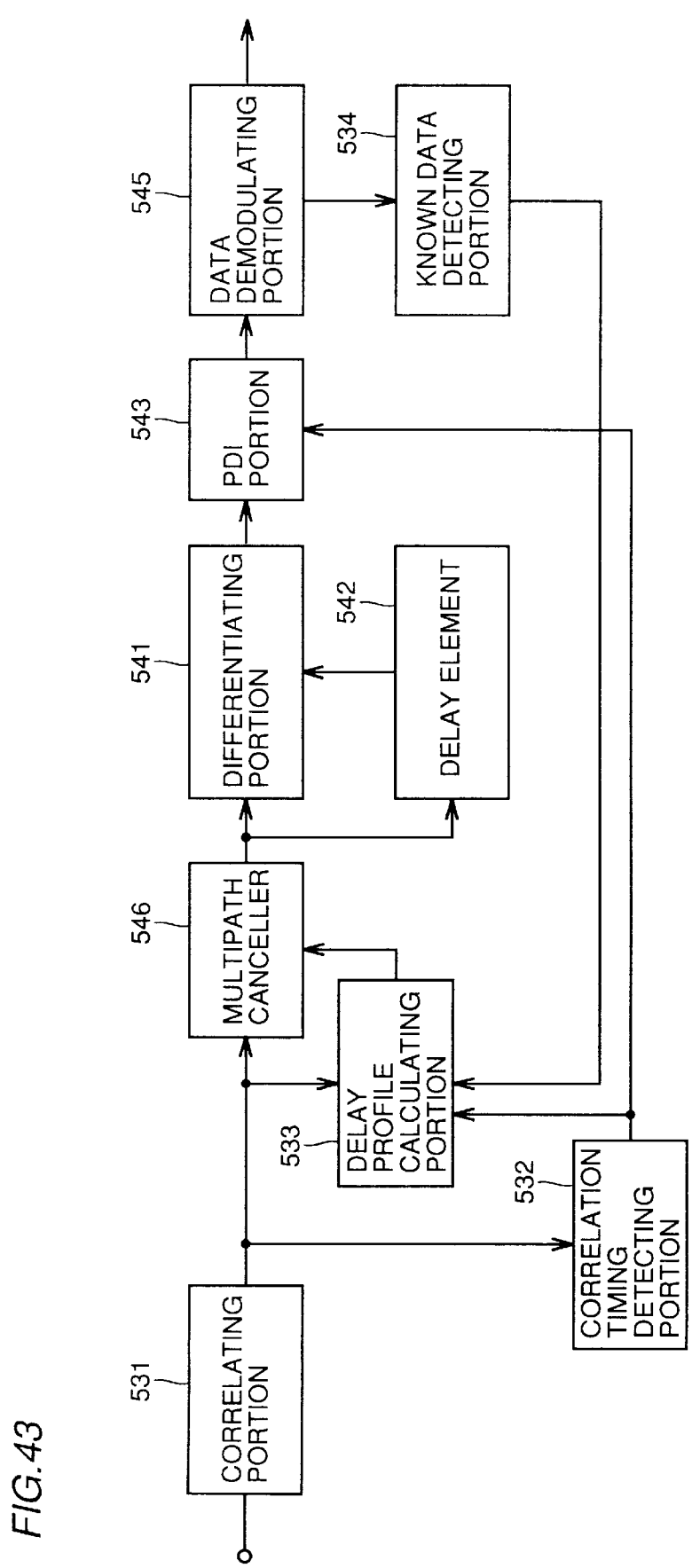
FIG. 43 is a block diagram showing a forty-second embodiment of the present invention.

FIG. 43 shows the forty-second embodiment of the present invention. In the example shown in FIG. 43, PDI control portion 544 of FIG. 39 is omitted, and a multipath canceler 546 is newly provided between correlating portion 531 and differentiating portion 541. Multipath canceler 546 removes multipath component from correlated output signal, and inputs the correlated output signal with the multipath component removed to the differentiating portion 541 of demodulating portion 540.

FIG. 44 is a timing chart showing the operation of the embodiment shown in FIG. 43. The operation will be described with reference to FIG. 44. The correlated output is as shown in (a) of FIG. 44, in which the solid line represents the actual signal, while the dotted lines correspond to the overlapping portions of the data signals. As can be seen, the correlated output is a superposition. In this case, different from the forty-first embodiment, the preceding data signal is overlapped with the following signal, resulting in degraded performance. Therefore, in the forty-second embodiment, the delay component is subtracted by using the correlated output before data demodulation, to improve performance. First, multipath canceler 546 knows the timing of the correlated output as shown in (b) of FIG. 44 from the correlation timing signal. Meanwhile, in the similar manner as the forty-first embodiment, delay profile calculating portion 533 calculates the delay profile as shown in (c) of FIG. 44, and calculates the signals where overlapping should be avoided, as shown in (d) of FIG. 44. By using this information, the component corresponding to the delay profile is cancelled in accordance with the value of the preceding demodulated data. As a result, the correlated signal comes to have the inherent signal component of itself as shown in (e) of FIG. 44, whereby degradation caused by the delay component of the preceding signal can be avoided.

Conventionally, in order to avoid such overlapping, the data rate has been determined based on delay profiles of large amount of data obtained experimentally. However, since the condition for use changes frequently, sometimes overlapping occurs inevitably, causing degradation of performance, or the data rate is made lower than necessary taking too large a margin, resulting in inefficiency of communication. However, the forty-second embodiment of the present invention enables highly efficient communication without error.

Performance can further be improved when the forty-second embodiment is combined with the forty-first embodiment.

Figure 45:
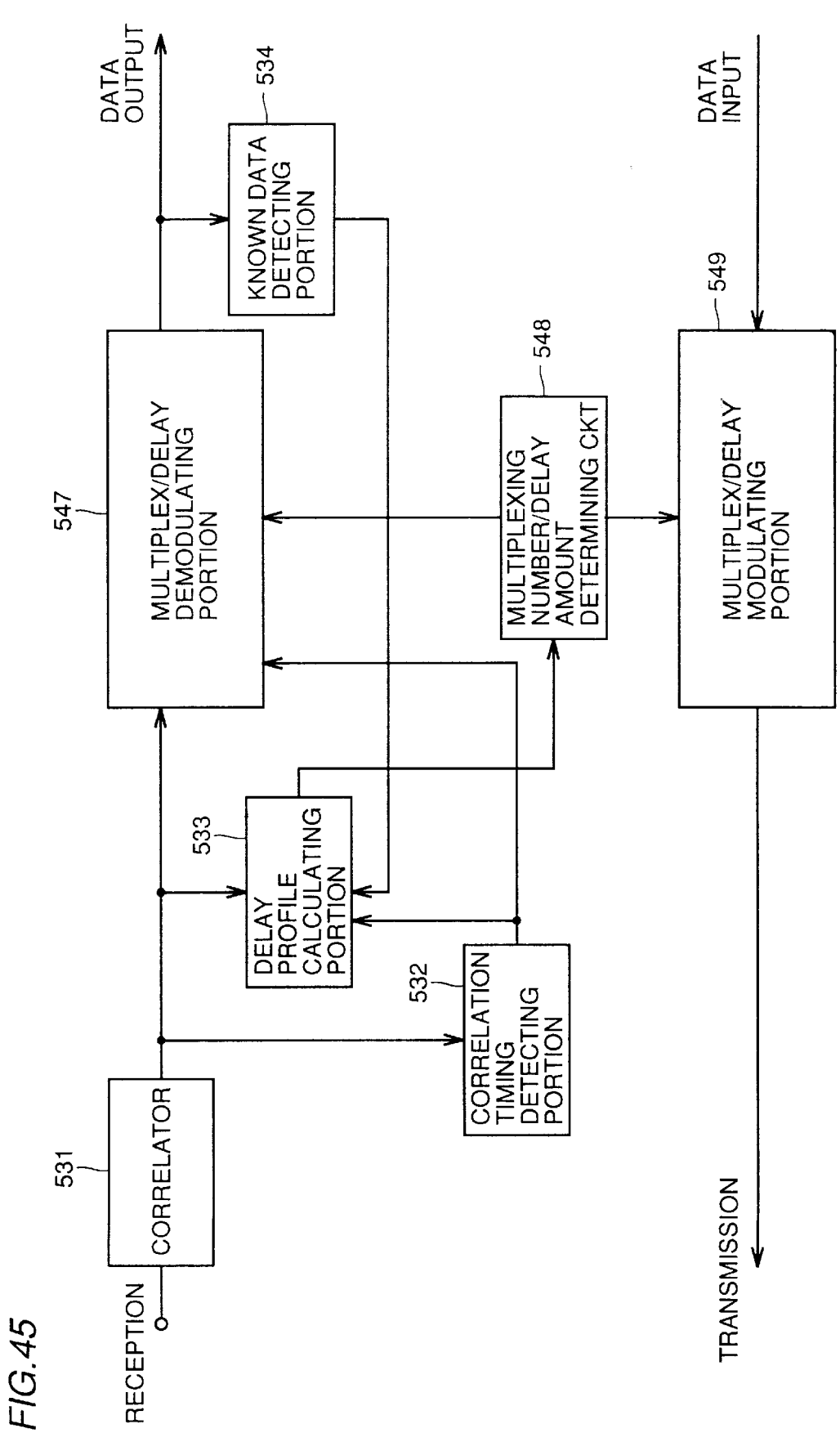
FIG. 45 is a block diagram showing a forty-third embodiment of the present invention.

FIG. 45 is a block diagram showing the forty-third embodiment of the present invention. In this embodiment, multiplex/delay portions 547 and multiplexing number/delay amount determining portion 548 are provided in place of the data demodulating portion 540 shown in FIG. 39. The delay profile signal calculated in delay profile calculating portion 533 is applied to multiplexing number/delay amount determining circuit 548, and the number of multiplexing and the amount of delay are determined in accordance with the delay profile. The output from correlating portion 531 is applied to demodulating portion 547 and in accordance with the output from the multiplexing number/delay amount determining circuit 548, the number of multiplexing and the amount of delay are determined. In this case, since it is transmission/reception system for communication, multiplex/delay modulating portion 549 is provided on the transmitting side, and the number of multiplexing and the amount of delay of the modulating portion 549 are determined in accordance with the output from the multiplexing number/delay amount determining circuit 548.

Figure 46:
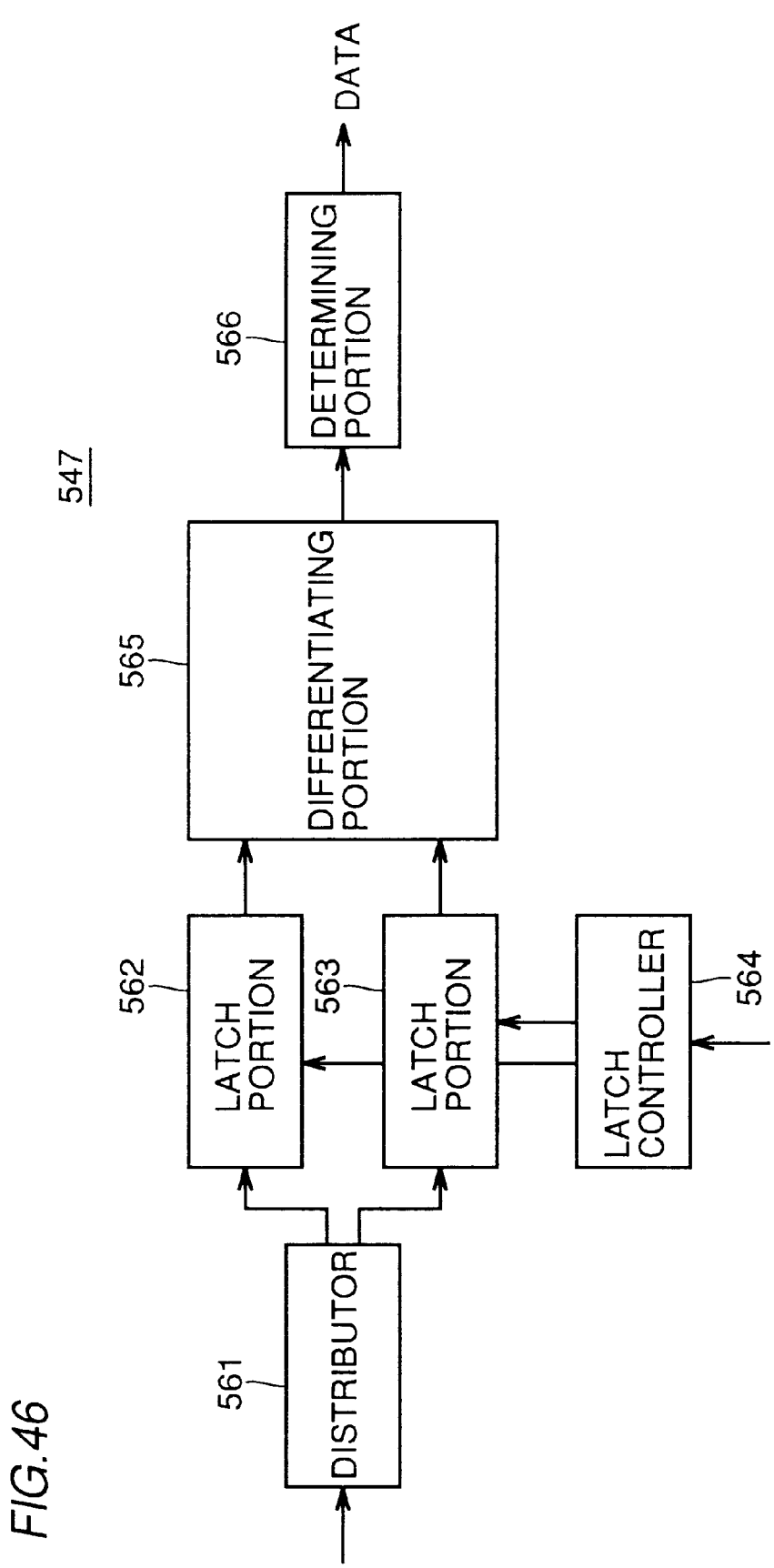
FIG. 46 shows a specific example of the demodulating portion of the proposed scheme shown in FIG. 45.

FIG. 46 is a block diagram showing the structure of the demodulating portion employing the multiplexing and delaying method shown in FIG. 45. Referring to FIG. 46, the demodulating portion 547 includes a distributor 561, latch portions 562, 563, a latch controller 564, a differentiating portion 565, and a determining portion 566. The correlated output from correlating portion 531 shown in FIG. 45 is applied to distributer 561, and the number of multiplexing and the amount of delay are applied from multiplexing number/delay amount determining circuit 548 to latch controller 564. Distributer 561 distributes the correlated signal from correlating portion 531 into two and generates distribution signals. One of the distribution signals from distributor 561 is applied to latch portion 562, and the other is applied to latch portion 563. Latch portion 562 latches one of the distribution signals from distributor 561 by the latch control signal from latch controller 564, and latch portion 563 latches the other one of the distribution signals from the distributor 561 by the latch control signal from latch controller 564.

More specifically, the correlated signal from correlator 531 includes four signals of different correlation multiplexed in time. Therefore, by latching at latch portions 562 and 563 at the delay timing of the multiplexed signals using the latch control signal from latch controller 564, a signal preceding by one delay time can be acquired. Based on the latched signals at latch portions 562 and 563, differential decoding is performed at differentiating portion 565, and demodulation is performed. The differentially decoded signals are output as data through determining portion 566.

FIG. 47 is a timing chart showing the operation of the modulating portion shown in FIG. 46. Let us consider the operation with the number of multiplexing varied from one to five. In latch portions 562 and 563, when the number of multiplexing is 1, the signals are latched at timings A and B shown in (a) of FIG. 47, and demodulation is performed at differentiating portion 565 based on the differentiated output. When the number of multiplexing is 2, the signals are latched at the timings C and D of (b) of FIG. 47 for differentiation, and differentiation between D and E is performed at the timing of D. As can be seen from FIG. 47, when the number of multiplexing is 1, the time difference between two correlated output is $t_1$, when the number is two, the time difference is $t_2$, when the number is 3, the time difference is $t_3$ as shown in (c), when the number is four, the time difference is $t_4$ as shown in (d), and when the number is five, the time difference is $t_5$ as shown in (e). Namely, time interval becomes shorter.

Therefore, if the calculated delay profile is large, the time difference t must be enlarged. For example, if the delay spread of the signal is $t_d$ from the delay profile, optical transmission becomes possible when the relation $t_k < t_D < t_{k+1}$ is satisfied. In this manner, multiplexing number/delay amount determining circuit 548 determines the number of multiplexing and the amount of delay.

In the conventional method of delay and multiplexing, setting of the number of multiplexing and the amount of delay are determined uniquely by preliminary set location or determined indirectly from the error rate. However, according to the forty-third embodiment, it becomes possible to set optimal number of multiplexing and amount of delay. Therefore, degradation of performance caused by too much multiplexing or degradation in throughput caused by too small a number of multiplexing with too large the margin can be prevented.

Figure 48:
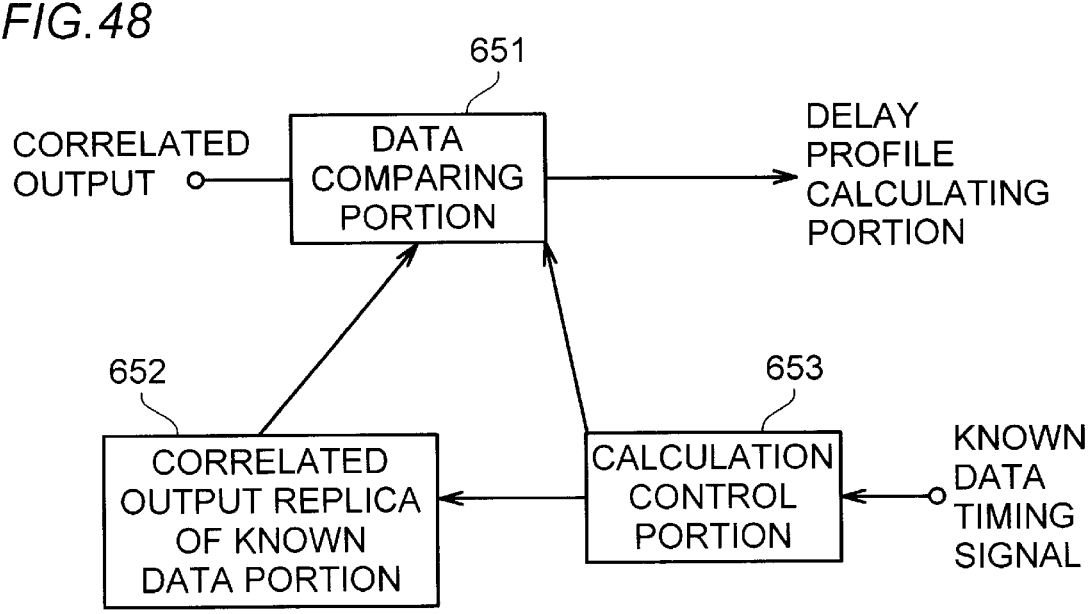
FIG. 48 is a block diagram showing a forty-fourth embodiment of the present invention.

FIG. 48 is a block diagram showing the forty-fourth embodiment of the present invention. In the embodiment shown in FIG. 39, the delay profile was calculated by adding known signal (1 or -1) to the measured data by delay profile calculating portion 533. In the forty-fourth embodiment, precision of the result of calculation is enhanced.

More specifically, the correlated output signal output from the correlating portion 531 shown in FIG. 39 is applied to data comparing portion 651. Meanwhile, storing portion 652 stores values of EVEN and ODD auto-correlation in advance in the form of replica. Further, known data timing signal output from known data detecting portion 534 shown in FIG. 39 is applied to calculation control portion 653, and calculation control portion 653 applies the known data timing signal to data comparing portion 651 and storing portion or memory portion 652. Storing portion 652 applies, based on the known data timing signal, the correlated output replica of the known data portion to data comparing portion 651. Based on the known data timing signal, data comparing portion 651 compares the correlated output with the correlated output replica of the known data portion applied from storing portion 652, outputs a delay profile and applies it to delay profile calculating portion 533 shown in FIG. 39.

Figure 49A:
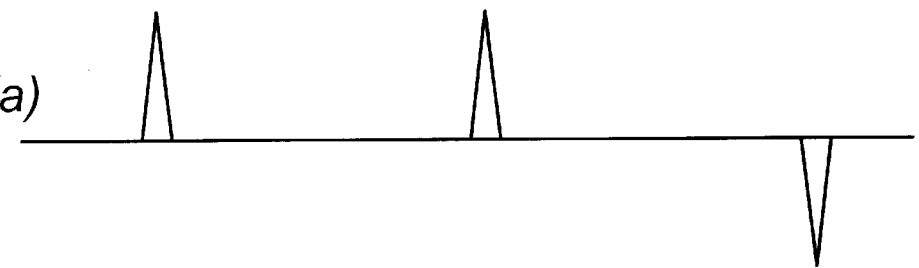
FIGS. 49(a) and (b) are timing charts showing the operation of the embodiment shown in FIG. 48.
Figure 49B:
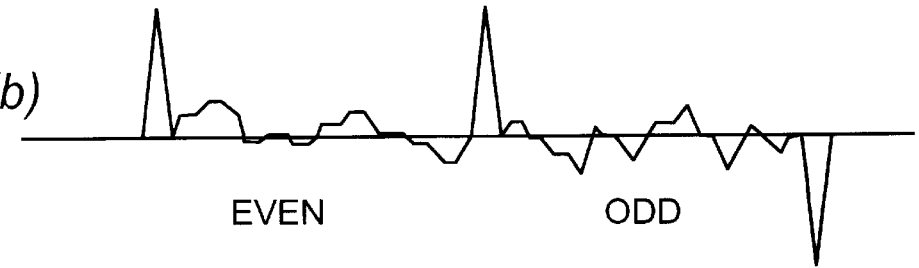

FIG. 49 shows the operation of the embodiment shown in FIG. 48. The operation of the embodiment shown in FIG. 48 will be described with reference to FIG. 49. An ideal spread code attains the maximum output when the correlation matches, as shown in FIG. 49(a), and in other periods, it assumes 0. However, actual spread code is not ideal. Therefore, though it attains the maximum output when correlation matches, it assumes several values because of auto-correlation of every signal in other periods. These values differ dependent on whether the data is (1, 1), (1, -1), (-1, 1) or (-1, -1), which are referred to as EVEN (continuation of the same data) and ODD (continuation of different data), as shown in FIG. 49(b). The auto-correlation value is uniquely determined by the spread code. Therefore, only the inherent delay component can be calculated if the data is stored in advance in the form of replica.

In the method of calculating the delay profile described above, the delay profile is obtained such as shown in FIG. 40(d). However, in this method of calculating the delay profile, the values of EVEN and ODD auto-correlations are not considered. Therefore, the resulting delay profile still contains this component. If we represent the inherent delay profile by f(t) and the output component of auto-correlation taking into account the delay by g(t), what is obtained by the method of calculating the delay profile described above is f(t)+g(t).

Therefore, in the present embodiment, the EVEN and ODD auto-correlation values are stored in advance in storing portion 652 in the form of replica to calculate the g(t) component, whereby only the inherent delay profile f(t) can be obtained by subtracting g(t) from f(t)+g(t). In this manner, in the present embodiment, delay profile free of degradation caused by auto-correlation can be obtained, and hence system performance can be improved.

Figure 50:
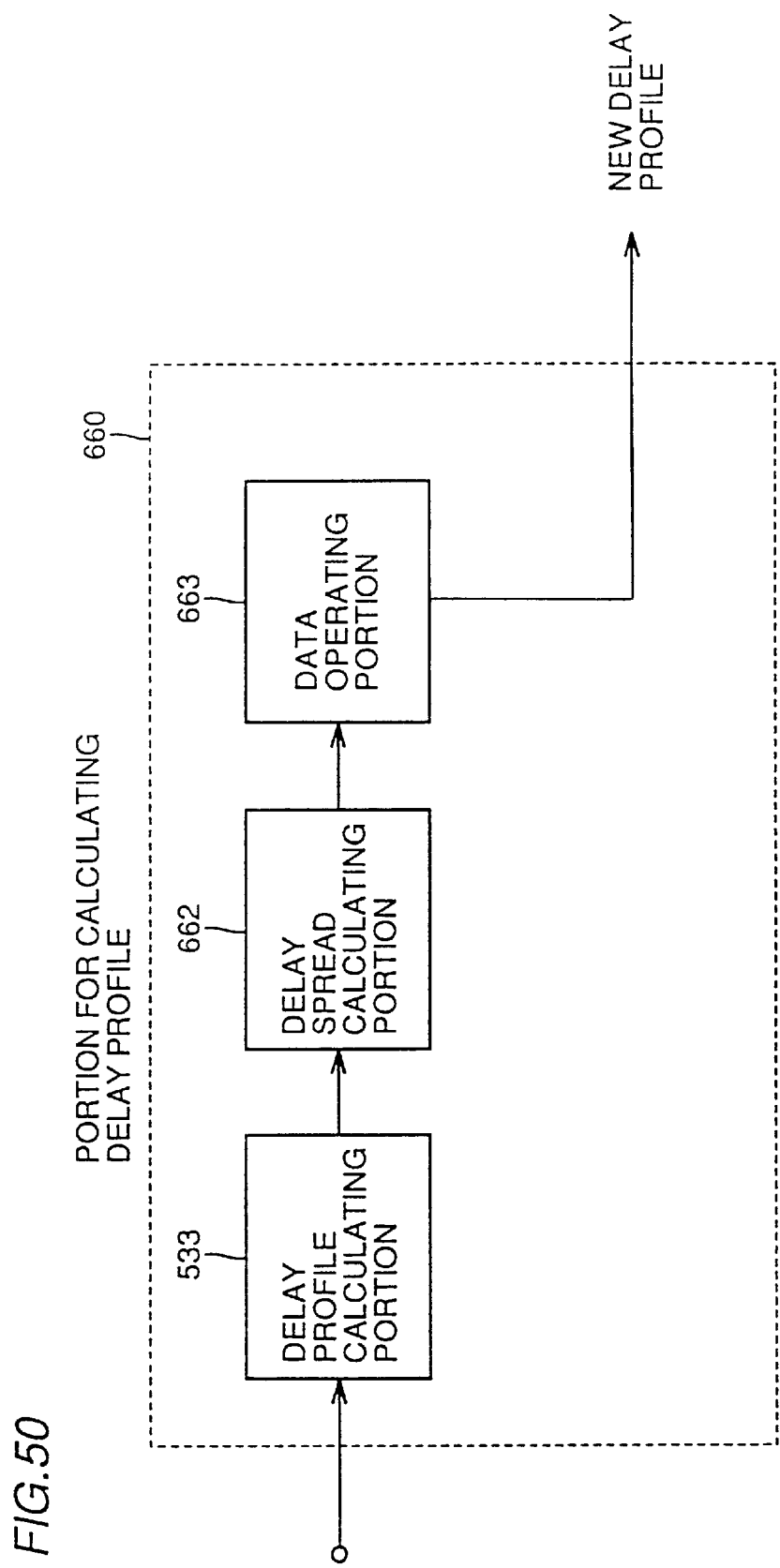
FIG. 50 is a block diagrams showing a forty-fifth embodiment of the present invention.
Figure 51:
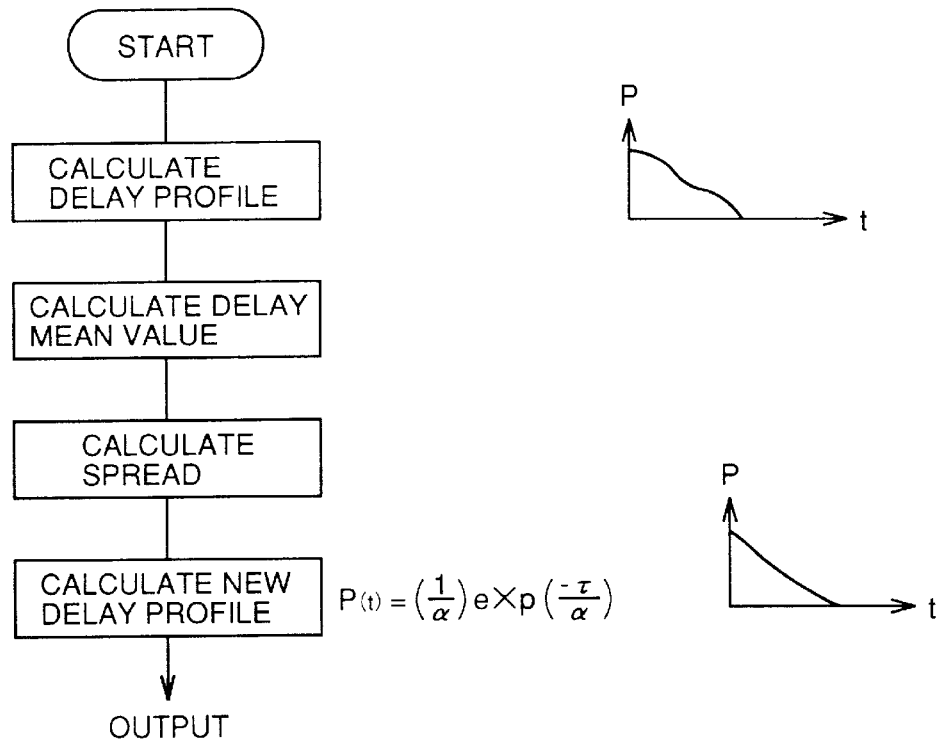
FIG. 51 is a flow chart showing the operation of the forty-fifth embodiment of the present invention.

FIG. 50 is a block diagram showing the forty-fifth embodiment of the present invention. The delay profile calculating portion 660 shown in FIG. 50 calculates and uses a new delay profile from the calculated delay profile, and it includes delay profile calculating portion 533, delay spread calculating portion 662 and data calculating portion 663. FIG. 51 is a flow chart showing the operation of delay profile calculating portion 530 shown in FIG. 50. Referring to FIGS. 50 and 51, delay profile calculating portion 533 calculates the delay profile, delay spread calculating portion 662 finds mean value of the delay time, and calculates spread based on the actually measured value and mean value. This is the same as general calculation of spread. Data calculating portion 663 calculates a new delay profile using the result. The new delay profile is an exponential curve such as shown in FIG. 51, which is different from the actually measured value to a certain extent. However, sometimes it is preferable to use this profile, when the actual value fluctuates, for example.

The new delay profile may be calculated by providing a memory table consisting of a ROM, for example, instead of data calculating portion 663. In that case, ROM implementation becomes more simple if exponential operations are done in advance and the results are stored in the form of a table. Alternatively, the delay time and a power (normalized value) at that time may be used as inputs to the ROM. In that case, though the number of tables is increased, operations of mean value and spreads can be omitted.

For calculating a new delay profile, equation such as follows may be used, where a represents delay spread.

$$P(\tau) = (1/\sigma) \: exp \: (-\tau/\sigma)$$

In the forty-first and forty-third embodiments above, it is assumed that the delay profiled does not change in one frame. However, it is possible that the delay profile changes in one frame in a special environment, for example when extremely high operation is being done or when there are a number of objects which operate at high speed. However, in that case also, the environment for use itself is not much changed. Accordingly, general delay spread is approximately constant, and the maximum delay spread is also approximately constant. From this point of view, sometimes it is preferable to use not the calculated data itself but the data re-calculated. The forty-fifth embodiment realizes this option.

In the above described forty-fourth embodiment, a method of calculating exact delay profile by using a replica has been described. In wireless communication link, there is the influence of not only delayed wave but also the influence of white noise when C/N is not satisfactory. Therefore, the signal derived from autocorrelation, correlated outputs derived from delay waves and correlated output derived from white noise are superposed in the correlated output. Though the autocorrelation component is removed in accordance with the forty-fourth embodiment described above, white noise component is left, which affects calculation in delay profile.

Therefore, a forty-sixth embodiment for reducing the influence of white noise will be described.

Figure 52:
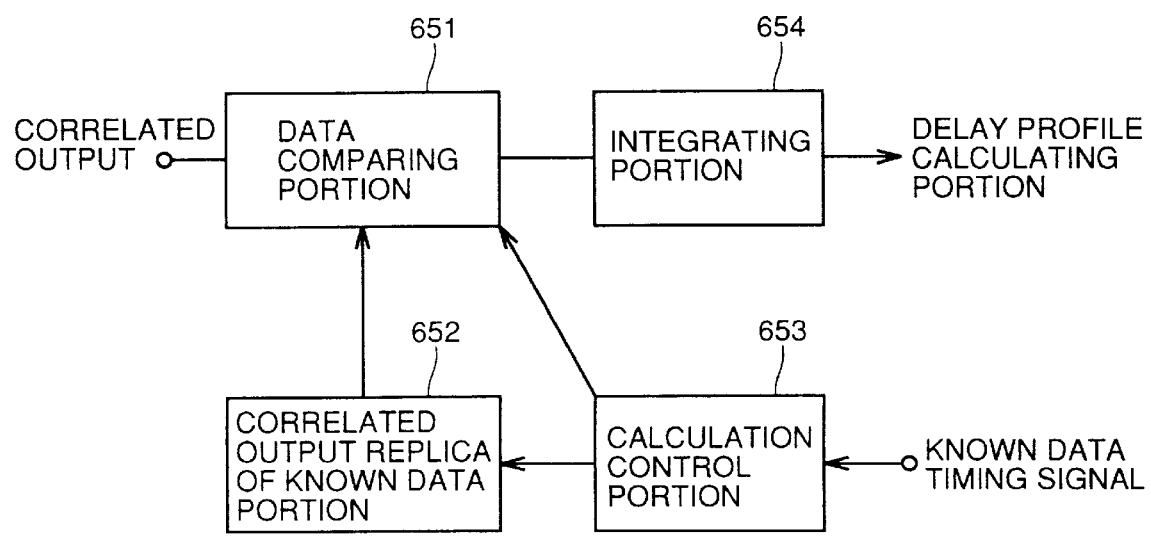
FIG. 52 is a block diagram showing a forty-sixth embodiment of the present invention.

FIG. 52 is a block diagram showing the forty-sixth embodiment. In the embodiment shown in FIG. 52, integrating portion 654 is provided at the output of data comparing portion 651 shown in FIG. 48. Integration by integrating portion 654 is performed at the same timing of each code, the delay profile is correlated at the same timing while the white noise has no correlation with respect to time. Therefore, by integration at integrating portion 654, the ratio of delay profile with respect to white noise becomes larger, and as a result, influence of white noise can be reduced.

Figure 53:
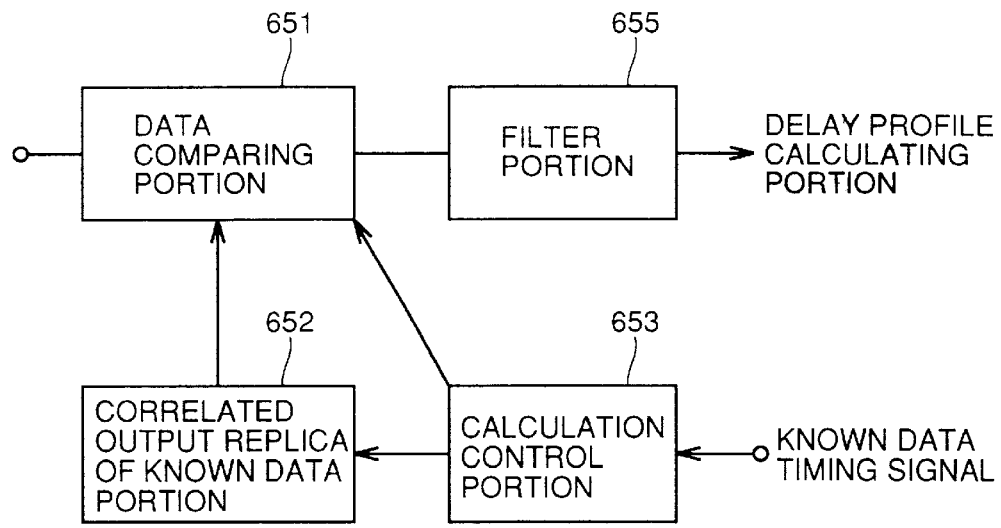
FIG. 53 is a block diagram showing a forty-seventh embodiment of the present invention.

FIG. 53 is a schematic block diagram showing a forty-seventh embodiment. In the embodiment shown in FIG. 52, integration is performed at the same timing by integrating portion 654 in order to reduce the influence of white noise. However, in the embodiment shown in FIG. 54, reduction of the influence is realized not by integration but by filter portion 55 for filtering at the same timing. Integrating operation is equivalent to the operation of a first order filter. However, by using second and third order filters, for example, the performance can be enhanced as compared with integration which corresponds to the filtering operation of the first order, though the process becomes complicated.

Figure 54:
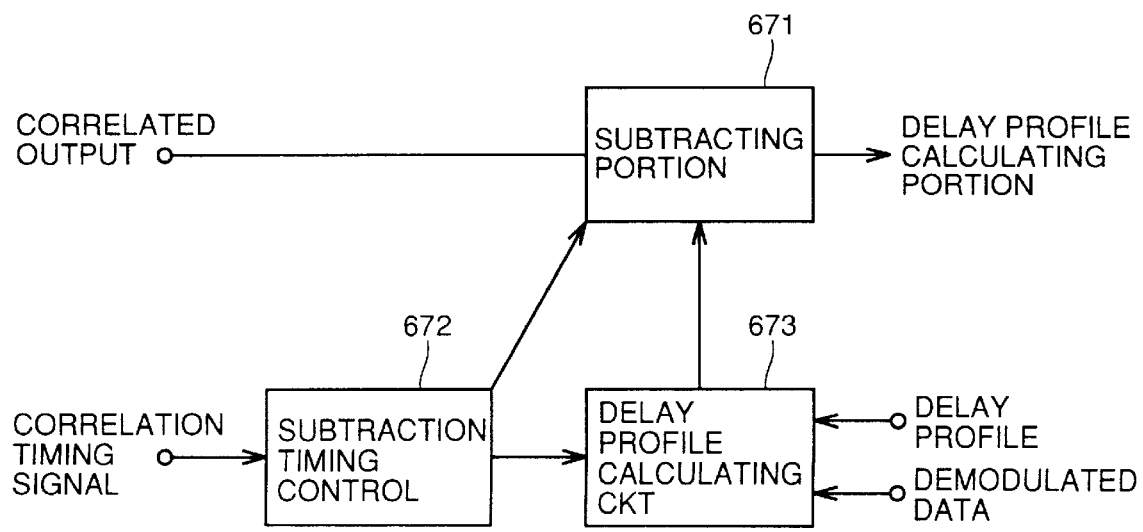
FIG. 54 is a block diagram showing a forty-eighth embodiment of the present invention.

FIG. 54 is a block diagram showing a forty-eighth embodiment in which a structure of a multipath canceler is shown. The delay profile and demodulated data are applied to delay profile calculating circuit 673. Delay profile calculating circuit 673 applies timing of the signal to be cancelled to subtracting portion 671, using correlation timing signal from the delay profile. From the delay profile and the data signal preceding the data to be demodulated, delay profile calculating circuit 673 calculates the delay profile which corresponds to an interference signal superposed on the data to be demodulated. Subtracting portion 671 subtracts only that signal which corresponds to the portion overlapping the next data from the correlated output and thereby cancels multipath, using a subtracting timing control signal based on the correlation timing signal output from subtraction timing control circuit 672.

In a conventional canceler, a method has been used in which a replica of a transmission signal is formed from a demodulated signal, and it is subtracted from the signal before correlation. The forty-eighth embodiment can be implemented by a circuit which is more simple than the conventional method. This is because the delay profile is known in advance in accordance with the forty-second embodiment, and hence maximum effect can be obtained by combining these embodiments.

Figure 55:
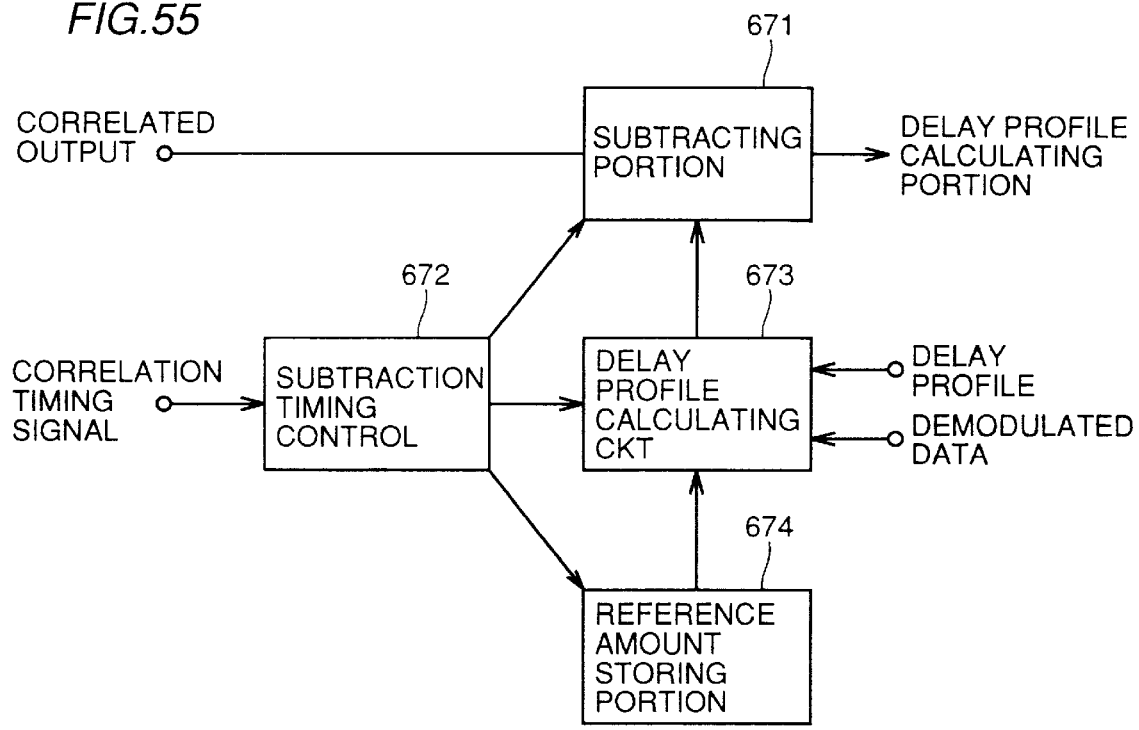
FIG. 55 is a block diagram showing a forty-ninth embodiment of the present invention.

FIG. 55 is a block diagram showing a forty-ninth embodiment of the present invention. In the forty-eighth embodiment above, the multipath component of the portion overlapping the data is completely subtracted from the signal obtained by the delay profile. In the forty-ninth embodiment shown in FIG. 55, reference amount storing portion 674 is provided, and a reference for determination whether subtraction is to be carried out or not is stored in the reference amount storing portion 674. If this reference for determination is exceeded, the multipath component is subtracted. As the reference for canceling is provided in this manner, multipath signal which is small relative to the signal component is not subtracted. Though not subtracted, the multipath component which is small relative to the signal component does not much affect the demodulation characteristic. Therefore, there is an advantage that the power consumption is reduced and a circuit can be made compact by reducing processors of such small component.

Figure 56:
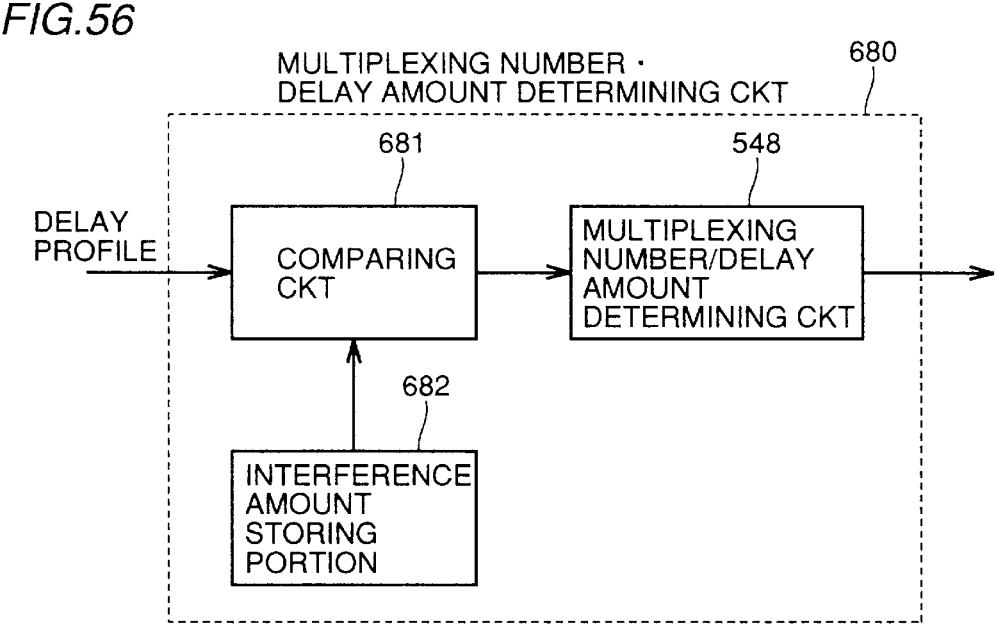
FIG. 56 is a block diagram showing a fiftieth embodiment of the present invention.

FIG. 56 is a block diagram showing a fiftieth embodiment of the present invention. In the embodiment shown in FIG. 48, the number of multiplexing and the amount of delay has been selected such that the delay wave caused by multipath does not overlap the next data in accordance with the delay profile. However, in actual communication, the necessary error rate differs dependent on the content of the data to be transmitted. For example, error rate of $BER=10^{-3}$ is necessary when voice is to be transmitted, and error rate of $BER=10^{-8}$ is necessary for transmitting data. In other words, there are various error rates suitable for respective contents. Sometimes higher data transmission rate is desired more than unnecessarily superior error rate.

Therefore, in the embodiment shown in FIG. 56, an amount of interference storing portion 682 stores in advance the relation between white noise and the amount of interference (C/I) corresponding to the error rate required of the communication link. A comparing circuit 681 compares the delay profile and the amount of interference stored in the amount of interference storing portion 682. Based on the comparison output, the number of multiplexing and the amount of delay are determined based on the necessary error rate and the amount of interference overlapped on the data portion when multiplexing.delay are performed, by multiplexing number/delay amount determining circuit 548.

For example, if C/I of at least 10 dB is necessary for voice transmission, corresponding amount of delay is calculated in accordance with the delay profile, and the number of multiplexing.delay amount are determined. If C/I of at least 15 dB is necessary for data, corresponding amount of delay is calculated in accordance with the delay profile, and the number of multiplexing.delay amount are determined. At this time, the number of multiplexing of the former example is larger naturally. In this manner, the number of multiplexing.delay amount optimal for the communication link can be determined in the present embodiment. Therefore, efficiency can be improved and throughput can be increased.

Figure 57:
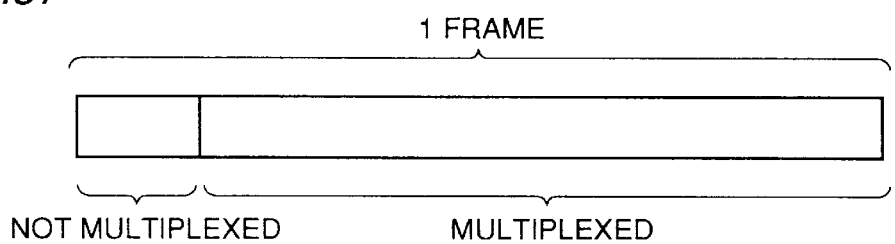
FIG. 57 shows a fifty-first embodiment of the present invention.

FIG. 57 shows a fifty-first embodiment of the present invention. In this embodiment, multiplexing is not performed at portions where information data is not included of the preamble portion in the data format, and only the portion containing information data are multiplexed. When the delay profile is to be calculated, it has been calculated based on the correlated output, or by using known data portion in the example of FIG. 51.

However, when multiplexing is performed, delay waves are overlapped because of multiplexing when delay profile is to be calculated. Therefore, the larger the number of multiplexing, the more complicated becomes calculation. Therefore, in the fifty-first embodiment, a period which is not overlapped is used for calculating the delay profile, and actually necessary data portions are multiplexed. When not multiplexed, the time between the data becomes k times (k is the number of multiplexing) that of the time when multiplexed. Therefore, overlapping of several delays caused by multipath can be avoided. Therefore, delay profile can be easily calculated.

Though the number of multiplexing and amount of delay are determined from portions not multiplexed in the above embodiment, the data of the number of multiplexing and the amount of data may be incorporated in this non-multiplexed portion as data. The number of multiplexing.amount of delay are determined based on the delay profile. By incorporating the data in said non-multiplexed portion as data, it becomes possible that the receiving side receives the non-multiplexed portion to adjust the number of multiplexing and the amount of delay on the receiver side based on the result. In such a case, the number of multiplexing can be determined by the received result at that time without the necessity of determining the number of multiplexing both on the transmitting and receiving sides. Therefore, even if the number of multiplexing is varied as the data amount increases, demodulation can be performed without any problem. As a result, in accordance with variation in that propagation path, the number of multiplexing.amount of delay can be determined on real time basis, and the throughput can be improved.

In the system for communication with the number of multiplexing.amount of delay varied, the circuitry such as described above is necessary to determine settings. In bidirectional communication, such circuitry may be provided only on one side, and as a result, the circuit can be simplified. For example, if communication is carried out between a main station and a sub station, for example, means for detecting the number of multiplexing.delay amount should be provided only on the main station. Generally, several sub stations are connected to one main station Therefore, the circuitry as a whole system can be significantly reduced.

An embodiment in which carrier offset is compensated will be described.

Figure 58:
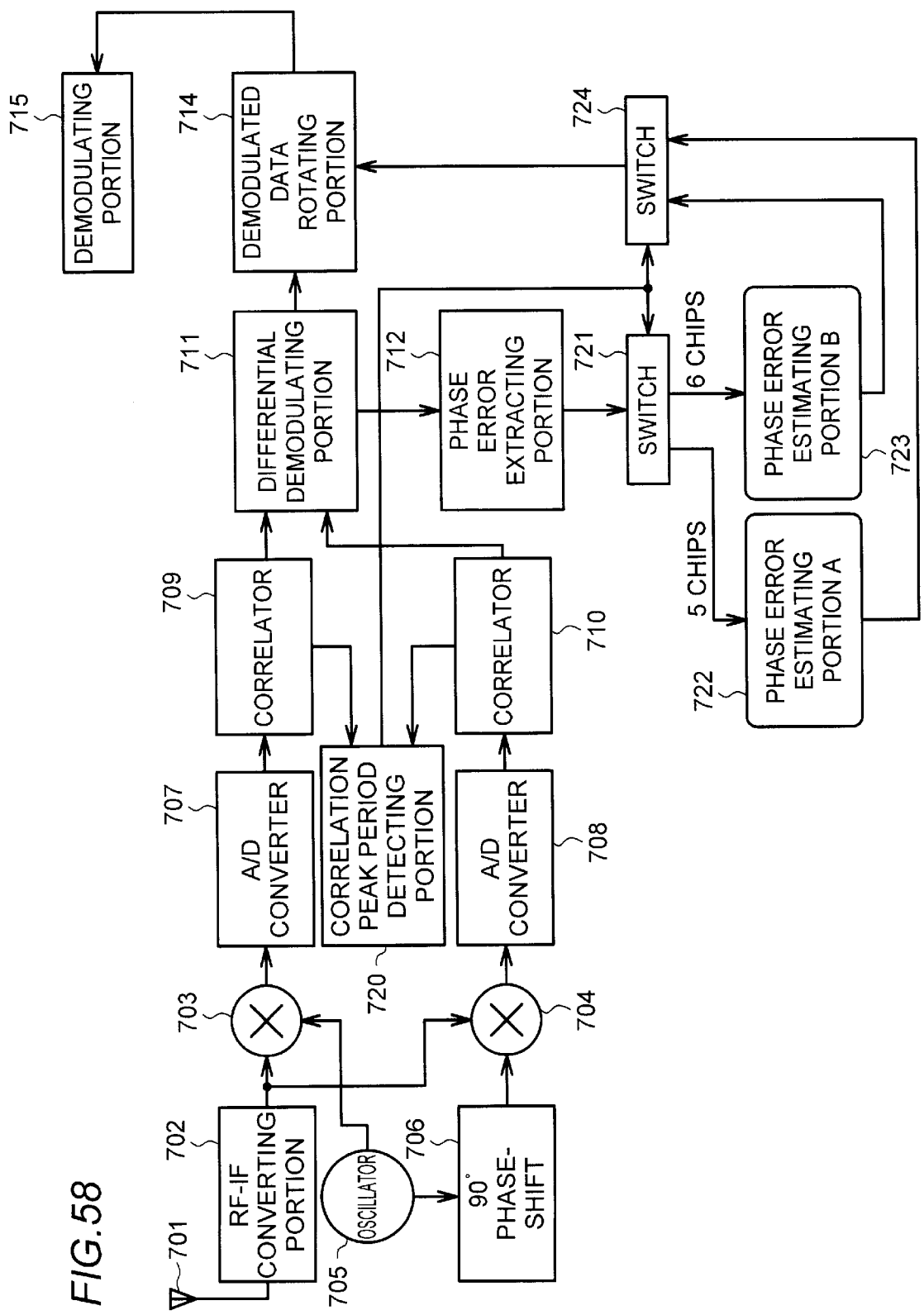
FIG. 58 is a block diagram showing the forty-second embodiment of the present invention.

FIG. 58 is a block diagram of a receiver in accordance with a fifty-second embodiment of the present invention. FIG. 59 is a graph showing relation between information bits, spread codes and the period of detecting correlation peak on the receiver. In this embodiment, as in the prior art example, modulation is performed with the first order modulation being DBPSK and the number of chips of the spread code for the second order modulation being 11 chips.

First, referring to FIG. 59, data sequence on the modulating side and the period of detection of correlation peak on the receiver in the spread spectrum communication system using delay multiplexing will be described. In this case, since delay multiplexing is employed, error rate characteristic is degraded as compared with when multiplexing is not performed. However, this example is advantageous in that twice the amount of information can be transmitted by using the same frequency band. First, the bit sequence to be transmitted is serial/parallel converted and differentially coded, which are allotted to bit sequences 1, 2, . . . shown by (a) and (b) of FIG. 59. These are spread by the code of 11 chips, the results of which are as shown by (c) and (d) of FIG. 59. In other words, data is transmitted in the form of difference of phase represented by the continuous spread spectrum signals. When demodulated on the receiver side, correlation peaks are output in order, such as 5 chips, 6 chips, 5 chips, 6 chips as shown in FIG. 59(e), and by detecting the phase difference (differential demodulation), transmitted data can be demodulated.

Referring to FIG. 58, the spread spectrum signal is received at antenna 701, and the signal is input to RF/IF converting portion 702 to be subjected to frequency conversion. The signal of which frequency is converted at RF/IF converting portion 702 is divided into two systems and supplied to first and second mixers 703 and 704. These are subjected to quadrature demodulation by using a local frequency signal from oscillator 705 and a local signal from a 90° phase shifter 706 which converts the phase of said signal by 90°. Thereafter, respective signals are converted to digital signals at first and second analog/digital converting portions (A/D converting portions) 707, 708, and correlation peaks are detected by first and second correlators 709 and 710, respectively. In this embodiment, correlation peaks are reflected in the repetition of 5 chips and 6 chips. The output from correlators 709 and 710 are transmitted to correlation peak period detecting portion 720, where correlation peak period is detected. Data demodulated at differential demodulating portion 711 is passed to phase difference extracting portion 712, and in accordance with a selection signal from correlation peak period detecting portion 720, phase difference data in accordance with the correlation of 5 chip period is transmitted to phase difference estimating portion 722, and phase difference data in accordance with correlation of 6 chip period is transmitted to phase difference estimating portion 723, by means of a switch 721. Phase differences are estimated at phase difference estimating portions 722 and 723.

Meanwhile, the data demodulated at differential demodulating portion 711 is rotated at demodulation data rotating portion 714. The data demodulated with the correlation of 5 chip period is rotated by the data from phase difference estimating portion 722, while the data demodulated with the correlation of 6 chips period is rotated by the data from phase difference estimating porion 723. Which phase difference data is to be used is determined by switch 724. Switch 724 is controlled by the selection signal from correlation peak period detecting portion 720, as is switch 721.

For describing the above operation using equations, assume that, in the order of reception, the odd numbered reception signals are the data having the correlation of 5 chips period, and the even numbered signals are data having the correlation of 6 chips period. Assume that phase difference estimating portion 722 or 723 calculates mean value of past N samples. Then, the output from phase difference estimating portion 712 will be represented by the following equation, when demodulation is to be performed using the (2t−1)th reception data at a certain time point.

$$\begin{pmatrix} \cos\phi \\ \sin\phi \end{pmatrix} = \begin{pmatrix} \frac{1}{N} \sum_{n=t-N}^{n=t-1} (\Delta\phi I_{2n-1}) \\ \frac{1}{N} \sum_{n=t-N}^{n=t-1} (\Delta\phi Q_{2n-1}) \end{pmatrix} \qquad \text{Formula 4}$$

Phase compensation is provided at demodulation data rotated portion 714. Similarly, demodulation of the 2t-th reception data is to be performed, the output at the phase difference estimating portion will be represented by the following equation, and phase compensation is provided at demodulation data rotating portion 714 similarly.

$$\begin{pmatrix} \cos\phi \\ \sin\phi \end{pmatrix} = \begin{pmatrix} \frac{1}{N} \sum_{n=t-N}^{n=t-1} (\Delta\phi I_{2n}) \\ \frac{1}{N} \sum_{n=t-N}^{n=t-1} (\Delta\phi Q_{2n}) \end{pmatrix} \qquad \text{Formula 5}$$

Data is determined at demodulating portion 715.

Figure 60B:
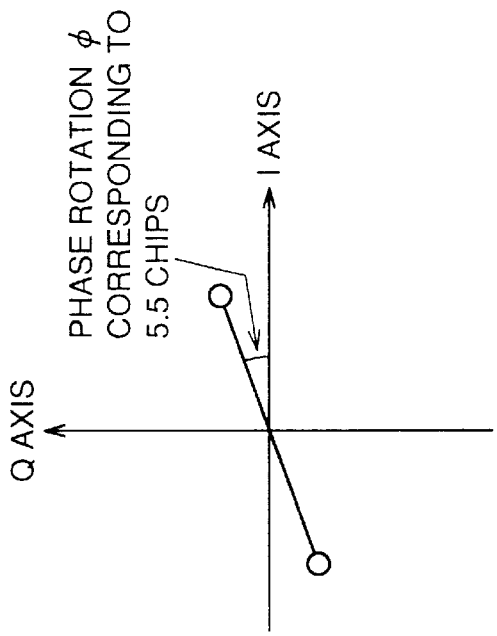
FIGS. 60A to 60D are phase space diagrams after the differential demodulation, in which 60A shows an example where there is no frequency offset between transmission/reception.
Figure 60D:
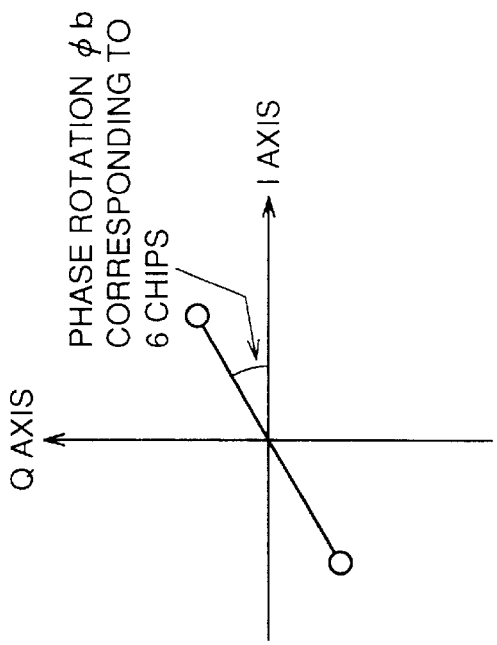
Figure 60A:
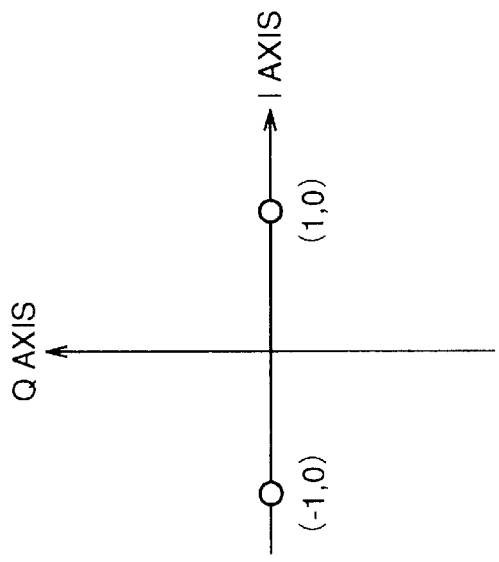

Compensation of data will be described with reference to phase space diagram of FIGS. 60A to 60D. FIG. 60A shows phase after differential demodulation when there is not a frequency offset between transmitter/receiver. Two points are demodulated with the phase difference of 180° on I axis. When there is a frequency offset between transmitter/receiver, the phase will be rotated after demodulation.

Figure 60C:
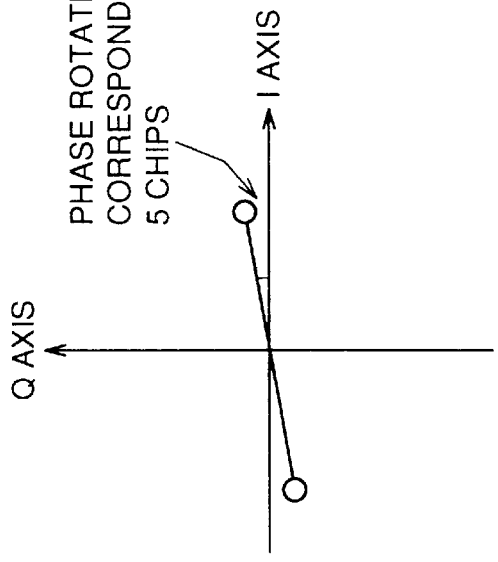

However, at the phase difference estimating portion 722 of the present invention, phase rotation $\phi_a$ shown in FIG. 60C is detected with respect to the data having the correlation interval of 5 chips. Phase difference estimating portion 723 detects phase rotation of $\phi_b$ shown in FIG. 60D for the data having the correlation interval of 6 chips. Therefore, phase compensation in accordance with the number of chips will be realized.

When the number of multiplexing is 2, it is not necessary to prepare a special circuit at correlation peak period detecting portion 720. What is necessary is to repeat the following operation, for example. When correlation peak is detected and the data at that time is transmitted to phase difference estimating portion 722 through switch 721, the demodulated data is phase compensated by using switch 724 so that information $\phi_a$ of phase difference estimating portion 722 is used, the next data is transmitted to phase difference estimating portion 723, and demodulated data is subjected to phase compensation by using information $\phi_b$ of phase difference estimating portion 723. Briefly, what is necessary is to alternately switch the switches 721 and 724 every time the correlation peak is detected. When the number of multiplexing is increased and there are multiplexing of different delay amounts, phase error estimating portions corresponding to that number should be provided. For example, let us consider a system in which the number of multiplexing is 6, including three waves having the delay of a chips, two waves having the delay of b chips and one wave having the delay of c chips, and these are multiplexed and transmitted in the order of a, a, a, b, b, and c. What is necessary is to provide three phase difference estimating portions on the receiving side, providing a system in which the delay waves of a chips, the delay waves of b chips and the delay waves of c chips are allotted utilizing the correlation peak period detecting circuit so that the delay waves of a chips are compensated for in phase error estimating portion a, the waves of b chips are compensated for by phase difference estimating portion b and the delay waves of c chips are compensated for by the phase difference estimating portion c. The correlation peak detecting circuit can be readily implemented. For example, a counter is prepared and correlation peaks are counted. If the output is from 0 to 2, the demodulation data are passed to phase difference estimating portion a, and the phase of the demodulated data is rotated by using the phase rotating information $\phi_a$ from phase difference estimating portion a. If the counted number is 3 or 4, the demodulated data is passed to phase difference estimating portion b, and if the count number is 5, the demodulated data is passed to phase difference estimating portion c, so that the phases are rotated by using the information $\phi_b$ and $\phi_c$, respectively. If the counter output reaches 5, the counter is reset.

If the order of the correlation period is not known in advance on the receiver side, it is possible to provide switch control data by counting chip clock between correlation peaks.

A fifty-third embodiment of the present invention will be described with reference to FIG. 61. It is assumed that similar modulation as in the fifty-second embodiment is performed on the modulating side.

Figure 61:
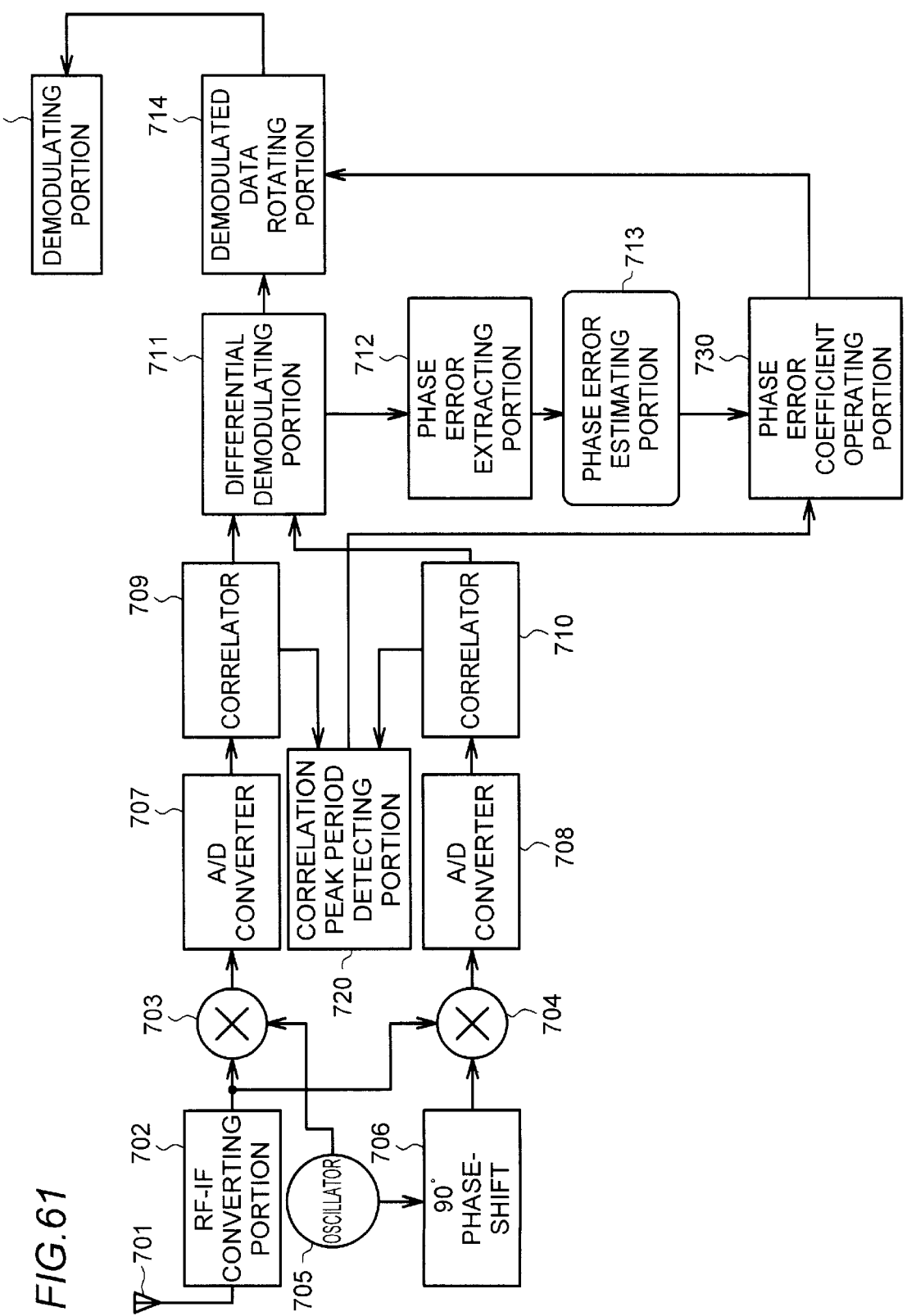
FIG. 61 is a block diagram of fifty-third embodiment of the present invention.

FIG. 61 is a block diagram showing the fifty-third embodiment of the present invention. From antenna 701 to demodulating portion 715, portions denoted by the same reference characters as FIG. 58 operate in the similar manner as those shown in FIG. 58. Phase difference estimating portion 713 calculates mean value of phase difference of the delay waves having the delay amount of 5 chips and the delay waves having the delay amount of 6 chips. In the fifty-second embodiment, the phase rotation in accordance with the phase frequency offset between the transmission/reception has been detected by separately treating delay of 5 chips and 6 chips. However, in the present embodiment, one phase difference estimating portion 713 is provided, and hence phase difference corresponding to the mean value of 5 chips and 6 chips, that is, 5.5 chips is detected. Therefore, as phase error coefficient operating portion 730 to which the data from phase difference estimating portion 713 is supplied, phase difference is multiplied by 10/11 when the data corresponds to 5 chips, and the result is transmitted to demodulated data rotating portion 714. If the data corresponds to 6 chips, it is multiplied by 12/11 and transmitted to demodulated data rotating portion 714. Further, whether the correlation period is 5 chips or 6 chips is determined by correlation peak period detecting portion 720, of which data is transmitted to phase difference coefficient operating portion 730. The structure of correlation peak period detecting portion 720 may be similar to that of the fifty-second embodiment. By the phase difference coefficient operating portion 730, the demodulated data can be phase compensated with approximately the same precision as in the fifty-second embodiment, at demodulating portion 715.

The foregoing will be described with reference to the phase space diagrams of FIGS. 60A to 60D. FIG. 60A shows an example where there is not a frequency offset. Since there is one phase difference estimating portion in this embodiment, phase rotation $\phi$ corresponding to 5.5 chips of FIG. 60B is detected. Meanwhile, phase rotation corresponding to 5 chips and 6 chips are required of the data. Therefore, if the data correspond to the correlation period of 5 chips, the rotation angle obtained at phase difference estimating portion 713 is multiplied by 10/11 (5/5.5), whereby the data for phase rotation shown in FIG. 60C is obtained. Similarly, for 6 chips, the angle of rotation is multiplied by 12/11 (6/5.5), whereby data of phase rotation shown in FIG. 60D is obtained.

An example is shown in which the number of multiplexing is N, the number of chips of the spread code is m, there are h waves having the delay waves of a chips, i waves having the delay waves of b chips and j waves having the delay waves of c chips. In this example, the data obtained at the phase difference estimating portion in accordance with the present invention is the amount of phase rotation PHEASE which corresponds to TCP chip, as represented by the following equation.

Formula 6

$$TCP=(a \times h+b \times i+c \times j)/N=m/N$$

At the phase difference estimating portion, the amount of phase rotation PHASE which corresponds to the TCP chip, that is, mean delay chip number of the multiplexed wave, is obtained. Therefore, the amount of phase rotation PHASE A for the delay wave of a chips is PHASE A=PHASE×a/TCP.

Namely, the data PHASE obtained at the phase difference estimating portion 713 is the amount of phase rotation with respect to the mean number of delay, that is, TCP. Therefore, the data to be modulated has the delay of a chips, it must be adopted thereto. Accordingly, the amount of phase rotation for the delay wave of a chips is obtained by multiplying a/TCP.

Similarly, for the delay of b chips and the delay of c chips, PHASE B and PHASE C are represented as PHASE B=PHASE×b/TCP
PHASE C=PHASE×c/TCP.

Accordingly, what is necessary is to multiply the data at the phase difference estimating portion by the coefficient of a/TCP for the delay wave of a chips, b/TCP for the delay wave of b chips and c/TCP for the delay wave of c chips, at the phase difference coefficient operating portion.

Based on this principle, the phase difference coefficient can be readily estimated even when the number of delays and the number of multiplexing vary.

Though BPSK has been described in the fifty-second and fifty-third embodiments, the present invention is also applicable to QPSK or other phase modulation.

Figure 62:
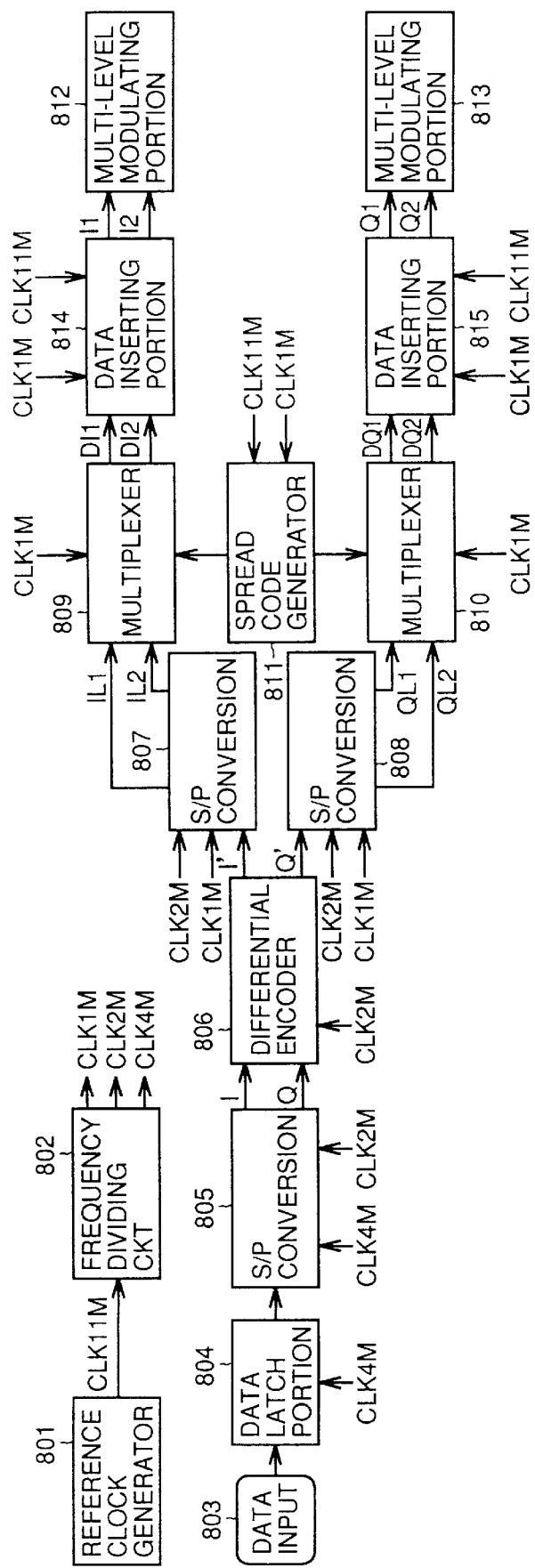
FIG. 62 is a block diagram of a transmitter in accordance with a fifty-fourth embodiment of the present invention.

FIG. 62 is a block diagram showing a transmitter of the spread spectrum signal showing the fifty-fourth embodiment of the present invention.

Referring to FIG. 62, a clock signal CLK11M of 11 MHz is generated from a reference clock generator 801. Clock signal CLK11M is applied to frequency dividing circuit 802, from which a clock signal CLK1M of 1 MHz, a clock signal CLK2M of 2 MHz and a clock signal CLK4M of 4 MHz are generated.

Figure 63:
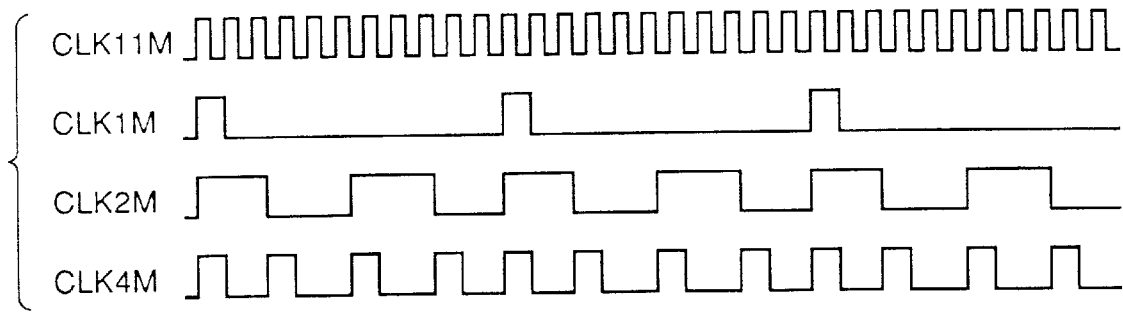
FIG. 63 is a timing waveform of generated clock signal.

FIG. 63 is a timing chart of the generated clock signals. To a data input portion 803, data of 4 Mbps is input. The data is applied to data latch portion 804, and for synchronizing with the clock signal, data is latched at data latched portion 804 using clock signal CLK4M. The data is subjected to S/P conversion by S/P convertor 805. The example shown here is assuming DQPSK modulation. Therefore, there are two output systems for 2 bits of input data. An example of the signal provided at one of the systems will be represented by I, and the other is represented by Q.

The output data I and Q from S/P convertor 805 are applied to differential encoder 806 and subjected to differential coding. The data output from differential encoder 806 are represented as I' and Q'. I' and Q' are respectively S/P converted by S/P converters 807 and 808 for multiplexing by multiplexers 809 and 810. Similar to that described above, S/P converters 807 and 808 provide two systems of output, using 2 bits of data as a pair. This is because this embodiment assumes multiplexing by 2. 2 bits of the output from I' side will be referred to as IL1 and IL2 and 2 bits of output from Q' side will be referred to as QL1 and QL2. Of these, output having the portions L1 are those provided earlier to S/P converters 807 and 808, which outputs are synchronized with the clock signal CLK1M.

Meanwhile, spread code generator 811 generates a spread code of 11 chips. The period of the spread code is in synchronization with clock signal CLK1M. The multiplexer 809 performs spreading, by providing exclusive OR between the generated spread code and the data. After spreading, signals IL2 and QL2 are input to a delay element of 5 chips for multiplexing.

Figure 64:
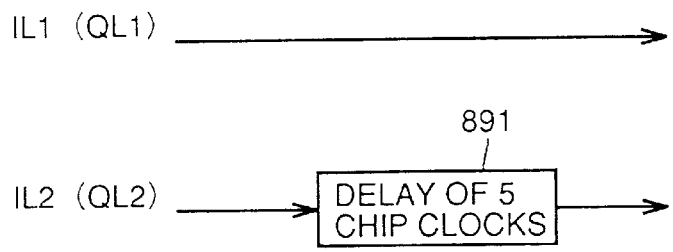
FIG. 64 shows a structure of the multiplexer shown in FIG. 62.

FIG. 64 shows the structure of the multiplexer. Only for the system for IL2, QL2, a 5 chips clock delay element 891 is provided. From multiplexer 809, outputs DI1 and DI2 (including delay of 5 chips) are obtained, while DQ1 and DQ2 (including delay of 5 chips) are obtained from multiplexer 810. Multilevel modulation portions 812 and 813 receive respective data, and when the input data pair is (1, 1), provide A, if the pair is (1, 0) or (0, 1), provide 0, and if the data pair is (0, 0), provide −A. More specifically, if the sum of the amplitudes of two waves to be multiplexed is 2, A is output. If the sum is −2, −A is output and if it is 0, 0 is output, and these outputs are input to a quadrature modulator which is to follow. By data inserting portions 814 and 815, data is inserted such that of the data of which chip number where preceding and succeeding data are overlapped is 5, the outputs from multilevel modulating portions 812 and 813 of the data corresponding to the central chip are forced to 0.

Figure 65:
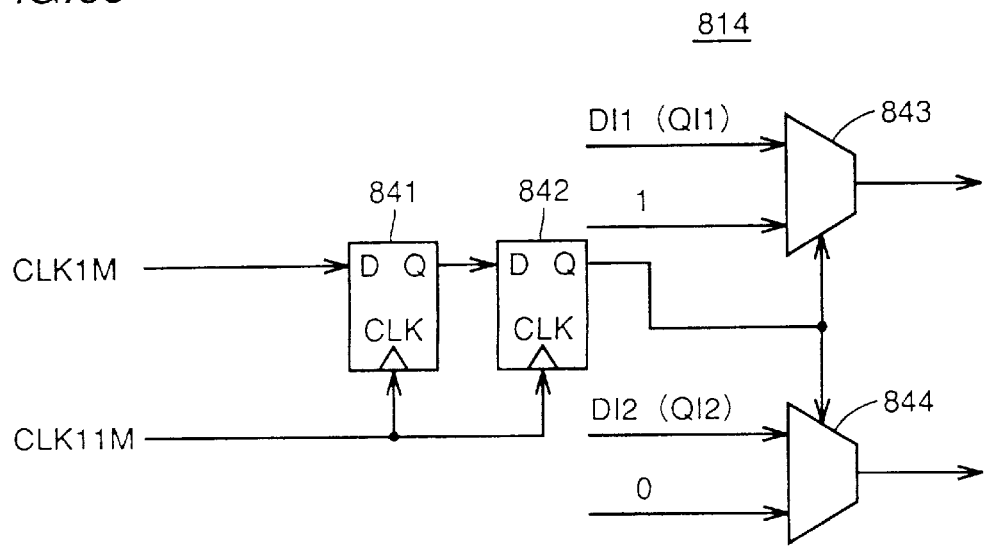
FIG. 65 shows a specific example of the data inserting portion shown in FIG. 62.

FIG. 65 is a specific block diagram of the data inserting portion. Referring to FIG. 65, data inserting portion 814 includes D type flipflops 841, 842 and selectors 843 and 844. D type flipflops 841 and 842 provide delay of 2 chips to clock signal CLK1M, in response to clock signal CLK11M, and by the Q output from D type flipflop 842, data selectors 843 and 844 are switched. More specifically, if the Q output from D type flipflop 842 is at the "L" level, data DI1, DI2 or DQ1 or DQ2 are selected by data selectors 843, 844, and if the Q output from D type flipflop 842 is at the "H" level, (1, 0) of a previously set data is selected. Because of such data inserting portion 814, the data corresponding to that chip which corresponds to the clock signal CLK1M delayed by 2 chips is always forced to have the combination of (1, 0), and hence the output from multilevel modulating portion 812 and 813 attain to 0. At other portions, DI1, DI2 or DQ1, DQ2 are output as they are, and the outputs from multilevel modulating portions 812 and 813 vary correspondingly. Therefore, variation after despreading is eliminated, enabling accurate demodulation.

Figure 66:
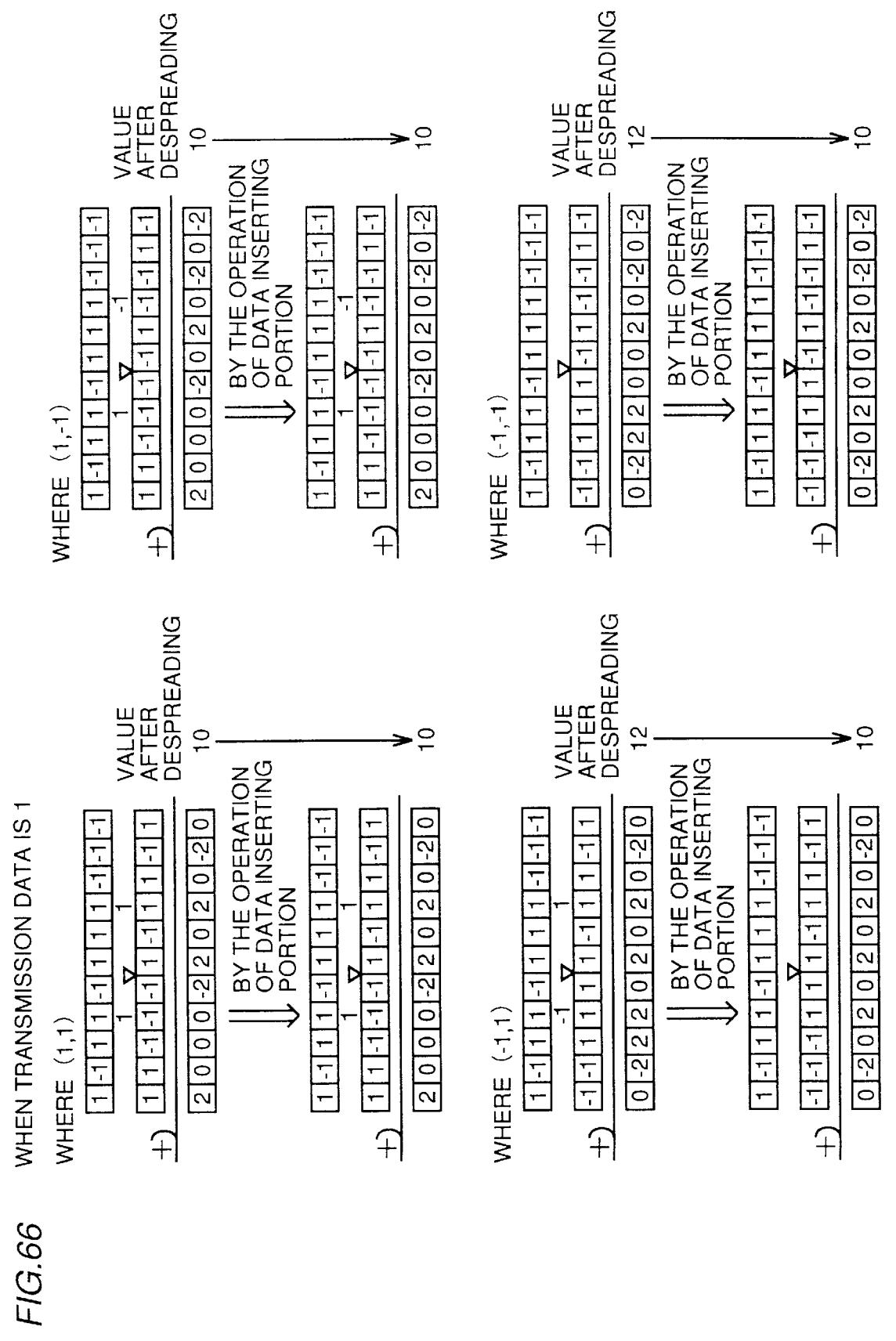
Figure 67:
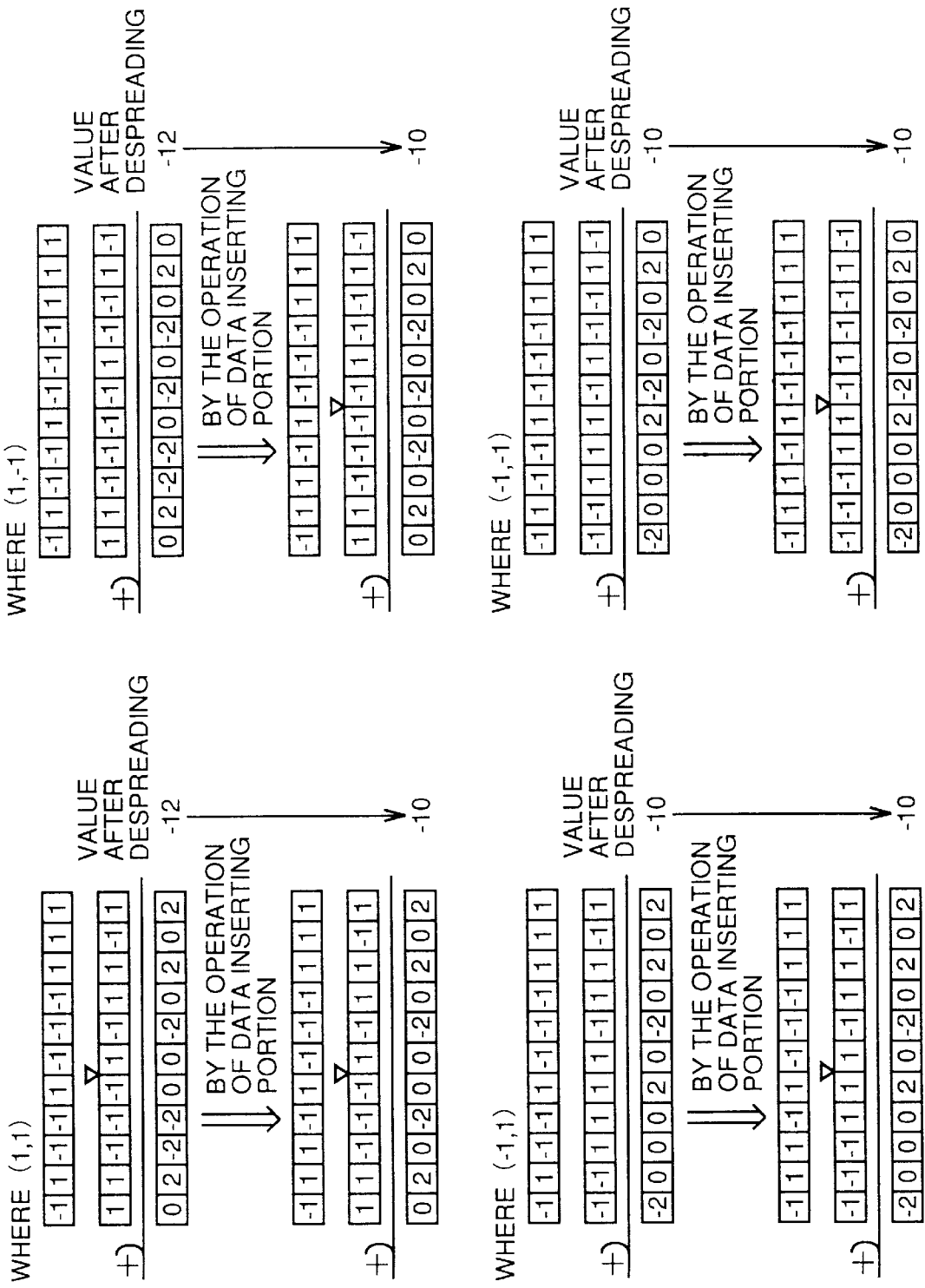
FIG. 67 shows a pattern of transmission data in accordance with the fifty-fourth embodiment of the present invention where transmission data is −1.

FIGS. 66 and 67 show patterns of transmission data. As is apparent from FIGS. 66 and 67, the data modulated in accordance with this embodiment of the present invention is received by a conventional receiver, phase variation after despreading is suppressed, and error rate characteristic can be improved.

In this embodiment, the clock signal CLK1M is offset by 2 chips at data inserting portions 814 and 815, so that the central 1 chip of the overlapping 5 chips is forced to 0. However, the clock signal CLK1M may be offset by 1 chip or 3 chips to provide similar effects. Further, though data inserting portions 814 and 815 are provided in the preceding stage of multilevel modulating portion 812 and 813, the value of multilevel modulating portions 812 and 813 may be directly operated.

Figure 68:
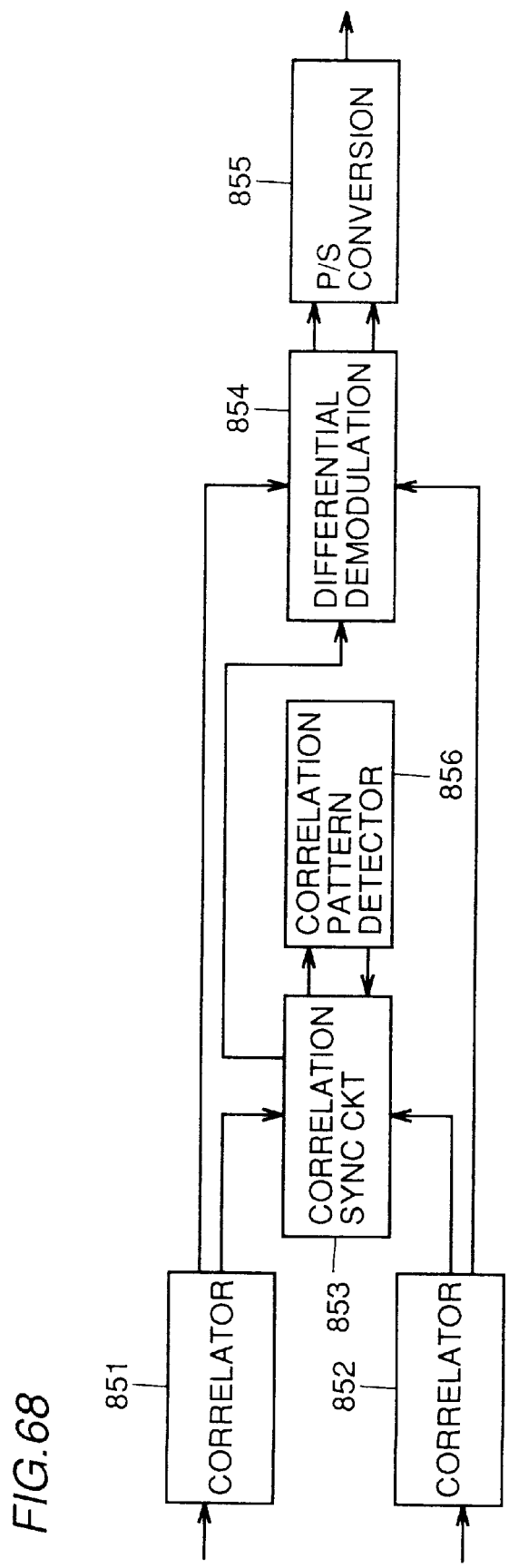
FIG. 68 is a block diagram of a receiver showing a fifty-fifth embodiment of the present invention.

FIG. 68 is a block diagram showing a receiver in accordance with a fifty-fifth embodiment of the present invention. The receiver includes correlators 851, 852, correlation synchronizing circuit 853, differential demodulating circuit 854, P/S converting circuit 855 and correlation pattern detector 856. Correlation pattern detector 856 detects correlation patterns, and changes coefficient of multiplication at correlators 851 and 852 accordingly, based on the detection output.

Figure 69:
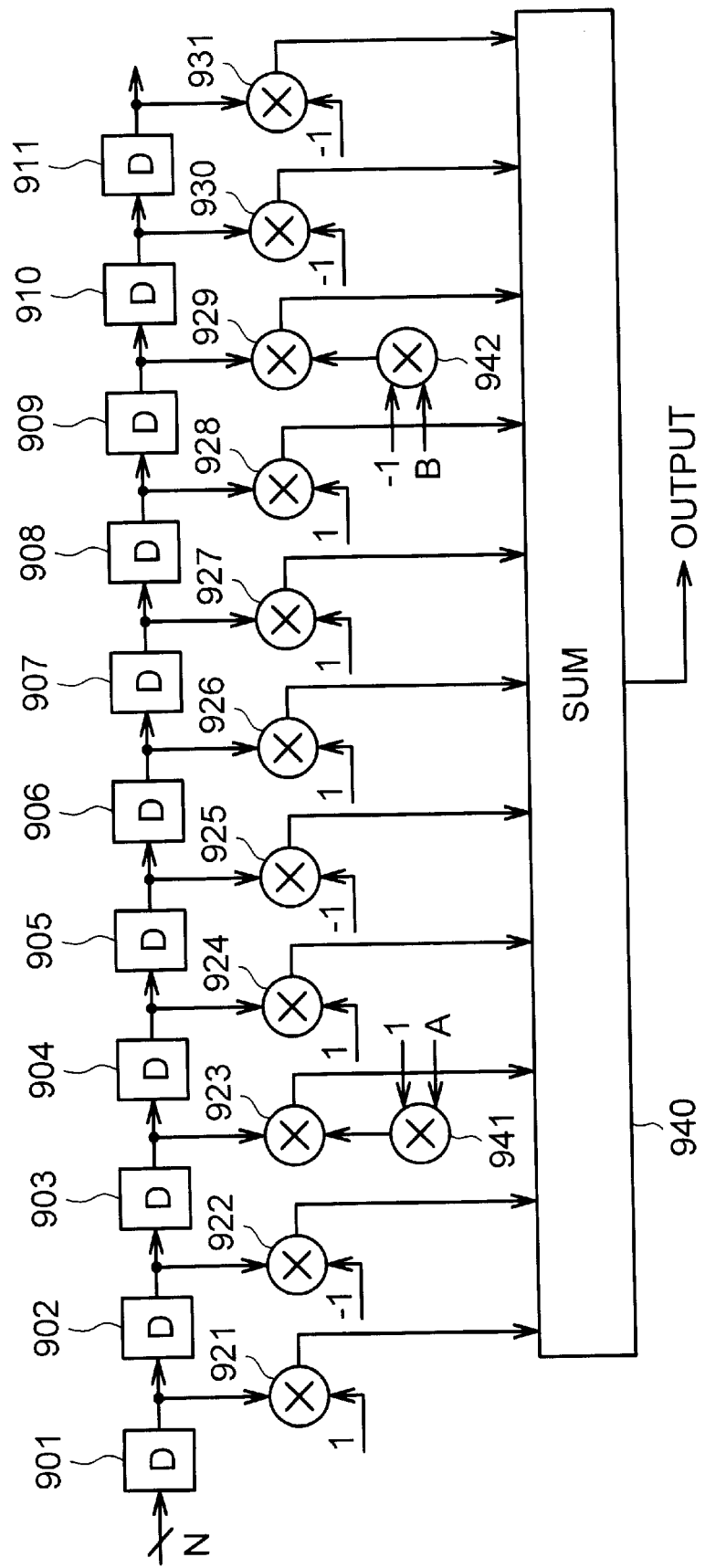
FIG. 69 shows a specific example of the correlator shown in FIG. 68.

FIG. 69 is a block diagram showing an example of the correlator shown in FIG. 68. Correlator 851 includes D type flipflop 901 to 911, multipliers 921 to 931 and summing circuit 940. D type flipflops 901 to 911 provide delay of 1 chip each to the input data, the data is multiplied by Barker code by multipliers 921 to 931, and the sum of the results is calculated by summing circuit 940, whereby correlation is obtained. Utilizing the result, correlation periods are synchronized by correlation synchronizing circuit 853 shown in FIG. 68, differential demodulation is performed by differential demodulating portion 854 and P/S conversion is performed by P/S convertor 855, whereby the transmitted data is demodulated.

Further, multipliers 941 and 942 are provided. Multiplier 941 multiplies the third bit of the Barker code by data A which is detected by correlation pattern detector 856 and fed back, and applies the result to multiplier 923. Multiplier 942 multiplies the ninth bit of the Barker code by the data B which is detected by correlation pattern detector 856 and fed back and applies the result to multiplier 929. Data A and B assume the value of 1 or 0.

When modulated using similar parameters as the prior art on the transmitting side, the correlation peaks are detected on the receiver side as repetition of 5 and 6 chips. On the receiver, when the correlation values are detected, there may be two possible cases. Namely, the data overlaps with the preceding data by 5 chips and overlaps the succeeding data by 6 chips (pattern I), or the data overlaps with the preceding data by 6 chips and overlaps with the succeeding data by 5 chips (pattern II). Therefore, correlation pattern detector 856 detects the pattern and feeds back the information to correlators 851 and 852. Correlation pattern detector 856 may be readily implemented by a counter, for example, which counts the chip clock from one correlation peak to another correlation peak. If the counted value is 6 clocks, it predicts that the next correlation value has pattern I, and feeds back A=1 and B=0 to correlators 851 and 852. If the counted number if 5 clocks, it predicts that the next correlation value has pattern II, and feeds back A=0 and B=1. When there is no correlation detected, the values are set to A=B=1.

FIG. 70 shows change in the received data at the receiver shown in FIG. 68. The digital data of the input data after conversion from IF to baseband are represented as RxI, RxQ, as shown in (a) and (b) of FIG. 70. The contents of data are similar to the transmission data. The data are correlated by correlators 851 and 852, resulting in Isum and Qsum, as shown in (c) and (d) of FIG. 70. More specifically, input data are delayed by D type flipflop 901 to 911 of correlators 851 and 852, the results are multiplied by multipliers 921 to 931 by a previously prepared Barker code, and respective sums are added by adder 940.

Meanwhile, correlation synchronizing circuit 853 generates a correlation synchronizing clock signal SCLK such as shown in FIG. 70 (e) which is in synchronization with correlation peak, utilizing the output from correlators 851 and 852. Differential demodulating portion 854 inputs, as data, such correlation peaks as shown in (f) and (g) of FIG. 70 to differential demodulating portion 854, utilizing the outputs from correlators 851, 852 and the correlation synchronizing clock signal SCLK. Differential demodulating portion 854 performs differential demodulation using the demodulated data and data preceding by one. More specifically, data such as shown in (h) and (i) of FIG. 70 are output and demodulated, based on the phase difference of the change in data. Further, the differentially demodulated data is P/S converted by P/S converter 855, and thus transmission data such as shown in FIG. 70(d) is demodulated. It can be understood that Isum and Qsum shown in (c) and (d) of FIG. 70 have constant absolute value.

Figure 71:
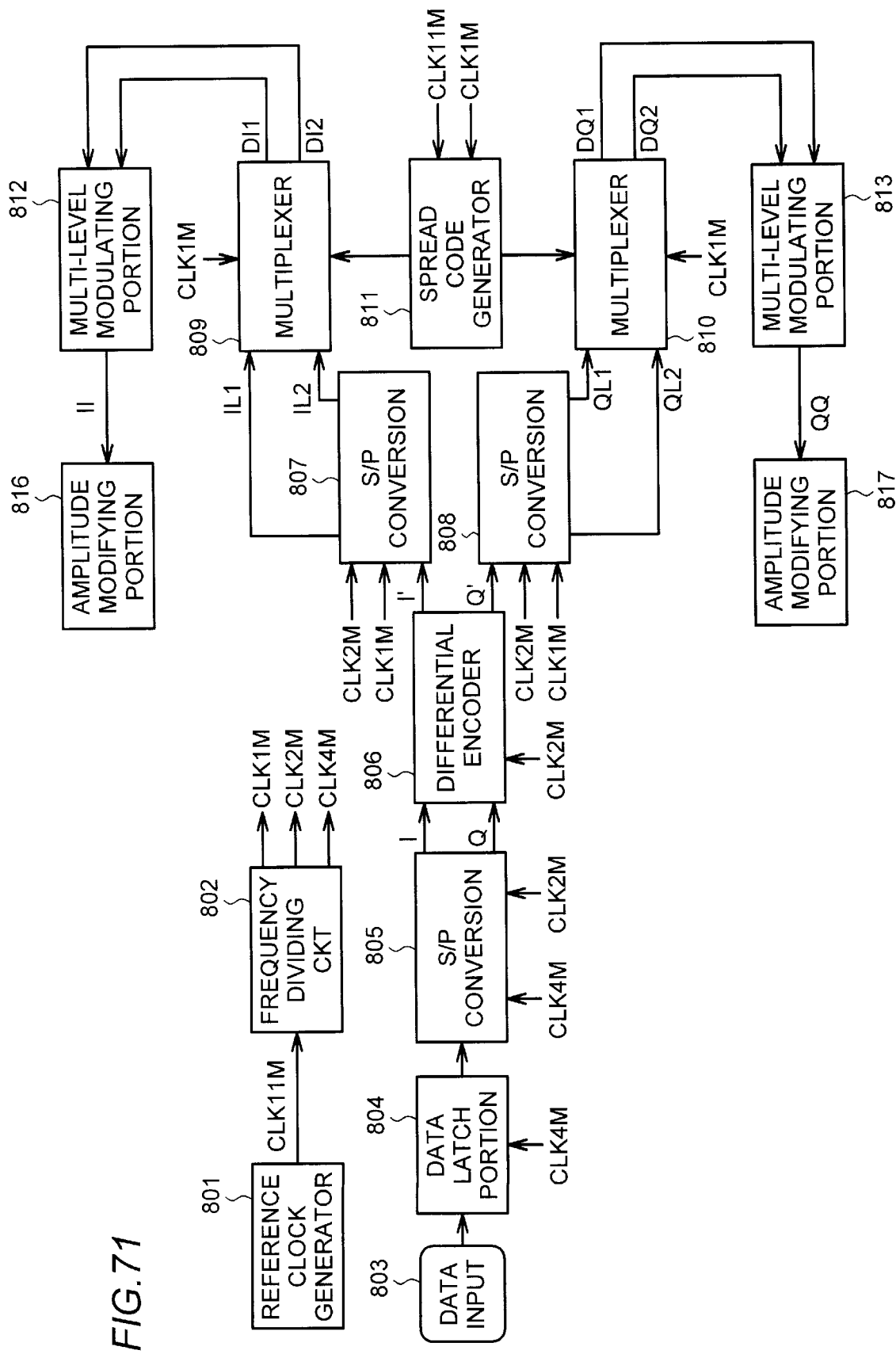
FIG. 71 is a block diagram of a transmitter showing the fifty-sixth embodiment of the present invention.

FIG. 71 is a block diagram of a transmitter in accordance with a fifty-sixth embodiment of the present invention. The transmitter/receiver shown in FIGS. 62 and 68 are adapted such that the correlation peak after despreading is ±10. The transmitter shown in FIG. 71 is adapted such that the correlation peak is ±12.

For this purpose, amplitude modifying portions 812 and 817 are provided on the output side of the multilevel modulating portions 812 and 813.

Figure 72:
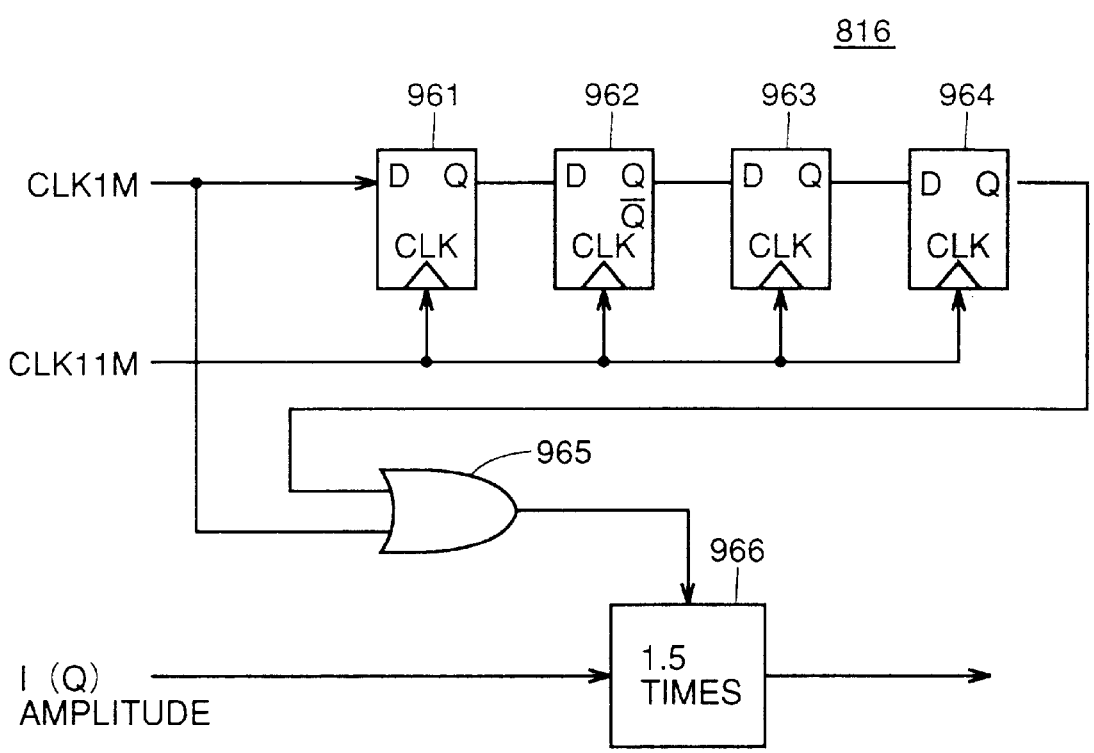
FIG. 72 shows a specific example of amplitude modifying portion shown in FIG. 71.

FIG. 72 shows a specific structure of the amplitude modifying portion shown in FIG. 71.

Amplitude modifying portion 816 includes D type flipflops 961 to 964, an OR gate 965 and a 1.5 times amplitude circuit 966. D type flipflops 961 to 964 delay the clock signal CLK1M by CLK11M. OR gate 965 operates the 1.5 times amplitude circuit 966 when clock signal CLK1M is input and is delayed by 4 chip clocks. The 1.5 times amplitude circuit 966 amplifies the input amplitude to 1.5 times.

The operation of the transmitter shown in FIG. 71 will be described. Here, parameters and the like for modulation are similar to those of the prior art example. First, by reference clock generator 801 and frequency dividing circuit 802, four different clock signals are generated. In order that the clock and data to the transmitter are synchronized, data and clock signal CLK4M are synchronized at data latch portion 804. For QPSK modulation, S/P conversion to two systems is performed by S/P converter 805. In this stage, data is in synchronization with clock signal CLK2M, and I and Q signals are output from S/P converter 805. In order to enable differential demodulation in the receiver, differential encoding is performed by differential encoder 806, and I' and Q' signals are output. For delay multiplexing, the data which has been separated into two systems are again S/P converted by S/P converters 807 and 808, whereby each data is divided into two systems. In this stage, the data is synchronized with clock signal CLK1M, which data are represented by IL1, IL2, QL1 and QL2. The data are spread by Barker code by multiplexers 809 and 810, and IL2 and QL2 are delayed by 5 chips. By multilevel modulating portions 812 and 813, multilevel modulation similar to that of the prior art is performed. More specifically, if the input data pair is (1, 1), A is output, if the pair is (1, −1) or (−1, 1), 0 is output, and if the pair is (−1, −1), −A is output. As a result, if the sum of the amplitudes of two waves to be multiplexed is 2, A is output, if the sum is negative, 2, −A is output, and if the sum is 0, 0 is output.

The amplitude information from multilevel modulating portions 812 and 813 are applied to amplitude modifying portions 816 and 817. In amplitude modifying portions 816 and 817, clock signal CLK1M is delayed by clock signal CLK11M by D type flipflops 961 to 964. At the timing when the clock signal CLKLM is input and at the timing of said clock delayed by 4 chip clock, OR gate 965 operates the 1.5 times amplitude circuit 966, whereby the input amplitude is widened to 1.5 times.

FIG. 73 shows the pattern of transmission data in accordance with the fifty-sixth embodiment. Assuming that A=2, it can be understood that the phase after despreading is constant at ±12.

Figure 74:
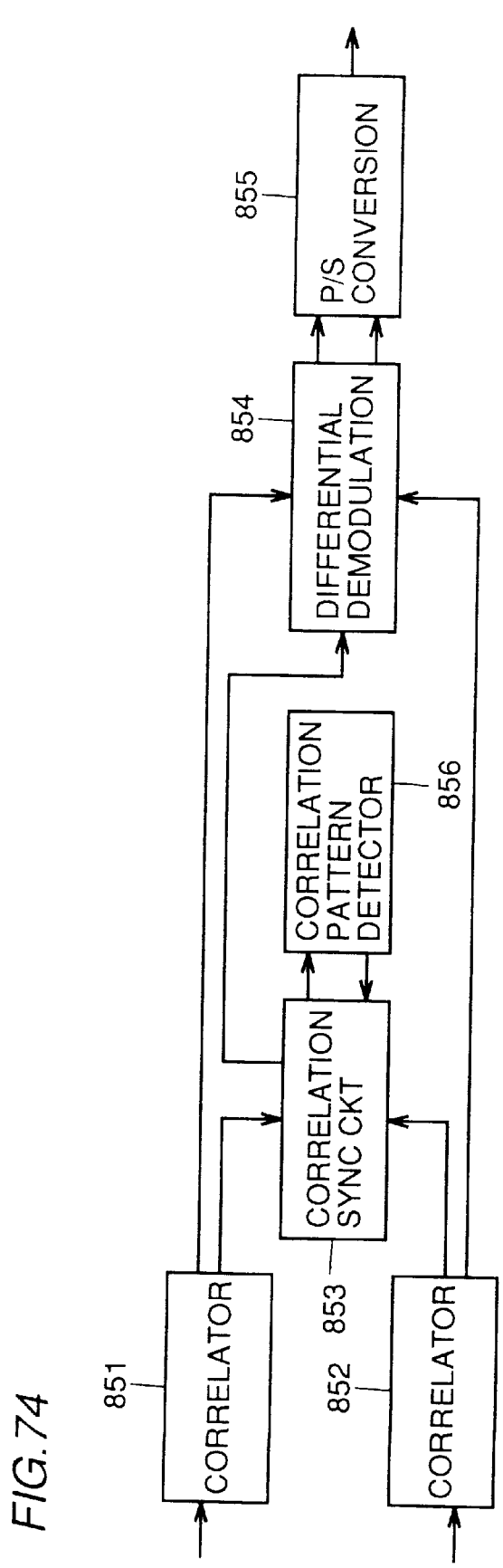
FIG. 74 is a block diagram of a receiver in accordance with a fifty-seventh embodiment of the present invention.

FIG. 74 is a block diagram of a receiver in accordance with a fifty-seventh embodiment of the present invention. In the fifty-sixth embodiment, the phase after despreading is made ±12 by the operation of the transmitting side. In the present embodiment, the phase after despreading is set to ±12 on the receiving side. Here, the structure of the transmitter is the same as the conventional one, and parameters for modulation are also the same as the prior art.

Figure 75:
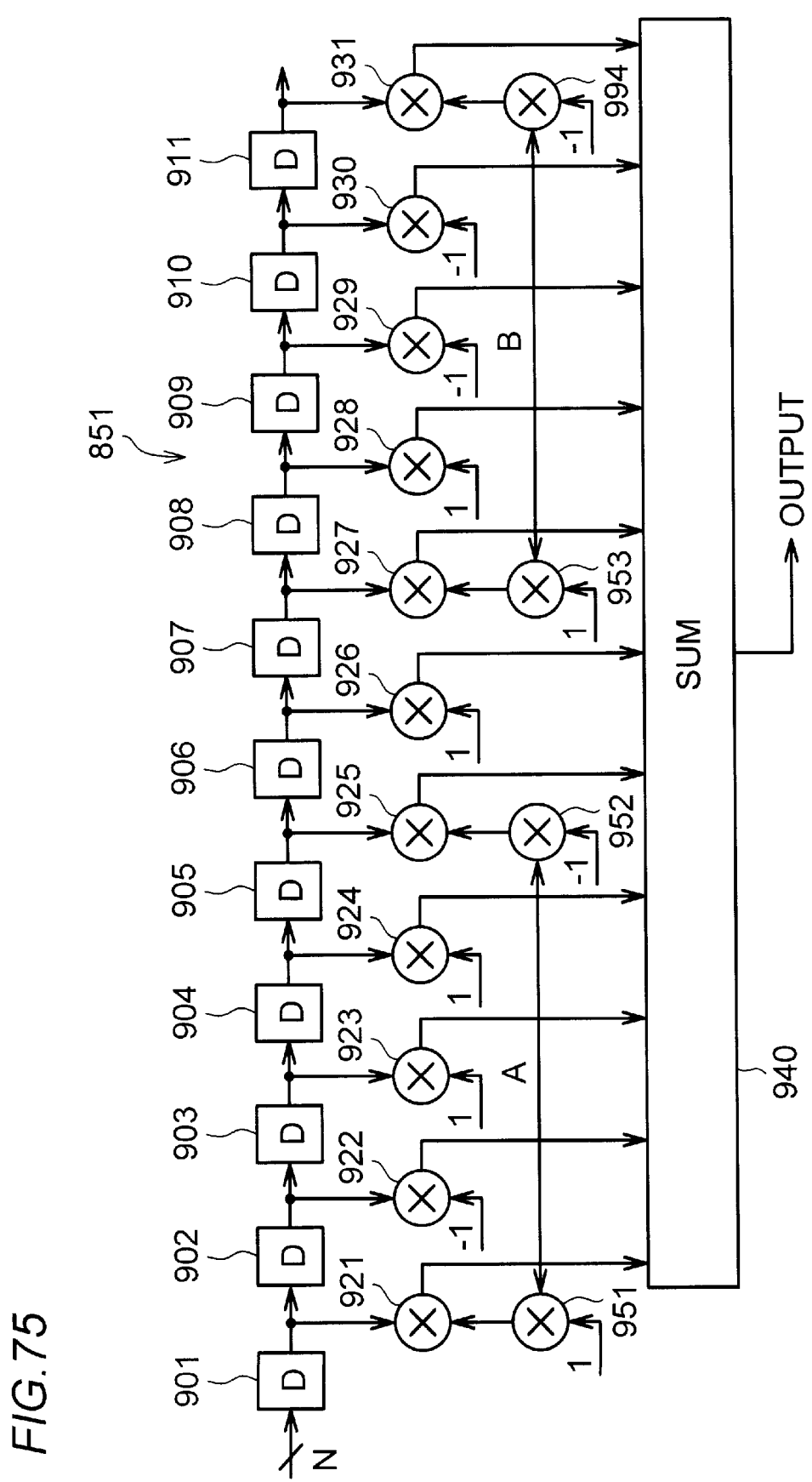
FIG. 75 is a specific block diagram of the correlator shown in FIG. 74.

FIG. 75 shows a structure of a correlator shown in FIG. 74. Referring to FIG. 75, the correlator is structured in the similar manner as shown in FIG. 69. However, it includes, in place of multipliers 941 and 942, multipliers 951 to 954. The multipliers 951 to 954 multiply data A or B detected and fed back by correlation pattern detector 856 by the Barker code, and apply the results to multipliers 921, 925, 927 and 931. Data A or B assume the value of "1" or "1.5."

The operation of the receiver shown in FIG. 74 will be described. When modulation is performed using similar parameters as in the prior art on the transmitting side, the correlation peaks are detected as repetition of 5 chips and 6 chips on the receiver. When the correlation value is detected in the receiver, there may possibly be two patterns of data overlapping, that is, the data overlaps by 5 chips with the preceding data and by 6 chips with the succeeding data (pattern I) and the data overlaps with the preceding data by 6 chips and 5 chips with the succeeding data (pattern II). Therefore, correlation pattern detector 856 detects the pattern and feeds the information back to correlators 851 and 852. In this embodiment also, the correlation pattern detector 856 may be implemented by a counter, for example. The chip clock from one correlation peak to another correlation peak is counted, and if it is 6 clocks, it is predetected that the next correlation value has pattern I, so that A=1.5 and B=1 are fed back. If the count number is 5 clocks, it is predetected that the next correlation value has pattern II, and A=1 and B=1.5 are fed back. When there is not a correlation detected, the values are set to A=B=1. In accordance with this data, multipliers 951 to 954 change the coefficient of multiplication applied to multipliers 921, 925, 927 and 931.

FIG. 76 shows changes in the reception data in accordance with the present embodiment. In FIG. 76, it is assumed that the received data is the same as the data of the prior art example. As shown in (c) and (d) of FIG. 76, the absolute value becomes constant at the time points where Isum and Qsum are output.

Figure 77:
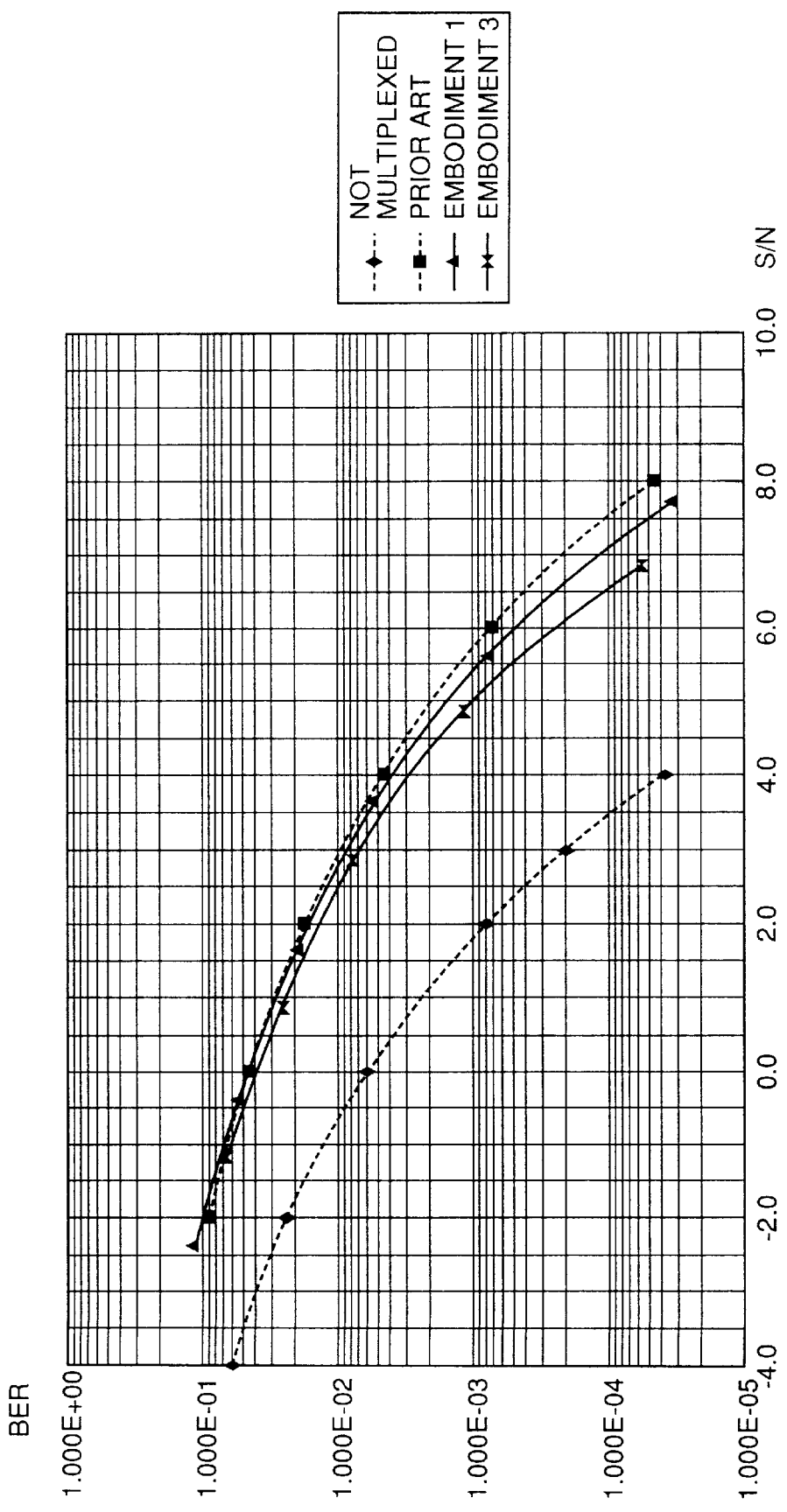
FIG. 77 shows how the error rate characteristic is improved by the present invention.

FIG. 77 is a graph showing error rate characteristic of the receiver in accordance with the fifty-fourth and fifty-sixth embodiments of the present invention. As is apparent from FIG. 77, error rate characteristics are improved in the prior art example, the fifty-fourth and fifty-sixth embodiments. This is because phase variation is suppressed after demodulation in accordance with the present invention. It is apparent that similar effects can be obtained in the fifty-fifth and fifty-seventh embodiments.

Figure 78:
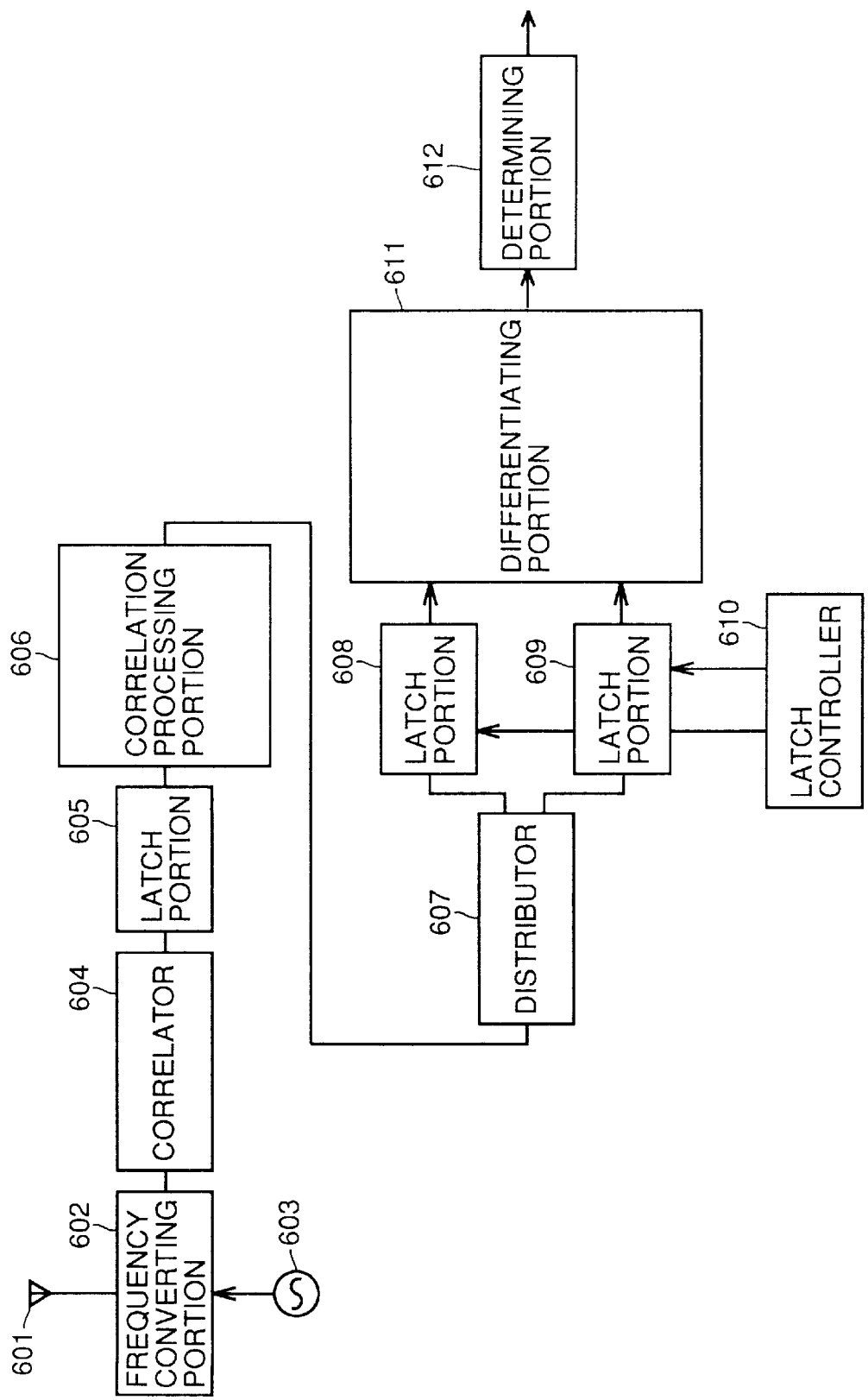
FIG. 78 is a block diagram of a receiver showing a fifty-eighth of the present invention.

FIG. 78 shows a receiving system of the fifty-eighth embodiment of the present invention. As for the transmitting system, the one shown in FIG. 1 is used. Referring to FIG. 78, the signal received at antenna 601 has its frequency converted by frequency converting portion 602 based on a local oscillation signal from local oscillator 603 to a baseband signal, and correlated by correlator 604. The correlation is latched at latch portion 605 at a timing of a correlation spike. Thereafter, degradation caused by auto-correlation is cancelled by correlation processing portion 606, the correlated output is applied to distributor 607 and distributed, and latched at latch portions 608 and 609 in accordance with a control signal from latch controller 610. Here, in accordance with the specific example above, the outputs are latched with 2 chips or 3 chips at latch portions 608 and 609. Output from latch portions 608 and 609 are differentiated by differentiating portion 611, and thereafter determined at determining portion 612 and demodulated.

Figure 79:
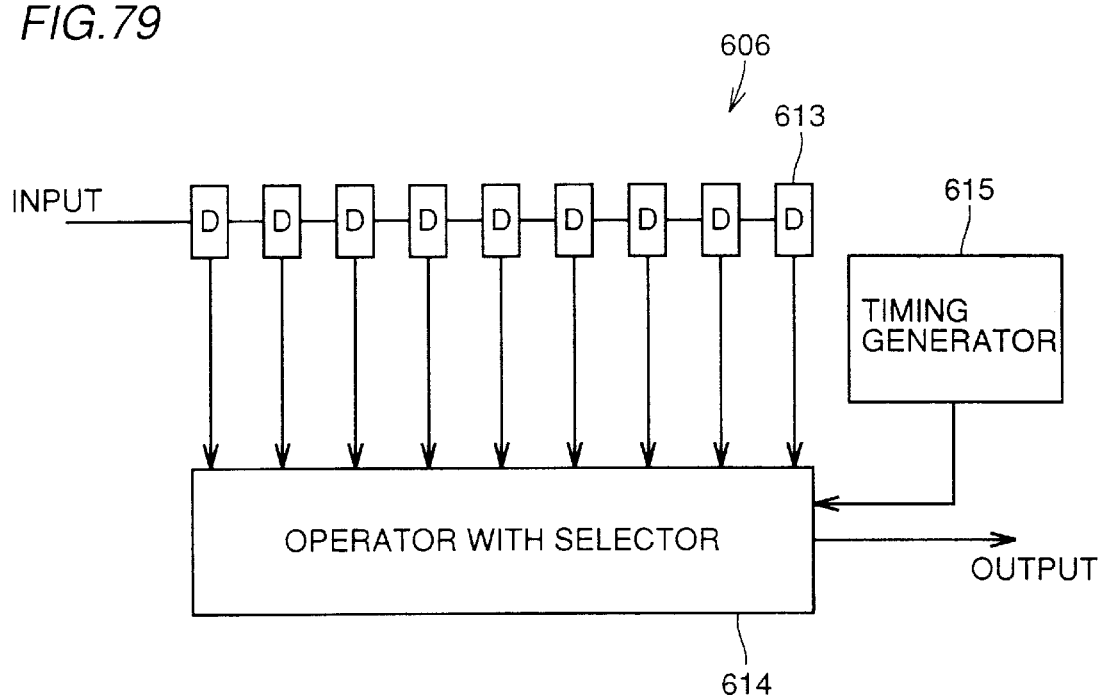
FIG. 79 is a block diagram of the correlation processing portion shown in FIG. 78.

FIG. 79 is a block diagram showing a specific example of the correlation processing portion shown in FIG. 78. The correlation processing portion 606 shown in FIG. 79 is an example where multiplication number is 5. Though only one system is shown in FIG. 79, two systems are necessary to implement the example shown in FIG. 78.

The input signal is input to a shift register 613 in accordance with the number of input bits, and with respect to the correlation spike of the desired data demodulation timing, four preceding and four succeeding correlation spikes are held. These signals are operated based on the timing signal generated from timing generator 615 by operator with selector 614. Timing generator 615 times the input and output signals, in accordance with a signal of a correlation synchronizing circuit, not shown.

Figure 80:
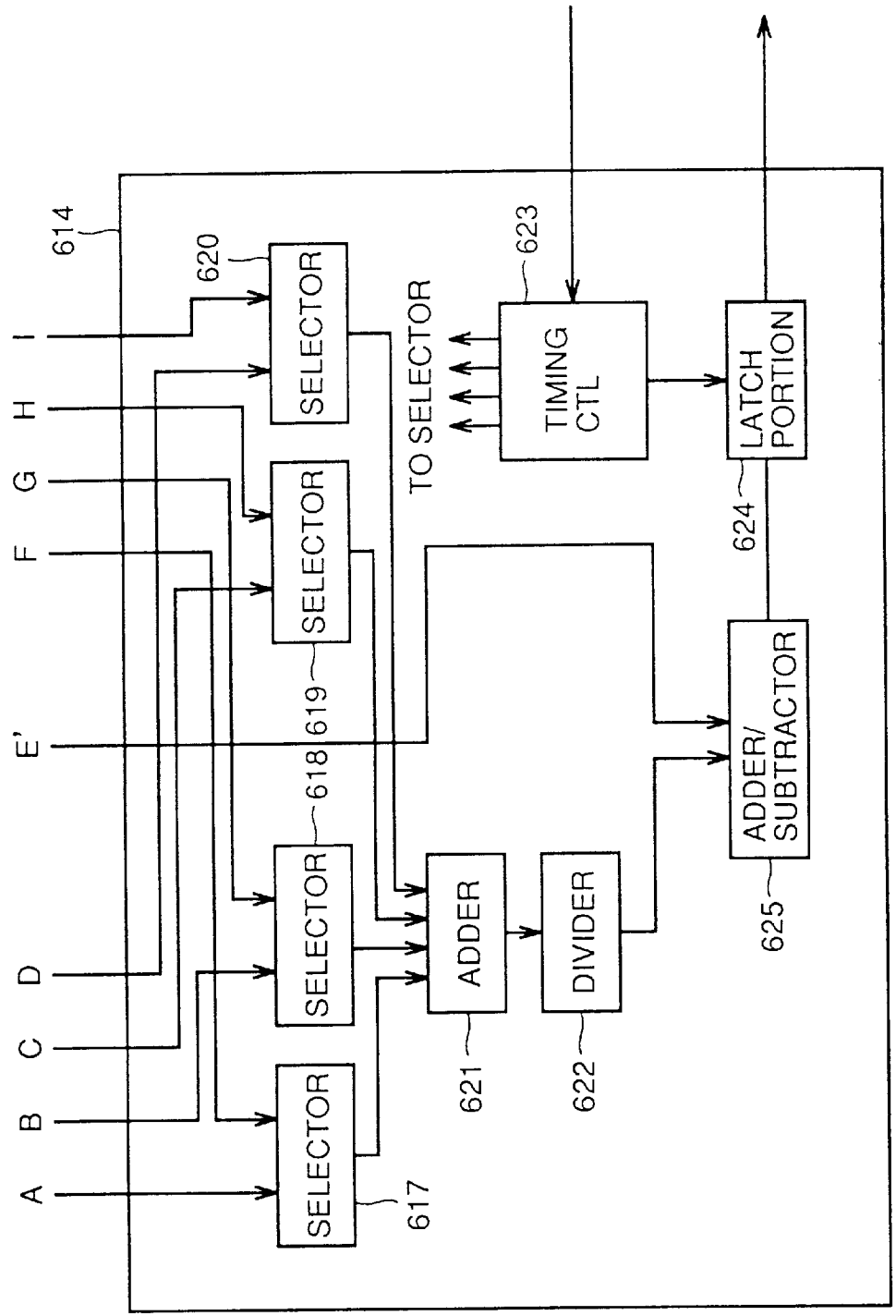
FIG. 80 is a specific block diagram of an operator with selector shown in FIG. 79.

FIG. 80 shows a specific structure of the operator with selector 614 shown in FIG. 79. Referring to FIG. 80, the operator with selector 614 includes selectors 617 to 620, an adder 621, a divider 622, a timing controller 623, a latch portion 624 and an adder/subtractor 625.

Figure 81:
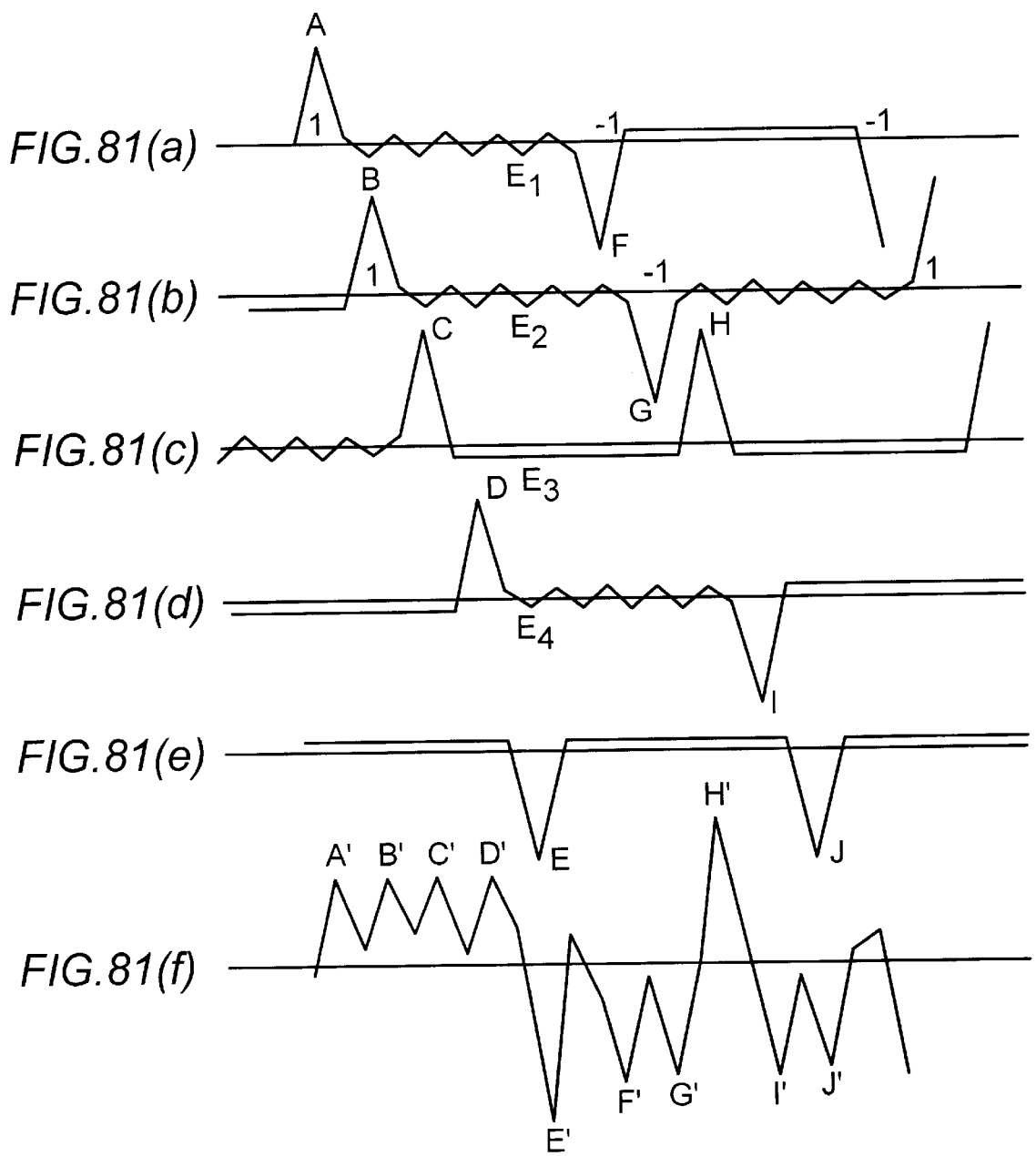
FIG. 81(a)–(f) show correlated outputs at the time of multiplexing in accordance with the fifty-eighth embodiment of the present invention.

FIG. 81 is a timing chart showing the operation of the operator with selector shown in FIG. 80. Referring to FIG. 81, assume that the correlation spike to be obtained is the signal E of FIG. 81. There are four side lobes varying the value of the correlation spike of the signal on both sides of the desired one of the signals 1 to 4. More specifically, A and F of the signal shown by (a) of FIG. 81, B and G of the signal shown by (b) of FIG. 81, C and H of the signal shown by (c) of FIG. 81 and D and I of the signal shown by (d) of FIG. 81. Dependent on the combination (EVEN, ODD) of these four signals, side lobe (E1, E2, E3, E4) of auto-correlation of the timing of E are determined, and as a result, these signals are added to E, resulting in the signal E' of (f) of FIG. 81. Signals E1, E2, E3 and E4 will be described in greater detail.

Figures 82, 83:
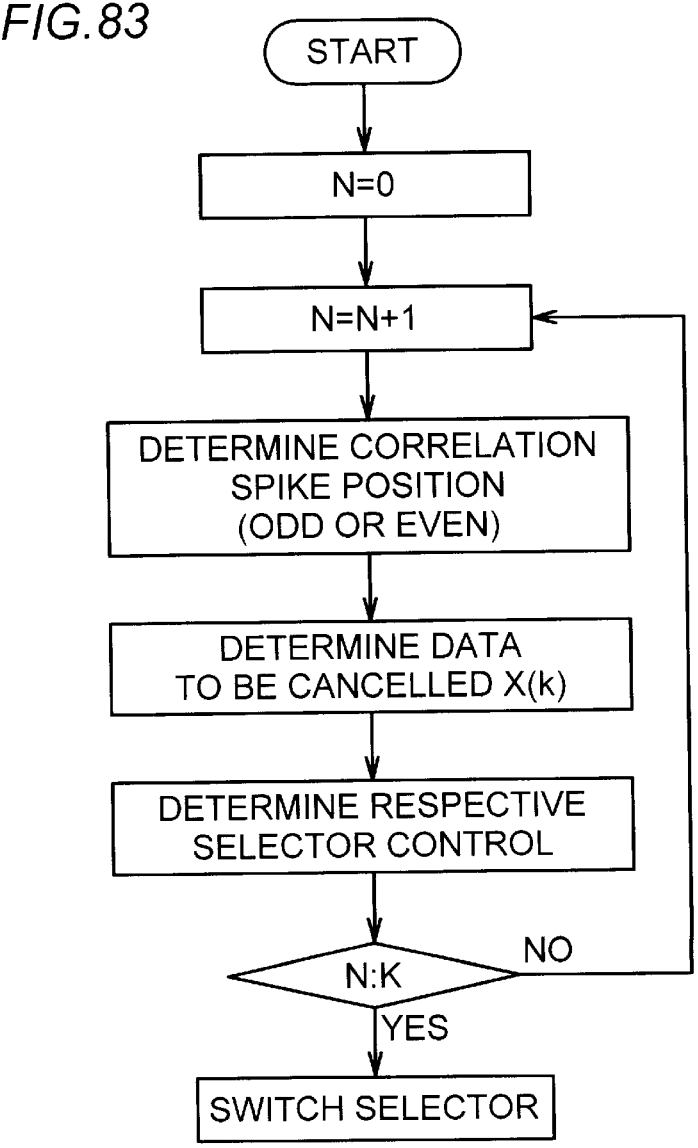
FIG. 82 shows auto-correlation characteristic of Barker code.
FIG. 83 is a flow chart showing the timing for switching the selector shown in FIG. 80.

FIG. 82 shows auto-correlation characteristic of Barker code. Here, there are four possible data combination, that is, (1, 1), (−1, −1), (1, −1), (−1, 1). These provide mutually different auto-correlation values. Here, EVEN represents even correlation and ODD represents odd correlation. Let us consider delay multiplication. Though the signals are spread and multiplexed, superposition is maintained in spread spectrum. Therefore, when the multiplexed signals are despread, each correlation value also has superposition. Namely, when multiplexed, superposition of respective auto-correlations can be obtained as the output from the correlator. In other words, portions not correlated, other than 11 or −11, referred to as auto-correlation side lobes has undesirable influence.

More specifically, when the data preceding and succeeding the one of which auto-correlation is to be determined are referred to as preceding data and succeeding data, respectively, at a timing of correlation spike, after odd numbered chips, the auto-correlation has the absolute value of 1 and the sign opposite to the preceding data, regardless of the succeeding data. After odd chips, the auto-correlation has the absolute value of 1 and the sign opposite to that of the succeeding data, regardless of the preceding data.

This will be considered with respect to signal E1. E1 is a signal which occurs after even numbered chips (8 chips) from the correlation spike A. Therefore, the auto-correlation is −1, since the sign thereof is opposite to the data of A. As for signal E2, it occurs after even numbered chips (6 chips) from the correlation spike of B. Therefore, it has opposite sign to data B, and hence the auto-correlation will be −1. As for E3, E3 occurs after even numbered chips from the correlation spike of C. Therefore, the odd-correlation will be −1, with the sign being opposite to that of the data C. As for E4, it is a signal occurring after even numbered chips from the correlation spike of D. Therefore, auto-correlation is −1, with the sign opposite to the data D.

From the foregoing, when a signal E is to be restored from the signal E', E1, E2, E3 and E4 must be subtracted from E'. That means, the value 1/11 should be subtracted, using different sign components of A, B, C and D. It is the equivalent of the following operation. Namely, A, B, C and D are added and the sum is processed to 1/11, and the result is added to E'.

Referring again to FIG. 80, signals A and F are input to selector 617, B and G are input to selector 618, C and H are input to selector 619, and signals D and I are input to selector 620. In the above described example, selectors 617 to 620 select signals A, B, C and D. Thereafter, signals A, B, C and D are added by adder 621, the sum is subjected to division of 1/11 by divider 622, and the result is added to E' by adder/subtractor 625, latched in latch portion 624 and output.

In the example shown in FIG. 81, the signals are offset each by 2 chips. Therefore, preceding data only are used. However, when the number of chips is an odd number, the succeeding data is to be used. For example, consider F as a reference. Since B and F are apart by 9 chips, the succeeding data, that is, G should be used. In this manner, whether the preceding data is to be used or the succeeding data is to be used depends on the relation of delay of the desired data and overlapping four preceding and four succeeding data, respectively.

FIG. 83 is a flow chart showing how the timing for switching the selector shown in FIG. 80 is determined. Referring to FIG. 83, first, N is initialized to N=0, and then N is incremented, as N=N+1. By correlation spike position determining process, whether the interval is odd numbered chips or even numbered chips is determined, so as to determine whether the preceding data or succeeding data is to be used in the next process. Accordingly, it is determined how each of the selectors 617 to 620 should be switched. This operation is performed for all the selectors, thereafter selectors are actually switched.

The timing is determined by the delay and multiplexing process of the present reception data, using an external timing generator. The information related to delay and multiplexing is determined dependent on whether the delay corresponds to even numbered chips or odd numbered chips, as the number of multiplexing and the amount of delay are determined uniquely by the system. Determination of selectors 617 and 620 are performed as shown in the flow chart of FIG. 83. However, the determining process need not be performed every time. For example, the amount of delay when the number of multiplexing is 5 will be a fixed value determined by the system. Therefore, actually, a circuit for switching the selectors 617 to 620 in a predetermined order repeatedly may be effective.

Figure 84:
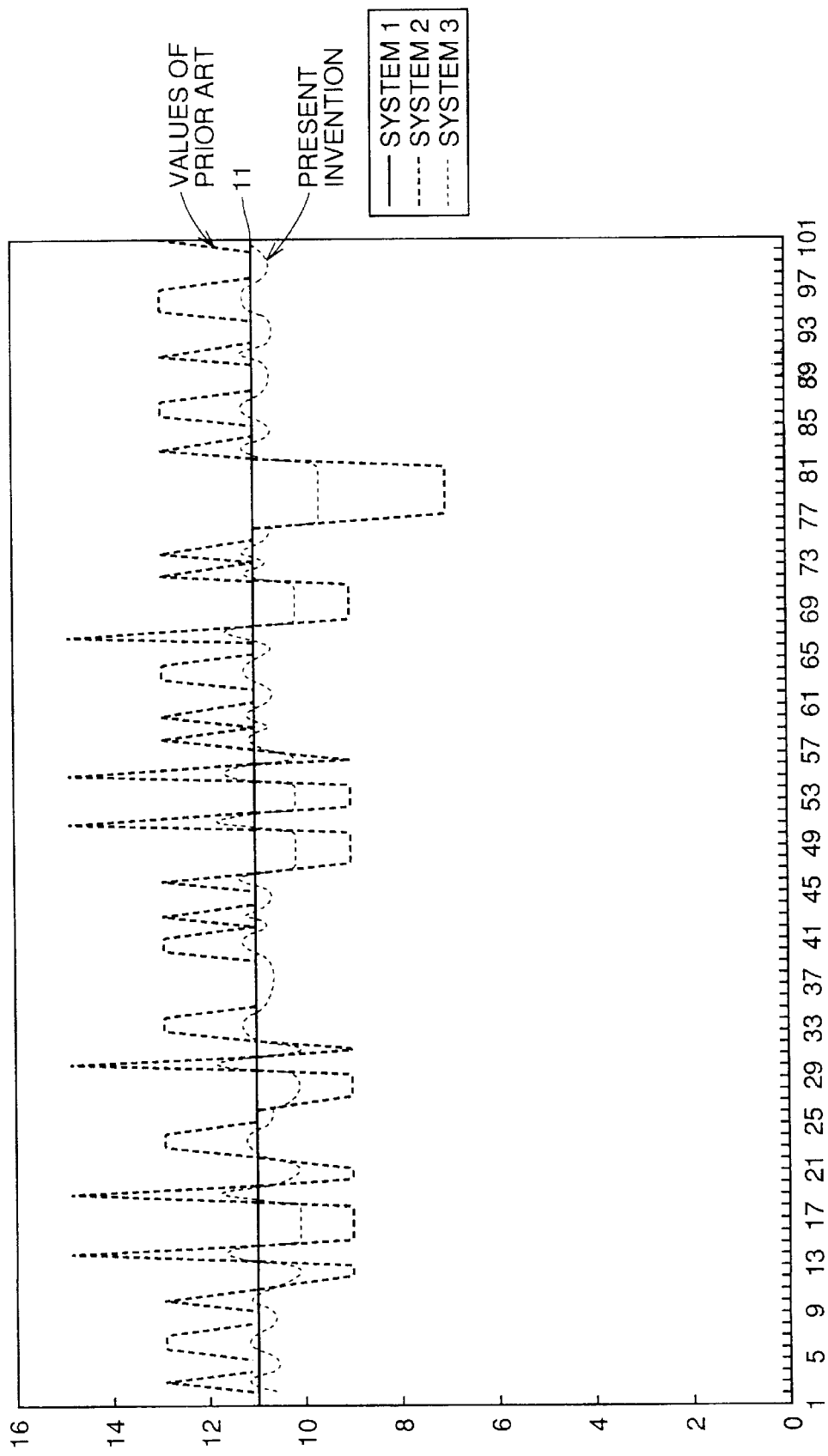
FIG. 84 shows an absolute value of correlated output of correlation spike in the fifty-eighth embodiment of the present invention..

FIG. 84 shows absolute values of correlated outputs of the correlation spike when processed in the above described manner. As is apparent from FIG. 84, the correlated outputs of correlation spike are closer to 11 as compared with the prior art example. Here, the value is not exactly 11, since data used for the addition of the preceding and succeeding data are actually not A, B, C and D but A', B', C' and D', which include errors, as these signals themselves vary from 11. An application of the present invention to DQPSK will be described.

Figure 85:
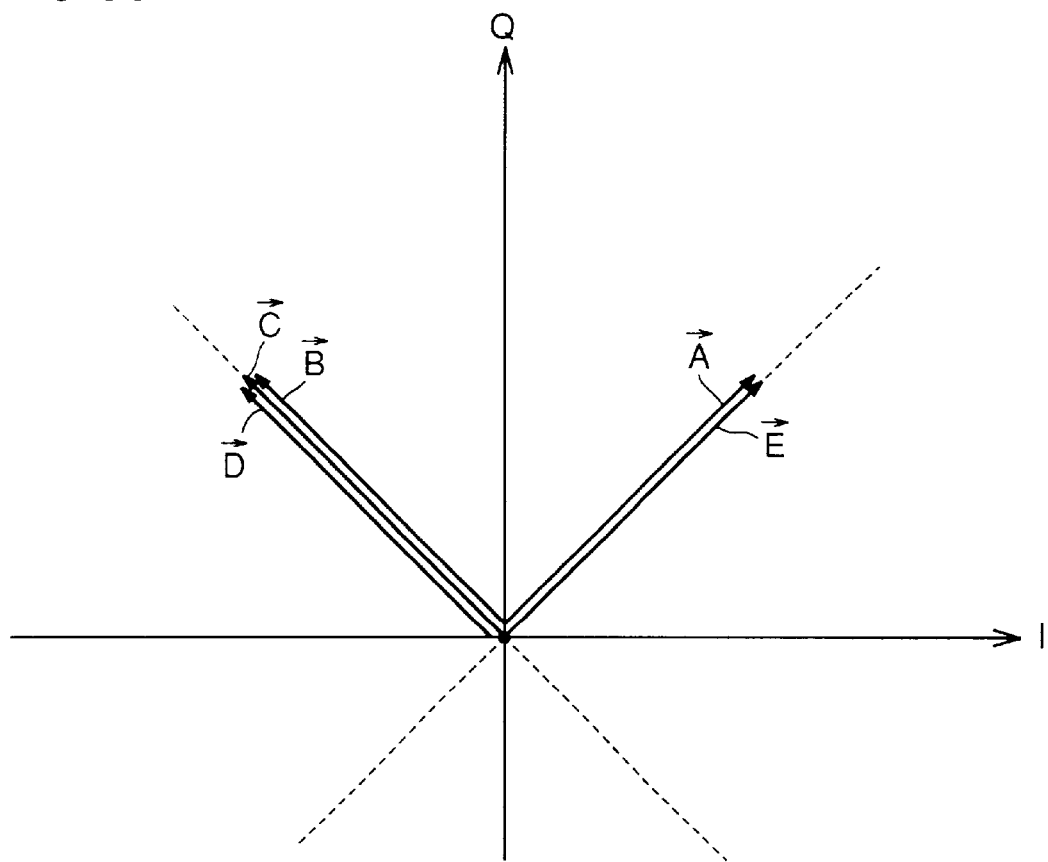
FIG. 85 shows a vector on a phase plane in accordance with the fifty-eighth embodiment of the present invention.
Figure 86:
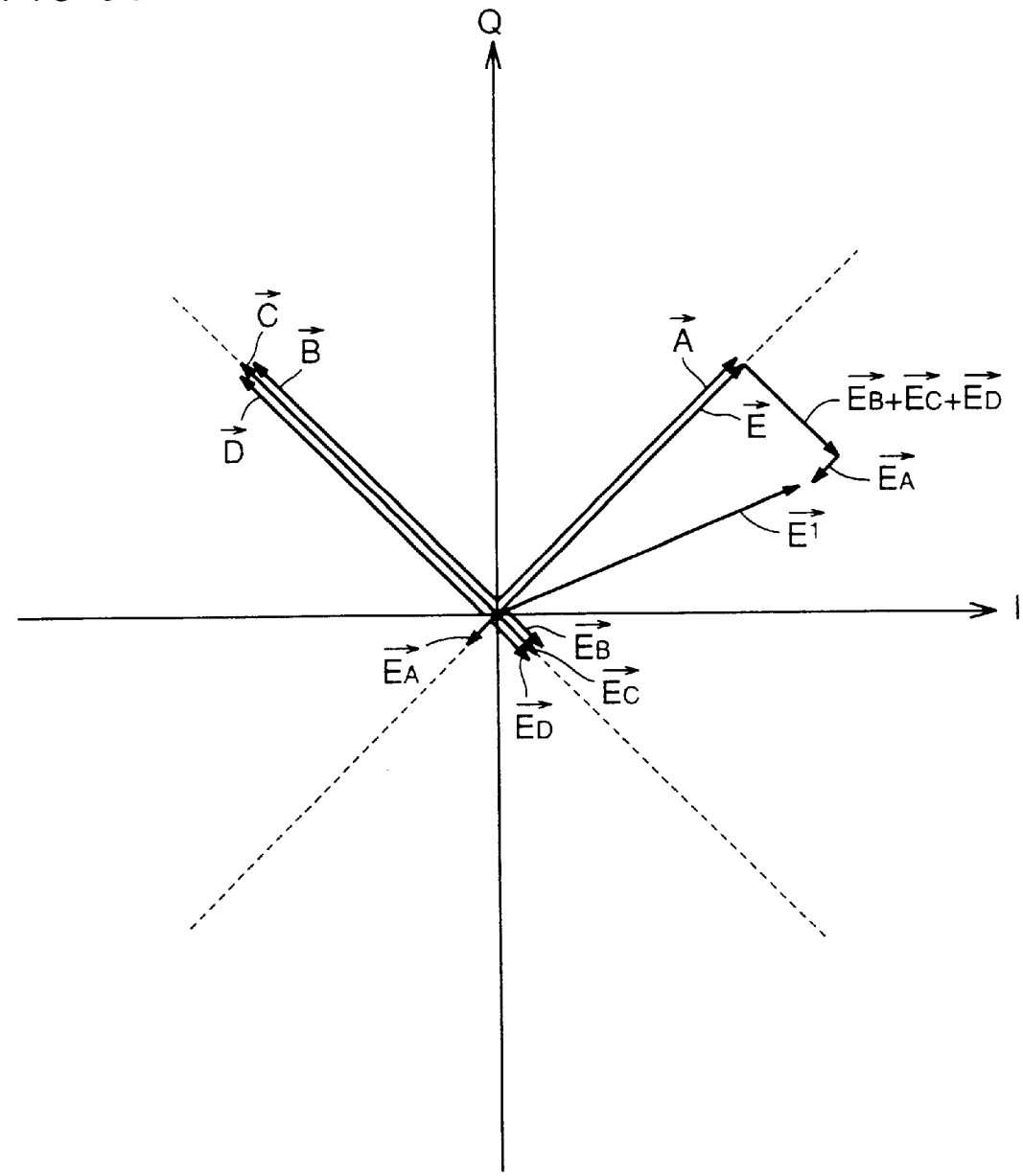
FIG. 86 shows a vector on a phase plane in accordance with the fifty-eighth embodiment of the present invention, showing vector change at the time of multiplexing.

FIG. 85 shows vectors on a phase plane illustrating the principle of the present invention. FIG. 86 shows change in vectors at the time of multiplexing.

Assuming that there is not an influence of auto-correlation side lobes, data will be represented by vectors A, B, C, D and E, as shown in FIG. 85. Actually, there are auto-correlation side lobes, and therefore, the signals are as shown in FIG. 86. Here, it is assumed that each delay includes even numbered chips so that only the preceding data has an influence, as in the above described example. For simplicity of description, it is assumed that the vectors A, B, C and D have the outputs of 11, and variation of each vector is neglected. The vectors generated from respective vectors A, B, C and D with the influence of auto-correlation side lobes are EA, EB, EC and ED, the composite vector of which with the vector E appears as the vector E'.

With respect to I and Q axes, A is (11, 11) and B, C and D are each (−11, 11). Therefore, vectors generated from the side lobes thereof will be (−1, −1) and (1, −1). Accordingly, I and Q can be operated independent from each other as shown in FIG. 78, and it can be understood that vector E can be restored from vector E' by independent operations of I and Q components.

Figure 87:
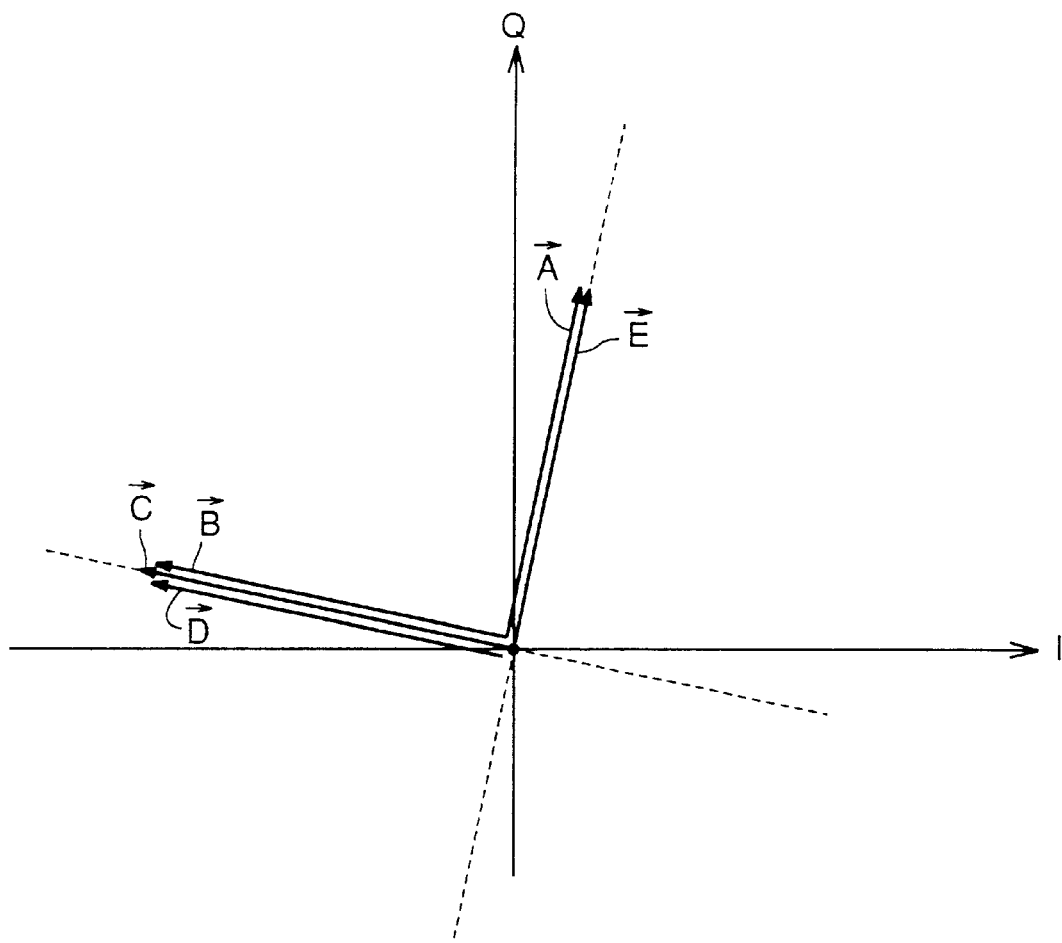
FIG. 87 shows a vector on a phase plane used in the fifty-eighth embodiment of the present invention, where the phase plane is rotated.
Figure 88:
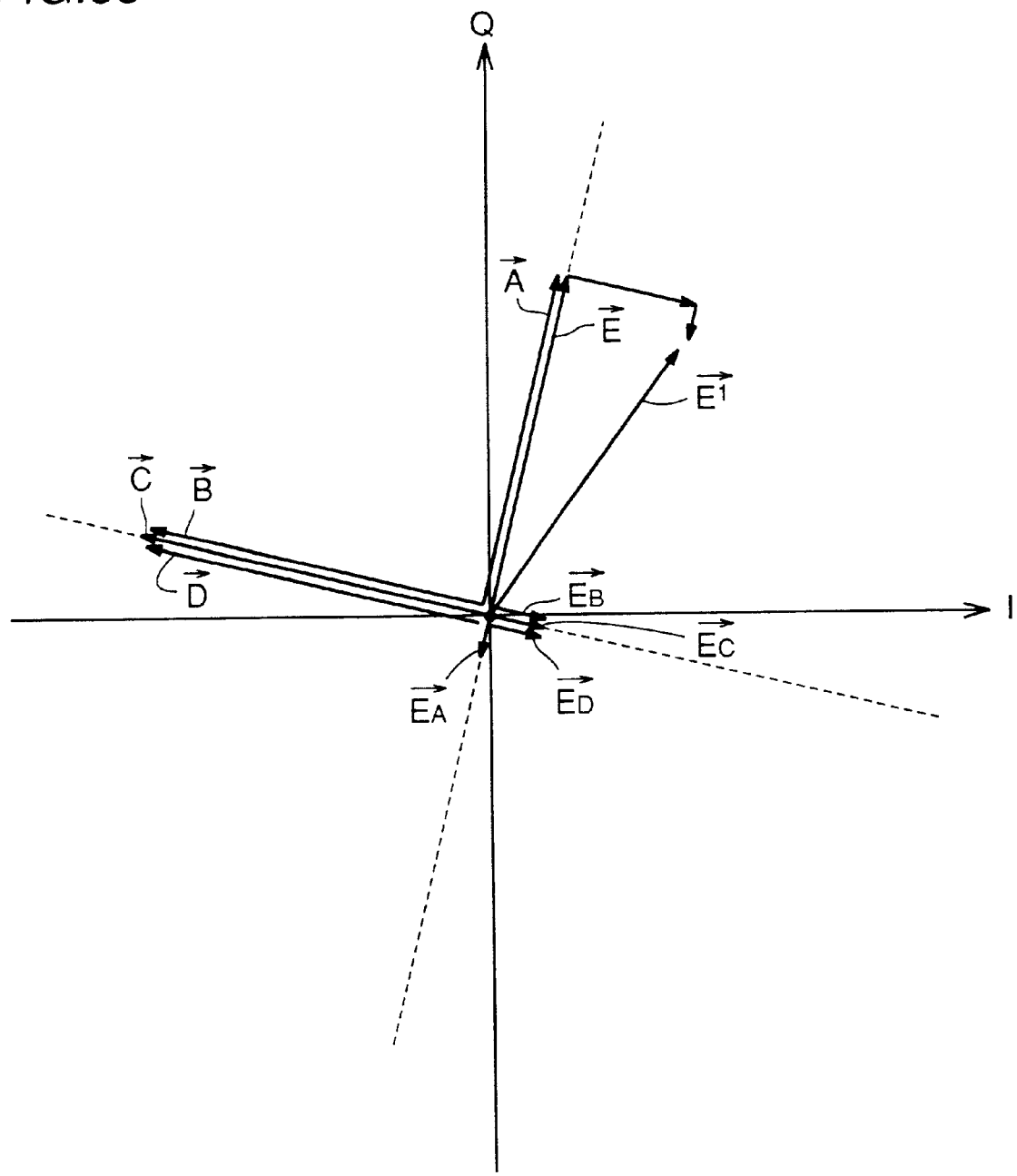
FIG. 88 shows vector change at the time of multiplexing when the phase plane used in the fifty-eighth embodiment of the present invention is rotated.

FIG. 87 shows vectors on a phase plane in accordance with fifty-eighth embodiment of the present invention with the phase plane rotated. FIG. 88 shows changes in vectors at the time of multiplexing with the phase plane rotated. FIG. 87 corresponds to FIG. 85 and FIG. 88 corresponds to FIG. 86. This example corresponds to reception in an asynchronous system with the phase plane rotated.

In the examples shown in FIGS. 87 and 88, though the signal axis is rotated, it can be understood that it is on the same axis as A, B, C and D when viewed as a vector. In vector operation, when the vectors are on the same axis, vectors EA, EB, EC and ED can be obtained by performing division of 1/11 and changing the sign for the I and Q axes independently. Therefore, the influence of auto-correlation side lobes can be cancelled in the circuitry shown in FIGS. 78 to 80.

Figure 89:
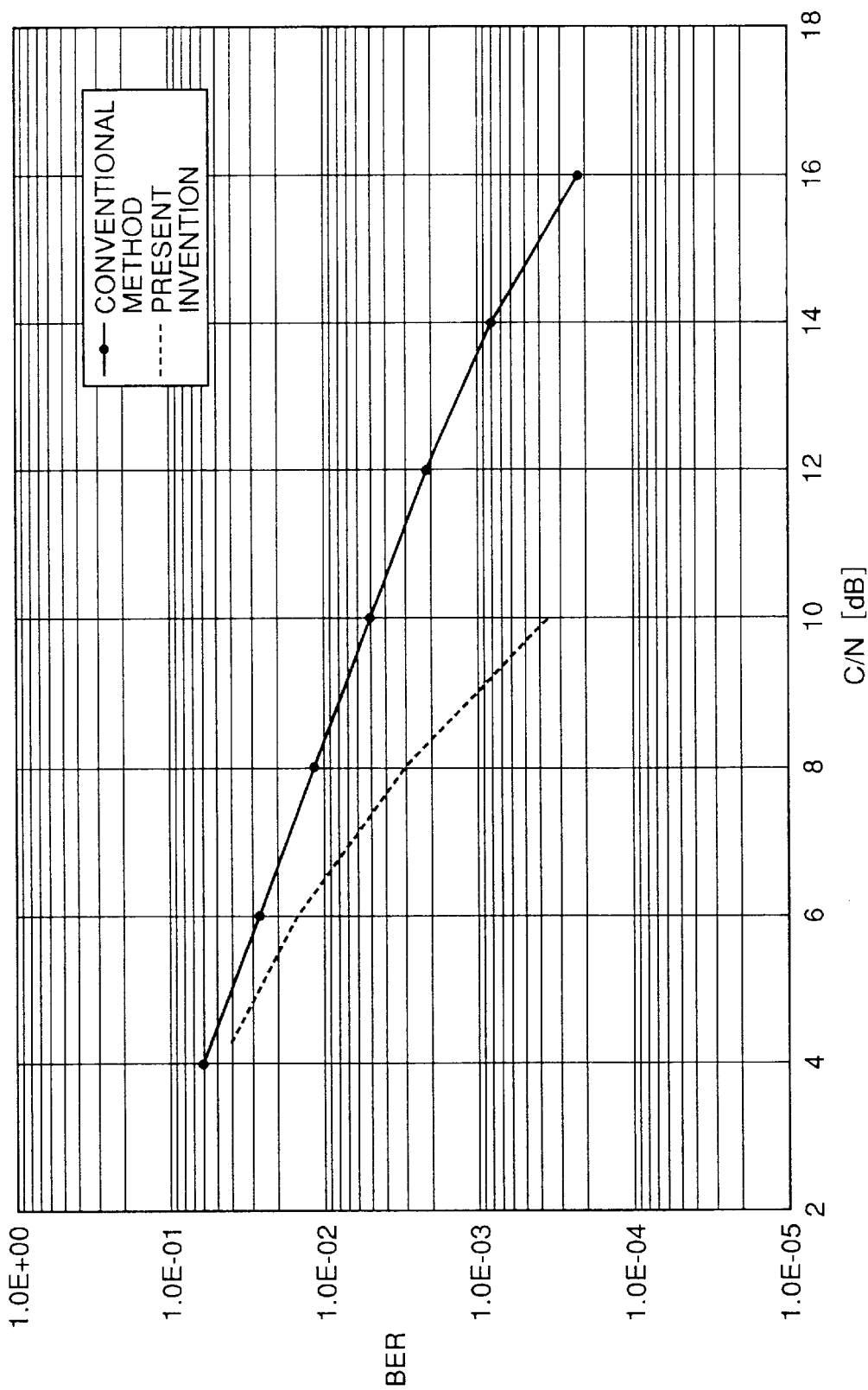
FIG. 89 shows improvement of error rate when the fifty-eighth embodiment of the present invention is implemented.

FIG. 89 shows improvement in error rate of the fifty-eighth embodiment of the present invention. The difference between the conventional example and the present invention is calculated by simulation in a DQPSK system. The abscissa represents C/N and the ordinate represents error rate. By an embodiment of the present invention, it can be understood that improvement of 6 dB has been attained near the point where BER=1.0 E-04. In the present embodiment, the process utilizes the fact that the auto-correlation side lobe is determined only by the preceding or succeeding data. However, a case where the auto-correlation sidewall is determined not only by one of the preceding and succeeding data but it is determined by the combination of the preceding and succeeding data will be considered. Assume that vector of F represents succeeding data with respect to the vector of A. For each of four possible vectors of F, the vector to be cancelled differs. Therefore, the vector must be calculated. In that case, the vector may not be on the same axis as A vector. Therefore, the vector to be cancelled must be calculated based on the vectors A and F. If the signal axis is not specified as in an asynchronous system, it is necessary to estimate and find the axis, which makes the process more complicated.

Similarly, if the axis has a spread because of noise, the operation becomes difficult. However, according to an embodiment of the present invention, what is necessary is only the operation on the axis A, and therefore, the operation can be implemented by the circuitry of FIGS. 78 to 80, so that only a simple circuit is necessary.

As described above, according to one embodiment of the present invention, the variation in signal amplitude caused by the influence of auto-correlation side lobes can be suppressed, and the error rate can be significantly improved. In one embodiment of the present invention, it is not necessary to determine whether the preceding data or succeeding data is to be used and to perform vector processing considering order of overlapped four data for processing vector component, noting the characteristic of the spread code. In this embodiment, what should be added is only the reception signals and hence the circuitry can be simplified. Even in an asynchronous system, what is necessary is simply the processing of the preceding and succeeding reception signals. Therefore, the present invention can be applied directly without the necessity of axis estimation.

In the foregoing, only an example in which Barker code is used as a spread code with the number of multiplexing being 5 has be described. However, other code may be used, and the number of multiplexing is not limited to five. Any code may be used provided that the auto-correlation side lobe is determined uniquely by the preceding or succeeding data. More specifically, it is not necessary that all the delay amounts of side lobes are determined based on the preceding and succeeding data as in the Barker code. What is necessary is simply that the correlation spike of the delayed signal comes to a position which is determined only by the preceding data/succeeding data. This example will be described with reference to an m sequence constituted by 15 chips.

FIG. 90 shows auto-correlation of m sequence of 15 chips. The code shown in FIG. 90 is represented by (111101011001000). Referring to FIG. 90, the auto-correlation at the fifth chip has the magnitude of 1 and the sign opposite to the succeeding data, and the auto-correlation at the tenth chips has the magnitude of 1 and the sign opposite to the preceding data.

FIG. 91 shows correlation value when signals of m sequence are delayed and multiplexed, in numerical values. When the value is 15 or −15 which correspond to the correlation spike, the multiplexed signal is 1 or −1 and the sign is determined uniquely from the preceding data or 5 succeeding data. Therefore, it is understood that the present invention is applicable. In this manner, it can be seen that the present invention is widely applicable to codes satisfying the above described conditions. Though the signs are opposite in the above example, in the following, another example in which the signs are the same will be described. A Barker code of 13 chips is shown as an example. The Barker code of 13 chips is represented by (1, 0, 1, 0, 1, 1, 0, 0, 1, 1, 1, 1, 1).

FIG. 92 shows auto-correlation of Barker code of 13 chips. Referring to FIG. 92, at a correlation of spike timing, a code of an even numbered chips has auto-correlation having the absolute value of 1 with the sign being the same as that of the preceding data, regardless of the succeeding data. As for the even numbered chips, the auto-correlation has the absolute value of 1 with the sign being the same as the succeeding data, regardless of the preceding data. Therefore, what is necessary is subtraction, contrary to the above example. Therefore, the adder/subtractor shown in FIG. 80 performs subtracting operation.

A fifty-ninth embodiment of the present invention will be described in the following. An example in which Barker code of 11 chips is used and number of multiplexing is 5 as in the above embodiment, will be described.

Figure 93:
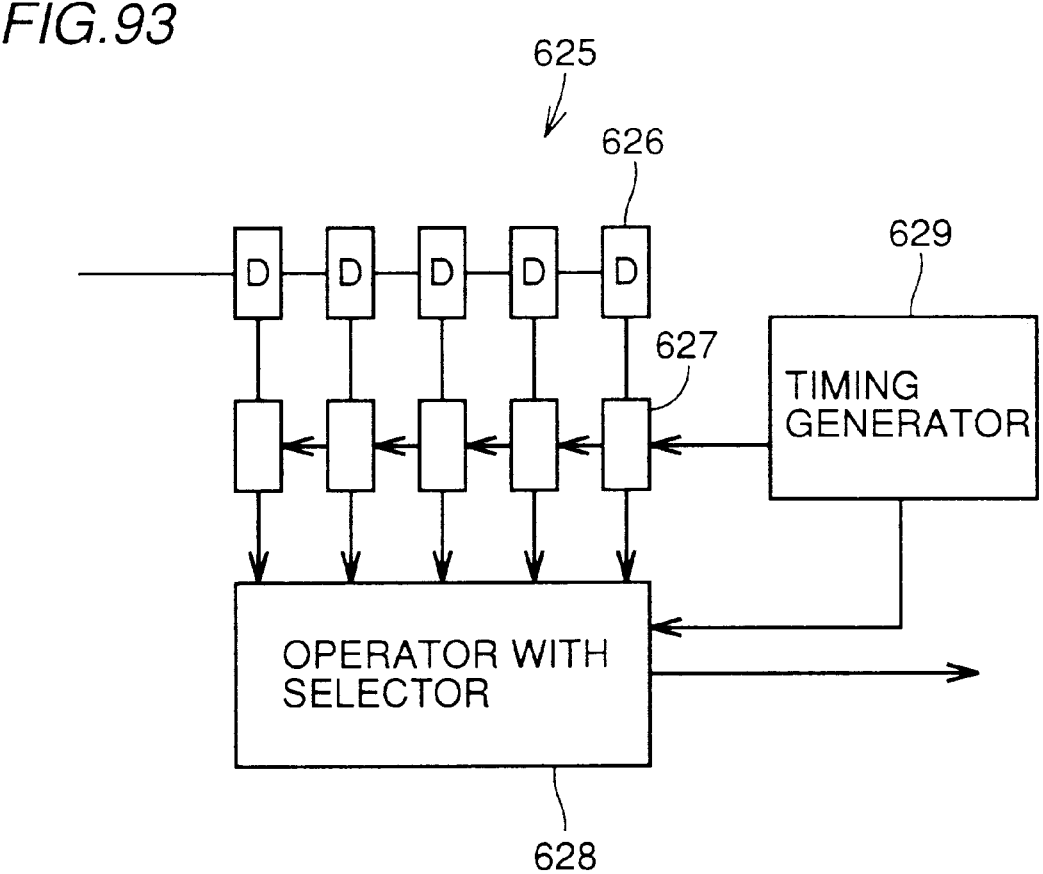
FIG. 93 is a block diagram of a correlation processing portion in accordance with a fifty-ninth embodiment of the present invention.

FIG. 93 is a block diagram of the correlation processing portion in accordance with the fifty-ninth embodiment of the present invention. Before the description of the circuit structure, the data used for cancelling auto-correlation with the delay amount being 2, 2, 2, 2, 3 will be considered. In FIG. 81, data G', H', I' and J' are used for cancelling F'. Data S', H' I', J' are used for cancelling G', and data F', G', I' and J' are used for cancelling H'.

Meanwhile, data F', G', H' and J' are used for cancelling I', and data F', G', H', I', are used for cancelling J'. Namely, five pieces of data, that is, F', G', H', I' and J' may be used as one block, and for the desired signal, other four pieces of data in the block may be used. Namely, a circuit structure accommodating only five pieces of data is necessary. Therefore, as compared with the example shown in FIG. 79, in the present embodiment, the necessary circuit structure is the one simply for shifting the five pieces of data, as shown in FIG. 93. More specifically, as shown in FIG. 93, correlation processing portion 625 includes 5 bits of shift registers 626, switches 627, an operator with selector 628, and a timing generator 629.

Figure 94:
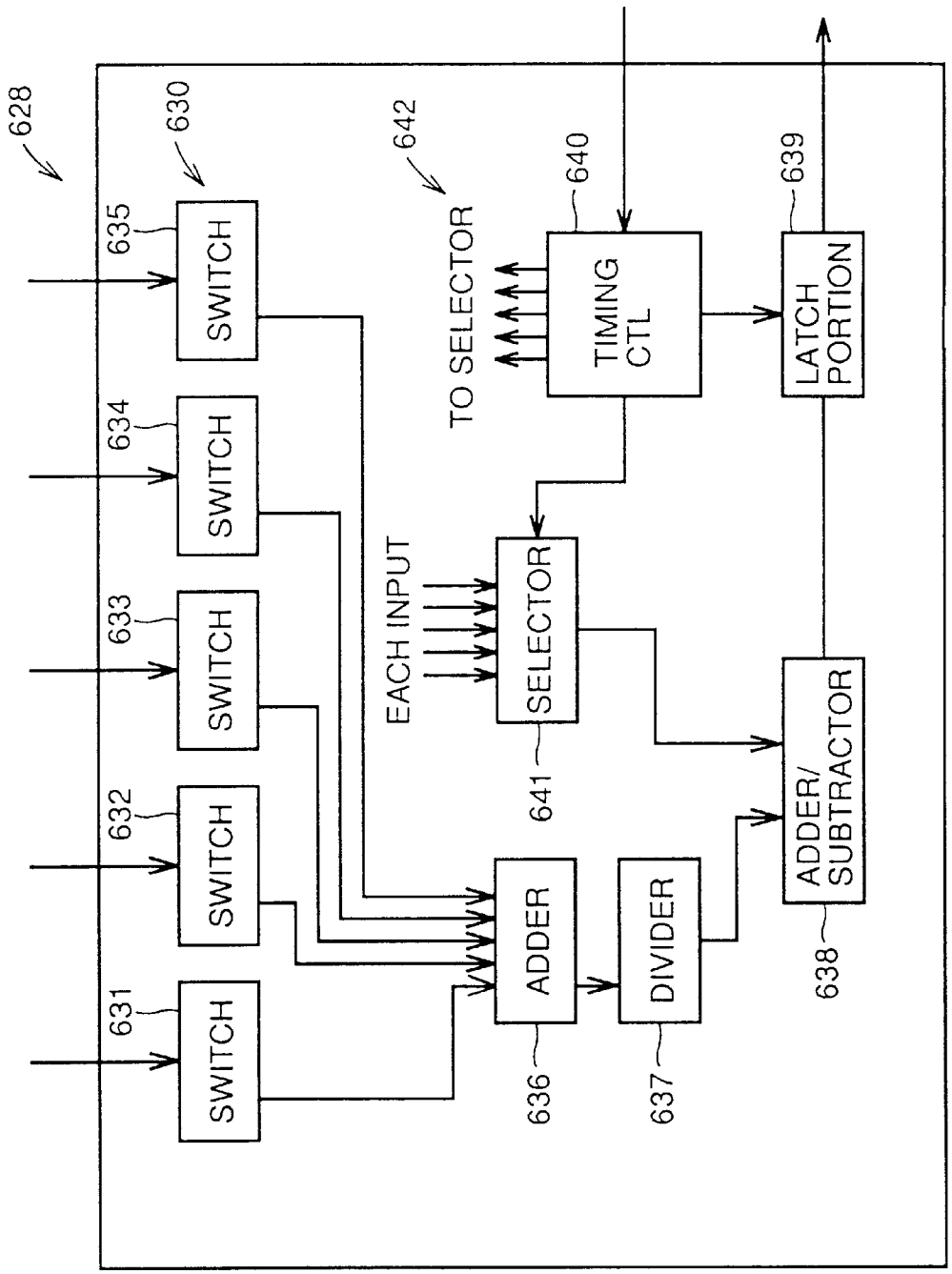
FIG. 94 is a block diagram of an operator with selector shown in FIG. 93.

FIG. 94 shows internal structure of the operator with selector 628 shown in FIG. 93. Regarding to FIG. 94, the input five signals are input to switches 631 to 635, respectively. Here, four signals other than the necessary signal are turned on, and the necessary signal is turned off, so that it is not passed. As a result, adder 636 adds four signals other than the necessary signal. To the selector 641, five signals are input, and only the necessary signal is selected. Except these points, the operation is the same as described with reference to FIG. 80. In this manner, in the present embodiment, it is not necessary to select all the preceding and succeeding data by selector 641, and the data can be processed as one block. To enable such operation, the code used and the amount of delay must be appropriately selected.

As described in fifty-eighth embodiment, in the present invention, only the preceding data or the succeeding data is used. Therefore, in order to cancel the first one of the data handled as a block, succeeding data of the remaining multiplexed waves may be used. For cancelling the second one of the data, the preceding data of the first one and succeeding data of the remaining ones may be used. In this manner, the third, fourth and other data may be processed, satisfying the conditions. For example, if a Barker code of 11 chips is to be used, it may be constituted by the delay amount of continuous even chips, and one amount of delay of odd chips. If such conditions are satisfied, the auto-correlation side lobe can be cancelled by the circuit structure shown in FIGS. 93 and 94.

The sixtieth embodiment of the present invention will be described. When the Barker code of 11 chips is used, in the fifty-eighth and fifty-ninth embodiment, first, division by the code length 11 used for spreading is performed, before addition. This is because E1 is 1/11 with respect to A, as shown in FIG. 81. However, in the actual circuitry, operation starts from A', which is the correlated output as shown in FIG. 80. Therefore, the value cannot be completely restored to 11 and residual component exist, as shown in FIG. 81.

Therefore, the changed correlation values and added values of other data are considered. Assume that the number of multiplexing is 5 as described above. Then, correlation values assume 7, 9, 11, 13, 15 and −7, −9, −11, −13 and −15. The added values of other four at this time are 28, 12, −4, 20, −36 and −28, −12, 4, 20 and 36, respectively. Accordingly, it can be seen that the values have the same difference of 16 between each other. In other words, as the data changes by 2, the corresponding change is −16. Therefore, division by 8 results in convergence to the same value. Therefore, in the example in which multiplexing number is 5, when division by 8 is performed instead of division by 11, all will be converged to the value of 10.5.

Figure 95:
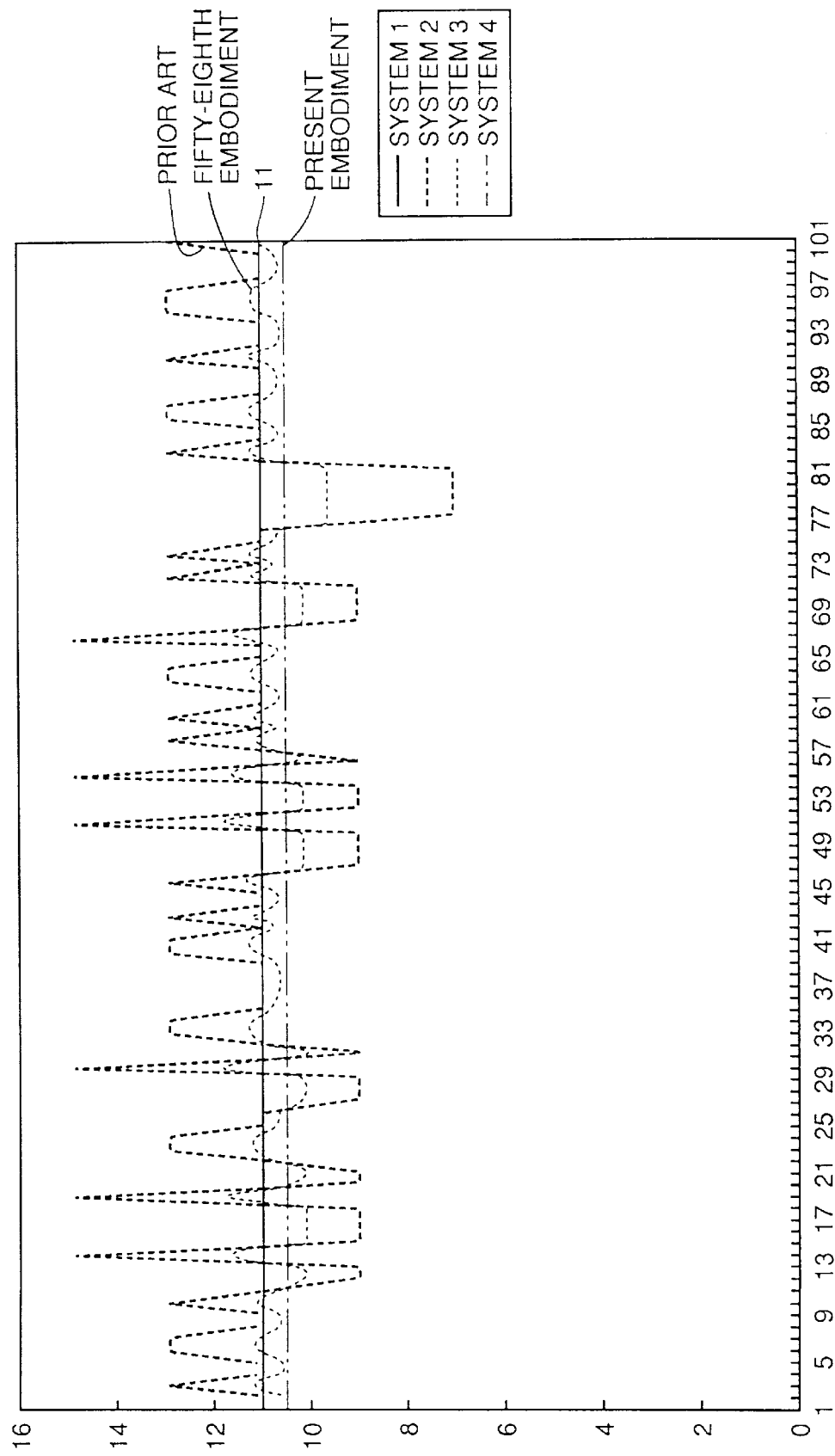
FIG. 95 shows an absolute value of the correlated value of correlation spike in accordance with the fifty-ninth embodiment of the present invention.
Figure 96:
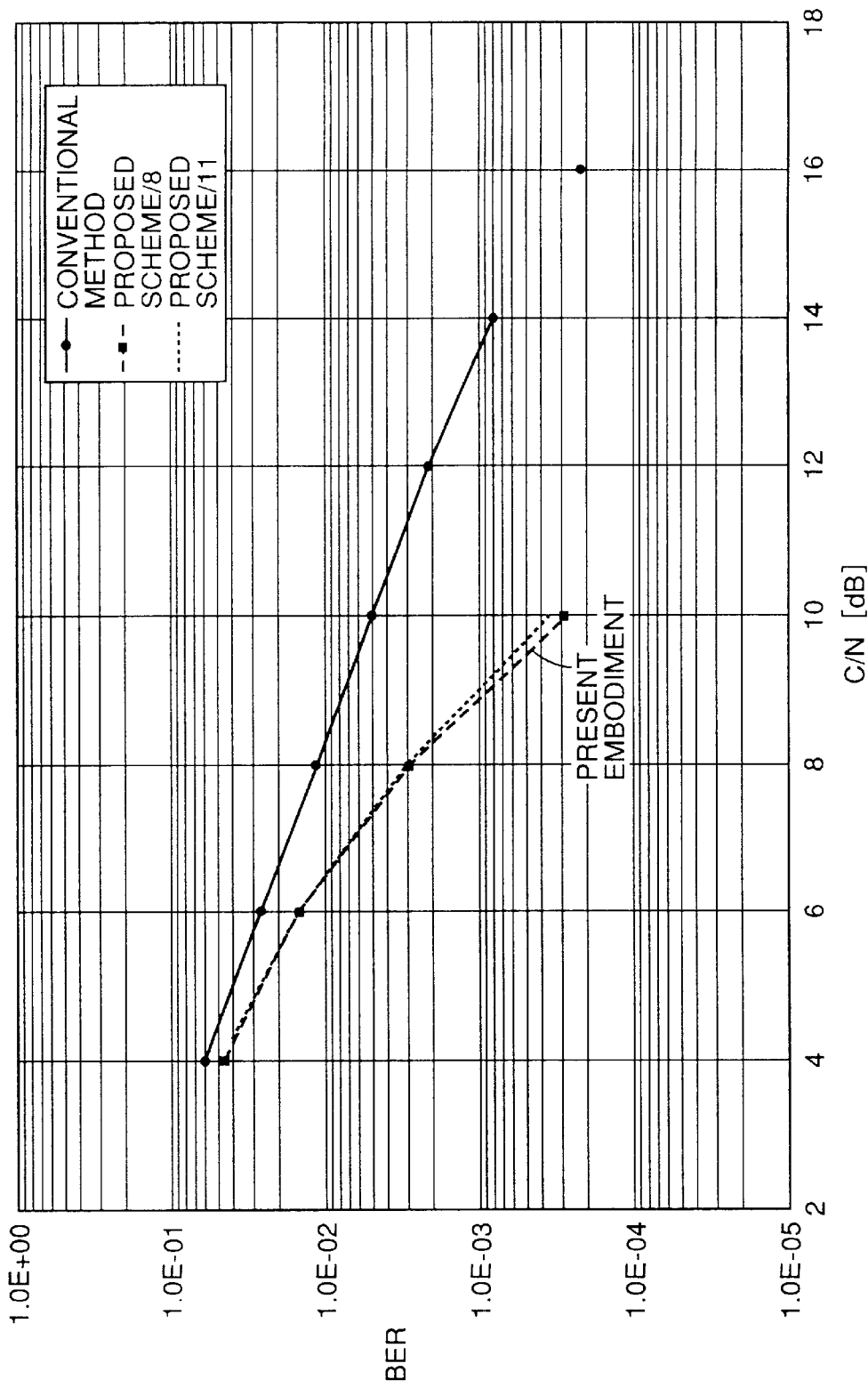
FIG. 96 shows improvement of error rate in the fifty-ninth embodiment of the present invention.

FIG. 95 shows absolute values of the correlated values of correlation spikes in the fifty-ninth embodiment. It corresponds to FIG. 84, and it can be seen that the values are all at 10.5. As a result, the phase after cancelling is converged to one point, as compared with the fifty-eight embodiment which still includes variations. Therefore, phase difference can be made smaller. The result is as shown in FIG. 96. FIG. 96 corresponds to FIG. 89, and it can be seen that the error rate is further improved by the sixtieth embodiment. In this manner, the sixtieth embodiment is advantageous in that the error rate can further be improved by the division by 8, instead of 11.

Though the number of multiplexing is 5 in the above description, when the number is 4, the added value have the same difference of −18 with each other and hence division by 9 should be performed. When the number is 3 and 2, respectively, division by 10 and division by 11 should be performed, whereby the results are all converged to one phase.

An example in which Barker code of 13 chips is used will be described. Assuming that the number of multiplexing is 6, the correlation values assume 8, 10, 12, 14, 16, 18 and −8, −10, −12, −14, −16 and −18. At this time, added values of five other data will be −80, 46, −12, 22, 56, 90 and 80, 46, 12, −22, −56 and −90. Namely, these have the same difference of 34 from each other. Namely, as the data changes by 2, the added value change by 34. Therefore, when divided by 17, the results will be converged to the same value. Therefore, when the number of multiplexing is 6, division by 17 is performed instead of division by 13, and the results are all converged to the value of 12.7. When the number of multiplexing is 5, division by 16 should be performed. Similarly, when the number of multiplexing is 4, 3, and 2, division by 15, 14 and 13 may be performed, whereby the results are all converged to one phase. In this manner, when auto-correlation side lobes are generated with the sign being opposite as in the Barker code of 11 chips, the devisor should be reduced one by one as the number of multiplexing increases one by one. Meanwhile, if the auto-correlation side lobes of the same sign are generated as in the Barker code of 13 chips, the divisor should be increased one by one as the number of multiplexing is increased one by one.

Figure 97:
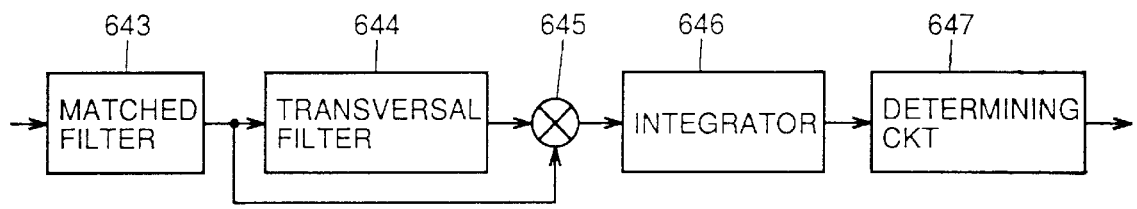
FIG. 97 is a block diagram showing PDI structure.

The sixty-first embodiment of the present invention which is applied to the technique referred to as PDI in spread spectrum system will be described. FIG. 97 shows a structure of a PDI circuit, disclosed in *Spread Spectrum Communication System*, Mitsuo Yokoyama, KAGAKU-GIJUTSU SHUPPANSHA. Referring to FIG. 97, the received signal is input to a matched filter 643, at which output, a pulse sequence having a plurality of peaks in accordance with the time of arrival and the signal intensity appear. The pulse sequences are input to a transversal filter 644. The time length of the delay line of the transversal filter 644 is set in accordance with the maximum delay spread. The output from transversal filter 644 and output from control filter 643 are applied to multiplier 645 and multiplied, whereby synchronized detection is performed. By this multiplication, the peak values of the pulse sequences are emphasized, and low level noise components are suppressed. The output from multiplier 645 is applied to an integrator 646 and integrated for the time period $T_M$, so that signals spread in time with the delay spread are gathered. This operation realizes diversity. The signal component is determined in determining circuit 647. In this manner, PDI technique utilizes all the signals spread by the delay waves for demodulation, and it has an advantage that error rate under phasing environment can be improved.

Figure 98:
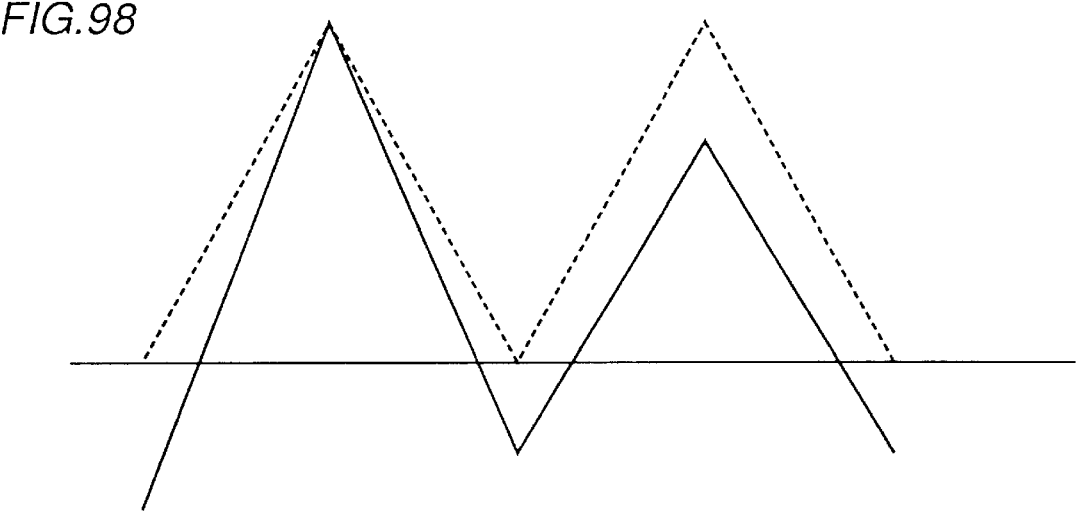
FIG. 98 shows correlated outputs used for describing PDI.
Figure 99:
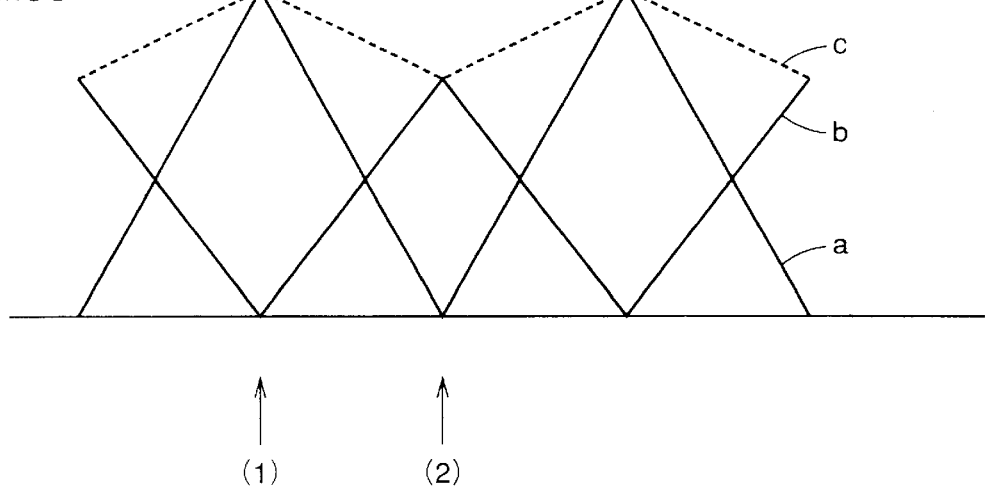
FIG. 99 shows correlated outputs used for describing PDI, showing the correlated outputs when combined.

FIG. 98 shows correlated outputs for describing PDI. The dotted line of FIG. 98 shows the correlated waveform without any delay wave in an ideal state. FIG. 99 shows a state in which one delay wave is added to the ideal waveform. Referring to FIG. 99, the line denoted by reference character a is an original correlated waveform, the line denoted by the character b is the delayed wave, and the dotted line denoted by c is the combined waveform. In the PDI, integration by integrator 646 is performed as shown in FIG. 97. For the simplicity of description, here, is assumed that signals at two sample points are used for demodulation. Namely, the original signal is demodulated at (1) of FIG. 99, and delay wave component is demodulated at (2) of FIG. 99. Therefore, by using PDI, performance can be improved than when PDI is not used.

Now, multiplexing of the present embodiment will be described. In this case, actual correlated output is as shown by the solid line of FIG. 98, which is deviated from the ideal state represented by the dotted line. This is because the auto-correlation side lobes have their influence at portions other than the correlation spike.

Figure 100:
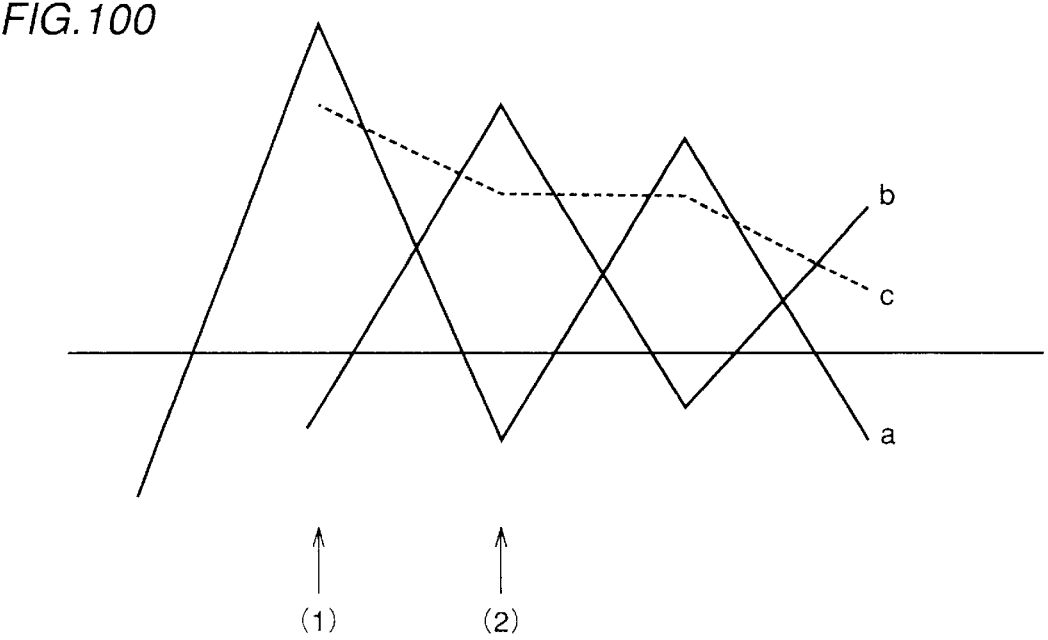
FIG. 100 shows correlated outputs used for describing PDI, which change because of the influence of autocorrelation side lobe.

FIG. 100 shows correlated outputs for describing PDI, which vary because of the influence of auto-correlation side lobes. When there is a correlation b as shown in FIG. 100 and there is another correlation a which is not 0, the combined output c is degraded from the original output both at the sample points (1) and (2). Since the error rate is determined by the ratio (C/N) of the carrier component with respect to the noise component, the error rate is degraded.

In order to solve this problem, the method of cancelling the auto-correlation side lobe of the present invention should be used not only for the original correlation spike but also for the correlation spike of the delay waves used for PDI.

Figure 101:
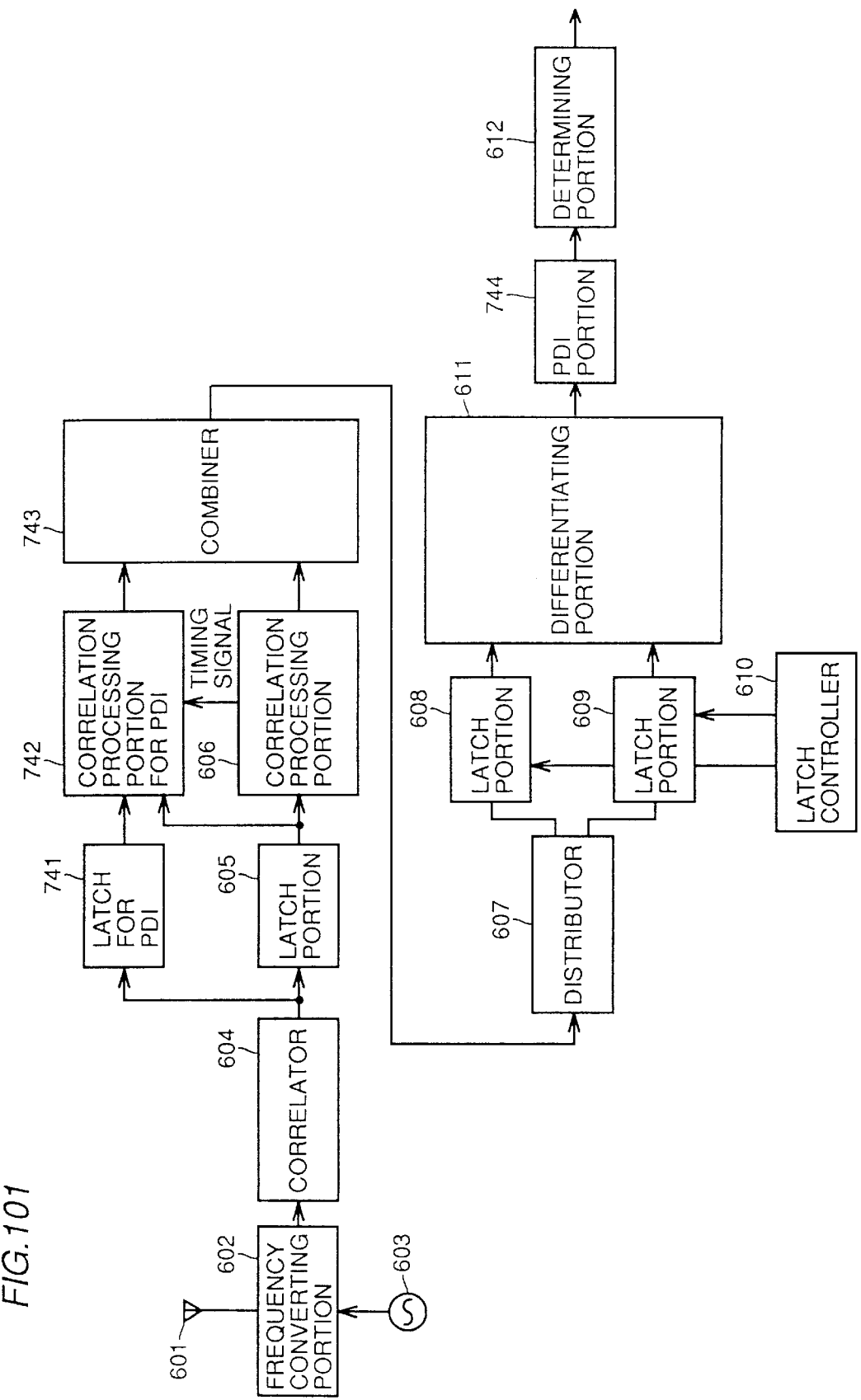
FIG. 101 is a block diagram showing the sixtieth embodiment of the present invention for PDI.

FIG. 101 is a block diagram showing the application of the present invention to a PDI receiver. FIG. 101 is the same as FIG. 78 except the following points. More specifically, the output from correlator 604 is latched at latch portion 741 for PDI at the delay wave timing, the output from PDI latch portion 741 is input to correlation processing portion 742 for PDI, correlated output signal from correlation spike latched at latch portion 605 is applied to correlation processing portion 742 for PDI, and the timing signal from correlation processing portion 606 is applied to correlation processing portion 742 for PDI. The outputs from correlation processing portion 742 for PDI and from correlation processing portion 606 are combined by combiner 743 and applied to distributor 607. Further, at the output of differentiating portion 611, PDI portion 744 is provided, and therefore the signals are subjected to PDI processing and thereafter applied to determining portion 612.

Figure 102:
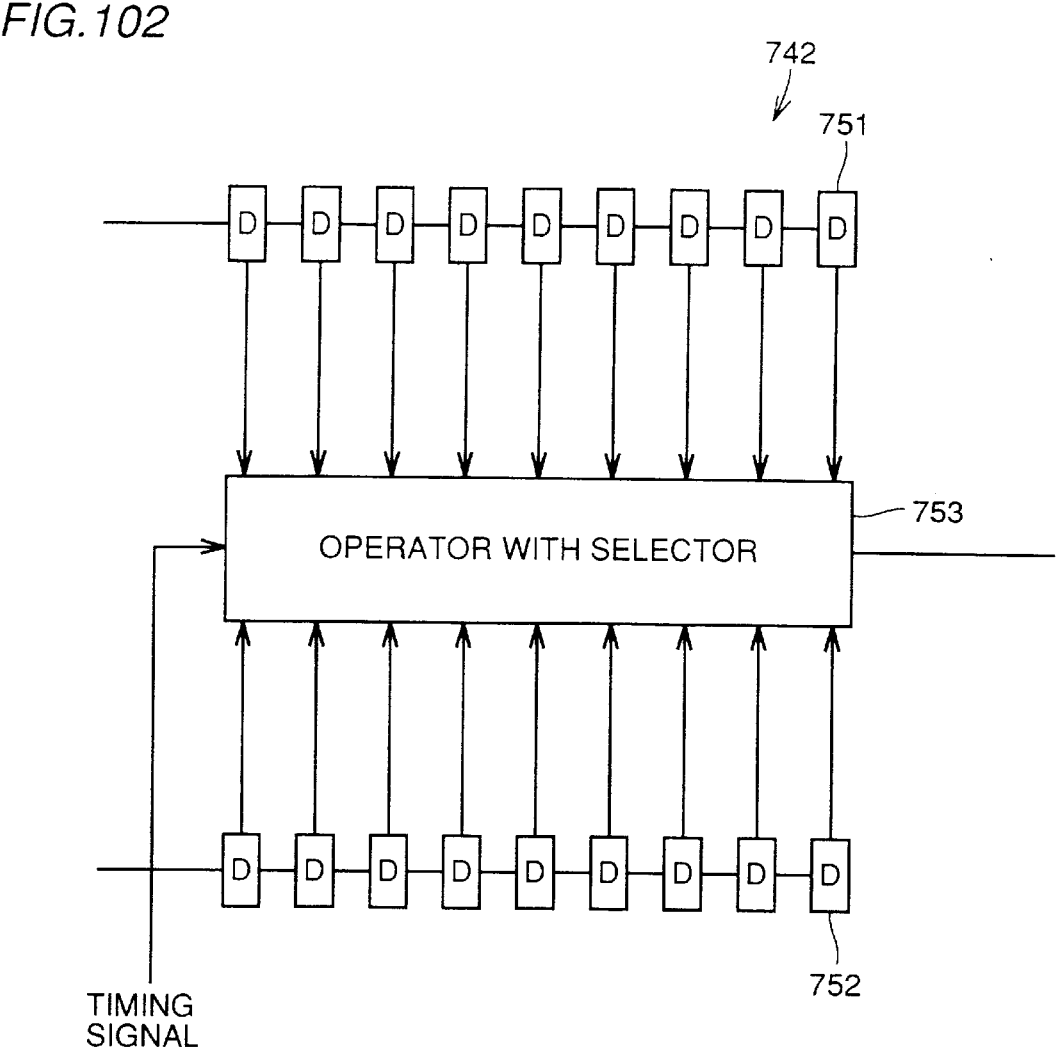
FIG. 102 is a block diagram showing a structure of a correlation processing portion for PDI shown in FIG. 121.

FIG. 102 is a block diagram showing the structure of the correlation processing portion for PDI 742 shown in FIG. 101. The correlation processing portion 742 for PDI includes shift registers 751, 752, and an operator with selector 753.

For the PDI, cancellation at the timing of the correlation spike of the delay wave is necessary, because of the influences with the side lobe of the signal for the original correlation spike timing and the side lobe of auto-correlation of the delay wave itself. Therefore, the correlation signal at the timing of the original correlation spike timing and the timing of the correlation spike of the delay wave for the PDI should both be used as the reference for cancellation. In this case, the side lobe derived from the correlation spike of the delay wave for PDI is cancelled in the same manner as the side lobe of the correlation spike. Namely, cancellation is performed using the correlation spike of (k−1) delay wave preceding and succeeding the signal latched at the timing of the delay waves, with the delay waves being the center.

As for the cancellation of the original correlation spike, referring to FIG. 82 as an example, after the delay of even numbered chips, the signal depends on the succeeding data, while after the delay of add numbered chips the signal depends on the preceding data. Therefore, by determining whether the original signal having influence at the PDI timing occurs after odd chips of delay or even chips of delay and by selecting the selector appropriately, cancellation at the PDI timing becomes possible.

Different from the fifty-eighth embodiment, not only the multiplexing signals before and after the correlation spike to be cancelled but all the multiplexed signals (if the number of multiplexing is 5, five signals) are added. This is because the PDI is influenced by the side lobe of the signal itself of the correlation spike, from which it is derived.

Therefore, in the correlation processing portion 742 for PDI, the correlation spike of the signal of the delay waves is held by the shift register 751 by 2(k−1)+1 as shown in FIG. 102, and the original correlation spike 2k is held in shift register 752.

Figure 103:
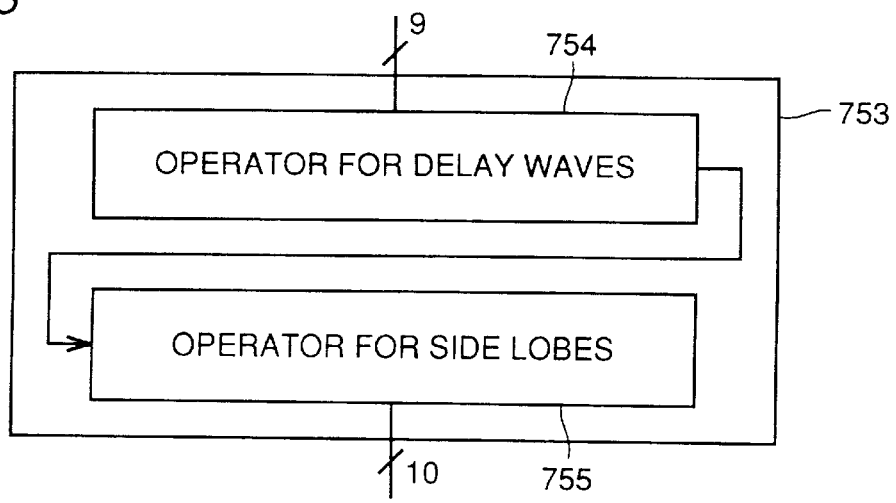
FIG. 103 is a block diagram showing a structure of an operator with a selector shown in FIG. 102.

FIG. 103 is a block diagram showing the structure of the operator with selector shown in FIG. 102. As shown in FIG. 103, the operator with selector 753 includes an operator 754 for delay wave and operator 755 for side lobe of the original correlation spike. The operator for delay wave 754 is the same as that shown in FIG. 80. By this structure, it becomes possible to cancel auto-correlation of the delay wave and thereafter to cancel the side lobe of the original.

Though two operators 754 and 755 are shown separately in FIG. 103, in actual processing, these may be integrated, so that timing controller, adder/subtractor and latch circuit may be shared. Further, either one of the operators may be used to reduce the size of the circuitry. Further, if the number of delay waves used for PDI is two or more, the circuit for the delay waves should be prepared in the same number.

In the above described embodiment, when a Barker code of 11 chips is used, the correlated value is divided by 11−k+2 dependent on the number of multiplexing, and when the Barker code of 13 chips is used, the correlated value is divided by 13+k−2. However, it is possible that the circuit scale for division becomes large. For example, if the data output from the correlator is represented by 8 bits, assume that three pieces of data are to be added to cancel interference from another station multiplexed. At that time, the number of bits after addition will be 10 bits, increased by 2 bits. If the data having this bit number is to be divided, the divisor will be 11−3+2=10. Such division is disadvantageous in the following two points.

The first is that division of data by 10 requires considerable amount of operation, for example, processing by a CPU. This leads to increased circuit scale and difficulty in high speed operation. Another problem is that the result of operation will have 10 or more bits, in order to realize accurate calculation. Thereafter, data demodulation is performed, and if the result of division is used as it is for this data demodulation operation, a data demodulating portion which operates with multiple bits (of at least 10 bits) is necessary. This means that the circuit scale of the demodulating portion is enlarged. In order to prevent this problem, processing such as grounding of the results of division by 10, so as to reduce the number of digits to 8 bits becomes necessary.

Figure 104:
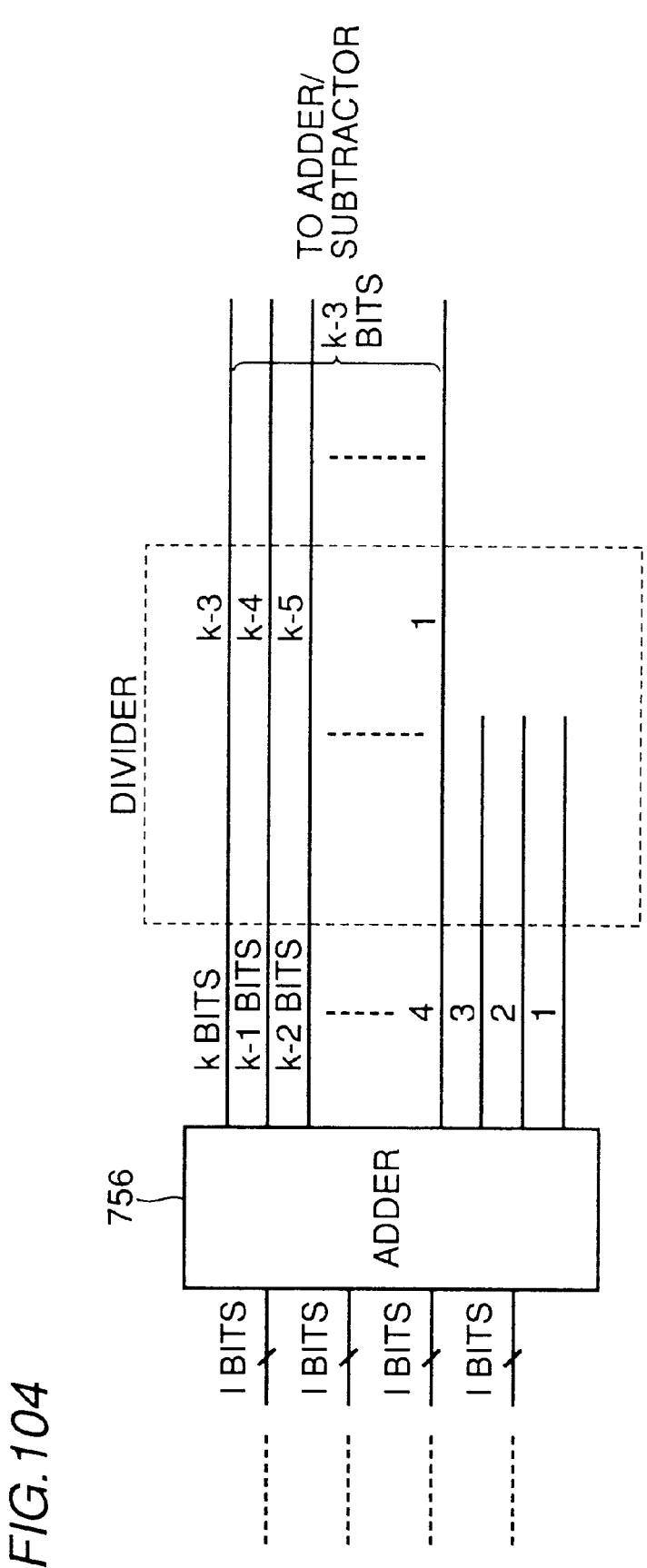
FIG. 104 shows a fifty-first embodiment of the present invention.

FIG. 104 shows an embodiment solving the above described problem. Referring to FIG. 104, of k bits of a signal output from adder 756, a least significant 3 bits are removed and k−3 bits are input to the adder/subtractor shown in FIG. 80 or 94. In an operation of 2 bits, removal of the lower 1 bit means division by 2. Removal of 2 bits is equivalent to division by 4. Therefore, removal of 3 bits is equivalent to division by 8. By providing adder 756, the circuit scale can be significantly reduced. Since the performance of the cancellation is degraded to some extent as lower 3 bits are removed, the division operation can be significantly simplified. When Barker code of 13 chips is to be used, the lower 4 bits may be removed, that is, divided by 16.

Figure 105:
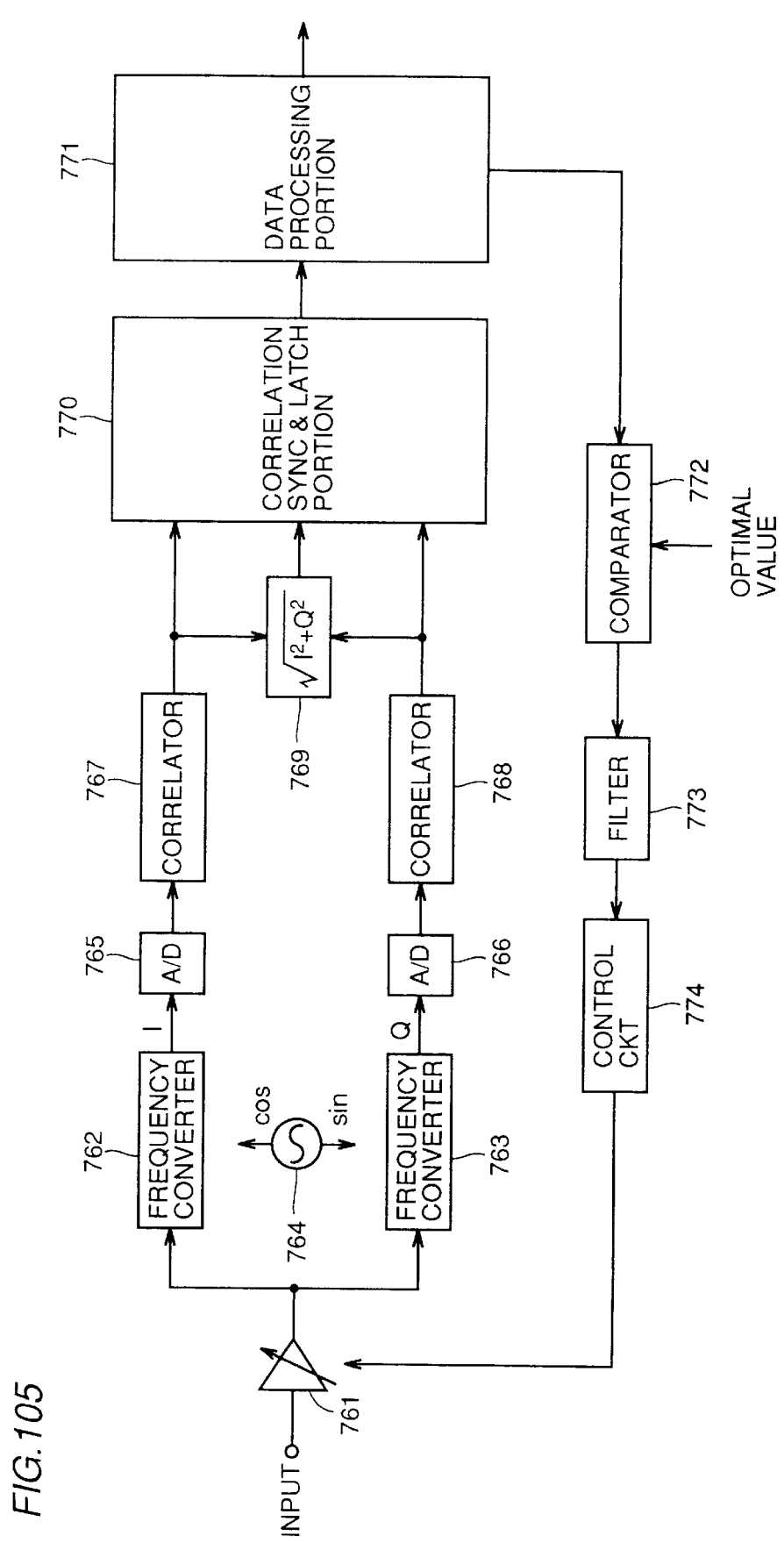
FIG. 105 shows a sixty-second embodiment of the present invention.

FIG. 105 shows a sixty-second embodiment of the present invention. Referring to FIG. 105, the spread spectrum signal received by an antenna, not shown, is applied to a gain control amplifier 761, so that the amplitude level of the reception signals is kept constant. The output from gain control amplifier 761 is applied to frequency converters 762 and 763, has its frequency converted by the local signal from oscillator 764 to be turned to I and Q baseband signals, which are applied to A/D converters 765 and 766 to be digital data, which are applied to correlators 767 and 768, whereby correlation peak is detected. The output from correlators 767 and 768 are passed to operating portion 769 where root of square sum is calculated, and applied to correlation synchronizing and latch portion 770. The output from correlators 767 and 768 are also applied to correlation synchronizing and latch portion 770, where correlation synchronization is performed, the data is latched and thereafter applied to data processing portion 771. The data processing portion performs data processing such as described above, and the output therefrom is applied to comparator 772 and compared with an optimal value. The output from comparator 772 is applied to control circuit 774 through a filter 773, and the gain of gain control amplifier 761 is controlled.

According to this embodiment, the correlated outputs which varied between 7 to 15 conventionally can be suppressed, or the output can be all converged to the same value, whereby residual fluctuation related to AGC can be reduced or eliminated.

Figure 106:
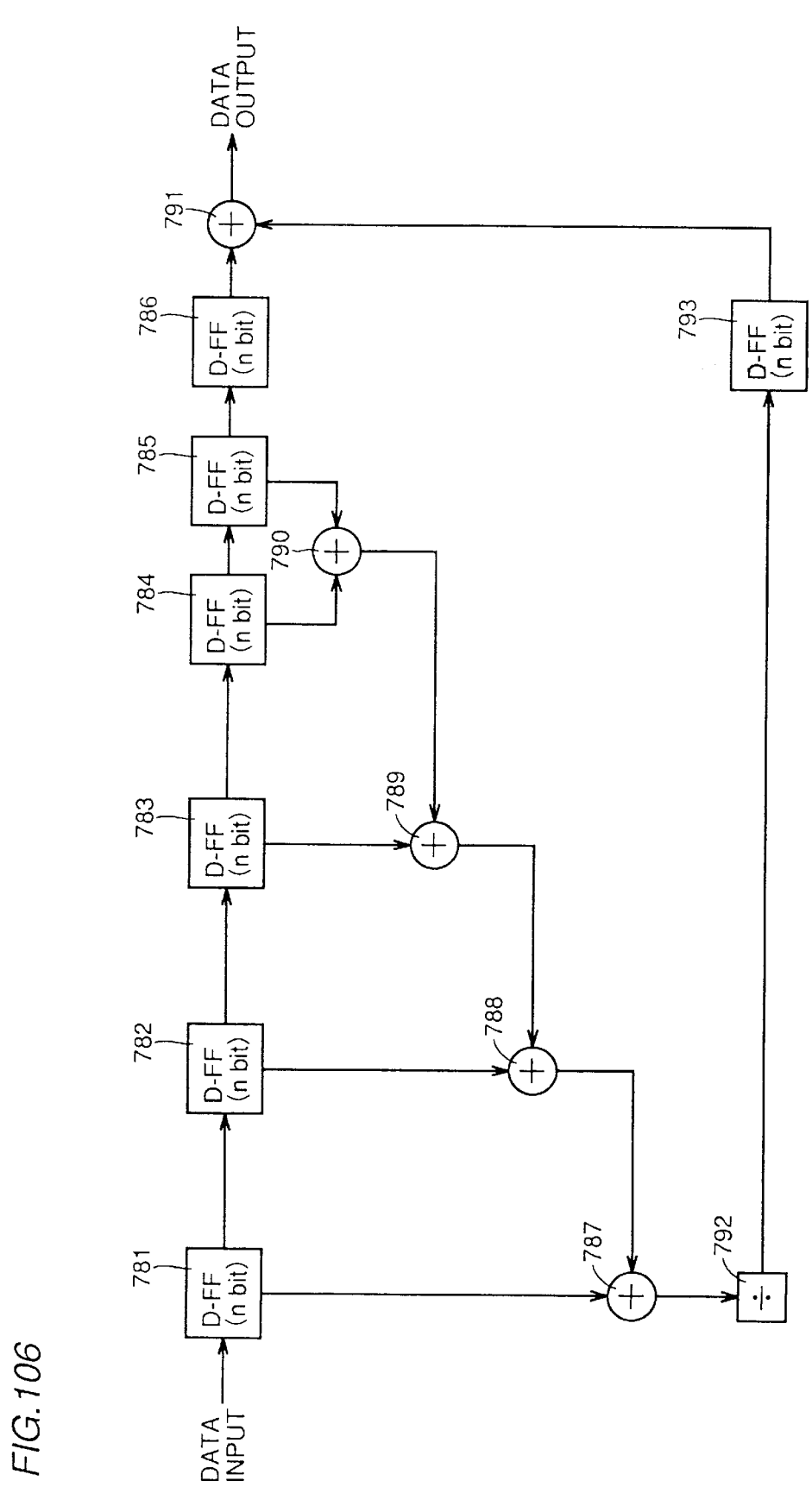
FIG. 106 is a block diagram showing a sixty-third embodiment of the present invention.

FIG. 106 is a block diagram showing an improvement of the embodiment shown in FIGS. 79 and 80.

The example shown in FIG. 80 requires n bits of selectors 617 to 620, and it is necessary to switch the selectors 617 to 620 in accordance with the pattern of correlation.

By contrast, in the example shown in FIG. 106, selectors 617 to 620 are unnecessary. More specifically, D type flipflops 781 to 786 constitute shift register, outputs from D type flipflops 784 and 785 are added in adder 790, and the added output is further added to the output from D type flipflop 783 by adder 789. Further, the output from adder 789 is added by adder 788 to the output of D type flipflop 782, and the added output is further added to the output of D type flipflop 781 by adder 787. The added output from adder 787 is divided by the length of the spread code by means of divider 792, and latched in D type flipflop 793. The output from the latch is added to the correlated value to be demodulated, which is the output from D type flipflop 786, by adder 791.

Figure 107:
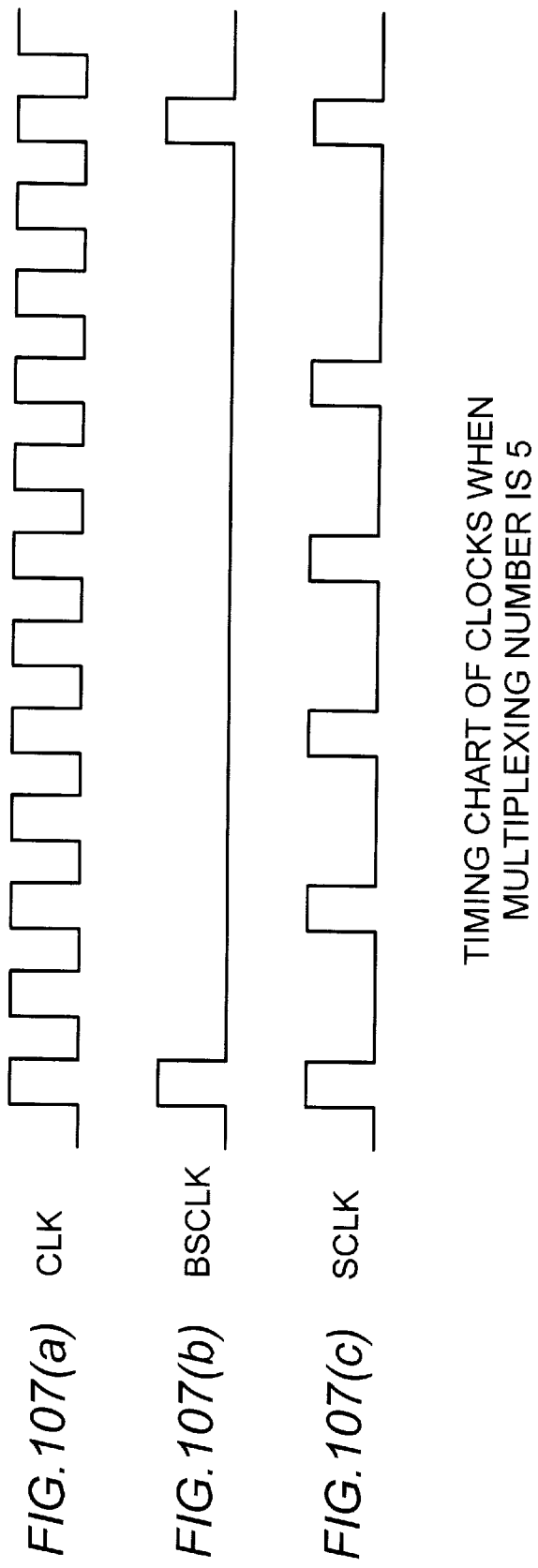
FIGS. 107(a)–(c) are time charts of a clock signal for operating the operator shown in FIG. 106.

FIG. 107 is a timing chart of the clock signal for operating the operator shown in FIG. 106. The operation of FIG. 106 will be described with reference to FIG. 107. In FIG. 107, CLK shown by (a) represents the system clocks, BSCLK shown by (b) is the clock signal indicating the head of the data constituting a block, and SCLK is a clock signal showing correlation. When BSCLK becomes active, correlated values held in D type flipflops 781 to 786 are output, when SCLK becomes active, addition by adders 790, 789, 788 and 787 is performed and division by divider 792 is performed, and the resulting value is held in D type flipflop 793. The output from D type flipflop 793 is added to the correlated value of D type flipflop 786 by adder 791 and output. When BSCLK becomes active the next time, the data latched in D type flipflops 781 to 786 are the data of the next block, the result of addition is again updated, and the same operation is repeated. Therefore, selection of data used for cancellation becomes unnecessary, data selector becomes unnecessary, and hence control thereof becomes unnecessary.

For better understanding, the actual demodulation data will be described. Correlation outputs when there is not any influence of noise or the like other than the auto-correlation side lobes are as follows.

..., −11, 13, −11, −11, 13, −9, −9, 15, −9, −9, 7, 7, 7, 7, 7...,

For convenience, each block is put in parenthesis.

...,) (−11, 13, −11, −11, 13,) (−9, −9, 15, −9, −9,) (7, 7, 7, 7, 7,) ( ....

Elements for cancelling the side lobes of the data listed above are as follows. When the first block, that is, (−11, 13, −11, −11, 13,) is to be demodulated, the sum obtained at adder 707 shown in FIG. 106 is −7, and if it is divided by the length of the spread code 11, the resulting value is about −0.64. When this value is added to each of the correlated values, the first block will be (−11.6, 12.36, −11,6, −11.6, 12.36). Similarly, in the next block, the sum of addition is −21 and the result of division is about −1.91. If this value is added to the correlated values, the result will be (−10.91, −10.91, 13.09, −10.91, −10.91), and the next block after operation will be (10.18, 10.18, 10.18, 10.18, 10.18). Clearly, there is an improvement.

Though the divider 792 divides the correlated value by 11 in the above description, when it is divided by 7, the data after cancellation all come to have the absolute value of 12, and hence the influence of auto-correlation side lobe can be completely eliminated.

In a spread spectrum receiver, when the correlation peak of the received signal is spread, error rate becomes higher at a signal point near the boundary of determination, and by this influence, the general error rate characteristics is degraded.

In the following, an embodiment will be described which suppresses the spread of the correlation peak caused by multiplexing, and which suppresses degradation of error rate characteristics caused by interference at the time of multiplexing.

Figure 108:
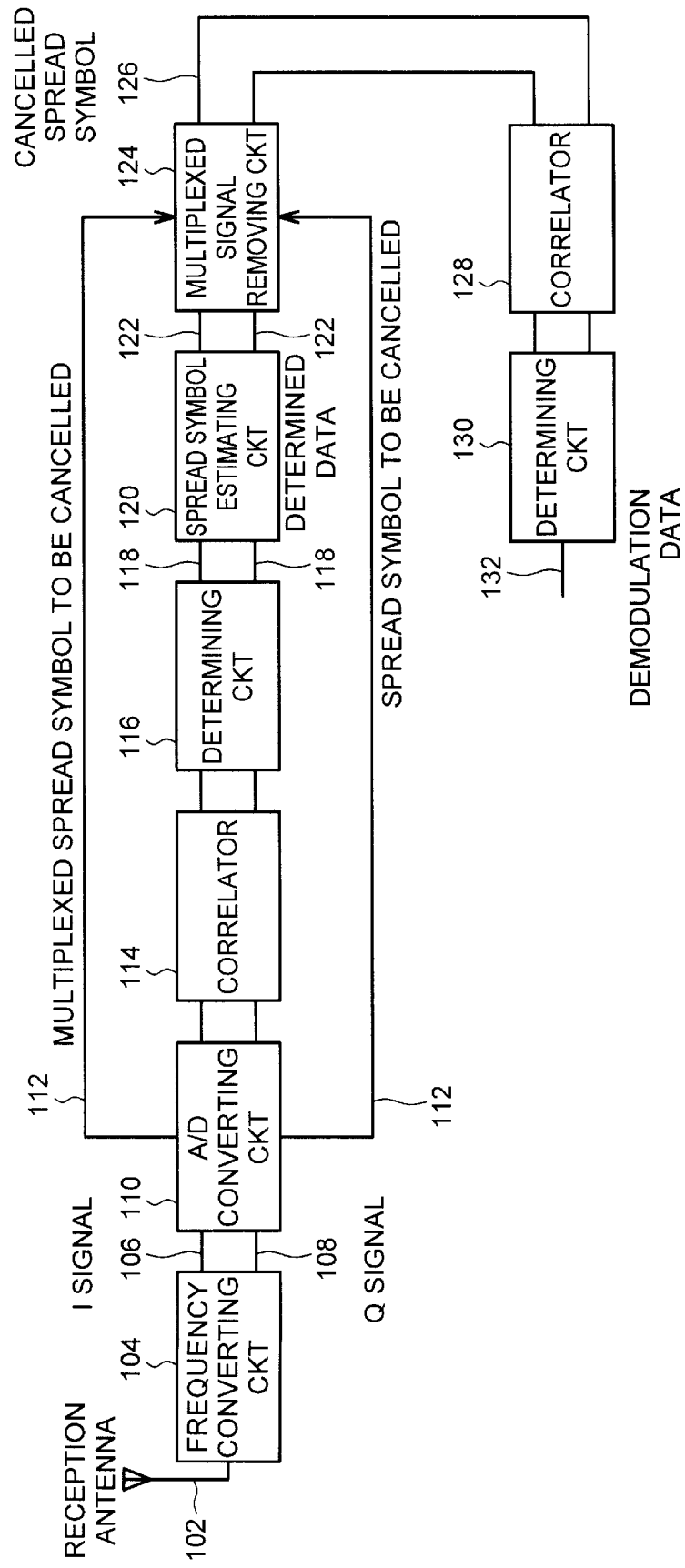
FIG. 108 is a block diagram showing a sixty fourth embodiment of the present invention.

FIG. 108 is a block diagram showing such an embodiment. Referring to FIG. 108, the multiplexed spread spectrum signal is received by reception antenna 102, passed to frequency converting circuit 104 to be output as baseband I signal 106 and Q signal 108, which are applied to A/D converter 110. A signal 112 of multiplexed spread symbol which is an object of cancellation is output and applied to multiplex signal removing circuit 124. Meanwhile, the determined data which is the output from determining circuit 116 is applied to spread symbol estimating circuit 120. Spread symbol estimating circuit 120 estimates the spreading symbols 122 before and after the point of cancelling by using determination data 118, which estimated symbols are input to multiplexed signal removing circuit 124. Multiplexed signal removing circuit 124 removes the multiplexed spreading symbols to be cancelled, which are estimated from the multiplexed spreading symbol which is the object of cancellation. The cancelled spreading symbol 126 from which the multiplexed signals have been removed by multiplexed signal removing circuit 124 is input to correlator 128, and correlation peak is output. The obtained correlation peak is input to determination circuit 130 and determined, and demodulated data 132 with the multiplexed signals removed is output from determining circuit 130.

Figure 109:
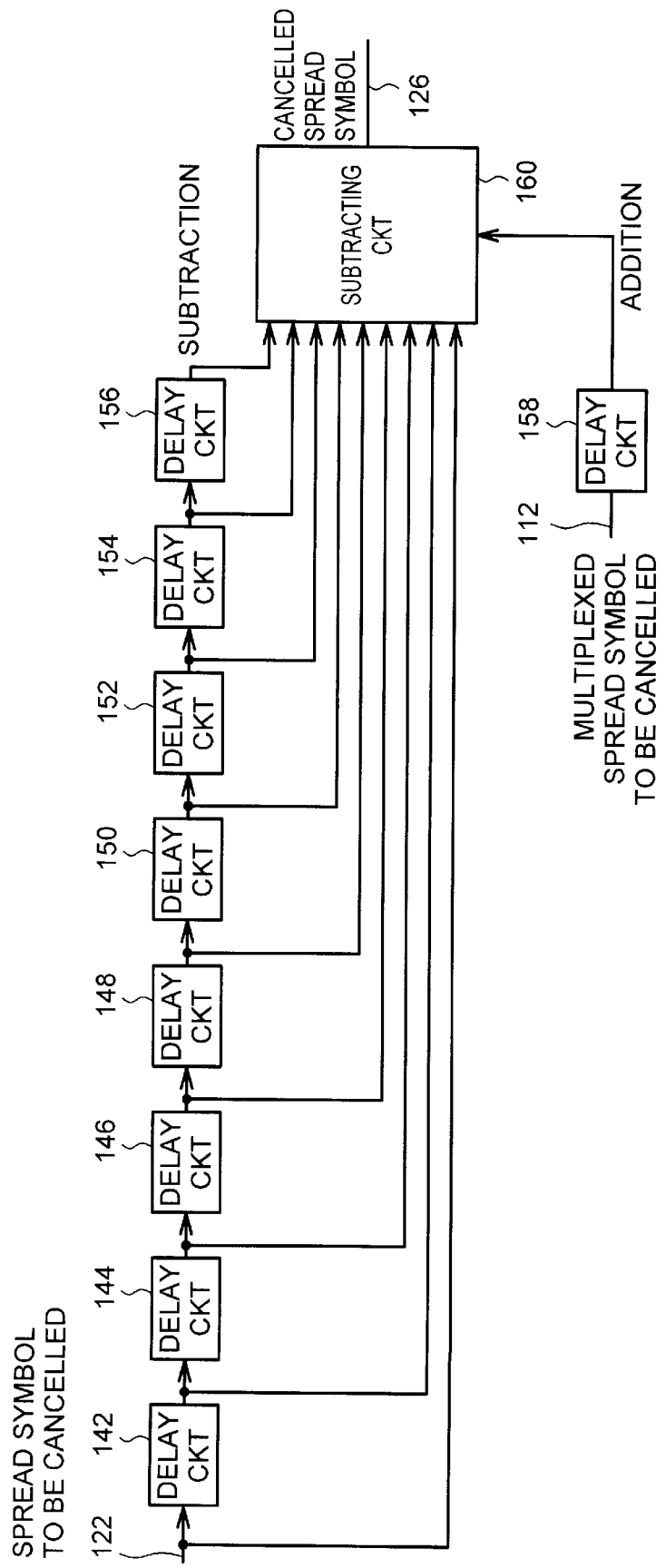
FIG. 109 is specific block diagram of the multiplexed signal removing circuit shown in FIG. 108.

FIG. 109 shows a structure of the multiplexed signal removing circuit shown in FIG. 108. Referring to FIG. 109, the multiplexed spreading symbol 112 which is to be cancelled output from A/D converting circuit 110 is input to delay circuit 158 where its timing is adjusted, and input to subtracting circuit 160 as an additional value. Meanwhile, the spreading symbol 122 to be cancelled estimated by the spread symbol estimating circuit 120 is input to delay circuit 142, and correlated to a set of 11 chips of spread symbol. Delay circuits 144 to 156 are serially connected to delay circuit 142, the spreading symbol of 11 chips is successively passed to the delay circuits 142 to 156 which provide delay of 2 or 3 chips, and input as subtraction value to subtraction circuit 160 in the form of spreading symbols to be cancelled, from respective outputs of the delay circuits. Subtracting circuit 160 subtracts the subtraction input from the chips corresponding to the multiplexed spreading symbol which is to be cancelled, and outputs a cancelling spreading symbol 126.

Figure 110:
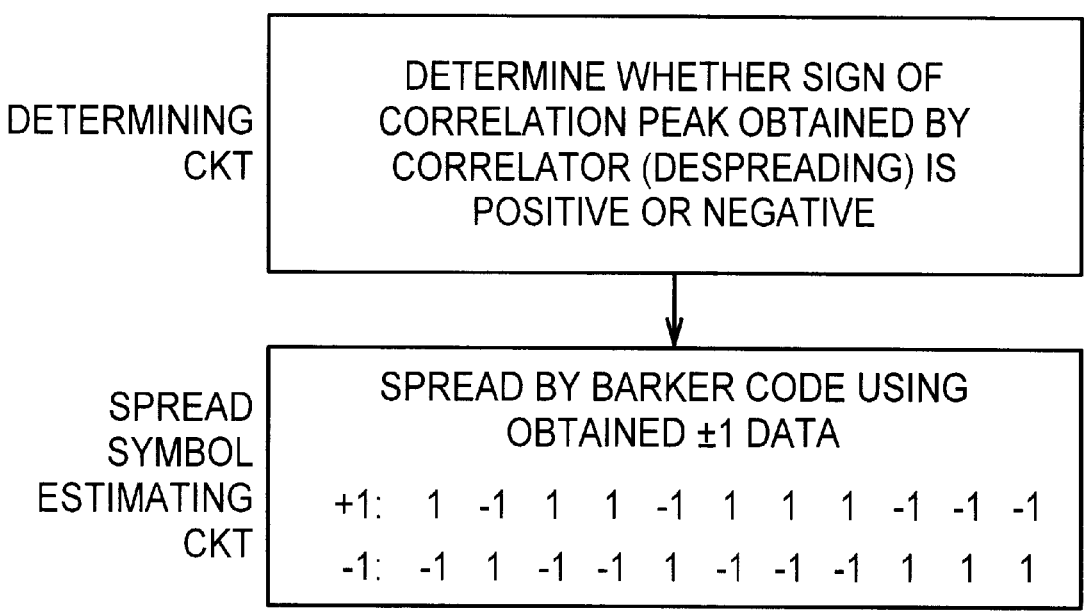
FIG. 110 shows processing operation of the spreading symbol estimating circuit shown in FIG. 108.

FIG. 110 shows the processing operation of the spreading symbol estimating circuit shown in FIG. 108. The correlator shown in FIG. 108 despreads the n-th symbol, as described above, and the sign (negative/positive) of thus obtained correlation peak symbol is determined by determining circuit 116, and using the data of negative/positive (±1) obtained in this manner, spread symbol estimating circuit 120 performs spreading, using the Barker code. More specifically, a shift register is used as the spreading symbol estimating circuit, the Barker code of 11 bits is set in accordance with "H"/"L" level, and it may be adapted that when data is +1, 11 bits of data are output successively, and if the data is −1, the data is inverted and output.

Figure 111:
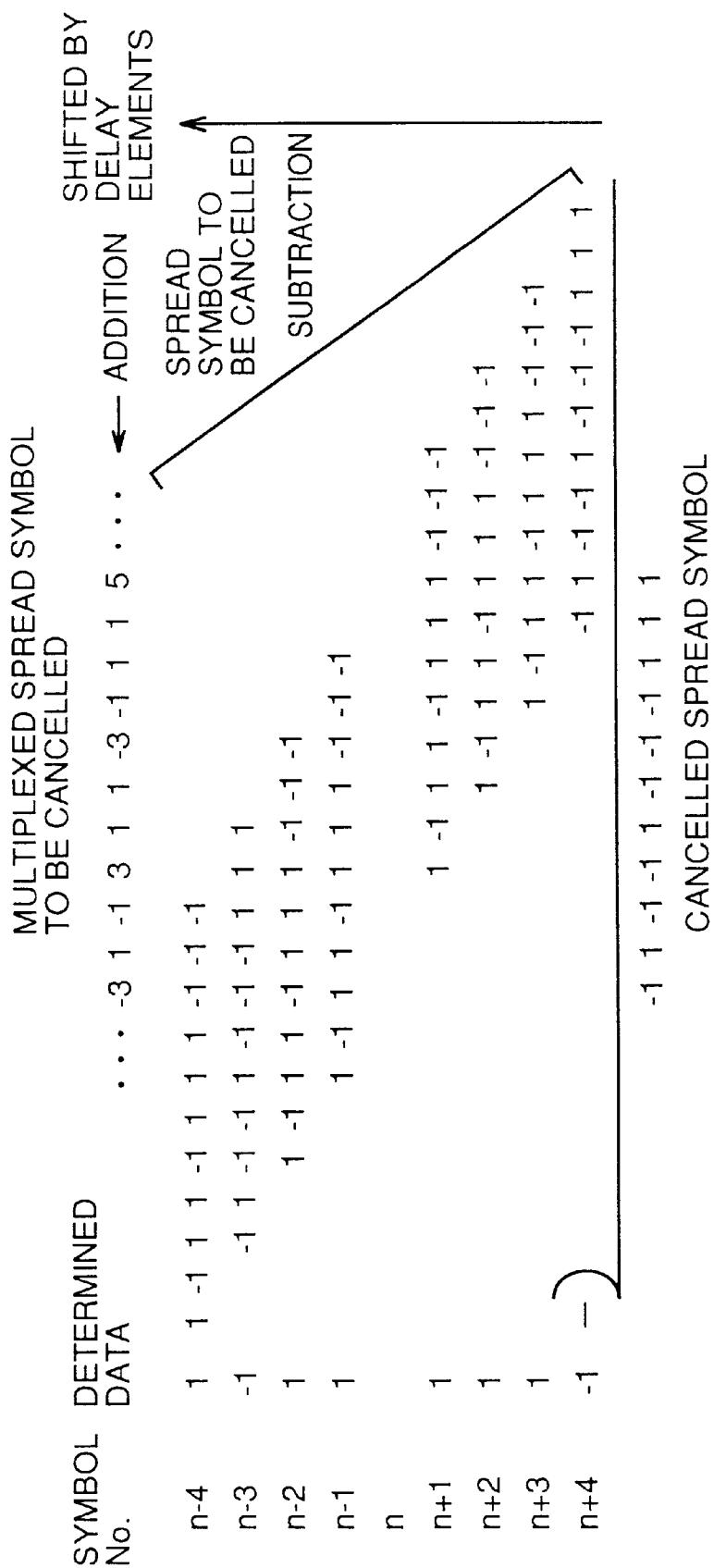
FIG. 111 shows a method of cancelling by performing an operation reverse to the multiplexing operation by the subtracting circuit shown in FIG. 109.

FIG. 111 shows the operation of the multiplexed signal removing circuit shown in FIG. 108. The spreading symbol 122 to be cancelled including 11 chips, output from spreading symbol estimating circuit 120 is successively input to delay circuits 142 to 156 shown in FIG. 109 as a set of 11 bits, and every time a new estimated symbol is input, shifted as a set of 11 bits. Therefore, constantly, preceding four and succeeding four of the multiplexed spreading symbols 112 to be cancelled are held. When there is not any noise between transmission/reception, the multiplexed spreading symbol 112 to be cancelled is the same as the multiplexed signal. The spreading symbol 120 to be cancelled is delayed, as it has passed through correlator 114, determining circuit 130 and spreading symbol estimating circuit 120. Therefore, to be timed therewith, the multiplexed spreading symbol 112 to be cancelled is also passed to delay circuits 142 to 156. Further, subtracting circuit 160 performs an operation reverse to the multiplexing operation, for cancelling. The process is as shown in FIG. 111.

The spreading symbol estimating circuit 120 is provided in each system for the I and Q signals. The operation of estimation and removal described heretofore are all performed for I and Q signals independent from each other.

As described above, in accordance with the sixty-fourth embodiment, the multiplexed signal multiplexed on the demodulation symbol is estimated and cancelled, and hence degradation of error rate characteristic caused by interference at the time of multiplexing can be suppressed.

Figure 112:
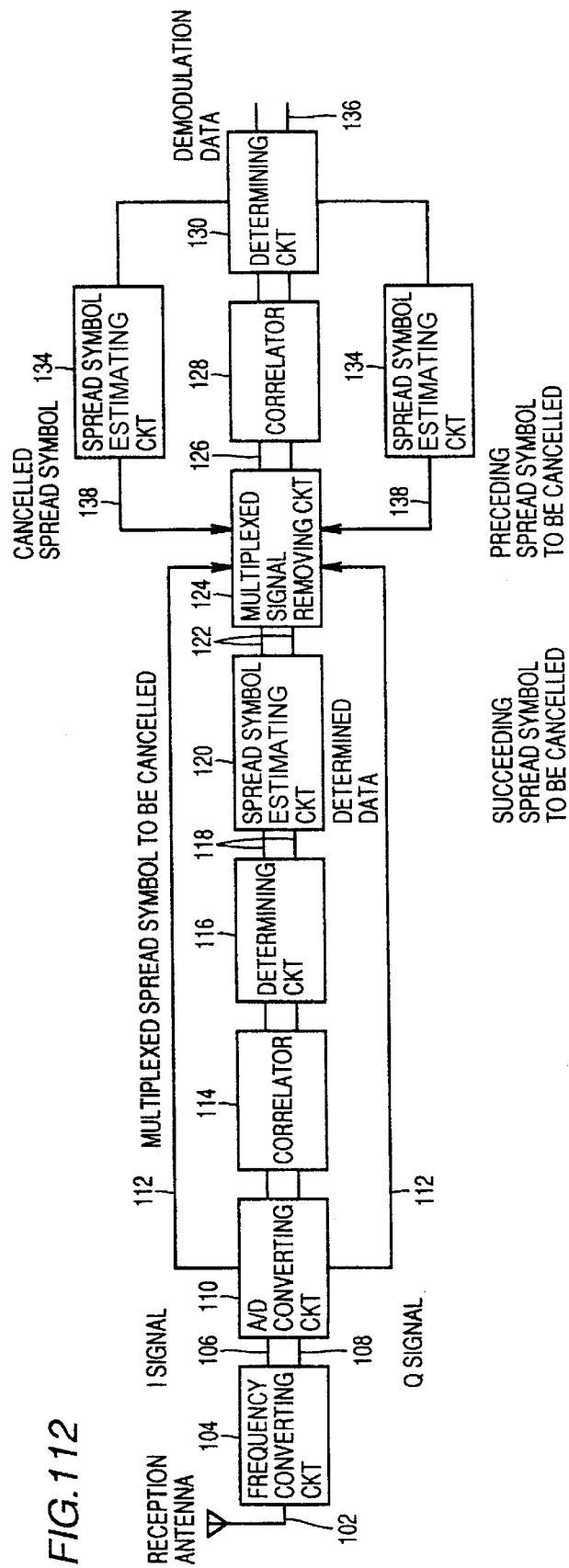
FIG. 112 is a block diagram showing overall configuration of the sixty-fifth embodiment of the present invention.

FIG. 112 is a block diagram showing the sixty-fifth embodiment of the present invention. In the embodiment shown in FIG. 108, determination data of the received signal provided by determining circuit 116 is used to estimate preceding and succeeding spreading symbols multiplexed on the symbol to be demodulated by spreading symbol estimating circuit 120, and the multiplexing signals are cancelled by multiplexed signal removing circuit 124. In the sixty-fifth embodiment shown in FIG. 112, determination data of the received signal, and determination data after cancellation of the multiplexed signals are both used to estimate the preceding and succeeding spreading symbols multiplexed on the symbol to be demodulated, whereby the multiplexed signals are cancelled.

Therefore, structures from the reception antenna 102 to determining circuit 130 are similar to those shown in FIG. 108. From spreading symbol estimating circuit 120, the succeeding spreading symbol to be cancelled is output and applied to multiplexed signal removing circuit 124. By contrast, the preceding spreading symbol 131 to be cancelled positioned preceding in time the multiplexed spreading symbol 112 to be cancelled is applied from spreading symbol estimating circuit 134 to multiplexed symbol removing circuit 124. Spreading symbol estimating circuit 134 estimates the correlation peak obtained through correlator 128 from the output from multiplexed signal removing circuit 124, using the demodulation data determined by the determining circuit 130. The multiplexed signal removing circuit 124 removes the spreading symbol to be cancelled, which has been multiplexed, estimated from the multiplexed spreading symbol to be cancelled. The cancelled spreading symbol 126 with the multiplexed signal removed is input to correlator 128 as in the embodiment shown in FIG. 108, the obtained correlation peak is determined by determining circuit 130, and demodulated data 136 with the multiplexed signal removed is output.

Figure 113:
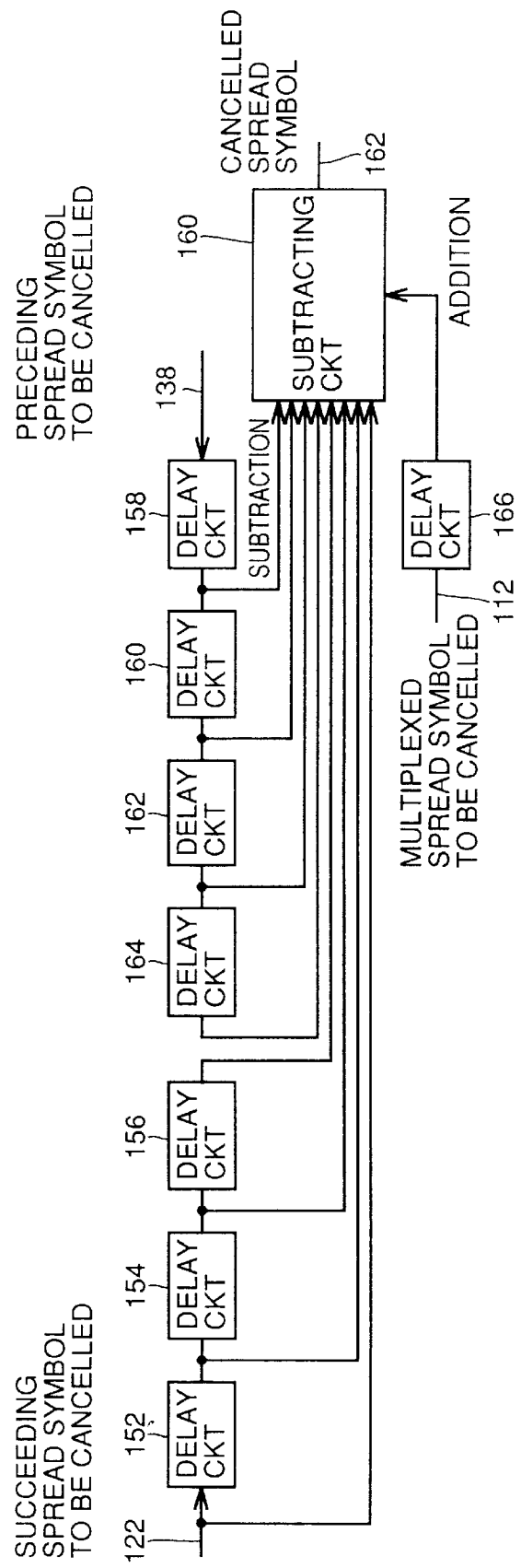
FIG. 113 is a block diagram showing a specific example of the multiplexed signal removing circuit shown in FIG. 112.

FIG. 113 is a block diagram showing a specific example of the multiplexed signal removing circuit shown in FIG. 109. As in FIG. 109, the multiplexed spreading symbol 112 to be cancelled output from A/D converting circuit 110 has its timing adjusted by delay circuit 166, and it is input to subtracting circuit 160 as an addition value. Meanwhile, delay circuits 152, 154 and 156 are connected in series, and the succeeding spreading symbol 122 to be cancelled estimated by spreading symbol estimating circuit 120 is input to delay element 152 as a set of 11 chips of spread symbols, and successively delayed.

Delay elements 158, 160, 162 and 164 are connected in series, the preceding spreading symbol 138 to be cancelled is input to delay element 158 as a set of 11 chips of spread symbols, and successively delayed. The spreading symbol to be cancelled is input as a subtraction value to subtraction circuit 160 from each of the delay elements 158 to 164, subtracting circuit 160 subtracts the substration input from the chip corresponding to the multiplexed spreading symbol to be canceled, and outputs a cancelled spread symbol 162.

Figure 114:
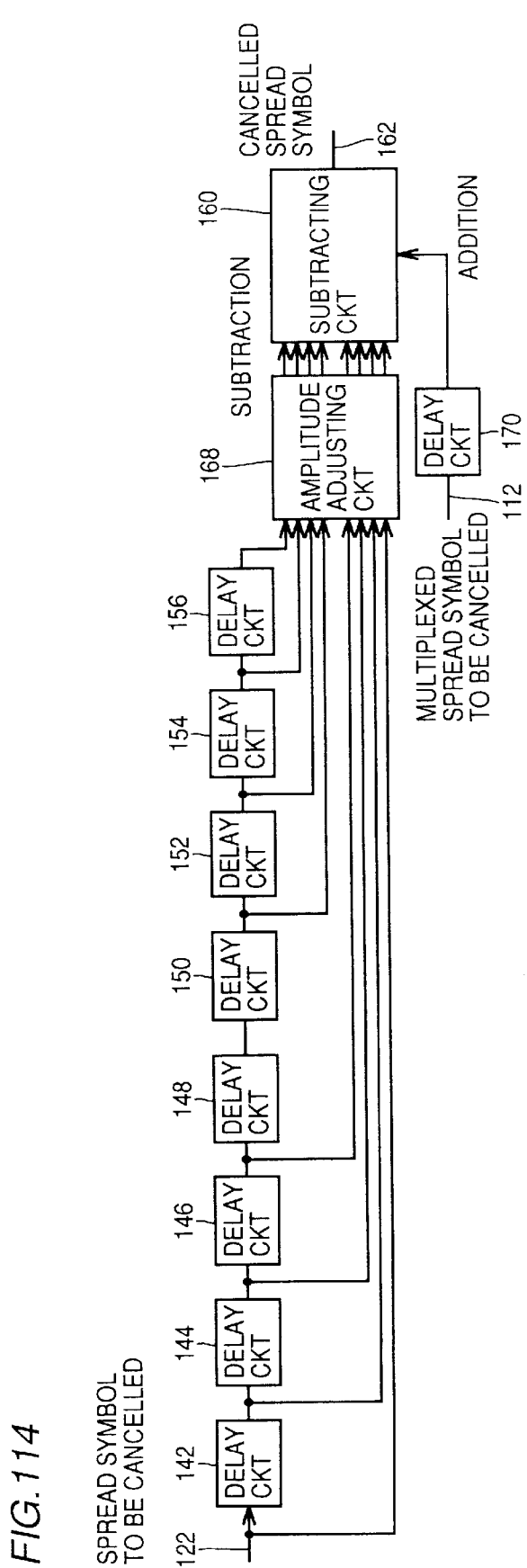
FIG. 114 is a block diagram of the multiplexed signal removing circuit in accordance with the sixty-sixth embodiment of the present invention.

FIG. 114 is a block diagram showing a structure of the multiplexed signal removing circuit in accordance with the sixty-sixth embodiment of the present invention. In FIG. 114, the structure is the same as that shown in FIG. 109 except that amplitude adjusting circuit 168 is included. Amplitude adjusting circuit 168 adjusts and inputs to the subtracting circuit 160, the amplitude of the spreading symbol to be cancelled, in accordance with amplitude fluctuation of the signal 112 of the multiplexed spreading symbol to be cancelled. In this manner, as the amplitude of the spreading symbol to be cancelled is adjusted by the amplitude adjusting circuit 168, the multiplexed signal can be removed not affected by amplitude fluctuation of the symbol signal 112 of the multiplexed spread signal to be cancelled.

Figure 115:
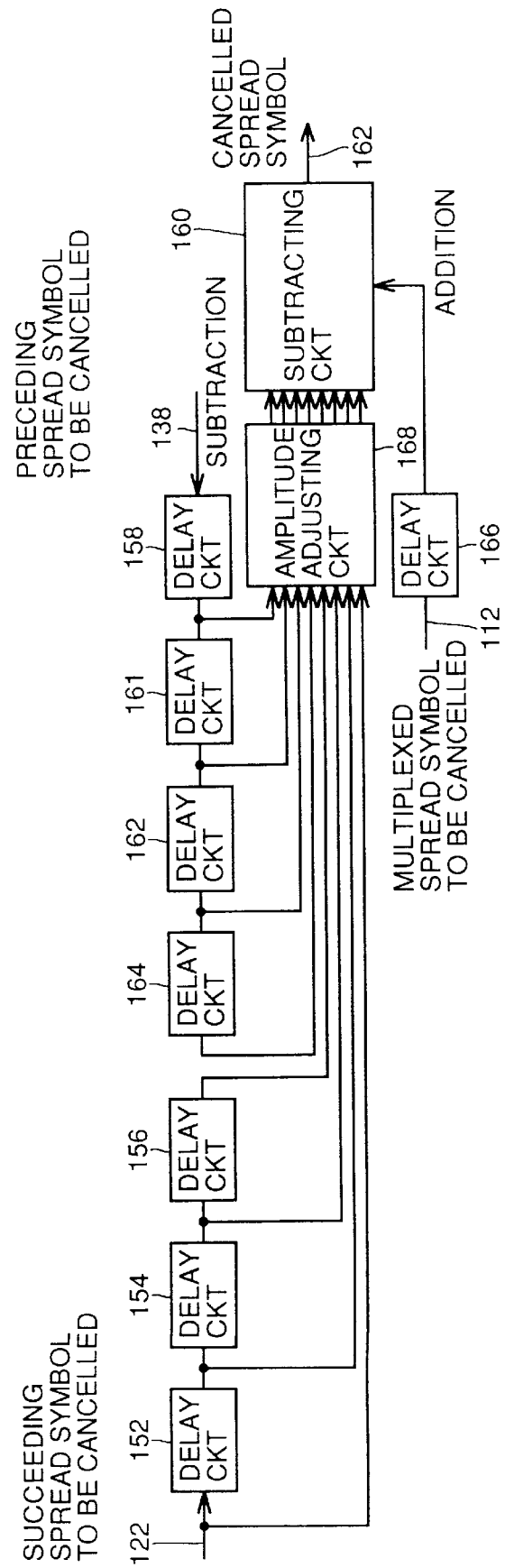
FIG. 115 is a block diagram showing the multiplexed signal removing circuit in accordance with the sixty-seventh embodiment of the present invention.

FIG. 115 is a block diagram of the multiplexed signal removing circuit in accordance with the sixty-seventh embodiment of the present invention. In the embodiment shown in FIG. 115, the structure is the same as that shown in FIG. 113 except that amplitude adjusting circuit 168 is included. The amplitude adjusting circuit 168 operates similarly to the one shown in FIG. 114, namely, adjusts the amplitude of the spreading symbol to be cancelled in accordance with the amplitude fluctuation of the signal 112 of the multiplexed spreading symbol to be cancelled, and inputs it to subtracting circuit 160. Therefore, multiplexed signal can be removed without any influence of amplitude fluctuation of the signal 112 of the multiplexed spread symbol to be cancelled.

Figure 116:
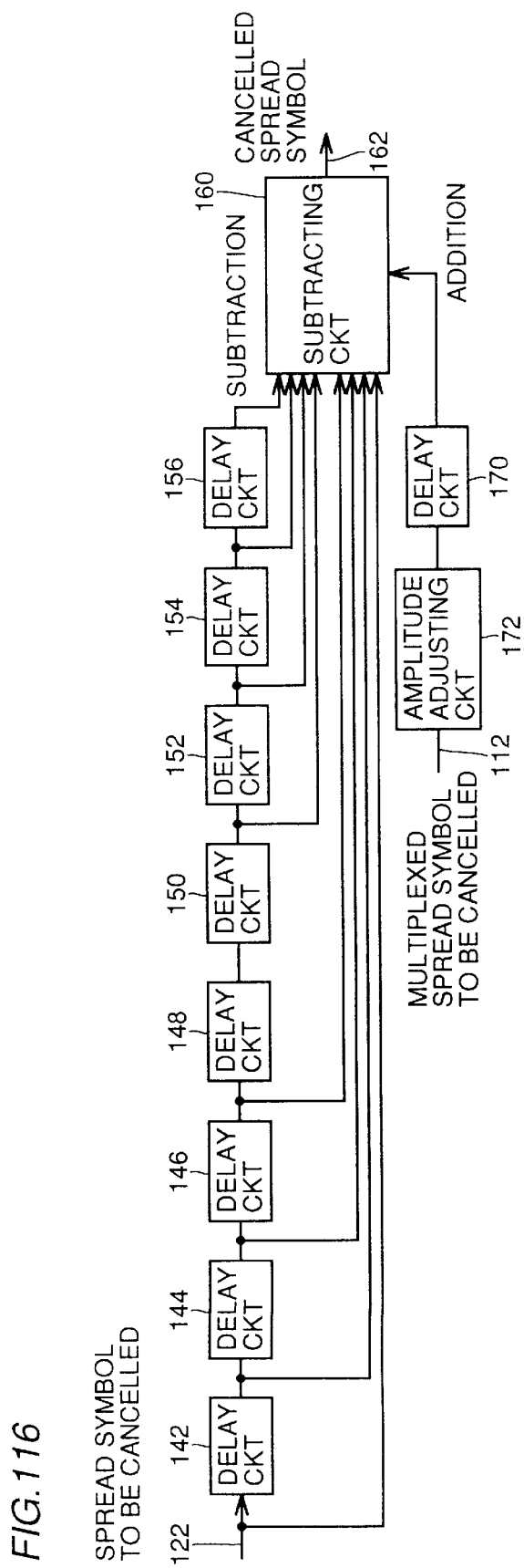
FIG. 116 is a block diagram of the multiplexed signal removing circuit in accordance with the sixty-eighth embodiment of the present invention.

FIG. 116 is a block diagram of the multiplexed signal removing circuit in accordance with the sixty-eighth embodiment of the present invention. In the embodiment shown in FIG. 116, amplitude adjusting circuit 172 is provided in the preceding stage of delay circuit 170. Amplitude adjusting circuit 172 adjusts the amplitude fluctuation of the signal 112 of the multiplexed spreading symbol, and inputs it to subtracting circuit 160 via delay element 170. In this embodiment also, multiplexed signal can be removed without any influence of output fluctuation.

Figure 117:
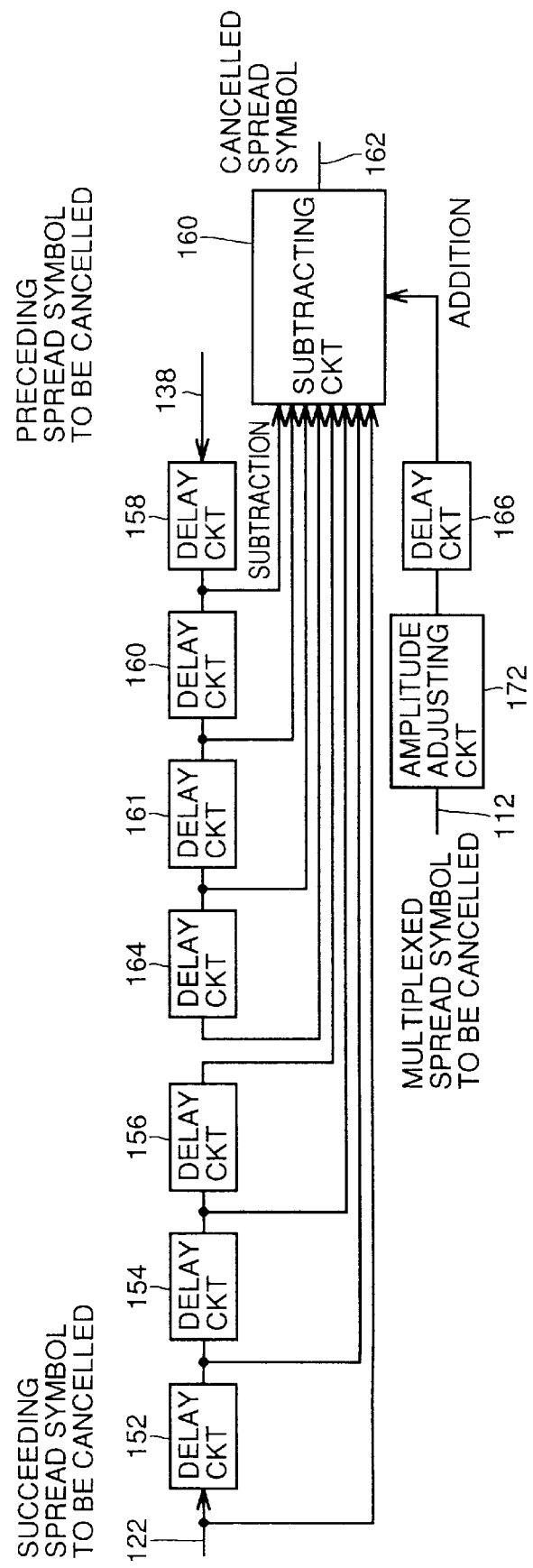
FIG. 117 is a block diagram of the multiplexed signal removing circuit in accordance with the sixty-ninth embodiment of the present invention.

FIG. 117 is a block diagram showing the multiplexed signal removing circuit in accordance with the sixty-ninth embodiment of the present invention. This embodiment is structured similar to that shown in FIG. 113 except for amplitude adjusting circuit 172. Amplitude adjusting circuit 172 adjusts the amplitude fluctuation of the signal 112 of the multiplexed spreading symbol to be cancelled in the similar manner as in the embodiment of FIG. 116, and inputs it to subtracting element 160 through delay circuit 166. Thus the multiplexed signal is removed without any influence of amplitude fluctuation.

Figure 118:
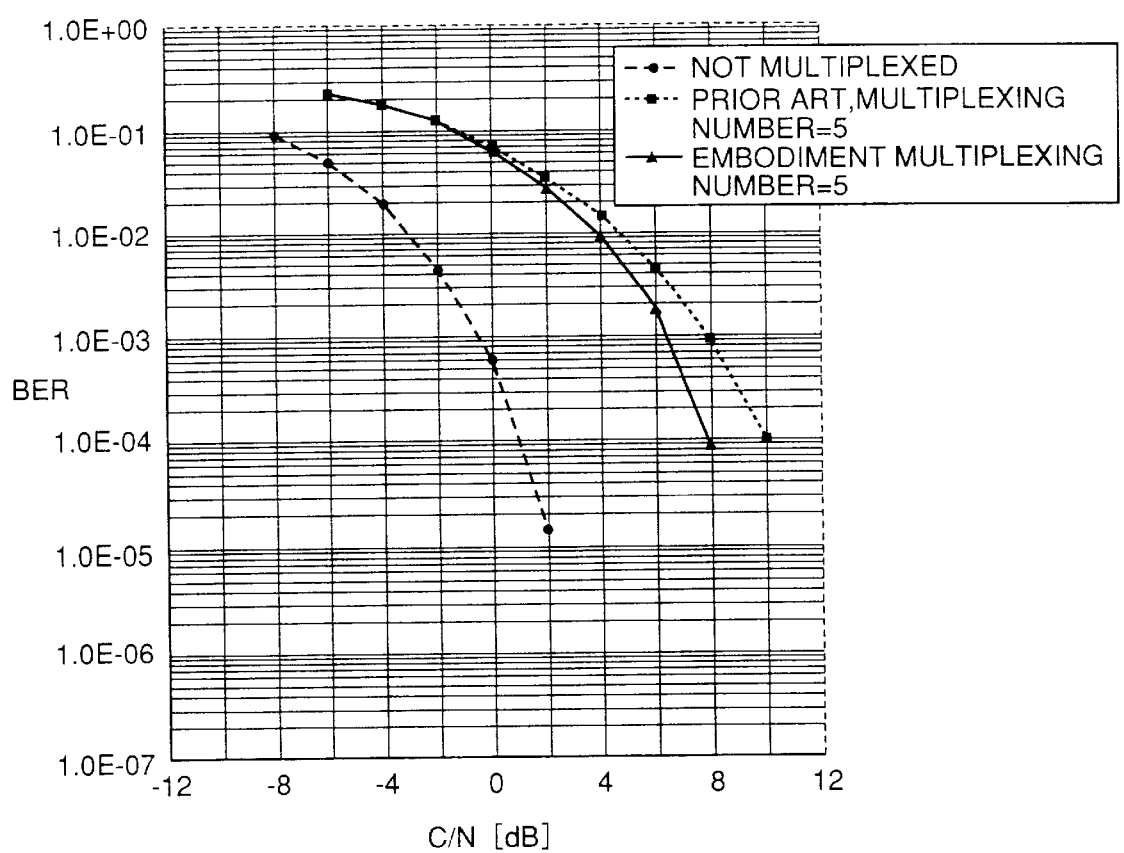
FIG. 118 shows the effects of the present invention

FIG. 118 shows results of computer simulation of the improvement of error rate characteristic when the sixty-fifth embodiment of the present invention is implemented. Referring to FIG. 118, at the bit error rate of BER=$10^{-4}$, with respect to the characteristic when multiplexing is not performed, there is degradation of 7.0 dB corresponding to the increase in power caused by multiplexing by 5 and degradation of 2.3 dB corresponding to the interference of multiplexing. Namely, a total degradation of 9.3 dB is observed in the conventional demodulation method. By contrast, when the embodiment of the present invention is implemented, there is an improvement of 2.1 dB which corresponds to the interference of multiplexing. In this manner, since the multiplexed preceding and succeeding spreading symbols are cancelled by the present embodiment, the correlation peak does not spread because of multiplexing, and degradation in error rate characteristic caused by interference at the time of multiplexing can be suppressed. Therefore, high speed data transmission is realized by multiplexing, while error rate comparable to the case where there is no interference cause by multiplexing can be obtained.

Figure 119:
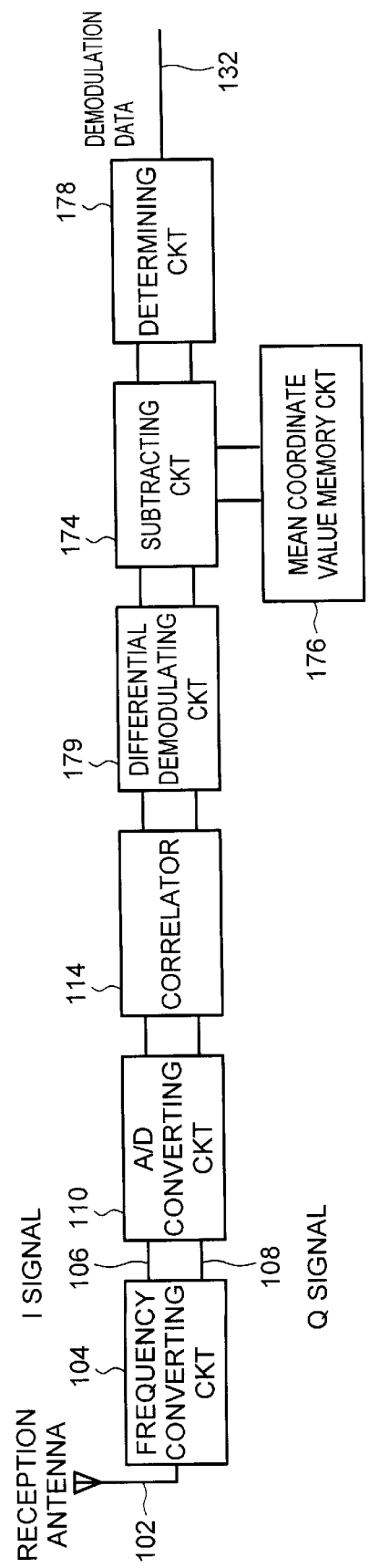
FIG. 119 is a block diagram showing a seventieth embodiment of the present invention

FIG. 119 is a block diagram showing the seventieth embodiment of the present invention. In this embodiment, mean value coordinate after differential demodulation is calculated, the mean coordinate value is subtracted from the data to be determined, and thereafter data determination is carried out.

Referring to FIG. 119, reception antenna 102, frequency converting circuit 104, A/D converting circuit 110, correlator 114 and determining circuit 178 are the same as those shown in FIG. 108. Between correlator 114 and determining circuit 178, differential demodulating circuit 179, subtracting circuit 174 and mean coordinate value memory circuit 176 are provided. Memory circuit 176 may be formed by a switch circuit or a memory circuit, and it applies a mean coordinate value to subtracting circuit 174. Subtracting circuit 174 subtracts the mean coordinate value applied from mean coordinate value memory circuit 176 from the output signal of differential demodulating circuit 179, and applies the results to determining circuit 178. Determining circuit 178 determines whether the sign is positive/negative with respect to I and Q signals, and thus demodulated data 132 is obtained.

The conditions described with reference to the prior art example will be described. The correlated value of the output from correlator 114 is any of ±7, ±9, ±11, ±13 and ±15 for each of the I and Q signals, because of interference at the time of multiplexing. When viewed on the IQ phase plane, the number of signal points of each quadrant is 25 points, and distribution is the same in any quadrant provided that the demodulation data is random.

In the example shown in FIG. 119, two continuous signal points provide a transitional pattern with a specific high possibility, as eight or ninth chips out of 11 chips of inputs to correlator 114 are the same. As for the examples of the transitional patterns, the highest possible transition when the sign is not changed from correlated values 9, 11 and 13 are 9→9, 11→11 and 13→13. When the sign is changed, the highest possible transmission is 9→-15, 11→-13 and 13→-11.

Figure 120:
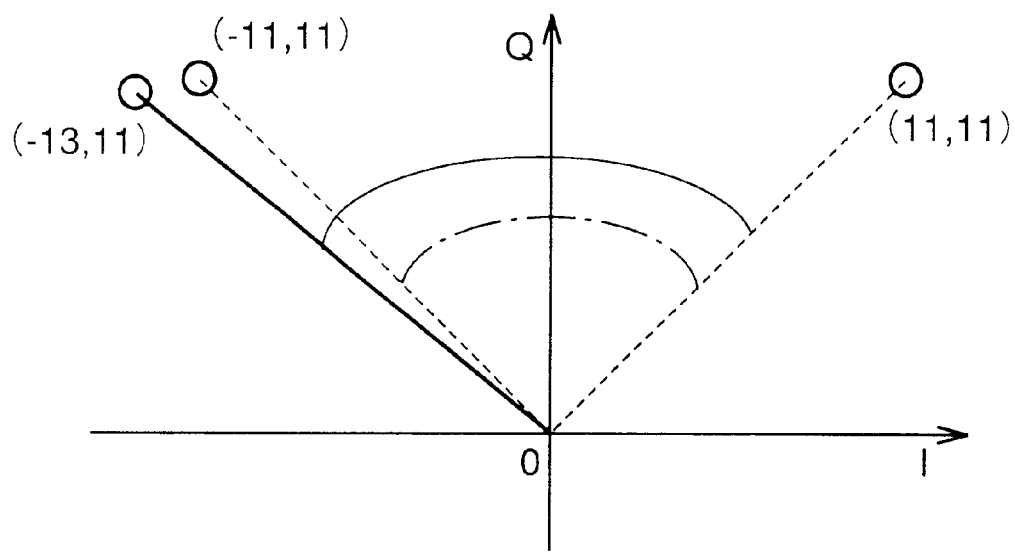
FIG. 120 shows an example of a transmission pattern in accordance with the seventieth embodiment of the present invention.

FIG. 120 shows difference in the amount of phase rotation obtained after differential demodulation, when the transition is 11→-11 where the value on the I axis does not suffer from interference at the time of multiplexing, and when transition is 11→-13 because of the interference caused at the time of multiplexing. From FIG. 120, it can be understood that the amount of phase rotation of the latter is larger than the former. Because of the influence of several transition patterns, on the IQ phase plane after differential demodulation, arrangements of signal points with high possibility differ from quadrant to quadrant, and hence symmetry with respect to quadrants is lost.

Figure 121:
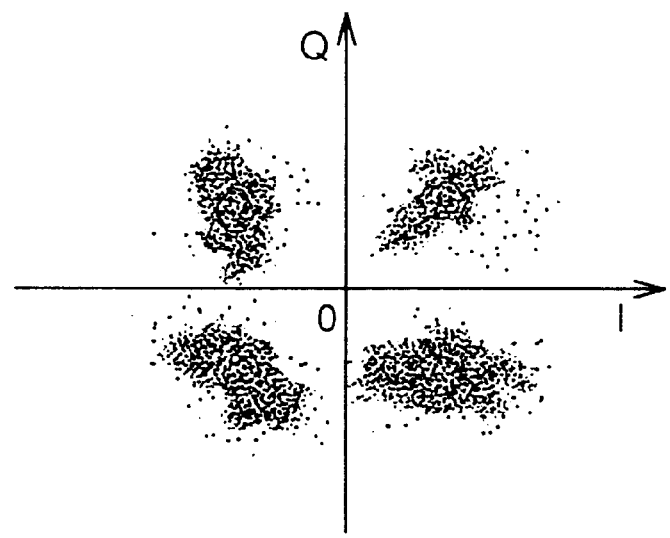

FIG. 121 shows distribution of signal points after differential demodulation where S/N=18 dB. As is apparent from FIG. 121, negative portion of the I and Q axes are close to the signal points in the second and fourth quadrants, and there is not a central boundary for determination between the distributions of the signal points. In order to obtain this, possibility of generation of signal points in all the quadrants is calculated, assuming random data, and considering the possibility of generation, mean signal point coordinate is calculated, which is (-30.4, -30.4), whereby the amount of shift from the origin is obtained. In this embodiment, the mean coordinate value is set in the mean coordinate value memory circuit 176, and it is subtracted from the output signal from differential demodulating circuit 179 by means of subtracting circuit 174, whether the sign of the I and Q signals are positive/negative is determined by determining circuit 178 as in the prior art, and demodulated data 132 is obtained.

Figure 122:
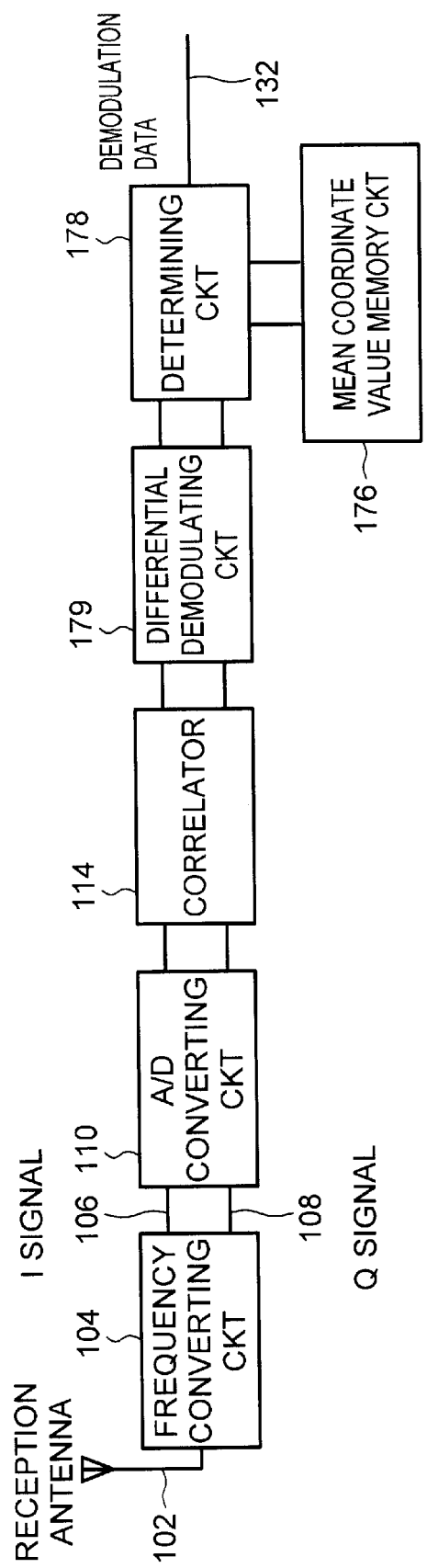

FIG. 122 is a block diagram showing a seventy-first embodiment of the present invention. In this embodiment, the magnitude of the output signal from differential demodulating circuit 179 is determined by determining circuit 178 using the means coordinate value from mean coordinate value memory circuit 176 as a reference. In this embodiment, the mean coordinate value calculated in the same manner as in the embodiment shown in FIG. 119 may be set in the mean coordinate value memory 176.

As described above, in the embodiment shown in FIGS. 119 and 122, the boundary for determination is arranged at the center of the signal point distribution, and therefore, the point which tends to be erroneously determined can be eliminated, and degradation in error rate can be suppressed. As a result, degradation in error rate caused by multiplexing can be suppressed while high speed data transmission is realized by multiplexing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A spread spectrum communication apparatus, comprising:

serial/parallel converting means for converting a data sequence into a plurality of parallel signals;

spread code generating means for generating a spread code;

multiplying means for multiplying the plurality of parallel signals converted by said serial/parallel converting means by the spread code generated from said spread code generating means to generate a plurality of spread signals;

modulating means for modulating the plurality of spread signals output from said multiplying means to generate a plurality of intermediate frequency signals;

delay means, having a plurality of different delay times, for delaying the plurality of intermediate frequency signals generated from said modulating means by said plurality of different delay times, to generate a plurality of delayed signals; and transmission signal output means for combining the plurality of delayed signals output from said delay means and for transmitting the combined delayed signals as a transmission signal, said plurality of different delay times having an arbitrary time difference of at least 1 chip from each other.

2. A spread spectrum communication apparatus, comprising:

serial/parallel converting means for converting a data sequence into a plurality of parallel signals;

spread code generating means for generating a spread code;

multiplying means for multiplying the plurality of parallel signals converted by said serial/parallel converting means by the spread code generated from said spread code generating means, to generate a plurality of baseband spread signals;

delay means, having a plurality of different delay times, for delaying said plurality of baseband spread signals by said plurality of different delay times to generate a plurality of delayed signals; and transmission signal output means for combining and outputting as a transmission signal the plurality of delayed signals delayed by said delay means, said plurality of different delay times having an arbitrary time difference of at least 1 chip from each other.

3. A spread spectrum communication apparatus, comprising:

serial/parallel converting means for converting a data sequence into a plurality of parallel signals that are baseband;

first delay means, having a plurality of different delay times, for delaying the plurality of parallel signals converted by said serial/parallel converting means by said plurality of different delay times to generate a plurality of delayed signals that are parallel;

spread code generating means for generating a spread code;

second delay means, having a same plurality of different delay times as said plurality of different delay times, for delaying the spread code generated from said spread code generating means by said plurality of different delay times to generate a plurality of delayed spread codes;

multiplying means for multiplying the plurality of delayed signals generated from said first delay means by the plurality of delayed spread codes output from said second delay means, to generate a plurality of spread signals; and transmission signal output means for combining and outputting as a transmission signal the plurality of spread signals output from said multiplying means, said multiplying means multiplying delayed signals and delayed spread codes having the same delay times, and said plurality of different delay times having an arbitrary time difference of at least 1 chip from each other.

4. A spread spectrum communication apparatus, comprising:

serial/parallel converting means for converting a data sequence into a plurality of parallel signals;

latch means for latching said plurality of parallel signals to generate a plurality of latch signals;

spread code generating means for generating a spread code;

delay means, having a plurality of different delay times, for delaying the spread code generated from said spread code generating means by said plurality of different delay times to generate a plurality of delayed spread codes;

multiplying means for multiplying the plurality of latch signals latched in said latch means by the plurality of delayed spread codes output from said delay means, to generate a plurality of delayed spread signals;

transmission signal output means for combining and outputting as a transmission signal the plurality of delayed spread signals generated by said multiplying means; and latch control means for generating a plurality of latch control signals which have the same timing as start chips of corresponding ones of the plurality of delayed spread codes, said latch means latching the plurality of parallel signals converted by said serial/parallel converting means in accordance with said plurality of latch control signals, whereby timings of said plurality of latch control signals and timings of the plurality of delayed spread codes output from said multiplying means are matched, and said plurality of different delay times having an arbitrary time difference of at least 1 chip from each other.

5. The spread spectrum communication apparatus according to any of claims 1 to 4, further comprising:

differential coding means provided in a preceding stage of said serial/parallel converting means for differentially encoding said data sequence; and receiving means, including demodulating means, for receiving and performing demodulation of said transmission signal, said demodulating means including differential decoding means for performing differential decoding of a signal based on the received transmission signal to generate a differential decoded signal having a time spread, and integrating means for integrating the differential decoded signal generated from said differential decoding means in a prescribed time range.

6. The spread spectrum communication apparatus according to any of claims 1 to 4, further comprising:

parallel/delay control means for setting a number of the plurality of parallel signals to be output from said serial/parallel converting means and for setting said plurality of different delay times of said delay means in accordance with environment of use.

7. The spread spectrum communication apparatus according to any of claims 1 to 4, comprising:

data generating means for generating said data sequence with data rate varied in accordance with information content; and parallel/delay control means for setting a number of the plurality of parallel signals to be output by said serial/parallel converting means and said plurality of different delay times of said delay means such that constant symbol rate is maintained regardless of variation of said data rate.

8. The spread spectrum communication apparatus according to any of claims 1 to 3, further comprising means for setting said plurality of delay times such that adjacent ones of the plurality of delayed signals have constant time difference.

9. A spread spectrum communication apparatus for transmission/reception using spread spectrum communication in such a data format that has a known data portion at a preamble portion, comprising:

correlating means for correlating a reception signal and a predetermined code;

detecting means for detecting the known data portion from a signal correlated by said correlating means;

known data portion output means for outputting in advance a correlated output of the known data portion; and delay profile calculating means for outputting a correlated signal at a time of actual measurements of said detecting means based on a detection signal from said detecting means, for comparing the output correlated signal with the correlated output from said known data portion output means, and for generating a delay profile indicating a state of the signal correlated by said correlating means.

10. The spread spectrum communication apparatus according to claim 9, further comprising:

delay spread calculating means for calculating delay spread from the delay profile generated by said delay profile calculating means, to generate various delay characteristics from the calculated delay spread based on a predetermined theoretical expression.

11. The spread spectrum communication apparatus according to claim 9, further comprising:

integrating means for integrating at every spread period timing a difference signal between two signals compared by said delay profile calculating means and for providing the integrated difference signal as the delay profile.

12. The spread spectrum communication apparatus according to claim 9, further comprising:

filter means for filtering, at a same spread period timing, a difference signal between two signals compared by said delay profile calculating means and for providing the filtered difference signal as the delay profile.

13. A spread spectrum communication apparatus for transmission/reception using spread spectrum communication in such a data format that has a known data portion at a preamble portion, comprising:

correlating means for correlating a reception signal with a predetermined code;

detecting means for detecting the known data portion from the signal correlated by said correlating means;

delay profile calculating means for calculating a delay profile indicating a state of a delay signal from the known data portion detected by said detecting means; and means for determining setting of path diversity based on the delay profile calculated by said delay profile calculating means.

14. A spread spectrum communication apparatus for transmission/reception using spread spectrum communication in such a data format that has a known data portion at a preamble portion, comprising:

correlating means for correlating a reception signal with a predetermined code;

detecting means for detecting the known data portion from the signal correlated by said correlating means;

delay profile calculating means for calculating a delay profile indicating a state of a delay signal from the known data portion detected by said detecting means; and means for determining setting of a multipath canceler from the delay profile calculated by said delay profile calculating means.

15. The spread spectrum communication apparatus according to claim 14, wherein said means for determining setting of a multipath canceler includes subtracting means for calculating a signal component at a delay amount corresponding to a data demodulation timing of the delay profile calculated by said delay profile calculating means in accordance with a demodulating data component and subtracting the calculated signal component from a correlated output of a timing portion of the reception signal used for demodulation of data other than the known data portion, based on the detection signal from said detecting means.

16. The spread spectrum communication apparatus according to claim 15, further comprising:

storing means for storing a reference value for determining whether subtraction is to be performed or not, said subtracting means does not subtract the calculated signal component from the correlated output when the calculated signal component is smaller than the reference value stored in said storing means.

17. The spread spectrum communication apparatus for transmission/reception using spread spectrum communication in such a data format that has a known data portion at a preamble portion, comprising:

correlating means for correlating a reception signal with a predetermined code;

detecting means for detecting the known data portion from the signal correlated by said correlating means;

known data portion output means for outputting in advance a correlated output of the known data portion;

delay profile calculating means for calculating a delay profile indicating a state of a delay signal from the correlated output of said known data portion output means; and modulating/demodulating means for delaying, combining and multiplexing the signal correlated by said correlating means, for determining a number of multiplexing and an amount of delay based on the delay profile output from said delay profile calculating means.

18. The spread spectrum communication apparatus according to claim 17, further comprising:

interference amount storing means for storing in advance an amount of interference corresponding to an error rate required in a communication link, said modulating/demodulating means calculating an amount of interference at a data transmission timing based on a calculated value of the delay profile and selecting a number of multiplexing and an amount of delay which are optimal and not exceeding the amount of interference stored in said interference amount storing means.

19. A spread spectrum communication apparatus for transmission/reception using spread spectrum communication in such a data format that has a known data portion at a preamble portion, comprising:

correlating means for correlating a reception signal with a predetermined code;

detecting means for detecting the known data portion from the signal correlated by said correlating means;

known data portion output means for outputting in advance a correlated output of the known data portion; and modulating/demodulating means for not performing multiplexing of the known data portion output from said known data portion output means and a subsequent specific data portion, and for multiplexing by delaying and combining the signal correlated by said correlating means at a subsequent specific portion.

20. The spread spectrum communication apparatus according to claim 17, wherein the number of multiplexing and the amount of delay determined by said modulating/demodulating means are transmitted as information inserted into a specific data portion to be multiplexed, and the number of multiplexing and the amount of delay are identified in the specific data portion, and demodulation is performed accordingly.

21. The spread spectrum communication apparatus according to claim 20, wherein the spread spectrum communication apparatus is a system allowing bidirectional communication, and determination and insertion of the number of multiplexing and the amount of delay into the specific data portion are performed in one direction, and the number of multiplexing and the amount of delay are the same in both directions of communication.

22. A spread spectrum communication apparatus in which an arbitrary number of delay waves delayed by an arbitrary number of chips with respect to a spread signal are multiplexed on a transmitting side, a modulated data obtained by differential decoding of data of continuous delay waves is received, comprising:

detecting means for estimating phase difference caused by frequency offset between transmission and reception; and compensating means for providing compensation with demodulated data in accordance with the amount of delay of each of the multiplexed delay waves in accordance with detected correlation peak and phase difference estimated by said detecting means.

23. A spread spectrum communication apparatus, comprising:

correlating means for detecting a correlation peak value of each wave of multiplexed spread signals;

correlation peak period detecting means for detecting a period of correlation peak value of each wave of the multiplexed spread signals based on an output from said correlating means;

differential demodulating means for differentially demodulating the output from said correlating means to output data;

demodulated data rotating means for rotating a phase of the data output by said differential demodulating means;

phase difference detecting means for extracting a phase difference of each wave of the multiplexed spread signals based on a signal from said differential demodulating means; and means, responsive to detection of the periods of the correlation peak value by said correlation peak period detecting means, for estimating a mean value of phase difference of each wave of the multiplexed spread signals based on the phase difference extracted by said phase difference detecting means and for controlling rotation of the data by said demodulated data rotating means.

24. The spread spectrum communication apparatus according to claim 23, wherein said means for estimating comprises:

phase difference estimating means for estimating the mean value of phase difference of each wave of the multiplexed spread signals based on the phase difference extracted by said phase difference extracting means; and operating means, controlled in accordance with an output from said correlation peak period detecting means, for multiplying the mean value of phase difference estimated by said phase difference detecting means by a coefficient in accordance with an amount of delay, to compensate for demodulated data output from said demodulated data rotating means.

25. The spread spectrum communication apparatus according to claim 23, wherein said means for estimating comprises:

first switching means for switching dependent on whether the correlation peak value detected by said correlation peak period detecting means is a first value or a second value;

first phase difference estimating means, responsive to switching of said first switching means when the correlation peak value is the first value, for estimating the mean value of phase difference of each wave of the multiplexed spread signal extracted by said phase difference determining means;

second phase difference estimating means, responsive to switching of said first switching means when the correlation peak value is the second value, for estimating the mean value of phase difference of each wave of the multiplexed spread signal extracted by said phase difference determining means; and second switching means, switched dependent on whether the correlation peak value detected by said correlation peak period detecting means is the first value or the second value, for providing compensation for demodulated data output from said demodulated data rotating means in accordance with an amount of delay, based on the mean value of phase difference estimated by said first and second phase difference estimating means.

26. A spread spectrum communication apparatus, comprising:

multiplexing means for spreading a transmission signal by using a single spread code to generate a plurality of spread symbols, delaying continuous spread symbols by a single or a plurality of chips of the spread transmission signal and for multiplexing the plurality of spread symbols and the delayed spread symbols; and data inserting means for inserting data for maintaining constant or multiplying by a constant value the spread symbols delayed by a single or a plurality of chips.

27. A spread spectrum communication apparatus in which a transmission signal is spread by using a single spread code to generate a plurality of spread symbols, continuous spread symbols are delayed by one or a plurality of chips of the spread code and the plurality of spread symbols are multiplexed and transmitted, and the transmitted spread spectrum signal is received, the spread spectrum communication apparatus comprising:

correlating means for receiving and correlating the transmitted spread spectrum signal with a predetermined code and for outputting a correlation peak value;

pattern recognition means for recognizing a pattern indicative of a correlation peak value output from said correlating means; and means for setting a code different from said predetermined code, based on a pattern recognized by said pattern recognizing means.

28. A spread spectrum communication apparatus, comprising:

a reception antenna for receiving a transmission signal;

frequency converting means for frequency converting the transmission signal received by said reception antenna with a frequency in synchronization with transmission frequency to baseband I and Q signals;

converting means for converting the baseband I and Q signals to digital signals;

first correlating means for correlating an output from said converting means with a predetermined code;

first determining means for determining an output from said first correlating means and outputting demodulated data;

spread symbol estimating means for estimating, using determination data of an output of said first determining means, preceding and succeeding spread symbols multiplexed on a multiplexed spread symbol to be cancelled;

multiplexed signal removing means for cancelling, by subtracting preceding and succeeding spread symbols to be cancelled multiplexed on the multiplexed spread symbol to be cancelled, by adjusting through successive delay timings of the spread symbol to be cancelled of the output from said spread symbol estimating means and timing of the multiplexed spread symbol to be cancelled of the output from said converting means;

second correlating means for correlating an output from said multiplexed signal removing means and a predetermined code; and second determining means for determining an output from said second correlating means and providing demodulated data.

29. The spread spectrum communication apparatus according to claim 28, further comprising:

second spread symbol estimating means for estimating preceding spread symbol multiplexed on a multiplexed spread symbol to be cancelled, by using an output from said second determining means.

30. The spread spectrum communication apparatus according to claim 28, wherein said multiplexed signal removing means comprises:

a plurality of first delay means for successively delaying timing of a spread symbol of the output from said spread symbol estimating means which is to be cancelled;

second delay means for delaying timing of the multiplexed spread symbol of the output from said converting means which is to be cancelled; and subtracting means for subtracting the spread symbol to be cancelled as delayed by said plurality of first delay means from the multiplexed spread symbol to be cancelled as delayed by said second delay means.

31. The spread spectrum communication apparatus according to claim 30, further comprising amplitude adjusting means for adjusting amplitude level of the spread symbol to be cancelled as delayed by said plurality of first delay means to a level obtained by dividing amplitude level of the multiplexed spread symbol to be cancelled by a number of multiplexing.

32. The spread spectrum communication apparatus according to claim 28, wherein said multiplexed signal removing means comprises:

amplitude adjusting means for adjusting amplitude level of the multiplexed spread symbol of the output of said converting means which is to be cancelled to ten and several times of the amplitude level of the multiplexed spread symbol to be cancelled;

a plurality of first delay means for successively delaying timing of the spread symbol of the output of said spread symbol estimating means which is to be cancelled:

second delay means for delaying the output from said amplitude adjusting means; and subtracting means for subtracting the spread symbol to be cancelled as delayed by said plurality of first delay means from the multiplexed spread symbol to be cancelled as delayed by said plurality of second delay means.

33. A spread spectrum communication apparatus comprising:

a reception antenna for receiving a transmission signal;

frequency converting means for frequency converting the transmission signal received by said reception antenna with a frequency in synchronization with or close to transmission frequency to baseband I and Q signals;

converting means for converting the baseband I and Q signals to digital signals;

correlating means for correlating an output from said converting means with a predetermined code;

differential demodulating means for differentially demodulating an output from said correlating means; and determining means for determining an output from said differential demodulating means to provide demodulated data, wherein a signal is spread by using a single spread code to generate spread signals, continuous spread symbols are delayed by one or a plurality of chips of the spread code, and a plurality of the delayed spread symbols are multiplexed and transmitted as the transmission signal received by said reception antenna, and wherein assuming a random transmission data, a possibility of generation of signal points on I and Q phase planes of the output of said differential demodulating means is calculated in advance, a mean coordinate thereof is calculated in consideration of the possibility of generation, and determination by said determining means is performed after I and Q coordinate values of the mean coordinate are subtracted from data of the baseband I and Q signals.

34. A spread spectrum communication apparatus comprising:

a reception antenna for receiving a transmission signal frequency converting means for frequency converting the transmission signal received by said reception antenna with a frequency in synchronization with or close to transmission frequency to baseband I and Q signals;

converting means for converting the baseband I and Q signals to digital signal;

correlating means for correlating an output from said converting means with a predetermined code;

differential demodulating means for differentially demodulating an output from said correlating means; and determining means for determining an output from said differential demodulating means and obtaining demodulated data, wherein a signal is spread by using a single spread code to generate spread symbols, continuous spread symbols are delayed by one or a plurality of chips of the spread code and a plurality of the delayed spread symbols are multiplexed and transmitted as the transmission signal received by said reception antenna, and wherein assuming random transmission data, a possibility of generation of signal points on I and Q phase planes of the output of said differential demodulating means is calculated in advance, a mean coordinate thereof is calculated in consideration of the possibility of generation, and said determining means determines using I and Q coordinate delay of the mean coordinate as references for determining the baseband I and Q signals.

35. A method of direct spread spectrum communication, in which a signal spread by one spread code is delayed by arbitrarily several chips and multiplexed for transmission, a code of which an auto-correlation side lobe is determined uniquely by a value of either preceding or succeeding data regardless of auto-correlation of odd or even correlation being used as the spread code, with a correlation value to be canceled being a central correlation value, correlations of data timings of (number of multiplexing−1) are held preceding and succeeding the correlation to be canceled, the preceding or succeeding data is selected to select and add correlated values of preceding data and succeeding data determined uniquely, a result of addition is divided by a division rate, and the correlation value to be canceled is added to/subtracted from a result of division to provide a correlated output with an auto/correlation side lobe canceled.

36. The method of direct spread spectrum communication according to claim 35, wherein when the correlated values are divided into blocks by the number of multiplexing and one of the blocked correlated values is to be canceled, an amount of delay is controlled such that all combinations of preceding and succeeding data are processed in one block, said correlations corresponding to the block are held, correlated values other than the correlation value to be canceled are selected and added, a result of addition is divided by a spread rate, and the correlation value to be canceled is added to/subtracted from a result of division, canceling the auto-correlation side lobe.

37. The method of direct spread spectrum communication according to claim 36, wherein when a Barker code of 11 chips which has a sign opposite to a signal used as a reference for canceling the auto-correlation side lobe is used for division and the number of multiplexing is k, a divisor is 11−k+2, and when a Barker code of 13 chips which has a same sign as the signal used as a reference for canceling the auto-correlation side lobe, and the number of multiplexing is k, the divisor is 13+k−2.

38. The method of direct spread spectrum communication according to claim 35, wherein when demodulation is performed by using post detection integration, at a demodulation timing used for post detection integration, in order to cancel the auto-correlation side lobe, with correlation corresponding to the post detection integration to be canceled being a center, preceding and succeeding data timing correlations corresponding to the number of multiplexing are held, correlation values of uniquely determined preceding data and succeeding data are selected and added, the result of addition is divided by a spread rate, and the result of division is added to/subtracted from the correlated value of the timing of the post detection integration to be canceled, canceling the auto-correlation side lobe.

39. The method of direct spread spectrum communication according to claim 35, wherein when the correlated values are divided into blocks of the number of multiplexing and one of the blocks of correlated values is to be canceled, all data of the block of correlated values to be canceled are added, a result of addition is divided by a spread rate, and the block of correlated values to be canceled is added to/subtracted from a result of division, canceling the auto-correlation side lobe.

40. The method of direct spread spectrum communication according to claim 39, wherein when a Barker code of 11 chips having a sign opposite to a signal used as a reference for canceling the auto-correlation side lobe is used as the spread code for division and the number of multiplexing is k, a divisor is 11−k+1, and when a Barker code of 13 chips having a same sign as the signal used as a reference for canceling the auto-correlation side lobe and the number of multiplexing is k, the divisor is 13+k−1.

41. The method of direct spread spectrum communication according to claim 37, wherein when the 11 chip Barker code is used, the divisor is set to 8, and division is performed by shifting data 3 bits by 3 bits with a least significant 3 bits removed, and when the 13 chip Barker code is used, the divisor is set to 16 and division is performed by shifting data 4 bits by 4 bits with a least significant 4 bits removed.

42. The method of direct spread spectrum communication according to claim 35, wherein an amplitude level of a reception signal is controlled by varying gain and the gain varied reception signal is digitized and quantified, gain being controlled by the correlated output.

* * * * *